(12) United States Patent
Ota

(10) Patent No.: US 7,787,772 B2
(45) Date of Patent: Aug. 31, 2010

(54) OPTICAL SIGNAL TRANSMISSION DEVICE AND OPTICAL COMMUNICATION NETWORK

(75) Inventor: Takeshi Ota, Tokyo (JP)

(73) Assignee: Canare Electric Co., Ltd., Aichi-Ken (JP)

( * ) Notice: Subject to any disclaimer, the term of this patent is extended or adjusted under 35 U.S.C. 154(b) by 633 days.

(21) Appl. No.: 11/795,940

(22) PCT Filed: Jan. 23, 2006

(86) PCT No.: PCT/JP2006/000979
§ 371 (c)(1),
(2), (4) Date: Jul. 24, 2007

(87) PCT Pub. No.: WO2006/080279
PCT Pub. Date: Aug. 3, 2006

(65) Prior Publication Data
US 2008/0131128 A1 Jun. 5, 2008

(30) Foreign Application Priority Data
Jan. 28, 2005 (JP) .............................. 2005-021523
Apr. 8, 2005 (JP) .............................. 2005-111625

(51) Int. Cl.
*H04J 14/02* (2006.01)
(52) U.S. Cl. .............................. 398/79; 398/68; 398/72; 398/81; 398/83
(58) Field of Classification Search .................. 398/79, 398/68, 72, 81, 83, 178, 181, 147
See application file for complete search history.

(56) References Cited

U.S. PATENT DOCUMENTS

| | | | | |
|---|---|---|---|---|
| 5,452,124 A | * | 9/1995 | Baker | 359/341.2 |
| 6,185,358 B1 | * | 2/2001 | Park | 385/140 |
| 6,954,303 B2 | * | 10/2005 | Islam | 359/334 |
| 7,330,303 B2 | * | 2/2008 | Sato et al. | 359/341.41 |
| 7,421,207 B2 | * | 9/2008 | Eiselt et al. | 398/181 |
| 7,474,459 B2 | * | 1/2009 | Sugaya et al. | 359/337.4 |
| 2002/0141048 A1 | * | 10/2002 | Spock et al. | 359/349 |
| 2003/0058523 A1 | * | 3/2003 | Islam | 359/334 |
| 2003/0076578 A1 | * | 4/2003 | Goto et al. | 359/337.4 |
| 2003/0123137 A1 | * | 7/2003 | Ota | 359/341.1 |
| 2004/0091266 A1 | * | 5/2004 | Okuno | 398/82 |

* cited by examiner

*Primary Examiner*—Ken N Vanderpuye
*Assistant Examiner*—Hibret A Woldekidan
(74) *Attorney, Agent, or Firm*—Notaro, Michalos & Zaccaria P.C.

(57) ABSTRACT

By using wavelength division multiplexing technologies, redundant star topology network is constructed on a ring-shaped optical fiber network. Edge-switches 5a, 5b, 5c, and 5d are connected to client station groups 6a, 6b, 6c, and 6d are connected, respectively. The edge-switches 5a, 5b, 5c, and 5d are connected to edge optical transport device 2a, 2b, 2c, and 2d. Core-switches 4a and 4b are connected to a core optical transport device 1. The edge optical transport device 2a, 2b, 2c, 2d, and the core optical transport device 1 are connected to a ring-shaped single optical fiber 3. A communication circuit 7 is formed among core optical transport device 1, edge optical transport devices 2a, 2b, 2c, and 2d, by using wavelength division multiplexing technologies.

15 Claims, 82 Drawing Sheets

OPTICAL SIGNAL TRANSMISSION DEVICE AND OPTICAL COMMUNICATION NETWORK

TECHNICAL FIELD

The present invention relates to a wavelength router and an OADM (Optical Add Drop Multiplexer) for an optical fiber communication system. The present invention also relates to an optical fiber communication network. The present invention relates to a wavelength division multiplexing systems and control software therefore.

BACKGROUND ART

So-called core-routers or core-switches applied for IP (Internet Protocol) networks, generally adopt redundant architecture. As shown in FIG. 90, the core-switch 1004a, and 1004b are disposed in duplicated manner. The core-switch 1004a and 1004b are connected through transmission line 1009 to share routing information. If the one of core-switches failed another core switch takes over job of the downed core-switch.

Edge-switches 1005a, 1005b, 1005c, and 1005d are connected to both core-switches. Each edge-switch is connected to both of core-switches, 1004a and 1004b. When two core-switches are under operation, traffic load is shared by two core-switches. When one of the core-switches failed, the surviving core-switch takes over entire traffic load.

VRRP (Virtual Router Redundancy Protocol) and MSTP (Multiple Spanning Tree Protocol) defined in IEEE802.1S are cited as redundant control protocol as shown above.

Furthermore, client stations 1006 are connected to the edge-switch 1005. A back-bone network 1008 is connected to the core-switch 1004a and 1004b.

DISCLOSURE OF THE INVENTION

Problems to be Solved by the Invention

The network shown in FIG. 90 requires very complicated transmission circuit 1007 among the core-switches 1004a, 1004b, the edge-switches 1005a, 1005b, 1005c, and 1005d. The transmission circuit 1007 needs huge amount of optical fiber deployment, as a result the deployment cost also become huge.

Metropolitan area network typically adopt redundant transmission line to protect against accidents such as cable cut. If the transmission circuit 1007 is made as duplicated form, network system consume more fibers, as a result, system deployment cost increase very much.

Present invention aims to solve the above problems.

Means to Solve the Problems

In order to solve the above problems, present invention adopts architectures described in claims. Here supplementary descriptions to the claims are provided.

The optical communication network according to present invention, for instance, comprises $1^{st}$ core-switch, $2^{nd}$ core-switch, at least one edge-switch, a core optical transport device, at least one edge optical transport device, and ring-shaped single optical fiber communication network, wherein the core optical transport device is connected to $1^{st}$ and $2^{nd}$ core-switch, $1^{st}$ and $2^{nd}$ core-switch connected each another, the edge optical transport device is connected to the edge-switch, $1^{st}$ circuit connected between the edge-switch and $1^{st}$ core-switch is formed by wavelength division multiplexing technology at the left side.

The optical communication network comprising the above architecture can build redundant star topology network on the ring-shaped single optical fiber physical layer. Hereby, the complicated transmission circuit 1007 shown in FIG. 90 can be implemented on ring-shaped single fiber physical network. In addition, redundant transmission lines are realized.

The details of present invention will be disclosed along description of embodiments. Present invention is described in claims, hereafter the details of invention will be showed by using the embodiments.

Effect of the Invention

According to present invention, the redundant star topology network is formed on ring-shaped optical fiber network. Both of the core-switches and transmission circuits made as redundant structures with small amount of optical fiber deployment are realized.

BRIEF DESCRIPTION OF THE DRAWINGS

FIG. 38 is a rearranged block diagram shown in FIG. 37a.

DESCRIPTION OF REFERENCE SYMBOLS

Figure 1:
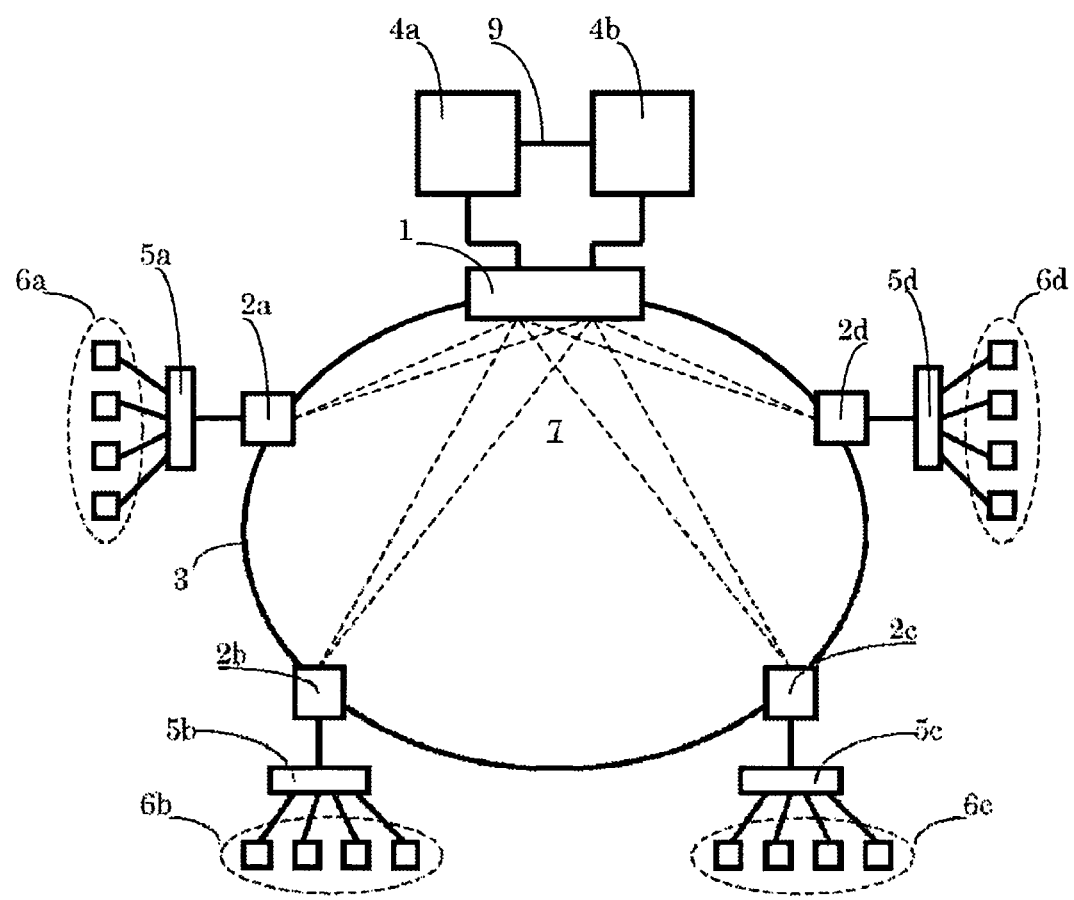
FIG. 1 is a schematic diagram of the $1^{st}$ embodiment of the optical communication network.

1 Core optical transport device
2 Edge optical transport device
3 Optical fiber
4 Core switch
5 Edge switch
6 Client stations
7 Transmission circuit
8 Backbone network
31 Core optical transport device
32 Edge optical transport device
33 Optical fiber
34 Optical fiber
41 Core optical transport device
43 Edge optical transport device
61 Core optical transport device
62 Edge optical transport device
63 Optical transport device
64 Core switch
66 Edge network
67 Transmission circuit
71 Edge switch
72 Edge switch
111 Core optical transport device
113 Ring-shaped optical fiber
117 Transmission circuit
121 Core switch
131 Core optical transport device
132 Edge optical transport device
133 Ring-shaped optical fiber
134 Core switch
135 Edge switch
136 Client station
137 Transmission circuit
171 Core optical transport device
172 Edge optical transport device
173 Core switch
174 Edge switch
175 Ring-shaped optical fiber
200 Optical transport device
201 Chassis
203 Optical transceiver
204 Optical transceiver
205 Slot for converter card
207 Optical fiber cable
208 Optical fiber cable
209 Wavelength division multiplexer
210 Remote optical fiber
211 Converter card with three-port switch
212 Management card
213 Cable
230 Converter card
231 Converter
240 Optical transport device
241 Converter
300 Dispersion compensation device
310 Dispersion compensation device
330 Converter card
350 Transmission circuit
400 Optical transport device

BEST MODES FOR CARRYING OUT THE INVENTION

Embodiments of the invention are described below.

The First Embodiment

FIG. 1 shows an optical communication network as a first embodiment of present invention. Client station group 6a and 6b are connected to Edge switches 5a and 5b, respectively. Edge switches 5a, 5b, 5c, and 5d are connected to edge optical transport devices 2a, 2b, 2c, and 2d, respectively. Core switches 4a and 4b are connected to a core optical transport device 1. The edge optical transport devices 2a, 2b, 2c, and 2d and the core optical transport device 1 are connected via ring-shaped single optical fiber 3. Among the core optical transport device 1, the edge optical transport devices 2a, 2b, 2c, and 2d, a transmission circuit 7 is formed using wavelength division multiplexing technology.

The switches described above denote packet exchanged based star-topology switch. In cases of IP (Internet Protocol) based switches, the above switches include layer 2 switches, layer 3 switches, and higher layer switches. Also the above switches include so-called Routers. The above switches are not limited by protocol. Star topology switches with any protocol are applicable.

Figure 2:
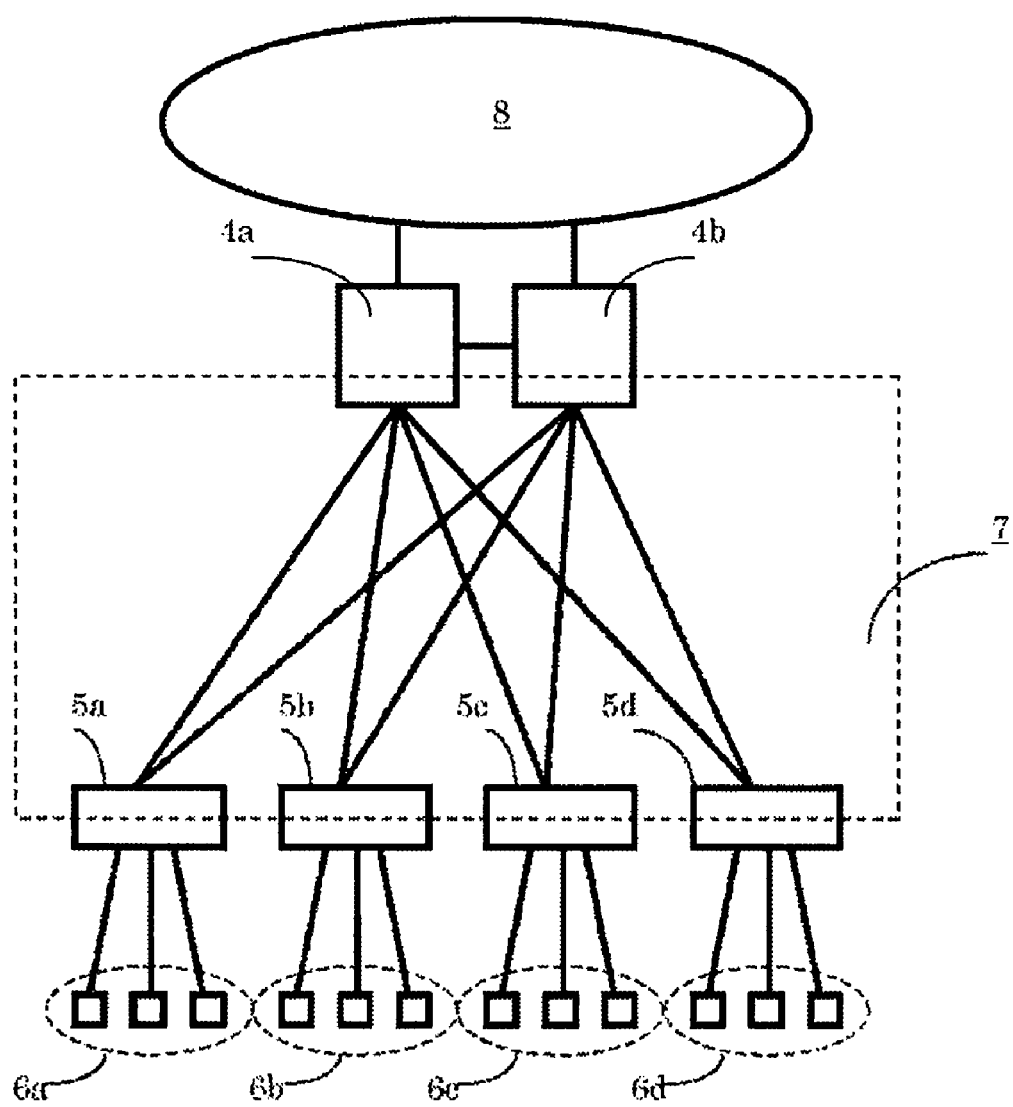
FIG. 2 is a schematic diagram describing a transmission circuit 7.

FIG. 2 shows transmission circuit 7. The transmission circuit 7 connects edge-switches 5a, 5b, 5c, and 5d are connected to core-switches 4a and 4b in a manner of star topology. A topology of the transmission circuit 7 is an overlaid star topology. One star topology comprises a core-switch 4a as a center node, and other nodes, edge-switches 5a, 5b, 5c, and 5d. Another star topology comprises a core-switch 4b as a center node, and other nodes, edge-switches 5a, 5b, 5c, and 5d. Hereafter, this topology is called as redundant star topology.

The redundant star topology is formed by wavelength routing using wavelength division multiplexing technology over the core optical transport device 1, an edge optical transport devices 2a, 2b, 2c, 2d, and optical fiber 3. The core-switches 4a and 4b are connected each another via a transmission circuit 9, as a result, routing information is shared. When one of the core-switches failed, another core-switch takes over the operation through the circuit 9. The core-switches 4a and 4b are connected to back-bone network as shown in FIG. 2. Edge-switches 5a, 5b, 5c, and 5d are connected both of core-switches 4a and 4b via transmission circuit 7. Therefore even if one of the core-switches failed, the edge-switches can communicate to the surviving core-switch. As a result high reliability is obtained.

It is suggested that, for example, VRRP (Virtual Router Redundancy protocol for IPv6) or MSTP (Multiple Spanning Tree Protocol) defined in IEEE802.1S is applicable for the network shown in FIG. 1. However the present invention is not limited by these protocols. Any protocol that comprises two or more core-switches and control mechanism of back-up system is applicable to the present invention.

Load-balancing function may be installed to the core-switch 4a and 4b. For example, if the core-switches 4a and 4b are assigned to the different domain of VLAN (Virtual Local Area Network), the communication traffic can be dispersed. In this case, the transmission circuit 9 interconnected between the core-switches 4a and 4b are used not only for routing information pass but also for real traffic pass. If some routing trouble has happened, the routing can be changed through the circuit 9.

Figure 3:
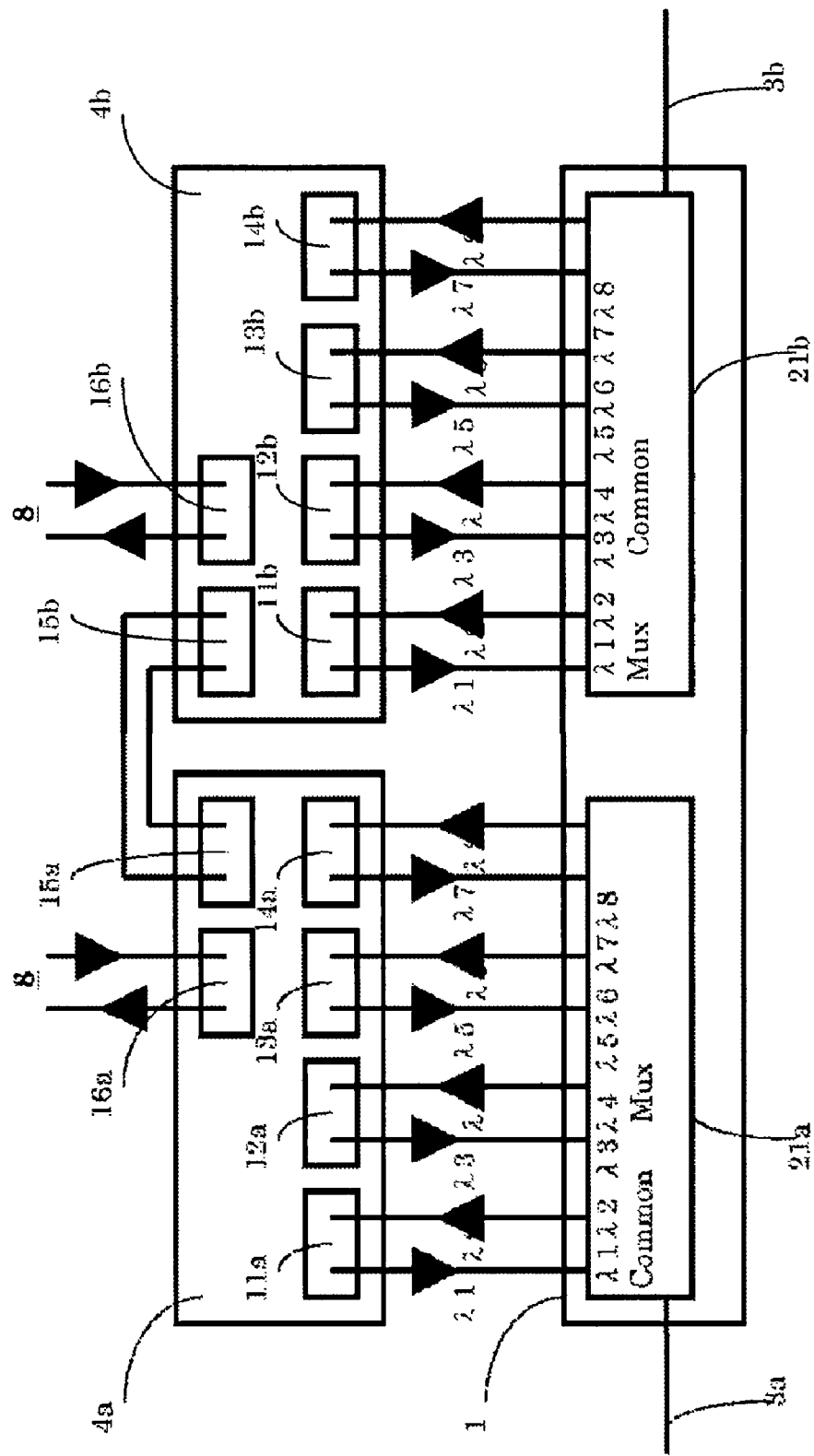
FIG. 3 is a schematic diagram showing detailed connection among core-switches 4a, 4b, and a core optical transport device 1.

FIG. 3 shows detailed connection among the core-switched 4a, 4b, and the core optical transport device 1. The core-switch 4a comprises pluggable optical transceivers 11a, 12a, 13a, and 14a. The core-switch 4b comprises pluggable optical transceivers 11b, 12b, 13b, and 14b. The pluggable optical transceivers 11a and 11b emits an optical signal of wavelength $\lambda_1$. The pluggable optical transceivers 12b and 12b emits an optical signal of wavelength $\lambda_3$. The pluggable optical transceivers 13b and 13b emits an optical signal of wavelength $\lambda_5$. The pluggable optical transceivers 14b and 14b emits an optical signal of wavelength $\lambda_7$. These pluggable optical transceivers 11a, 11b, 12a, 12b, 13a, 13b, 14a, and 14b, can receive an optical signal of a wide range of wavelength. The pluggable optical transceivers denote that these transceivers are able to put on and take off. As pluggable optical transceivers, SFP (Small Form Factor Pluggable) transceivers, or GBIC (Giga Bit Interface Converter) transceivers are applicable.

The core optical transport device comprises wavelength division multiplexers 21a and 21b. The wavelength division multiplexers 21a can multiplex 8 wavelengths from $\lambda_1$ to $\lambda_8$. The wavelength division multiplexers 21b can multiplex 8 wavelengths from $\lambda_1$ to $\lambda_8$. The wavelength division multiplexer 21a extracts optical signals of wavelength $\lambda_1$, $\lambda_3$, $\lambda_5$, and $\lambda_7$ from the optical fiber 3a and sends these optical signals to the optical transceivers 11a, 12a, 13a, and 14a, respectively. The wavelength division multiplexer 21a combines the optical signals of wavelength $\lambda_2$, $\lambda_4$, $\lambda_6$, and $\lambda_8$ into the optical fiber 3a. The wavelength division multiplexer 21b extracts optical signals of wavelength $\lambda_2$, $\lambda_4$, $\lambda_6$, and $\lambda_8$ from the optical fiber 3b and sends these optical signals to the optical transceivers 11b, 12b, 13b, and 14b, respectively. The wavelength division multiplexer 21b combines the optical signals of wavelength $\lambda_2$, $\lambda_4$, $\lambda_6$, and $\lambda_8$ into the optical fiber 3b.

As the wavelength division multiplexer 21a and 21b, a variety of devices such as thin film dielectric filters, AWG (Arrayed Waveguide Grating), and FBG (Fiber Bragg Grating) are applicable.

The core-switched 4a and 4b comprises signal transmission ports 15a and 15b, respectively. The signal transmission ports 15a and 15b are interconnected. Through the interconnected ports 15a and 15b, the core-switches 4a and 4b shares routing information and operates in a backup mode when one of the core-switches failed. The core-switches 4a and 4b comprises a signal transmission port 16a and 16b, respectively. The signal transmission ports 16a and 16b are connected to backbone network 8.

Figure 4:
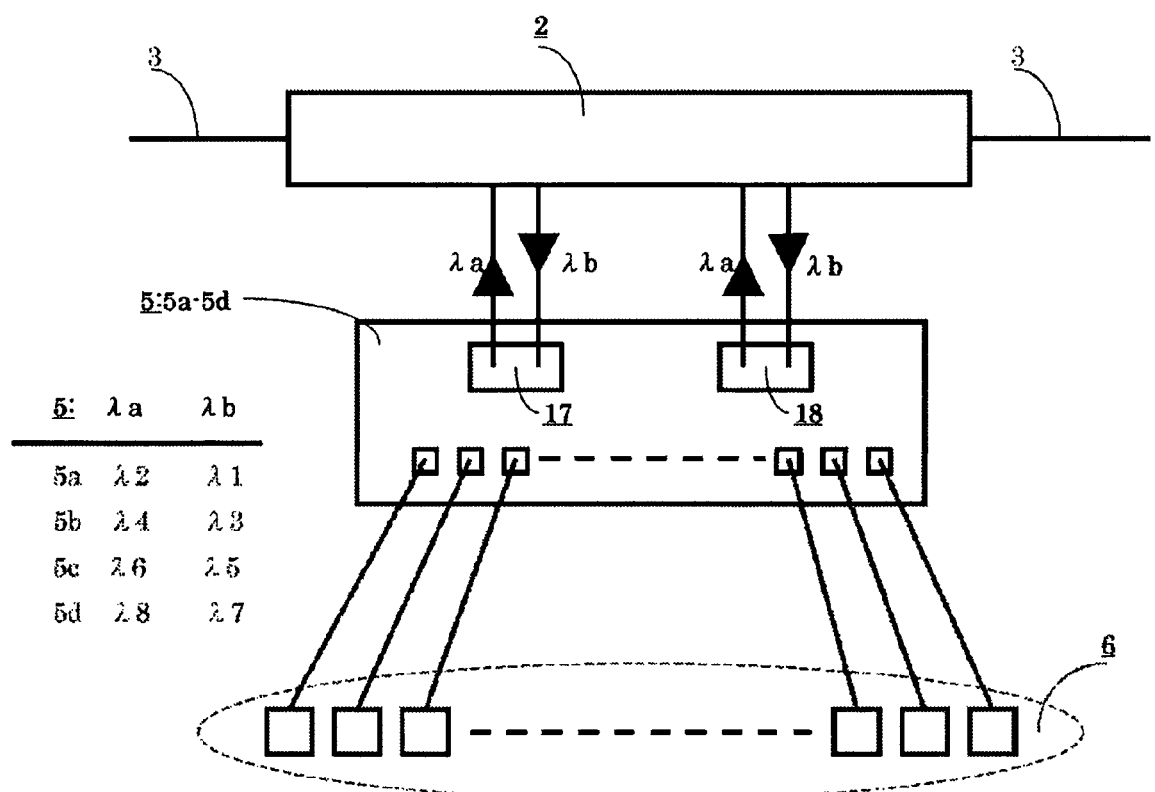
FIG. 4 is a schematic diagram showing detailed connection between an edge optical transport device 2 and an edge-switch 5.

FIG. 4 shows detailed connection between the edge optical transport device 2 and the edge-switch 5. The edge-switch 5 comprises pluggable optical transceivers 17 and 18. The edge-switch 5a comprises the pluggable optical transceivers 17 and 18 which emit wavelength $\lambda_2$. The edge-switch 5b comprises the pluggable optical transceivers 17 and 18 which emit wavelength $\lambda_4$. The edge-switch 5c comprises the pluggable optical transceivers 17 and 18 which emit wavelength $\lambda_6$. The edge-switch 5d comprises the pluggable optical transceivers 17 and 18 which emit wavelength $\lambda_8$.

Figure 5:
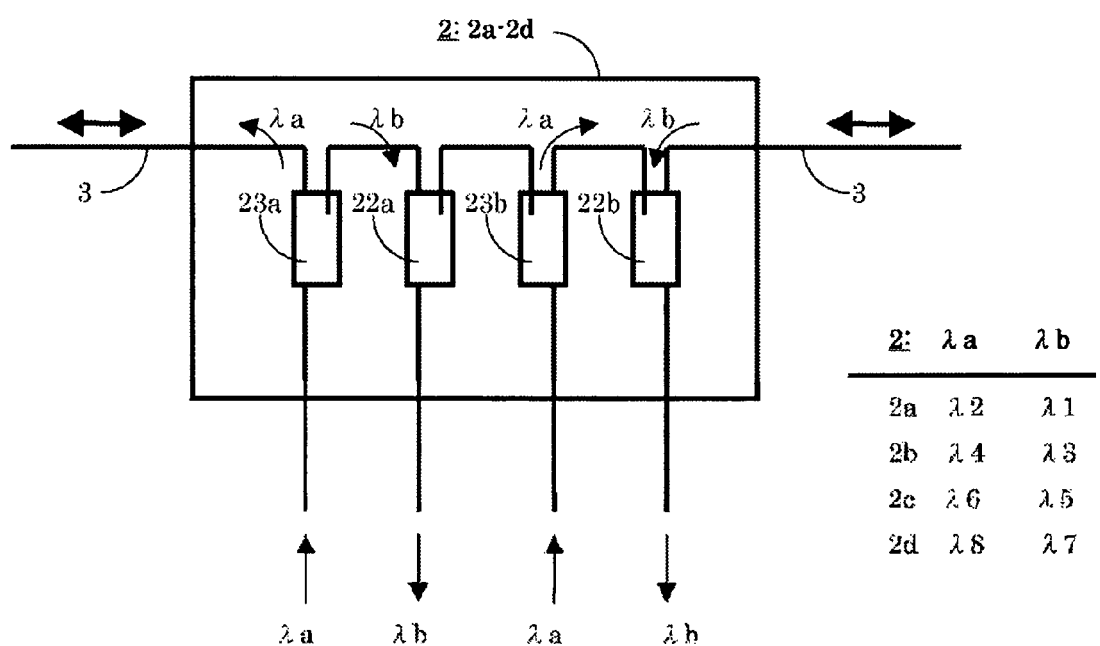
FIG. 5 is a schematic diagram showing inside architecture of the edge optical transport device 2.

FIG. 5 shows internal architecture of the edge optical transport device 2. The edge optical transport device 2 adopts so-called OADM (Optical Add Drop Multiplexer) architecture. The reference number 23a and 23b are thin film dielectric filters which pass optical signals of wavelength $\lambda b$. The reference number 22a and 22b are thin film dielectric filters which pass optical signals of wavelength $\lambda a$. In case of the edge optical transport device 2a, the wavelengths $\lambda a$ and $\lambda b$ denote $\lambda 2$ and $\lambda 1$, respectively. In case of the edge optical transport device 2b, the wavelengths $\lambda a$ and $\lambda b$ denote $\lambda 4$ and $\pm 3$, respectively. In case of the edge optical transport device 2c, the wavelengths $\lambda a$ and $\lambda b$ denote $\lambda 6$ and $\lambda 5$, respectively. And in case of the edge optical transport device 2d, the wavelengths $\lambda a$ and $\lambda b$ denote $\lambda 8$ and $\lambda 7$, respectively. FBG (Fiber Bragg Grating) may be applied for the OADM instead of the thin film dielectric filters.

Figure 6:
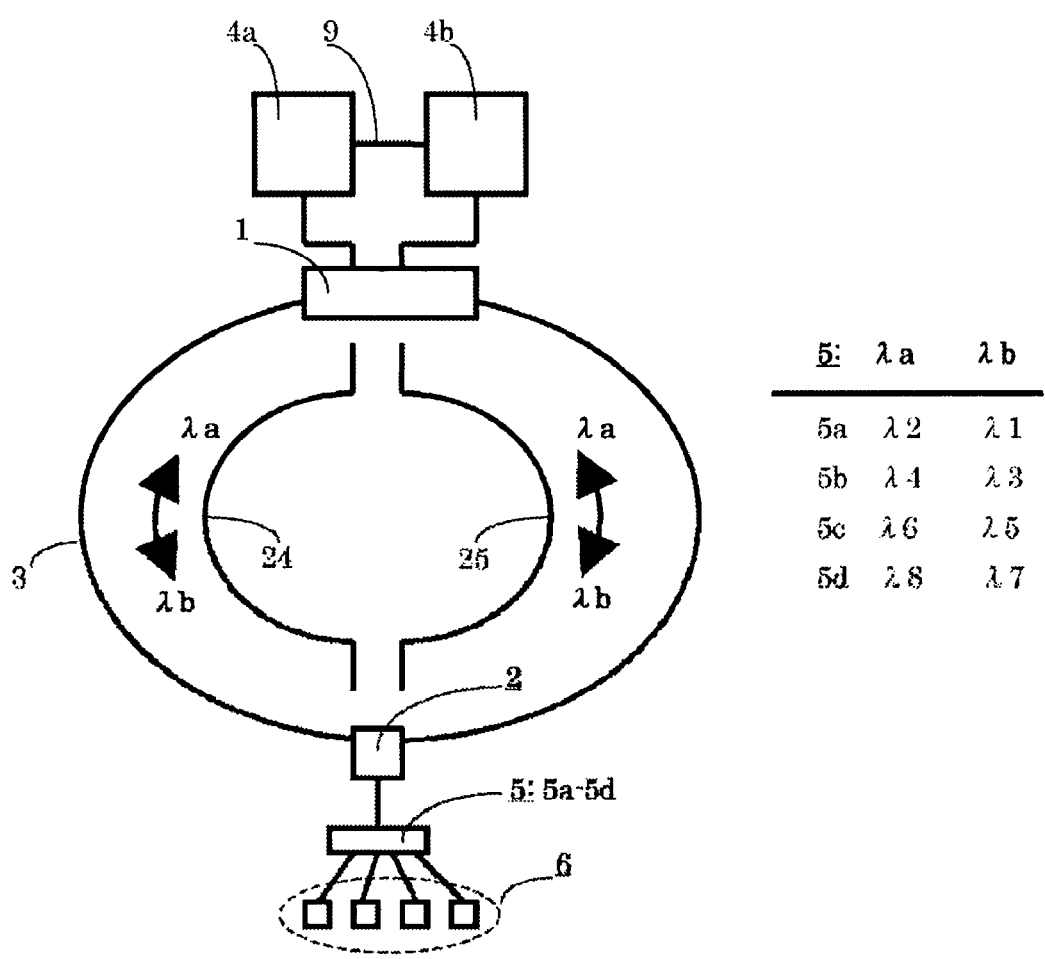
FIG. 6 is a schematic diagram showing transmission circuit formed between a core optical transport device 1 and edge optical equipment 2.

FIG. 6 shows transmission circuit formed between the core optical transport device 1 and the edge optical transport device 2. A left side transmission circuit 24 and a right side transmission circuit 25 are formed between the core optical transport device 1 and the edge optical transport device 2. An upstream signal from the edge optical transport device 2 to the core optical transport device 1 is an optical signal of wavelength $\lambda a$. A downstream signal from the core optical transport device 1 to the edge optical transport device 2 is an optical signal of wavelength $\lambda b$. Thus single fiber transmission over the optical fiber 3 is realized. The above wavelength alignment is valid in both of the left side transmission circuit 24 and the right side transmission circuit 25.

The left side transmission circuit 24 connects the edge-switch 5 and core-switch 4a. The right side transmission circuit 25 connects the edge-switch 5 and core-switch 4b. Both of the left side transmission circuit 24 and the right side transmission circuit 25 comprise two wavelengths $\lambda a$ and $\lambda b$. Typical OADM system needs 4 wavelengths to realize two transmission circuits. In present embodiment, the wavelengths are recycled so that the kinds of wavelengths are reduced.

Figure 7:
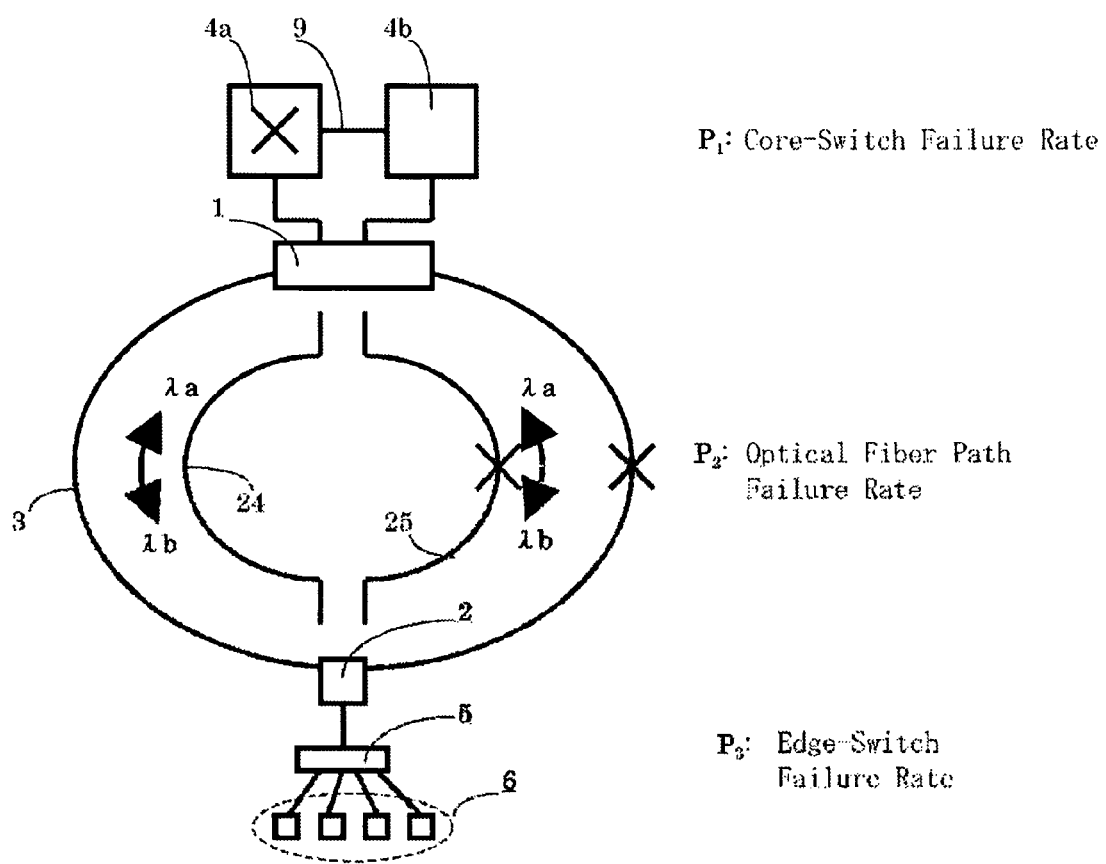
FIG. 7 is a schematic diagram describing reliability of the $1^{st}$ embodiment.

FIG. 7 shows reliability of the optical communication network. As shown in FIG. 7, P1, P2 and P3 denotes a failure rate of a core-switch, a failure rate of an optical fiber transmission circuit, and a failure rate of an edge-switch, respectively.

The most serious case is two core-switches fail simultaneously. In this case, entire network functions go down. The probability of this case is P1². Also, when both of the fiber transmission circuits failed simultaneously, the entire network functions will go down. The probability of this case is P2². In the case of failure of the optical fiber transmission circuit, sometimes, network function can survive in partially. In case of failure of the edge-switch, services for client stations 6 will go down. The probability of this case is P3.

In order to estimate failure rates of the above cases, for example, let us suppose P1, P2, and P3 are 1% per 1000 hours. The probability of the two core-switches fail simultaneously, P1², is 0.01% per 1000 hours. The probability of the two optical fiber transmission circuits fail simultaneously, P2², is 0.01% per 1000 hours. The probability of the edge-switch failure, P3, is 1% per 1000 hours.

As shown in FIG. 7, the case in which one of two optical fiber transmission circuits fail and one of two core-switches fails, simultaneously, must be considered. In this case, the entire network functions will go down. The probability of this case is P1×P2, that is, 0.01% per 1000 hours. Two type of case, simultaneous failure of the transmission circuit 24 and the core-switch 4b, and simultaneous failure of the transmission circuit 25 and the core-switch 4a, must be considered. As a result, simultaneous failure one of two core-switches and one of two transmission circuits is 0.02% per 1000 hours. The serious failure of the network shown in FIG. 7 is described by the equation (1).

$$Pa=P1^2+2P1P2+P2^2 \qquad (1)$$

If the P1 and P2 are 1% per 1000 hours, Pa is calculated as 0.04% per 1000 hours. This value of Pa is far smaller than P3 in which one of the edge-switches fails. Because in present embodiment, both of the core-switches and the optical fiber transmission circuits are disposed in duplex manner so that the probability of the serious failure is order of square of the failure rates of the network components.

As described above, the optical communication of present invention can reduce the failure rate of the entire network down.

The Second Embodiment

Figure 8:
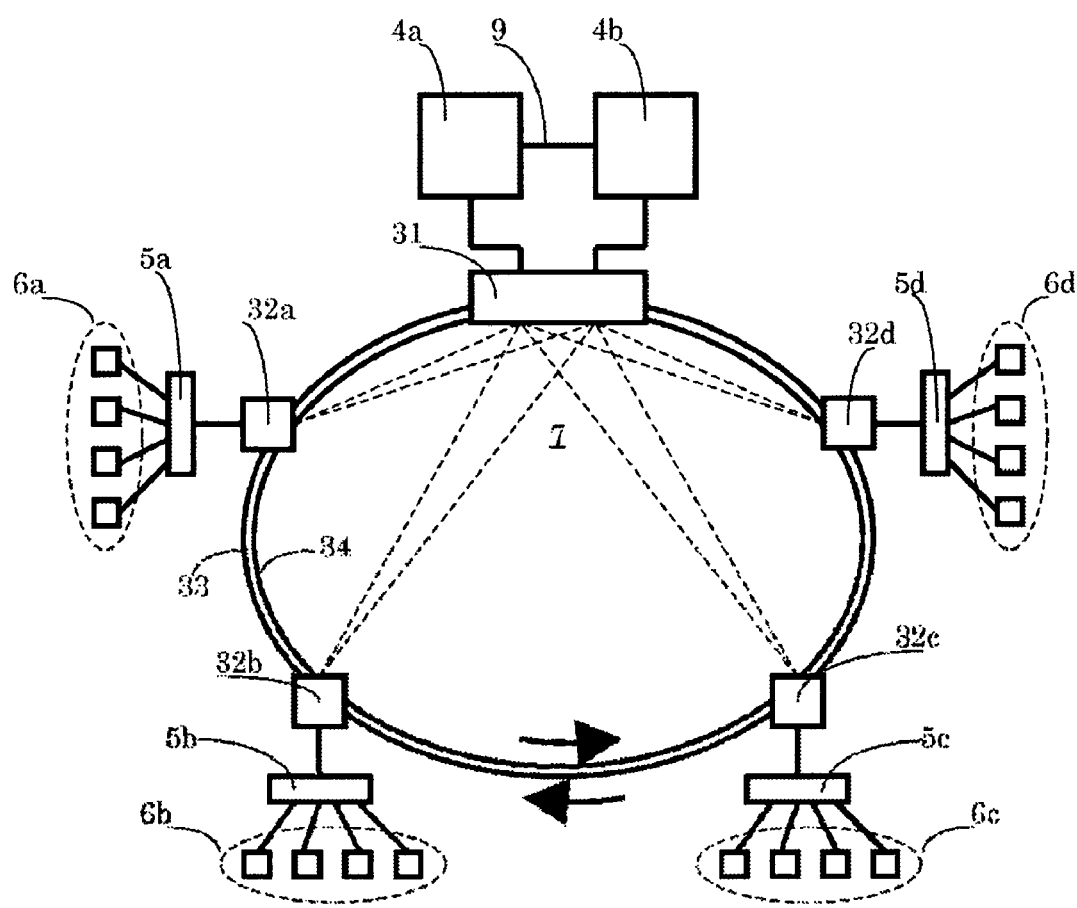
FIG. 8 is a schematic diagram of the $2^{nd}$ embodiment of the optical communication network.

FIG. 8 shows the second embodiment of present invention. The major difference from the first embodiment shown FIG. 1 is that present embodiment comprises two optical fibers. As shown in FIG. 8, optical signals propagate clockwise on an optical fiber 33, and optical signals propagate anticlockwise on an optical fiber 34. According to present invention, all the optical signals propagate same direction on each fiber. Therefore it is easy to install optical amplifiers on this optical communication network. The optical amplifiers generally comprise optical isolator so that only one-way optical signal propagation is allowed.

Figure 9:
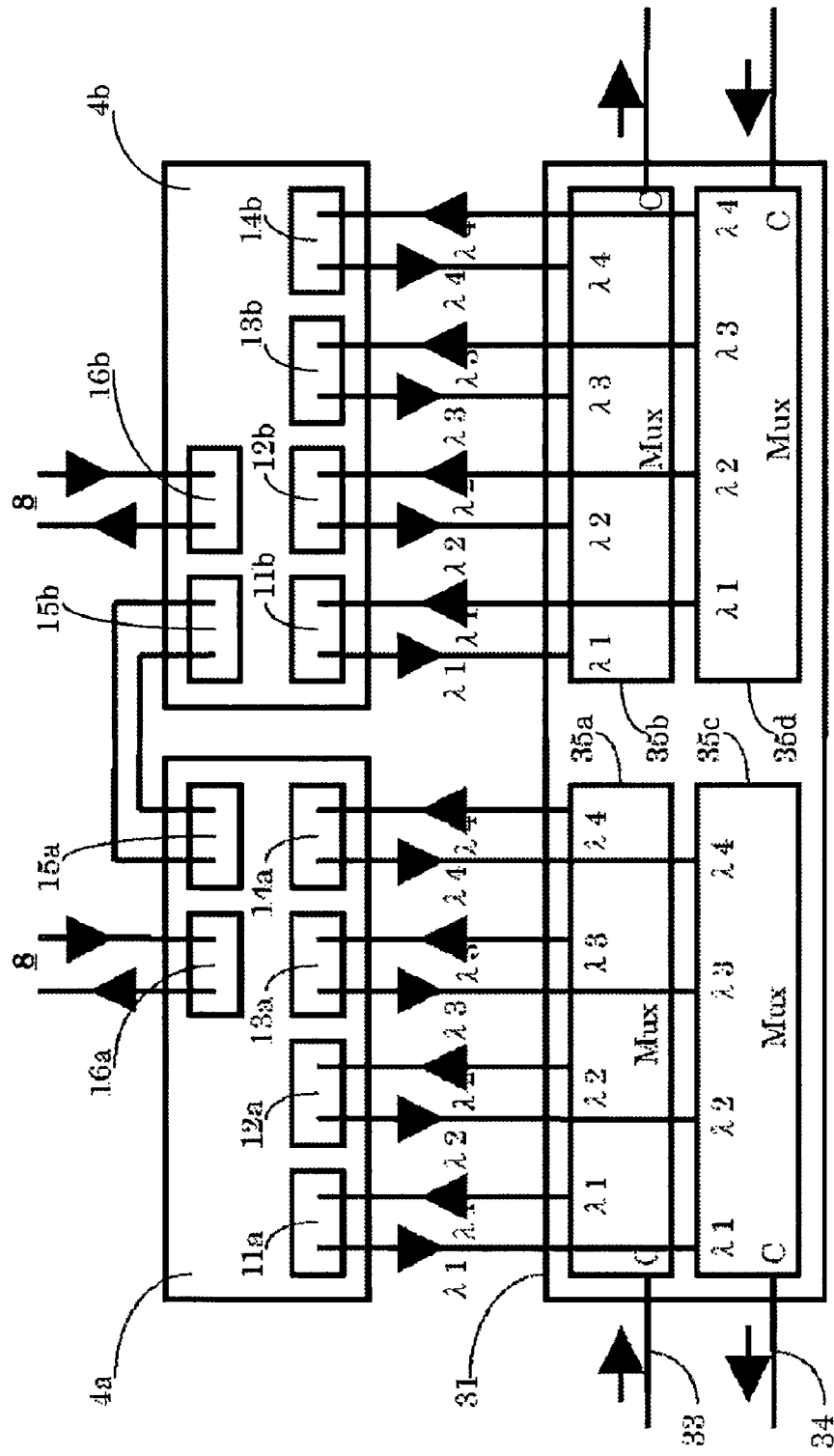
FIG. 9 is a schematic diagram showing detailed connection among core-switches 4a, 4b, and a core optical transport device 31.

FIG. 9 shows detailed connection among the core-switches 4a, 4b, and a core optical transport device 31. The major difference from FIG. 3 is that the core optical transport device 31 comprises wavelength division multiplexers 35a, 35b, 35c, and 35d. The wavelength division multiplexers 35a, 35b, 35c, and 35d can multiplex 4 wavelengths optical signals $\lambda 1$, $\lambda 2$, $\lambda 3$, and $\lambda 4$.

Figure 10:
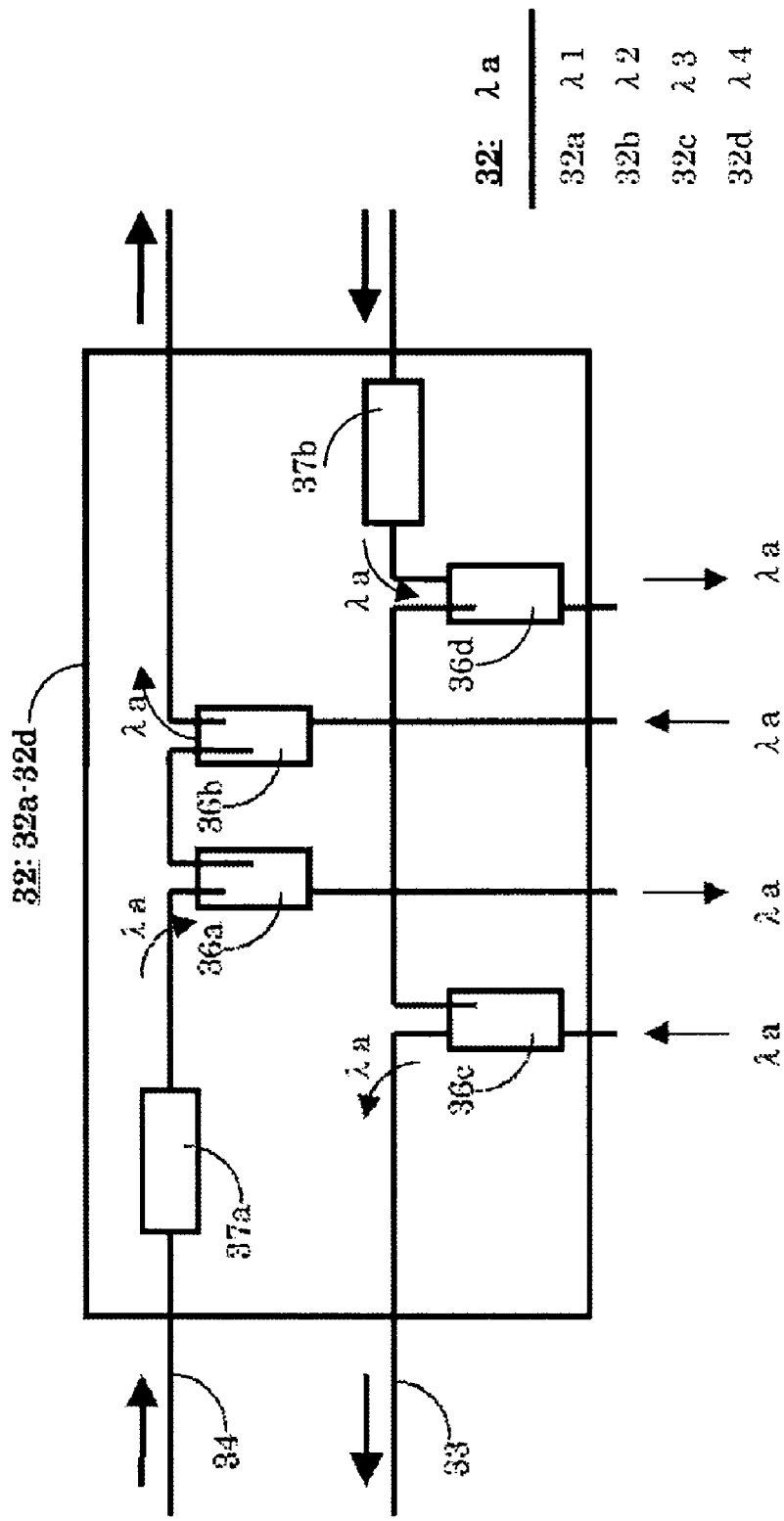
FIG. 10 is a schematic diagram showing inside architecture of the edge optical communication equipment 32.

FIG. 10 shows inside architecture of an edge optical transport device 32. The edge optical transport device 32 also comprises OADM (Optical Add Drop Multiplexer) as same as the edge optical transport device 2. In addition, the optical transport device 32 comprises optical amplifiers 37a and 37b. The reference number 36a and 36b denote dielectric thin film filters which pass wavelength of $\lambda a$. In the case in the edge optical transport devices 32a, 32b, 32c, and 32d, $\lambda a$ denotes $\lambda 1$, $\lambda 2$, $\lambda 3$, and $\lambda 4$, respectively.

According to present embodiment, the redundant star topology is formed by using two optical fibers, therefore high reliability communication network is realized as same as the first embodiment. Present embodiment comprises two optical fibers so that it is easy to install the optical amplifiers.

The Third Embodiment

Figure 11:
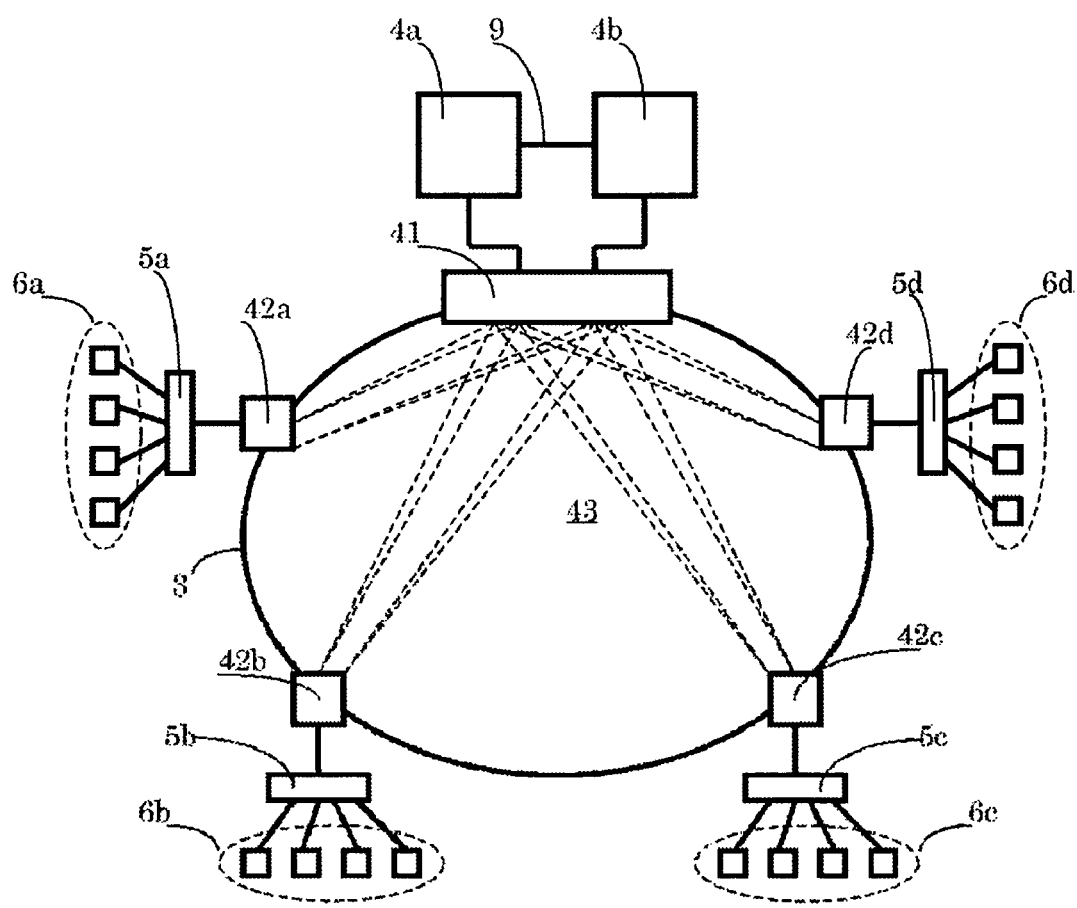
FIG. 11 is a schematic diagram showing the $3^{rd}$ embodiment of the optical communication network.

FIG. 11 shows the third embodiment of present invention. The major difference from the first embodiment shown FIG. 1 is that present embodiment comprises transmission circuit 43. The transmission circuit 43 is formed by wavelength division multiplexing technology, and comprises duplex redundant star topology in which each star topology is further duplicated. As shown in FIG. 11, a core optical transport device 41, edge optical transport devices 42a, 42b, 42c, and 42d, are connected by the transmission circuit 43 on the ring-shaped single optical fiber 3. Each element of star topology is duplicated so that further redundancy is obtained; as a result, high reliability network is realized.

Figure 12:
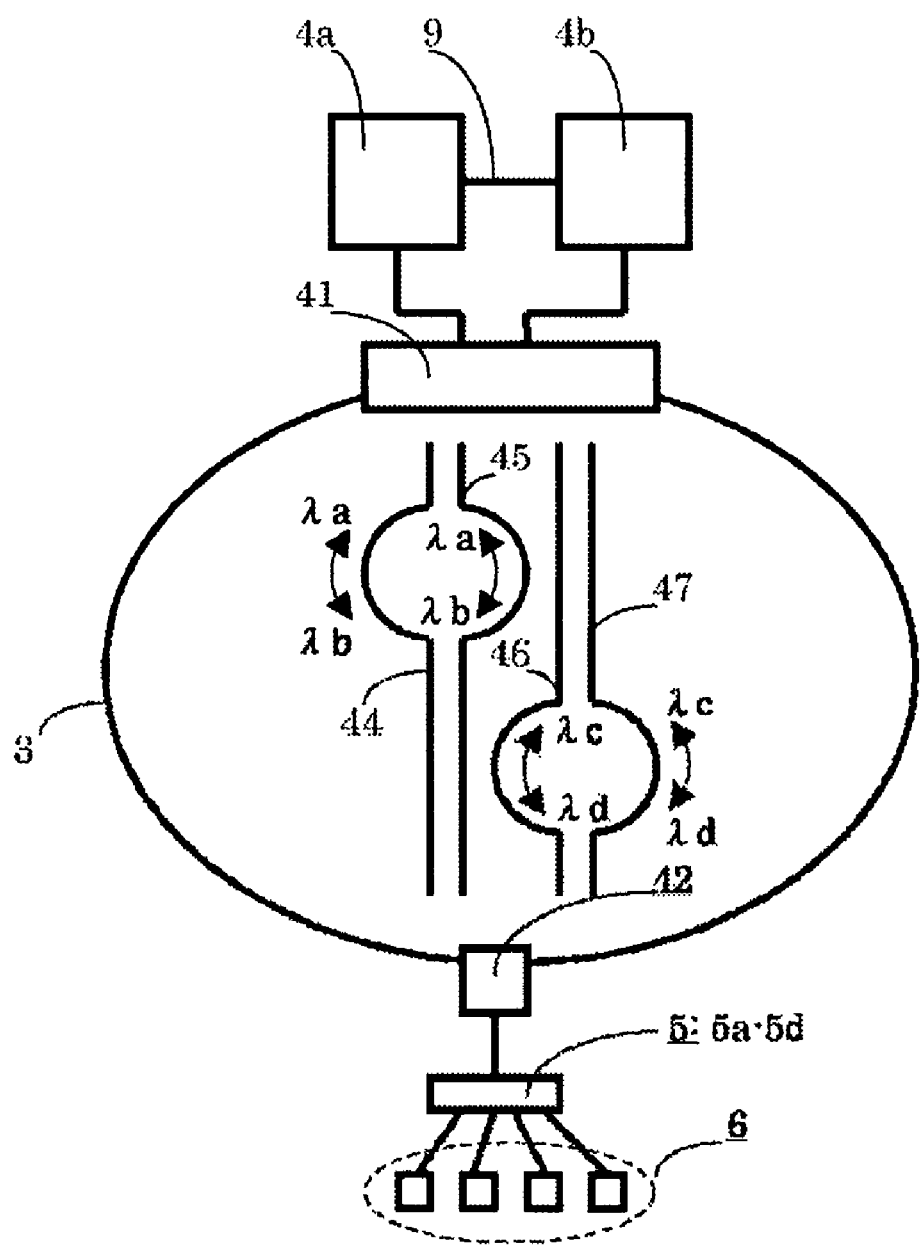
FIG. 12 is a schematic diagram showing duplex transmission circuit formed between a core optical transport device 41 and an edge optical transport device 42.

FIG. 12 shows duplex transmission circuit formed between the core optical transport device 41 and the edge optical transport device 42. A circuit 44 is formed on a left part of the optical fiber 3 using $\lambda a$ and $\lambda b$. A circuit 45 is formed on a right part of the optical fiber 3 using $\lambda a$ and $\lambda b$. A circuit 46 is formed on a left part of the optical fiber 3 using $\lambda c$ and $\lambda d$. A circuit 47 is formed on a right part of the optical fiber 3 using $\lambda c$ and $\lambda d$.

Figure 13:
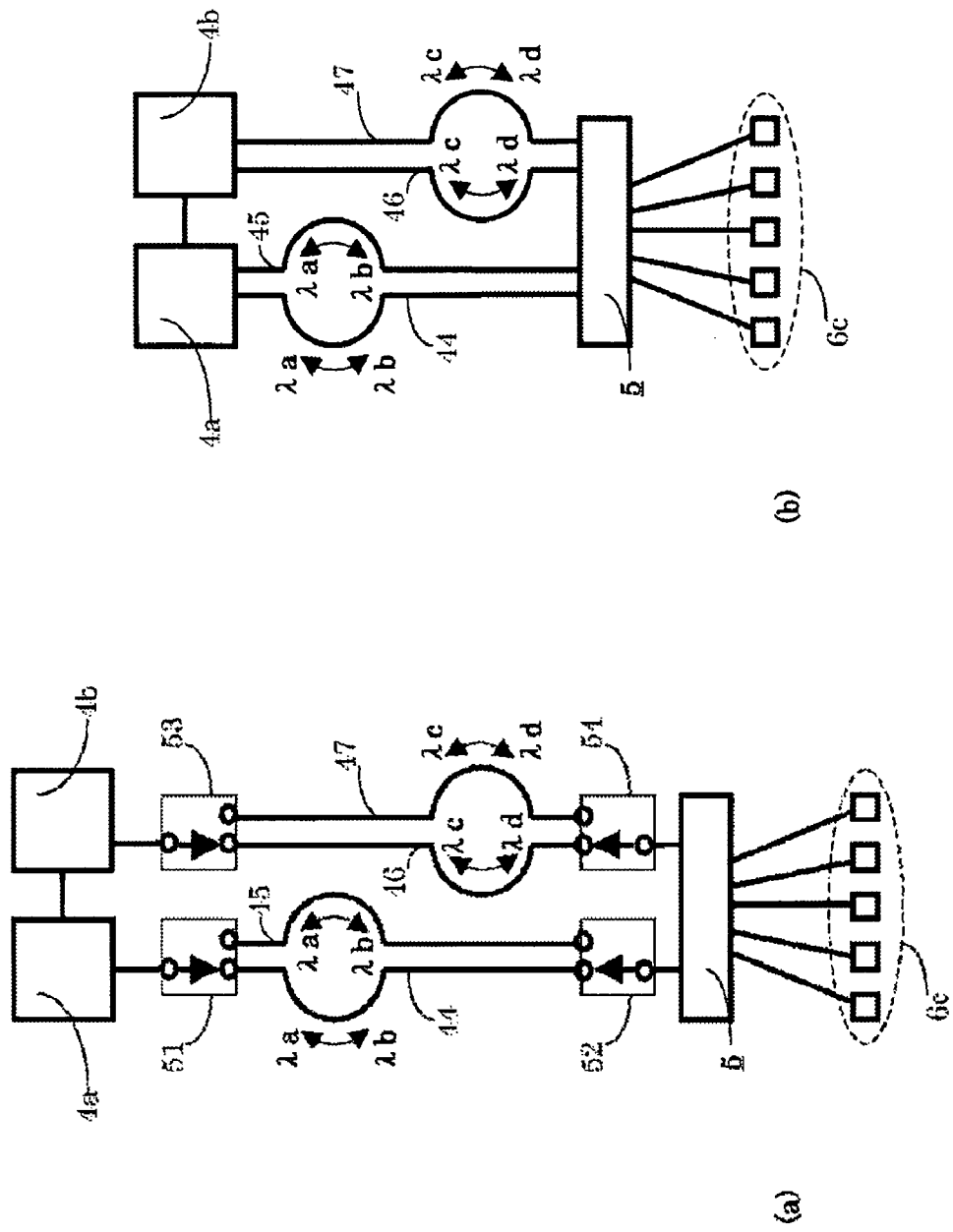
FIG. 13 is a schematic diagram showing redundant operation using the duplex transmission circuit.

FIG. 13a and FIG. 13b show how to utilize the duplex transmission circuit. As shown in FIG. 13a, switching means 51 and 52 which switch transmission circuits 44 and 45 are provided. Switching means 53 and 54 which switch transmission circuits 46 and 47 are provided. The switching means 51 and 52 switch transmission circuit from the transmission circuit 44 to the transmission circuit 45 when some trouble is detected on the transmission circuit 44. Detective mean for the transmission circuit 44 is not shown in FIG. 13a. Similarly, the switching means 53 and 54 switch transmission circuit from the transmission circuit 46 to the transmission circuit 47 when some trouble is detected on the transmission circuit 46. Detective mean for the transmission circuit 44 is not shown in FIG. 13a.

For example, the switching means 51, 52, 53, and 54 may be optical switches. As another example, the switching means 51, 52, 53, and 54 may be pairs of optical transceivers with electrical switching means.

So-called link aggregation mechanism may be applied as the switching means. As shown in FIG. 13b, transmission circuits 44 and 45 are provided between the core-switch 4a and the edge switch 5. The link aggregation mechanism is installed in the core-switch 4a and the edge switch 5.

The link aggregation mechanism denotes multiple links are defined as a group. These aggregated links are regarded as a big capacity link by the core-switch 4a and the edge switch 5. The links belong to the group are operated under load balancing. If some link failed, the failed link will shut down and communication traffic is conveyed by live links. Thus the link aggregation can increase communication capacity and protect of the transmission circuits.

As shown in FIG. 13b, the core-switch 4a and the edge-switch 5 are connected via the transmission circuits 44 and 45 by using the link aggregation. In normal times, the transmission circuits 44 and 45 shares traffic. If the transmission circuit 44 or 45 is in trouble, another transmission circuit takes over entire traffic. The core-switch 4b and the edge-switch 5 are connected via the transmission circuits 46 and 47 by using the link aggregation. In normal times, the transmission circuits 46 and 47 shares traffic. If the transmission circuit 44 or 45 is in trouble, another transmission circuit takes over entire traffic.

In present embodiment, as shown in FIG. 13a and FIG. 13b, the transmission circuits has independent redundancy from the redundancy of the core-switches 4a and 4b so that the situation shown in FIG. 7 will never happen. Thus probability of entire network down, Pb, is summation of the probability of two transmission circuits simultaneous failure and the probability of two core-switches simultaneous failure.

$$Pb = P1^2 + P2^2 \quad (2)$$

In equation (2), P1 and P2 denote a failure rate of a transmission circuit, and a failure rate of a core switch, respectively. Pb in equation (2) is smaller than Pb in equation (1) as small as 2P1P2. Therefore present embodiment has better reliability.

Present embodiment may also comprise two fibers similar to the optical communication network shown in FIG. 8.

The Fourth Embodiment

Figure 14:
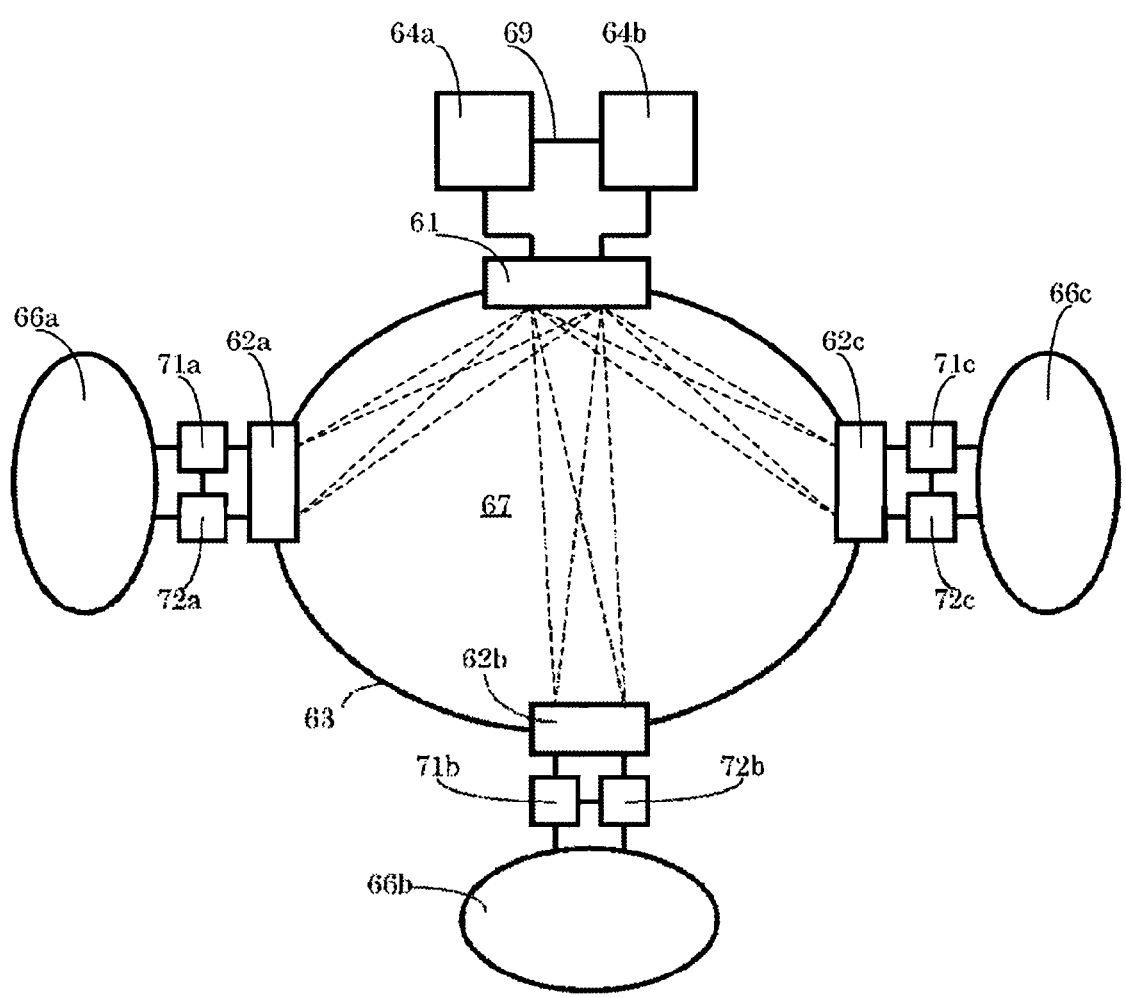
FIG. 14 is a schematic diagram showing the $4^{th}$ embodiment of the optical communication network.

FIG. 14 shows the fourth embodiment of present invention. Present embodiment comprises pairs of edge-switches. Edge-switches 71a and 72a are interconnected to form redundant architecture. Edge-switches 71b and 72b are interconnected. Edge-switches 71c and 72c are interconnected. The edge-switches 71a and 72a serve an edge-network 66a. The edge-switches 71b and 72b serve an edge-network 66b. The edge-switches 71c and 72c serve an edge-network 66c. These edge-networks are similar to the network shown in FIG. 1. From a different view point, the network shown in FIG. 14 corresponds to the backbone network 8 in FIG. 1.

As shown in FIG. 14, core-switches 64a and 64b are interconnected to form redundant architecture. The core-switches 64a and 64b are connected to a core optical transport device 61. The edge-switches 71a and 72a are connected to an edge optical transport device 62a. The edge-switches 71b and 72b are connected to an edge optical transport device 62b. The edge-switches 71c and 72c are connected to an edge optical transport device 62c. The core transport device 61, the edge optical transport devices 62a, 62b, and 62c are connected by single ring-shaped fiber 63. Among the core transport device 61, the edge optical transport devices 62a, 62b, and 62c, transmission circuit 67 is formed by wavelength division multiplexing technology.

Figure 15:
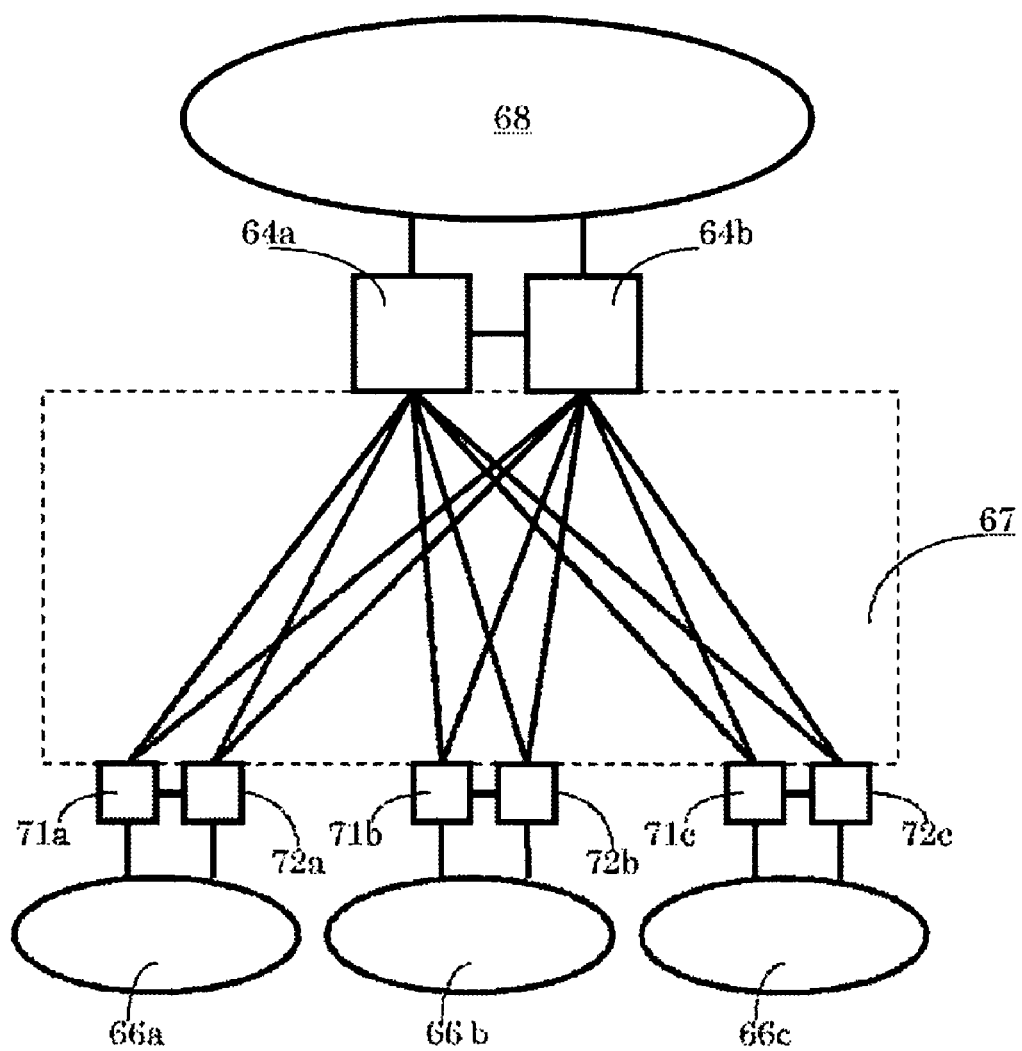
FIG. 15 is a schematic diagram describing the transmission circuit 67.

FIG. 15 shows the transmission circuit 67. The transmission circuit 67 comprises the redundant star topology in which two star topologies are overlaid. The core-switch 64a is a center node of one of the two star topologies. The core-switch 64b is a center node of another star topology.

In present embodiment, not only core-switches but also edge-switches are disposed in redundant manner, thus higher reliability is obtained.

The communication network shown in FIG. 1 comprises single edge-switch for a group of client stations so that if the edge-switch failed the services for the client station will go down. The probability of this situation is defined as P3. On the other hand, due to present embodiment comprises two edge-switches for a group of client stations, the failure rate of edge-network 66 is $P3^2$. The $P3^2$ is far smaller than P3 so that present embodiment provides higher reliability.

Figure 16:
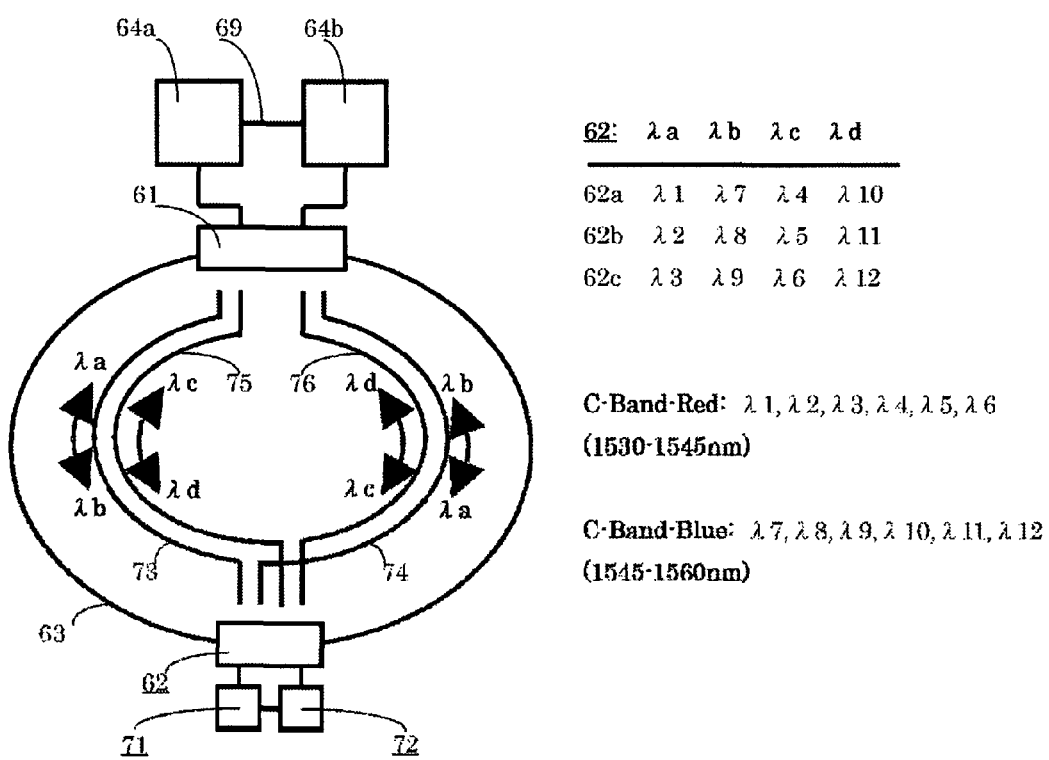
FIG. 16 is a schematic diagram describing the circuit between the core optical transport device 61 and the edge optical transport device 62.

FIG. 16 shows a transmission circuit formed between the core optical transport device 61 and the edge optical transport device 62. Between the core optical transport device 61 and the edge optical transport device 62, transmission circuits 73 and 74 are formed to connect the core-switch 64a and the edge-switch 71. The transmission circuit 73 employs a wavelength λa as upstream optical signal, and a wavelength λb as downstream optical signal. The transmission circuit 74 employs a wavelength λb as upstream optical signal, and a wavelength λa as downstream optical signal.

Between the core optical transport device 61 and the edge optical transport device 62, transmission circuits 75 and 76 are formed to connect the core-switch 64b and the edge-switch 71. The transmission circuit 75 employs a wavelength λc as upstream optical signal, and a wavelength λd as downstream optical signal. The transmission circuit 74 employs a wavelength λd as upstream optical signal, and a wavelength λc as downstream optical signal.

The edge optical transport device 62a employs wavelengths λ1, λ7, λ4, and λ10 as λa, λb, λc, and λd, respectively. The edge optical transport device 62b employs wavelengths λ2, λ8, λ5, and λ11 as λa, λb, λc, and λd, respectively. The wavelengths from λ1 to λ12 are selected wavelengths from C-band 100 GHz grid defined by ITU-T. The wavelengths from λ1 to λ6 belong to Red band. The wavelengths from λ7 to λ12 belong to Blue band. The C-band is around wavelength range between 1530 nm and 1560 nm. The Red band is around wavelength range between 1545 nm and 1560 nm. The Blue band is around wavelength range between 1530-1545 nm. The wavelengths from λ1 to λ6 propagate clockwise on the ring-shaped fiber 63. The wavelengths from λ7 to λ12 propagate anti-clockwise on the ring-shaped fiber 63.

Figure 17:
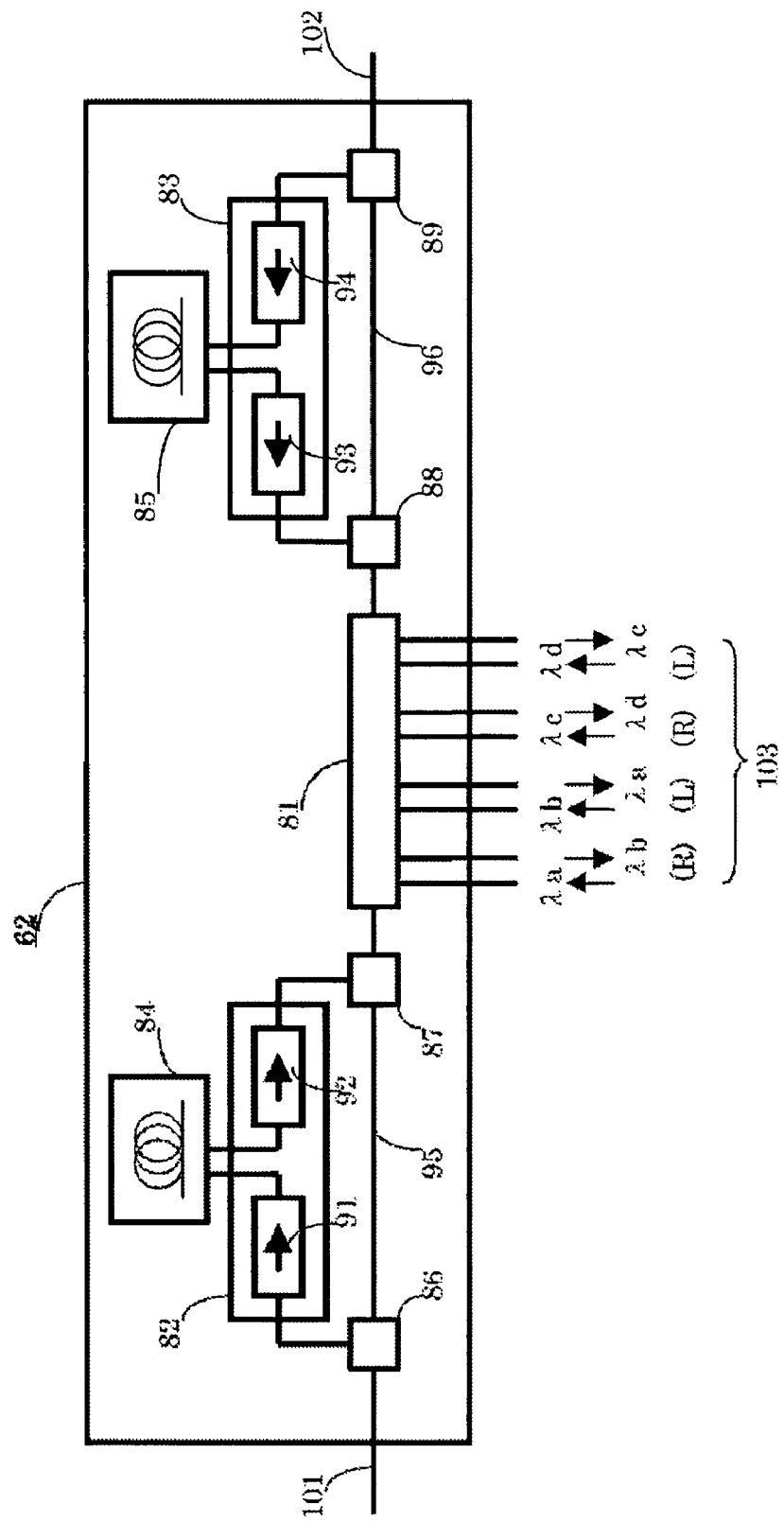
FIG. 17 is a schematic diagram showing inside architecture of the edge transport device 62.

FIG. 17 shows inside architecture of the edge optical transport device 62. The optical transport device 62 comprises an OADM (Optical Add Drop Multiplexer) 81, optical amplifiers 82 and 83. The OADM 81 adds and drops the wavelengths λa, λb, λc, and λd.

All the optical signals inputted from a port 101 belong to the blue band. A blue band selection filter 86 selects the inputted optical signals and transmits to the optical amplifier 82. The amplified signals are transmitted via a blue band selection filter 87 to the OADM 81. The optical signals passed OADM 81 are transmitted via a red band selection filter 88, a bypass optical fiber 96, and a red band selection filter 89 to a port 102.

All the optical signals inputted from the port 102 belong to the red band. The red band selection filter 89 selects the inputted optical signals and transmits to the optical amplifier 83. The amplified signals are transmitted via the red band selection filter 88 to the OADM 81. The optical signals passed the OADM 81 are transmitted via the blue selection filter 87, a bypass optical fiber 95, and the blue band selection filter 86 to the port 101. The blue band selection filters 86 and 86 are band pass filter which select the blue band optical wavelengths. The red band filters 88 and 89 are band pass filters which select the red band optical wavelengths.

The optical amplifier 82 comprises two EDFA (Erbium Doped Fiber Amplifier) modules 91 and 92. The optical amplifier 82 is so-called a two stage optical amplifier. Between these two EDFA modules 91 and 92, a dispersion compensation fiber 84 is installed. According to this architecture, an insertion loss caused by the dispersion compensation fiber 84 is compensated. The dispersion compensation fiber 84 is an external module. The optical amplifier 83 comprises EDFA modules 91, 92, and a dispersion compensation fiber 85 in same manner of the optical amplifier 82.

Other types of dispersion compensation means may be applied instead of the dispersion compensation fibers 84 and 85. For example, AWG (Arrayed Waveguide Grating) based devices, and thin film dielectric filter based devices may be employed.

The edge optical transport device 62 comprising the above architecture makes it possible to form bidirectional transmission circuit on the single ring-shaped fiber 63 using wavelength division multiplexing technology. The edge optical transport device 62 makes it possible to compensate transmission loss by optical amplifying means. The edge optical transport device 62 makes it possible to compensate dispersion of optical fibers. As a result, even if data rate is higher than 10 Gbit/s and transmission distances over 50 km, a workable optical physical layer is provided.

In present embodiment, single fiber operation is cited as an example, but two fiber operation is also available. Present invention is not limited in only one fiber operation.

The Fifth Embodiment

Figure 18:
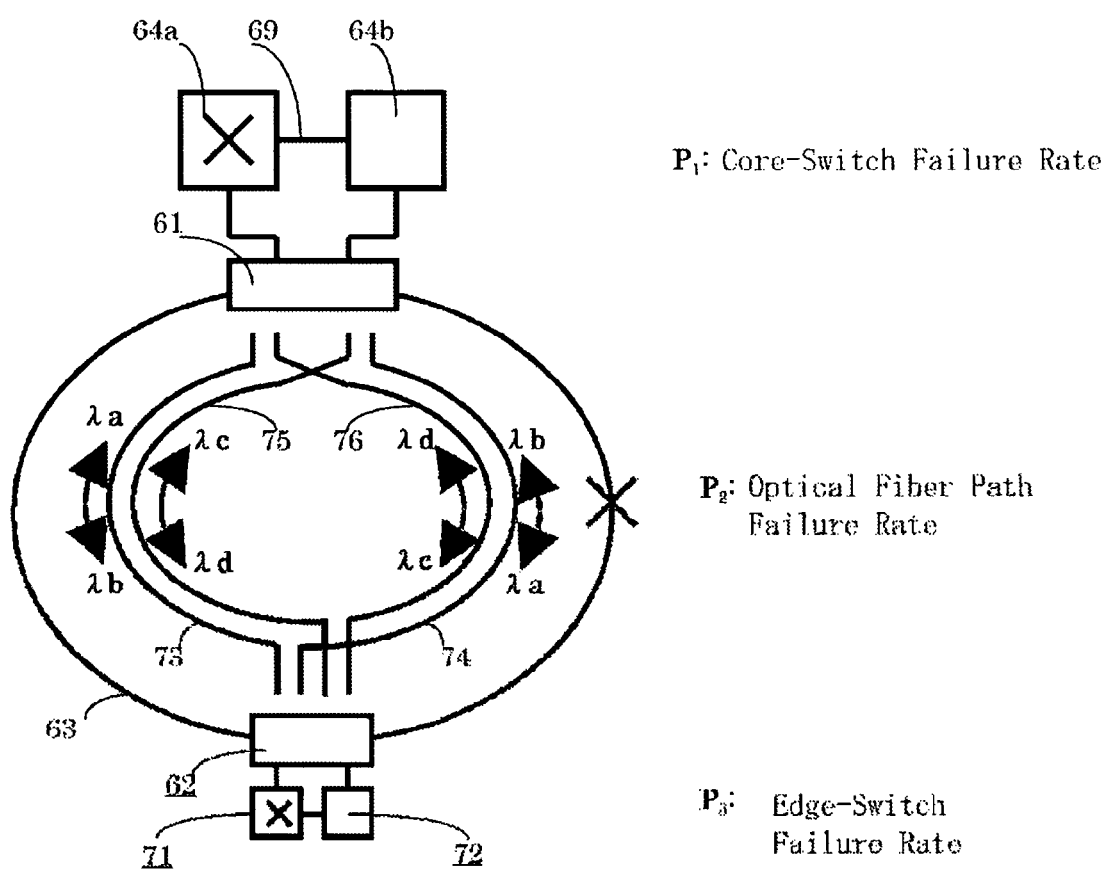
FIG. 18 is a schematic diagram showing the $5^{th}$ embodiment of the optical communication network.

FIG. 18 shows fifth embodiment of present invention. As shown in FIG. 16, the edge-switch 71 and core-switch 64$a$ are connected via the transmission circuit 75. Also, the edge-switch 72 and core-switch 64$b$ are connected via the transmission circuit 76. By contrast, as shown in FIG. 18, the edge-switch 71 and core-switch 64$a$ are connected via the transmission circuit 76. Also the edge-switch 72 and core-switch 64$b$ are connected via the transmission circuit 75.

According to the architecture of FIG. 16, if simultaneous failure such as a fiber cut accident on right half part of ring-shaped fiber 63 and malfunction of the core-switch 64$a$, happened then entire network system will go down. On the other hand, according to the architecture shown in FIG. 18, the edge switch 71 can access to the surviving core switch 64$b$ via the transmission circuit 75 so that the network system still works.

The failure probability Pc at the simultaneous occurrence of the fiber cut accident on right half part of ring-shaped fiber 63 and the malfunction of the core-switch 64$a$ is described in Eq. (3);

$$Pc=P1P2 \quad (3)$$

Where P1 denotes failure rate of a core-switch and P2 denotes failure rate of the fiber cut occurrence on half part of ring-shaped fiber 63.

The failure probability Pd at the simultaneous occurrence of the fiber cut accident on right half part of ring-shaped fiber 63, the malfunction of the core-switch 64$a$, and malfunction of the edge-switch 71, is described in Eq. (4);

$$Pd=P1P2P3 \quad (4)$$

Where P3 denotes failure rate of an edge-switch.

Suppose if all of P1, P2, and P3 are 1% per 1000 hours, Pc is calculated as 0.01% per 1000 hours, on the other hand, Pd is calculated as 0.001% per 1000 hours. The Pd is smaller than Pc.

In fact, the probability of simultaneous failure of two transmission circuit, or the probability of simultaneous malfunction of two core-switches is larger than Pd. Thus the probability of entire network down in FIG. 18 is estimated to $Pb=P1^2+P2^2$. This value is smaller than $Pa=P1^2+2P1P2+P2^2$. Thus present embodiment has higher reliability than the fourth embodiment.

FIG. 18 shows single fiber operation. But present invention is not limited to the single fiber operation. It is possible to incorporate two fibers operation into the fifth embodiment.

The Sixth Embodiment

Figure 19:
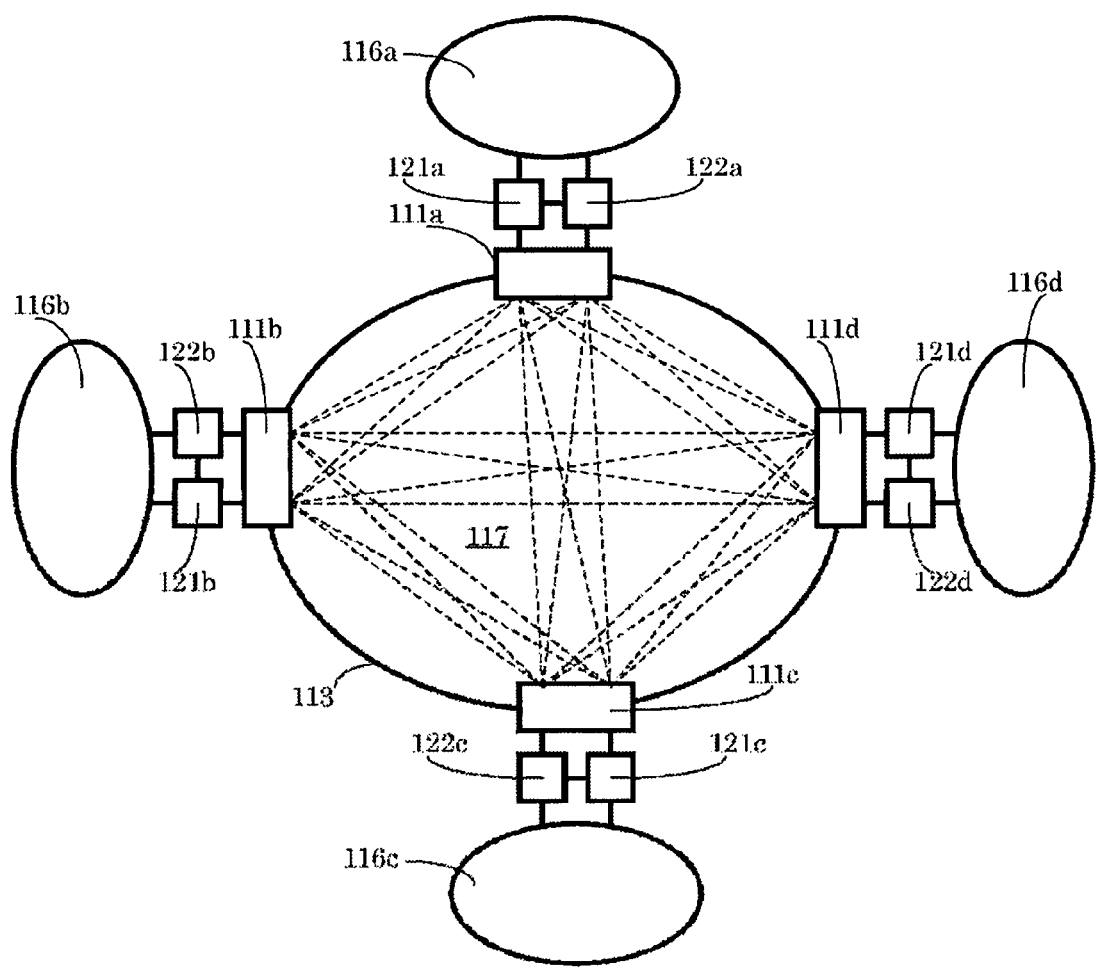
FIG. 19 is a schematic diagram showing the 7th embodiment of the optical communication network.

FIG. 19 shows the sixth embodiment of present invention. In present embodiment, multiple pairs of core-switches are connected in a manner of full-mesh connection. Core-switches 121$a$ and 122$a$ are interconnected to form redundant architecture. An edge network 116$a$ is connected to the core-switches 121$a$ and 122$a$. A core optical transport device 111$a$ is connected to the core-switches 121$a$ and 122$a$.

Core-switches 121$b$ and 122$b$ are interconnected to form redundant architecture. An edge network 116$b$ is connected to the core-switches 121$b$ and 122$b$. A core optical transport device 111$b$ is connected to the core-switches 121$b$ and 122$b$. Core-switches 121$c$ and 122$c$ are interconnected to form redundant architecture. An edge network 116$c$ is connected to the core-switches 121$c$ and 122$c$. A core optical transport device 111$c$ is connected to the core-switches 121$c$ and 122$c$. Core-switches 121$d$ and 122$d$ are interconnected to form redundant architecture. An edge network 116$d$ is connected to the core-switches 121$d$ and 122$d$. A core optical transport device 111$d$ is connected to the core-switches 121$d$ and 122$d$.

The core optical transport device, 111$a$, 111$b$, 111$c$, and 111$d$ are connected via ring-shaped single fiber 113, and a transmission circuit 117 is formed by wavelength division multiplexing technology. The transmission circuit 117 is full mesh topology.

The transmission circuit 117 is formed from overlaying of the transmission circuits shown FIG. 16 or FIG. 18. Elements of the transmission circuit 117 are pair of redundant circuits. Therefore this topology has high reliability.

Figure 20:
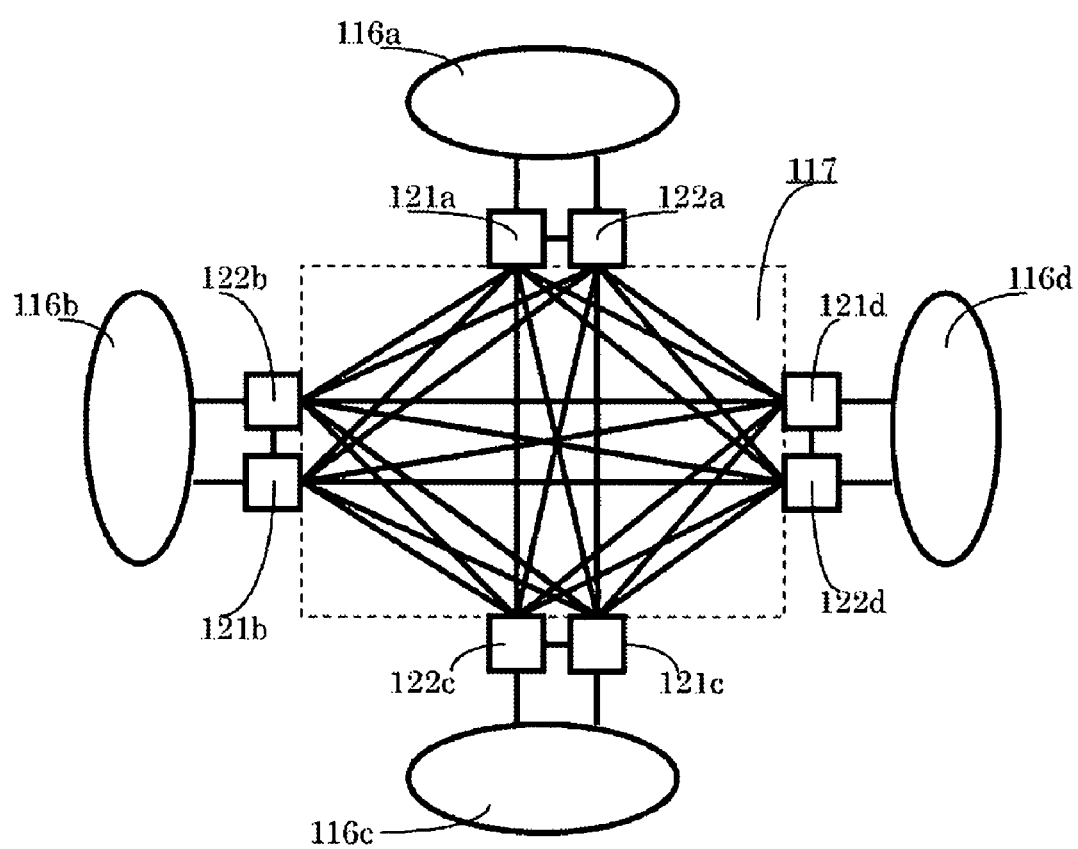
FIG. 20 is a schematic diagram showing that the transmission circuit 117 comprises full-mesh topology.

The redundant full mesh topology shown in FIG. 20 does not have any specific center node so that network performances degrade gracefully against malfunctions of network elements. In the case of the core-switches 121$a$ and 122$a$ simultaneously failure, for instance, the services for the edge network 116$a$ are suspended. However other edge networks can still provide services. According to the architecture shown in FIG. 19, communication traffic load is shared by each network element.

FIG. 19 shows single fiber operation. But present invention is not limited to the single fiber operation. It is possible to incorporate two fibers operation into the sixth embodiment.

The Seventh Embodiment

Figure 21:
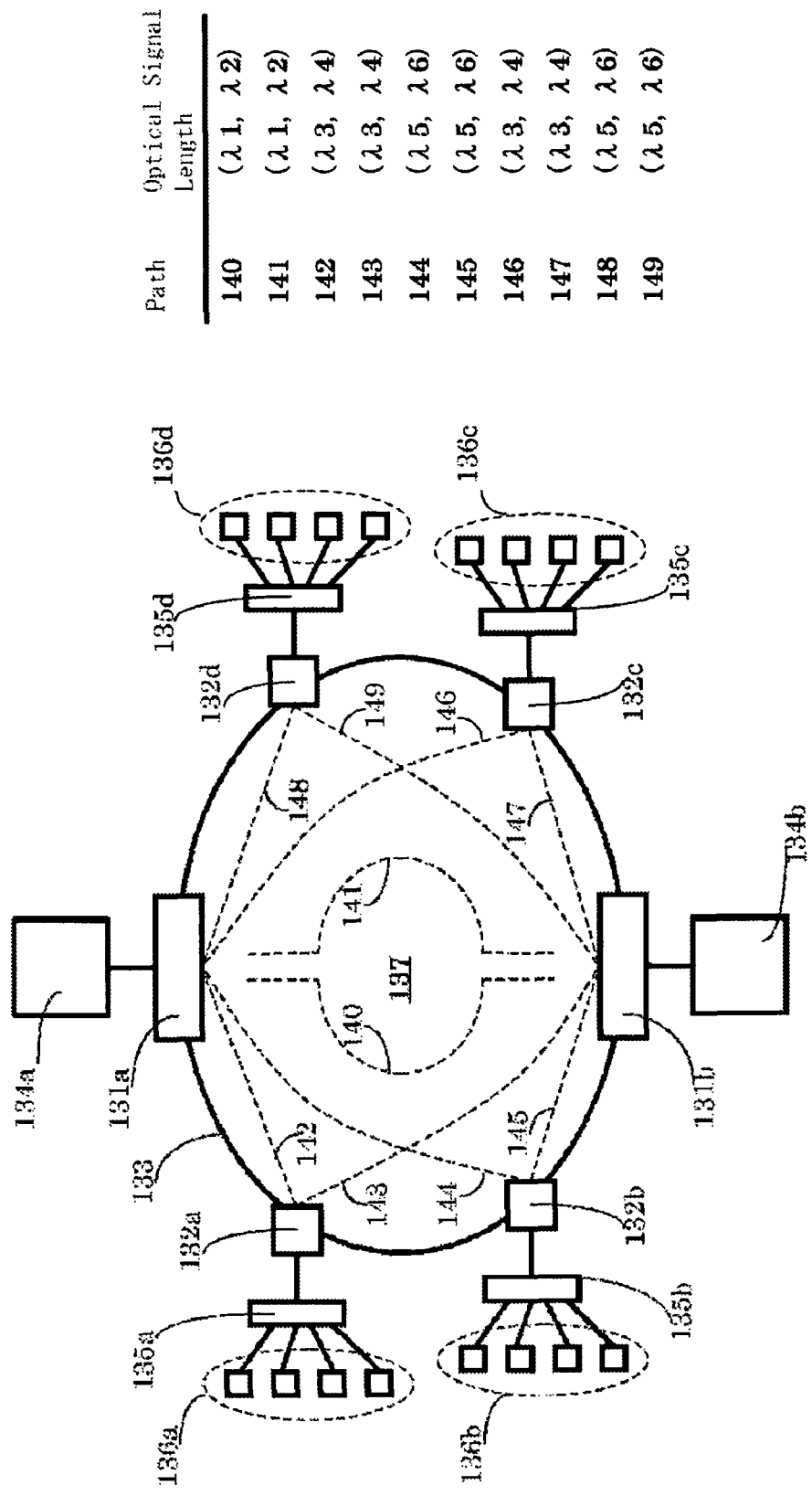
FIG. 21 is a schematic diagram showing the 7th embodiment of the optical communication network.

FIG. 21 shows the seventh embodiment of present invention. In present embodiment, two core-switches 134$a$ and 134$b$ are alienated from each another. Core optical transport device 131$a$, 131$b$, edge optical transport devices 132$a$, 132$b$, 132$c$, and 132 $d$ are connected by single ring-shaped fiber 133. The core optical transport device 131$a$ and 131$b$ are connected to the core-switches 134$a$ and 134$b$, respectively. The edge optical transport devices 132$a$, 132$b$, 132$c$, and 132$d$ are connected to the edge-switches 135$a$, 135$b$, 135$c$, and 135$d$, respectively. The edge-switches 135$a$, 135$b$, 135$c$, and 135$d$ are connected to client station groups 136$a$, 136$b$, 136$c$, and 136$d$, respectively.

Among core optical transport devices 131$a$, 131$b$, edge optical transport devices 132$a$, 132$b$, 132$c$, and 132$d$, a transmission circuit 137 is formed by wavelength division multiplexing technology. The transmission circuit 137 is formed from elemental transmission circuits 140, 141, 142, 143, 144, 145, 146, 147, 148, and 149.

Figure 22:
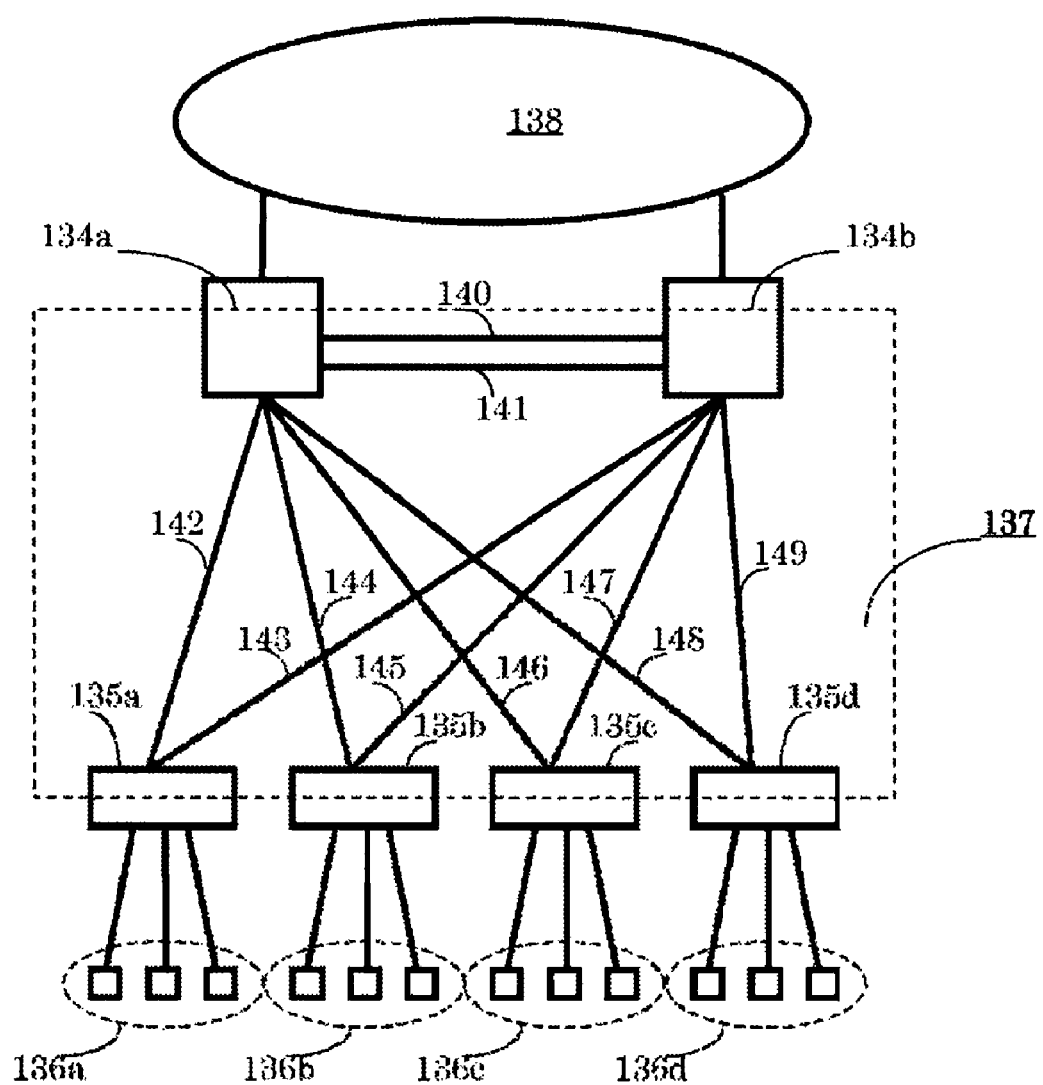
FIG. 22 is a schematic diagram describing the transmission circuit 137.

FIG. 22 shows the transmission circuit 137. The edge-switches 135$a$, 135$b$, 135$c$, and 135$d$ are connected to the core-switches 134$a$ and 134$b$ in the manner of redundant star topology. The transmission circuit 137 also comprises redundant transmission circuit 140 and 141 which connect the core-switches 134a and 134b.

Refer to FIG. 21 and FIG. 22, the elemental transmission circuits of the transmission circuit 137 is described. The elemental transmission circuits 140 and 141 made from wavelength λ1 and λ2 connect core-switches 134a and 134b. The two wavelengths, λ1 and λ2 represent upstream signal and downstream signal on single fiber, respectively.

The elemental transmission circuits 142 made from λ3 and λ4 connects the edge-switch 135a and the core-switch 134a. The elemental transmission circuits 143 made from ±3 and λ4 connects the edge-switch 135a and the core-switch 134b.

The elemental transmission circuits 144 made from λ5 and ±6 connects the edge-switch 135b and the core-switch 134a. The elemental transmission circuits 145 made from λ5 and λ6 connects the edge-switch 135b and the core-switch 134b.

The elemental transmission circuits 146 made from λ3 and λ4 connects the edge-switch 135c and the core-switch 134a. The elemental transmission circuits 147 made from λ3 and λ4 connects the edge-switch 135c and the core-switch 134b.

The elemental transmission circuits 148 made from λ5 and ±6 connects the edge-switch 135d and the core-switch 134a. The elemental transmission circuits 149 made from λ5 and λ6 connects the edge-switch 135d and the core-switch 134b.

As shown in FIG. 21, the elemental transmission circuits 142, 143, 146, and 147 recycle wavelengths, λ3 and λ4. Also the elemental transmission circuits 144, 145, 148, and 149 recycle wavelengths, λ5 and λ6. The elemental transmission circuits which connect edge-switches and core-switches are accommodated in the half part of the ring. Thus the required transmission distance is short so that cost-effective CWDM technology may be applied.

In present embodiment, as shown in FIG. 22, each edge switch can access both of the core-switches 134a and 134b so that high reliability is obtained against the core-switches' malfunction. Redundant access routes from the edge-switch to the core-switch are duplicated therefore high reliability is obtained. Two core-switches 134a and 134b are connected via duplex elemental transmission circuit 140 and 141 so that high reliability is obtained.

Present embodiment adopts single fiber operation. However, also two fiber operation is available in present invention.

The Eighth Embodiment

Figure 23:
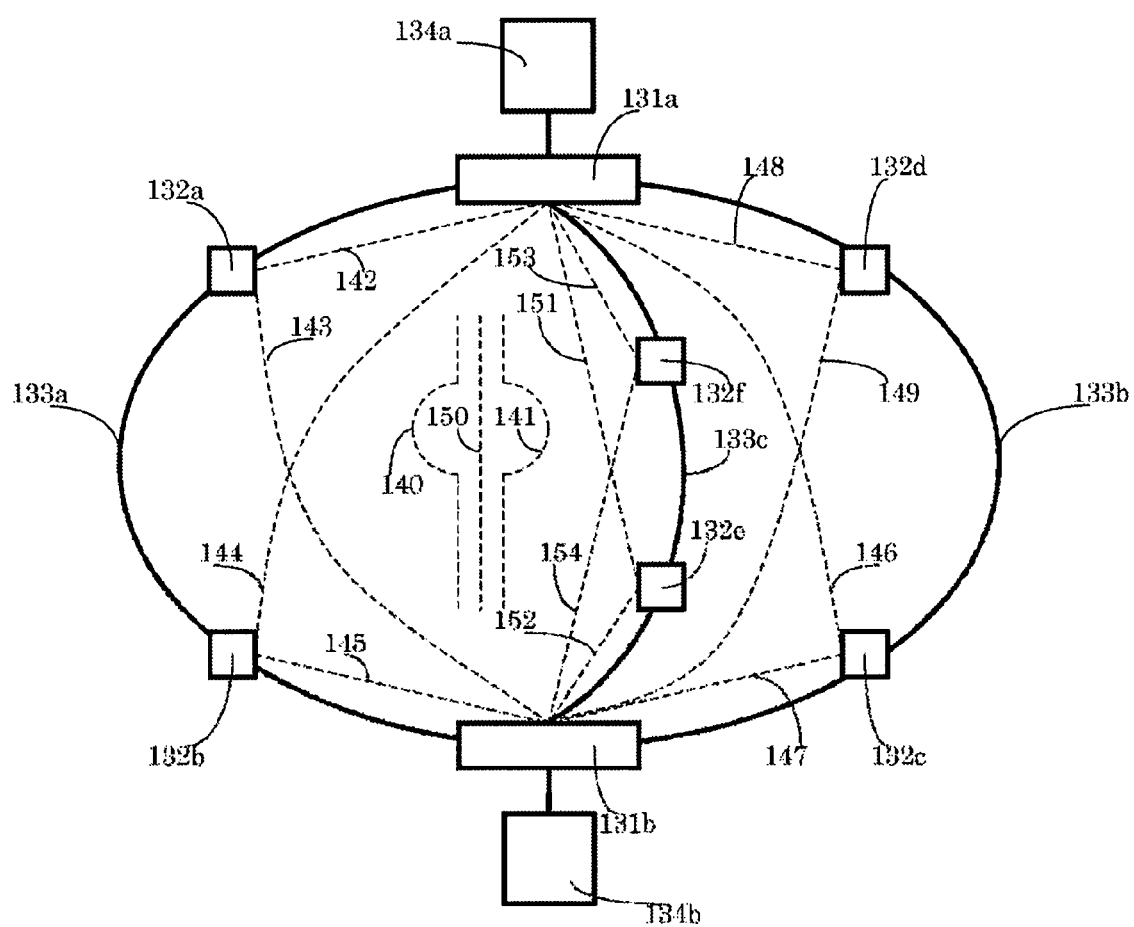
FIG. 23 is a schematic diagram showing the 8th embodiment of the optical communication network.

FIG. 23 shows the eighth embodiment of present invention. FIG. 23 employs the same reference number of FIG. 21 for the same elements. Major difference between FIG. 21 and FIG. 23 is that an optical fiber 153c made addition to the optical fibers 153a and 153b. According to the architecture shown in FIG. 21, there are two fibers between the core optical transport device 131a and 131b. On the other hand, in present embodiment, three optical fibers are connected between the core optical transport devices 131a and 131b.

On the optical fiber 133c, edge optical transport devices 132e and 132f are disposed. The edge optical transport device 132e can access to the core optical transport device 131a via a transmission circuit 151. The edge optical transport device 132e can access to the core optical transport device 131b via a transmission circuit 152. The edge optical transport device 132f can access to the core optical transport device 131a via a transmission circuit 153. The edge optical transport device 132e can access to the core optical transport device 131b via a transmission circuit 154. Thus the edge optical transport device can access both of the core optical transport devices 131a and 131b. The transmission circuits 150, 151, 152, 153, and 154 are formed on the optical fiber 133c by using wavelength multiplexing technology.

The core optical transport devices 131a and 131b are connected by three transmission circuits, a transmission circuit 140 on the optical fiber 133a, a transmission circuit 141 on the optical fiber 133b, and a transmission circuit 150 on the optical fiber 133c. The core-switches 134a and 134b are connected by using the link aggregation. State-of-the-are switches which can aggregate 4 links are already in practical use. Therefore the above architecture is realizable.

In present embodiment, between the core optical transport devices 131a and 131b, three optical fibers are deployed and edge optical transport devices are installed on these fibers. Thus the network topology is more flexible. Every edge optical transport device can access to both of the core-switches so that high reliability is obtained. In addition, the third transmission circuit which connects between the core-switches is added so that high reliability is obtained.

In addition to the architecture shown in FIG. 23, further optical fibers may be installed between the core optical transport devices 131a and 131b.

Figure 24:
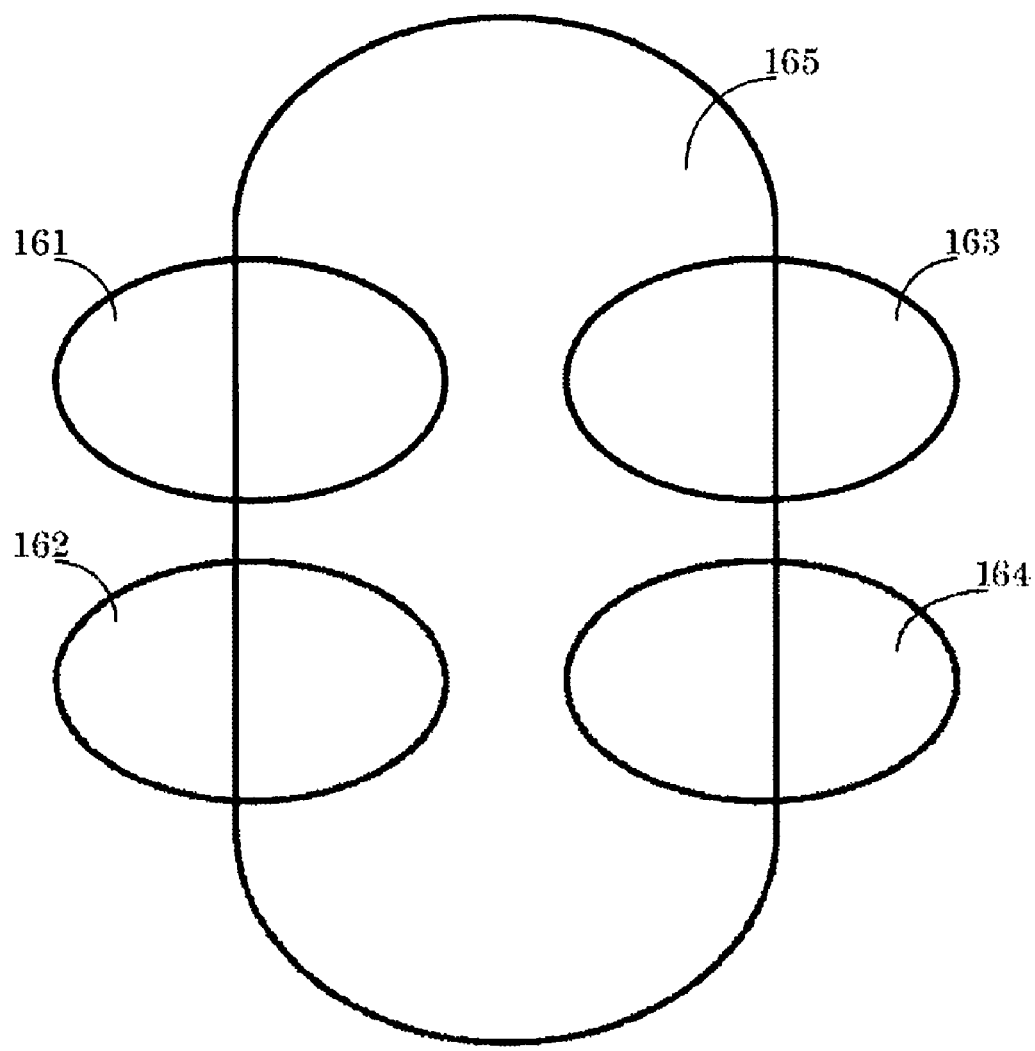
FIG. 24 is a schematic diagram showing a massive scale network interconnected multiple optical communication networks showing in FIG. 23.

As shown in FIG. 24, a large scale network in which multiple networks shown in FIG. 23 are interconnected is realizable. In FIG. 24, the reference numbers 161, 162, 163, and 164 denotes a network shown in FIG. 23. The reference number 165 denotes a core network which integrates the edge networks 161, 162, 163, and 164.

In present embodiment single fiber operation is adopted. Two fiber operation is also available for present embodiment. Present invention is not limited to the single fiber operation.

The Ninth Embodiment

Figure 25:
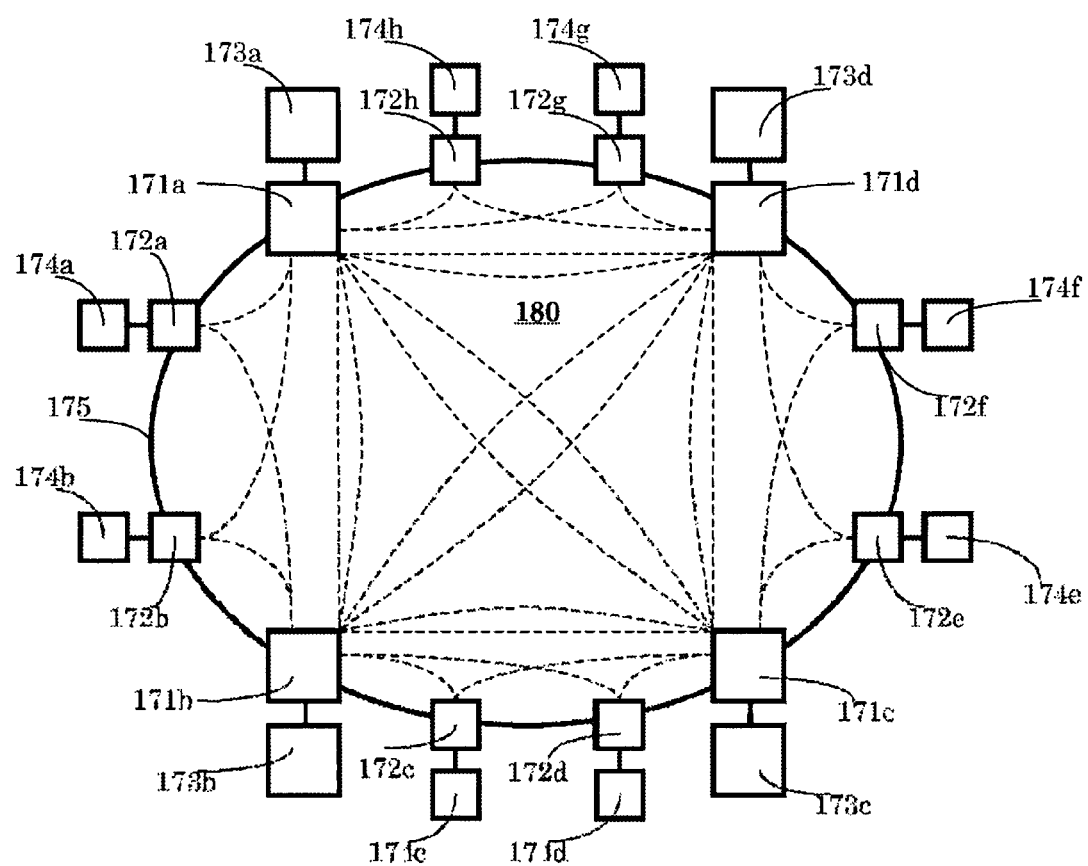
FIG. 25 is a schematic diagram showing the 9th embodiment of the optical communication network.

FIG. 25 shows the ninth embodiment of present invention. Core optical transport devices 171a, 171b, 171c, 171d, edge optical transport devices 172a, 172b, 173c, and 172h are connected by an optical fiber 175. The core optical transport devices 171a, 171b, 171c, and 171d are connected to core-switches 173a, 173b, 173c, and 173d, respectively. The edge optical transport devices 172a, 172b, 172c, and 172h are connected to edge-switches 174a, 174b, 174c, 174d, 174e, 174f, 174g, and 174h, respectively.

Among the core optical transport devices 171a, 171b, 172c, and 171d, the edge optical transport devices 172a, 172b, 172c, 172d, 172e, 172f, 172g, and 172h, a transmission circuit 180 is formed on the optical fiber 175 by using wavelength multiplexing technology. The transmission circuit 180 comprises an architecture in which two transmission circuits, a transmission circuit 181 shown in FIG. 26 and a transmission circuit 182 shown in FIG. 27, are overlaid.

Figure 26:
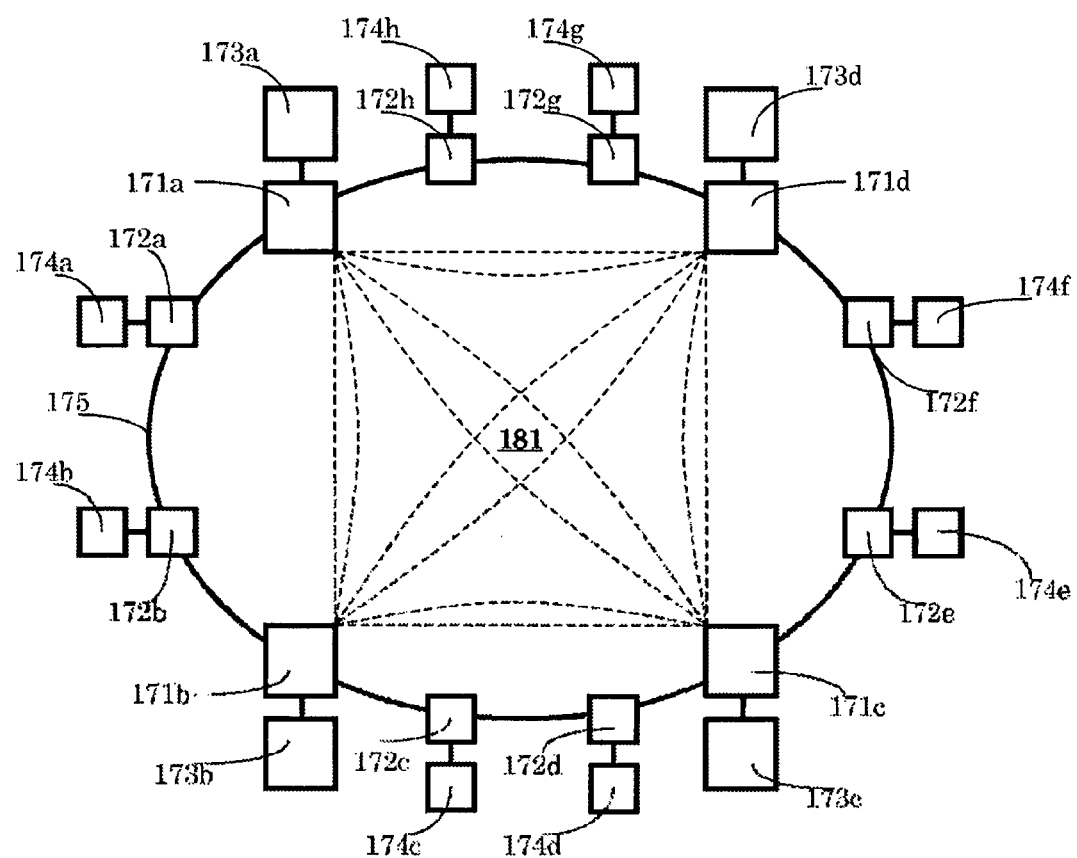
FIG. 26 is a schematic diagram showing the transmission circuit 181.
Figure 27:
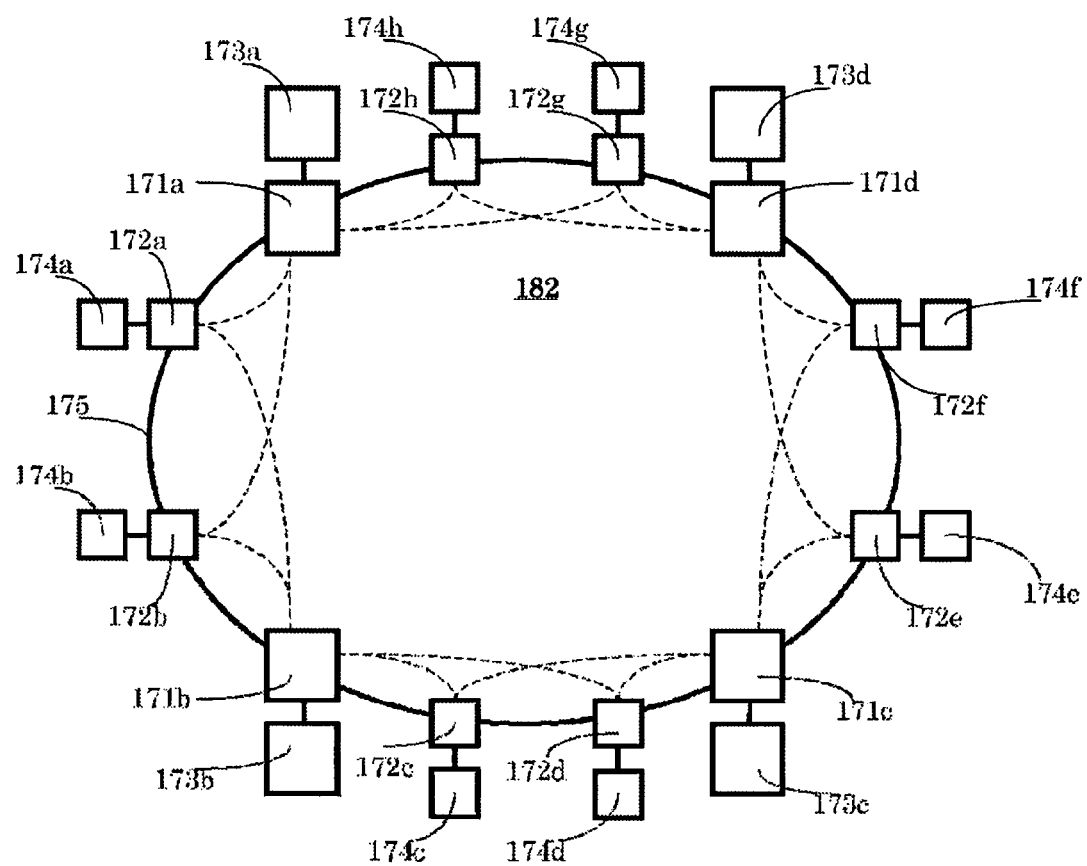
FIG. 27 is a schematic diagram showing the transmission circuit 182.

As shown in FIG. 26, the transmission circuit 181 comprises redundant full-mesh topology which connects the core optical transport devices 171a, 171b, 171c, and 171d. As shown in FIG. 27, the transmission circuit 182 comprises redundant star topology which connects the core optical transport devices 171a, 17ab, 17ac, and 171d, the edge optical transport devices 172a, 172b, 172c, 172d, 172e, 172f, 172g, and 172h. Each edge transmission device is connected to nearest neighbor core optical transport device.

Figure 28:
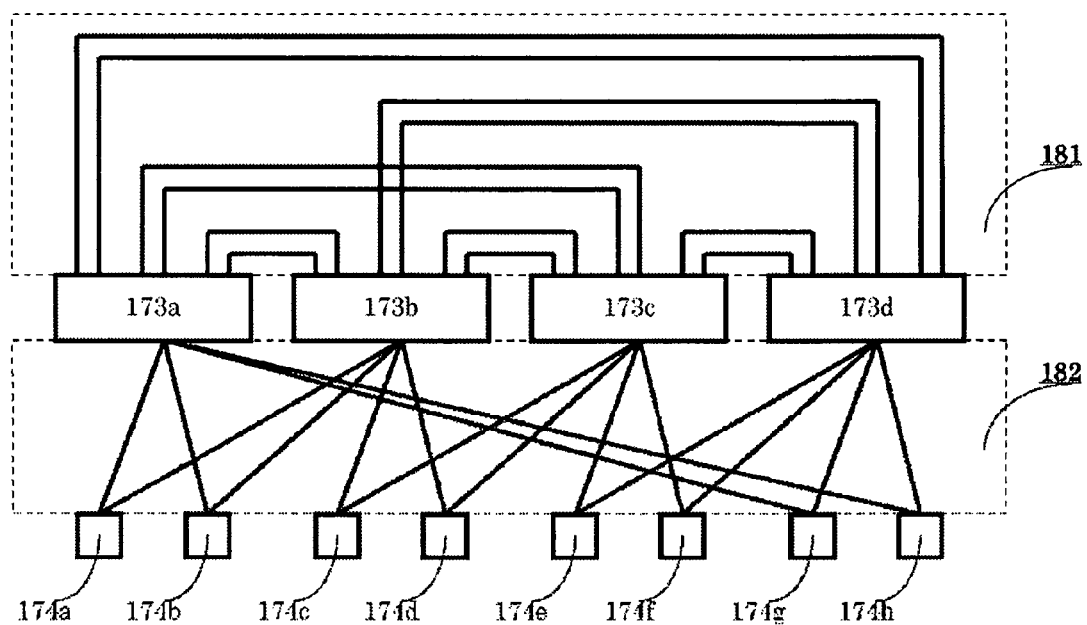
FIG. 28 is a schematic diagram showing relation among core-switches, edge-switches, transmission circuits 181, and 182.

FIG. 28 shows relation among core-switches 173a, 173b, 173c, 173d, the edge-switches 174a, 174b, 174c, 174d, 174e, 174f, 174g, 174h, the transmission circuits 181, and 182. The transmission circuit 181 forms a backbone network among the core-switches 173a, 173b, 173c, and 173d. The transmission circuit 181 comprises redundant full-mesh topology so that high reliability and load balanced performance are obtained. The transmission circuit 182 forms an edge network among the edge-switches 174*a*, 174*b*, 174*c*, 174*d*, 174*e*, 174*f*, 174*g*, 174*h*, core-switches 173*a* and 173*d*. The transmission circuit 182 comprises redundant star topology so that high reliability is obtained.

As described above, a backbone network of redundant full-mesh topology and edge networks of redundant star topology are formed on the single fiber physical layer by using wavelength multiplexing technology. Thus optical fiber deployment is reduced so that deployment costs are reduced.

Present embodiment adopts single fiber operation. However, also two fiber operation is available in present invention.

The Tenth Embodiment

Figure 29:
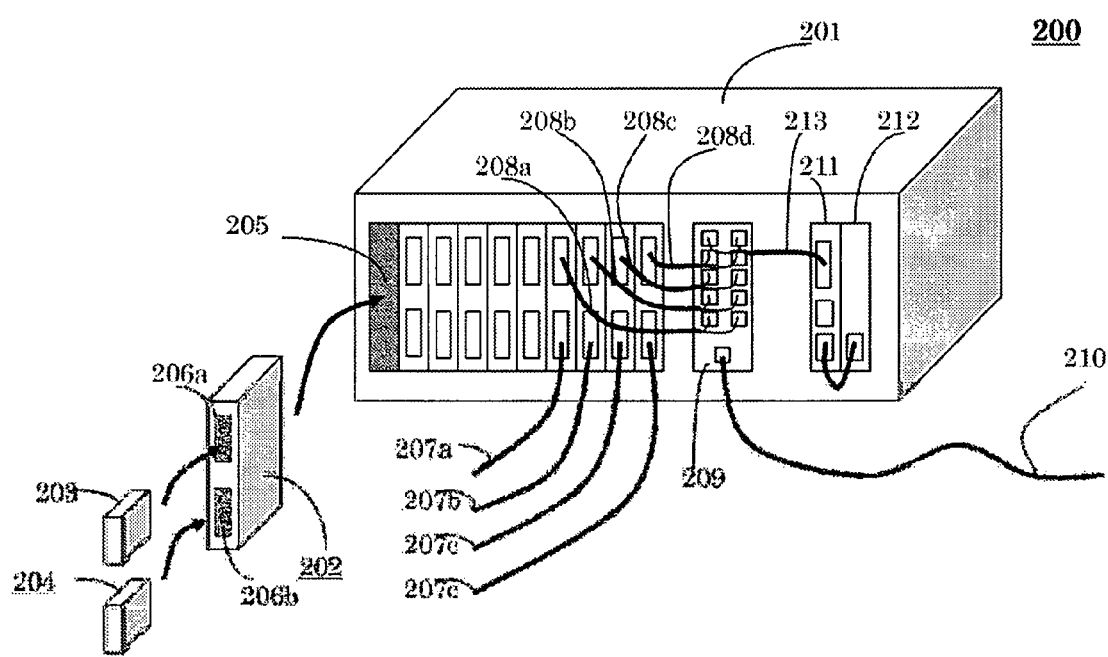
FIG. 29 is a perspective view of the optical transport device 200 of the 10th embodiment of present invention.

FIG. 29 shows the tenth embodiment of present invention. Optical transport device 200 is applied for the core optical transport device or edge optical transport device.

A chassis 201 of the optical transport device comprises plural slots. A converter card 202 is mounted into the slot 205. The converter card 202 comprises slots 206*a* and 206*b*. Pluggable transceivers 203 and 204 are mounted into the slots 206*a* and 206*b*. The pluggable transceivers 203 and 204 are such as GBIC, SFP or XFP. In FIG. 29, the optical transceiver 204 is a local transmission transceiver; the optical transceiver 203 is a remote transmission transceiver. The converter card 202 is a hot-swappable card. The optical transceivers 203 and 204 are hot-swappable.

The local transceiver 204 is a short distance transceiver which communicates to neighbor machines of the optical transport device 200. The local transceiver 204 may be both of an electronic signal transceiver and an optical signal transceiver. The local transceivers handle signal interfaces such as 1000Base-SX, 1000Base-LX, 1000Base-T, 100Base-T, OC-x, FibreChannel, ESCON, HD-SDI, SD-SDI, and/or DVB.

The remote transceiver 203 is a long distance optical transceiver. A CWDM (Coarse Wavelength Division Multiplex) optical transceiver or DWDM (Dense Wavelength Division Multiplex) optical transceivers are applied as the remote transceiver 203.

A back panel of the chassis 201 comprises two power modules which forms redundant power supply system. The power modules are hot-swappable.

A front panel of the chassis 201 comprises a wavelength division multiplexer module 203, a three-port switch converter card 211, and a management card 212.

The management card 212 monitors the chassis 201 and all the cards and modules mounted on the chassis 201. The management card 212 comprises a function to transmit corrected information to outside. In present embodiment, the management card is operated under SNMP (Simple Network Management Protocol). The SNMP management cared 212 comprises Ethernet interface of a RJ45 jack.

The three-port switch converter card 211 comprises two Ethernet interfaces of RJ45 jacks and a pluggable transceiver interface. The three-port switch converter card 211 comprises three-port Ether switch. In present embodiment, a RJ45 jack is applied to connect the management card 212. The Ethernet signal transmitted from the management card 212 is converted to an optical signal by the three-port switch converter card 211. The converted optical signal is transmitted to a remote site via an optical fiber 210 by using wavelength division multiplexing technology. Thus the management signal can be conveyed by the same fiber for main signal transmission. This manner of management signal transmission is called as "In-line management signal transmission".

Figure 30:
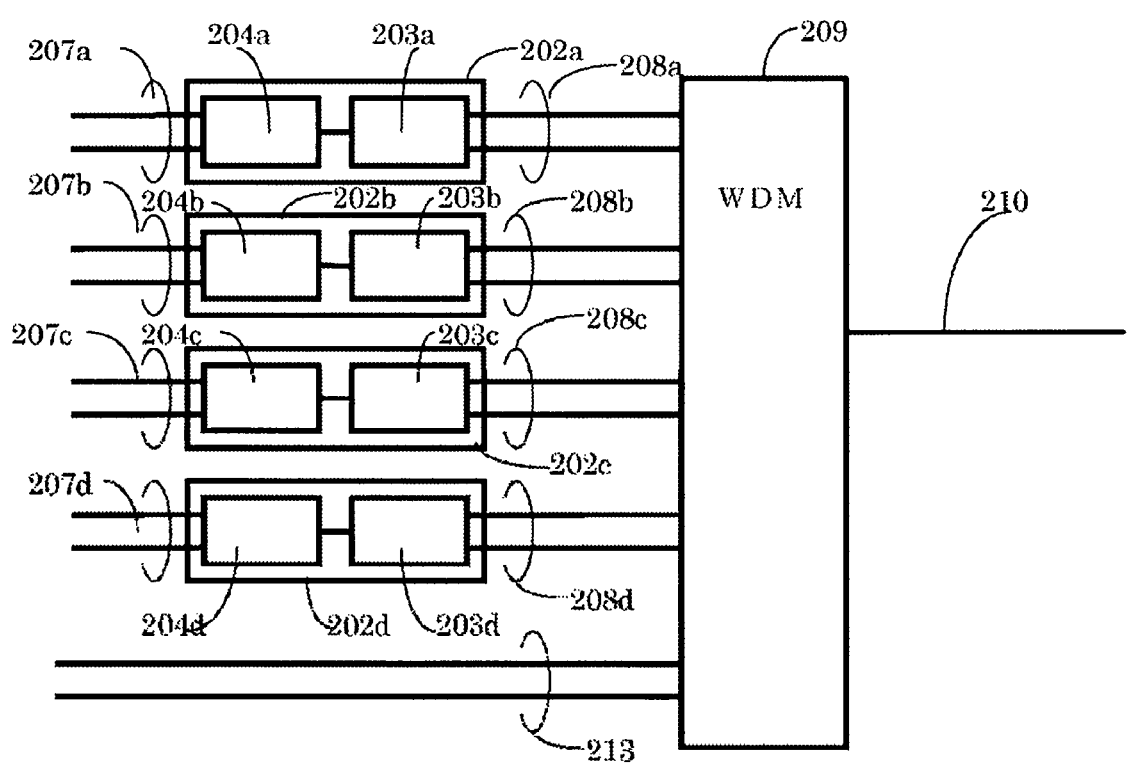
FIG. 30 is a schematic diagram showing Opt-Electro signal conversion and wavelength division multiplexing mechanism in FIG. 29.

FIG. 30 shows optical-electrical signal conversion and wavelength multiplexing mechanism. Local signals from switches are transmitted to converter cards 202*a*, 202*b*, 202*c*, and 202*d* by cables 207*a*, 207*b*, 207*c*, and 207*d*, respectively. The local signals are converted to optical signals and transmitted to the wavelength division multiplexer module 209 by optical fiber cables 208*a*, 208*b*, 208*c*, and 208*d*. The wavelength division multiplexer module 209 combines multiple wavelengths optical signals into the remote optical fiber 210. Via the remote optical fiber 210, the combined multiple wavelength optical signals are transmitted to the remote site. Optical signals transmitted from the remote site via the remote optical fiber 210 are de-multiplexed by the wavelength division multiplexer module 209. The de-multiplexed optical signals are transmitted to the converter cards 202*a*, 202*b*, 202*c*, and 202*d* and converted to the local signal. The converted local signals are transmitted to the local machines such as switches via cables 207*a*, 207*b*, 207*c*, and 207*d*.

The cables 207*a*, 207*b*, 207*c*, 207*d*, optical fiber cables 208*a*, 208*b*, 208*c*, and 208*d* are duplex cables. The duplex cable denotes integration of a pair of cables. On the other hand, the remote fiber is a simplex cable.

An optical signal from the three-port switch converter card 211 is transmitted to the wavelength division multiplexer module 209 via a cable 213 and multiplexed into the remote optical fiber 210. The management signal transmitted from the remote site via 210 is de-multiplexed by wavelength division multiplexer module 209, and sent to the three-port switch converter card 211.

The above description is based on the case of four converter cards. Present invention is not limited to certain number of converter cards. Present invention may employ any number of cards. Duplex remote fiber cable is also able to employ. If two remote transceivers are mounted on both slots 206*a* and 206*b*, converter card can act as repeater. The converter card can be operated as a simple media converter.

OADM may be mounted into the slot of the chassis 201 instead of the wavelength division multiplexer. The optical transport device described in among $1^{st}$ and $9^{th}$ embodiments comprises OADM. If OADM is mounted into the slot of the chassis 201, these embodiments can be implemented.

Furthermore optical amplifiers and/or dispersion compensation fibers may be mounted into slots disposed on the chassis. The edge optical transport device 32 shown in FIG. 10 may be implemented by using configuration shown in FIG. 29. The edge optical transport device 62 shown in FIG. 17 may be implemented by using configuration shown in FIG. 29. The edge optical transport device 32 or 62 may be implemented using the converter cards.

According to the converter card shown in present embodiment, both of a local transceiver and a remote transceiver are pluggable so that many kinds of local interfaces are applicable a kind of converter card.

In the case that 1000Base-SX, 1000Base-LX, 1000Base-T, FibreChannel, OC-3, OC-12, OC-48 are provided as local transceivers, and 8 kinds of wavelengths of CWDM and 45 kinds of wavelengths of DWDM, 371 kinds of converter card configurations are realizable. In order to realize these 371 kinds of configurations, a kind of converter card, 7 kinds of local transceivers, and 53 kinds of remote transceivers are required. As a result, 61 kinds of module can produce 371 kinds of the converter card configurations.

As described below, if three kinds of converter cards, a 2R converter card in which clock data recovery function is not disposed, a 3R converter card in which clock data recovery function is disposed, and a FEC (Forward Error Correction) converter card in which error correction mechanism is disposed, are provided, 1113 kinds of converter card configurations are realizable with 63 kinds of modules.

According to present embodiment, both of a local transceiver and a remote transceiver are pluggable, in addition the converter card itself is pluggable, thus many kinds of converter card configurations are realizable using small kinds of modules.

Figure 31:
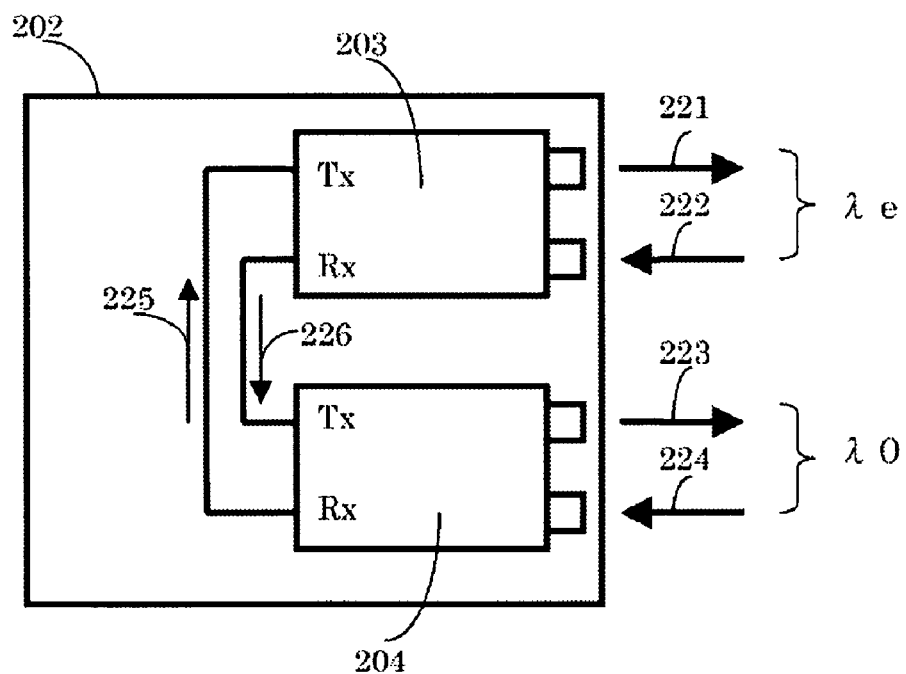
FIG. 31 is a schematic diagram showing converter card 202 adopting a 2R mechanism.

FIG. 31 shows a 2R converter card 202. A local transceiver 204 and a remote transceiver 203 are connected electrically. An optical signal 224 of wavelength λ0 inputted to the local transceiver 204 is converted to electrical signal 225 and transferred to the remote transceiver 205. Then the remote transceiver 205 converts the electrical signal 225 into an optical signal 221 of wavelength λe. An optical signal 222 of wavelength λe inputted to the remote transceiver 203, is converted to electrical signal 226 and transferred to the local transceiver 204. Then the local transceiver 204 converts the electrical signal 226 into an optical signal 223.

The converter card without clock extraction mechanism is called as a 2R converter card. On the other hand the converter card with clock data recovery mechanism is called as a 3R converter card. A copper cable transceiver is also applicable as a local transceiver 204 in configuration shown in FIG. 31.

The converter card 202 comprises monitor circuit, which is not shown in FIG. 31, manages status information such as LOS (Loss Of Signal) or LF (Laser Failure) of the local transceiver 204 and the remote transceiver 203. The management information is transmitted from the monitor circuit via a bus, which is not shown in FIG. 31, to the management card 212. The SFP transceivers comprises so-called DDM (Digital Diagnostics Mode) so that the management information of SFP transceivers can be derived using this function.

XFP transceivers which works at 10 Gbit/s data rate, comprises clock data recovery function inside the transceivers. Thus the converter card 202 equipped XFP transceivers work as a 3R converter card.

A 3R converter card comprising clock data recovery function only works as 3R mode. On the other hand, the 2R converter card can work both of the 2R mode and the 3R mode by choosing the pluggable transceivers. Therefore the 2R converter card provides flexible system architecture.

Transceivers which work under high data rate such as over 10 Gbit/s, should equip the clock data recovery function for achieve appropriate performance due to technical reason. Because PCB (Print Circuit Board) design comprising high data rate electrical components is difficult.

The term of 10 Gbit/s denotes data rate defined in OC-192, 10Gigabit Ethernet, and 10Gigabit FibreChannel standards. Several data rates around 10 Gbit/s are defined in these standards.

Figure 32:
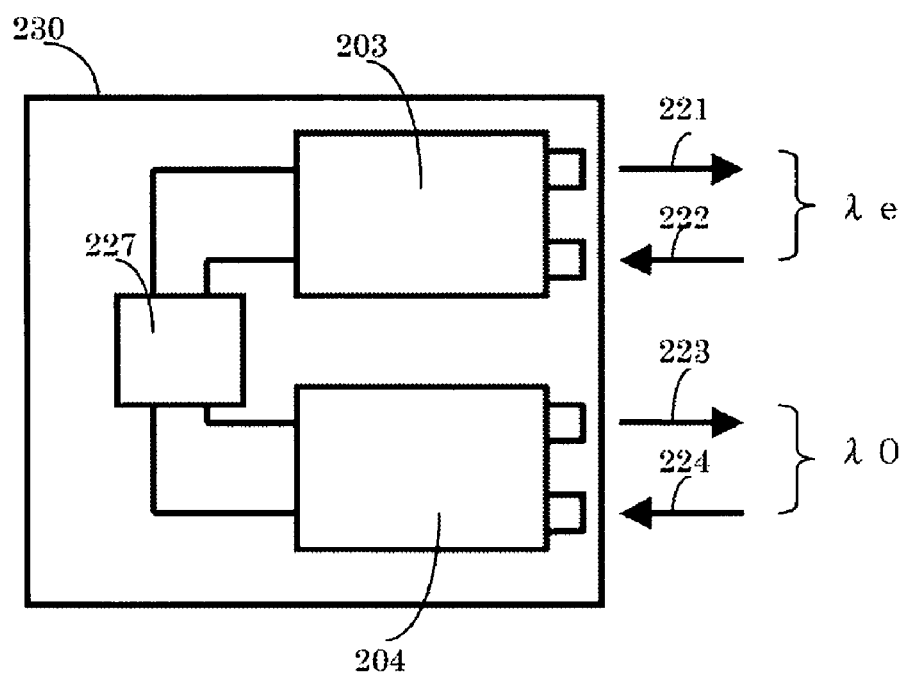
FIG. 32 is a schematic diagram showing converter card 230 adopting a 3R mechanism.

FIG. 32 shows a 3R converter card 230. A clock data recovery circuit 227 is disposed between the local transceiver 204 and the remote transceiver 203. The clock data recovery circuit 227 extracts clock from electrical signal and retimes data signal. The clock data recovery circuit 227 can remove time domain distortion such as jitter from the signal.

The converter card 230 comprises a monitor circuit which is not shown in FIG. 32, manages the status information of transceivers such as LOS or LF, and status information of the clock data recovery circuit 227 such as LOL (Loss Of Lock). The management information is transmitted from the monitor circuit via a bus, which is not shown in FIG. 32, to the management card 212.

Figure 33:
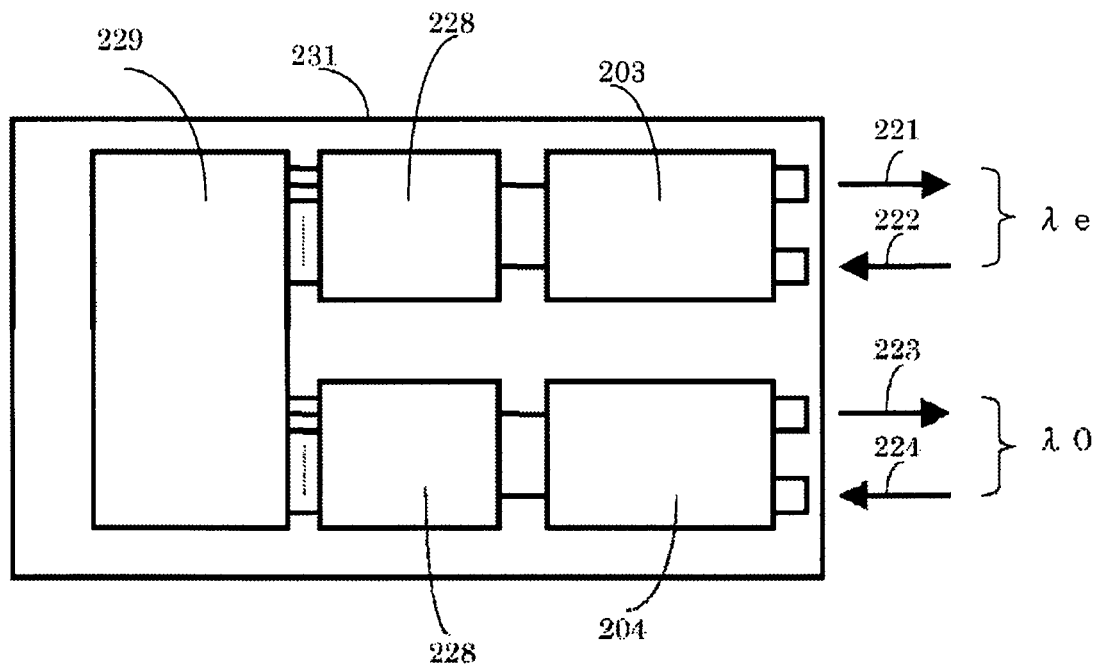
FIG. 33 is a schematic diagram showing converter card 231 adopting FEC mechanism.

FIG. 33 shows a FEC (Forward Error Correction) converter card 231. A serial parallel converter circuit 228 and a Wrapper 229 comprising FEC function are disposed between the local transceiver 204 and the remote transceiver 203. The Wrapper 229 added error correction codes such as Reed-Solomon codes to a transmitting signal. The Wrapper 229 derives error by analyzing the receiving signal and corrects the errors.

The Wrapper 229 comprises a performance monitor function which analyses error rate, packet discard rate, traffic rate, and so on. The converter card 231 comprises a monitor circuit which is not shown in FIG. 33, manages status information of the Wrapper 229, the local transceiver 204, and the remote transceiver 203. The management information is transmitted from the monitor circuit via a bus, which is not shown in FIG. 33, to the management card 212.

According to the above architecture, present embodiment can configure flexibly. Present embodiment enables to implement the core optical transport device and edge optical transport devices described in among the $1^{st}$ and $9^{th}$ embodiment. Also present embodiment is applicable for WDM transport devices and media converters.

The Eleventh Embodiment

Figure 34:
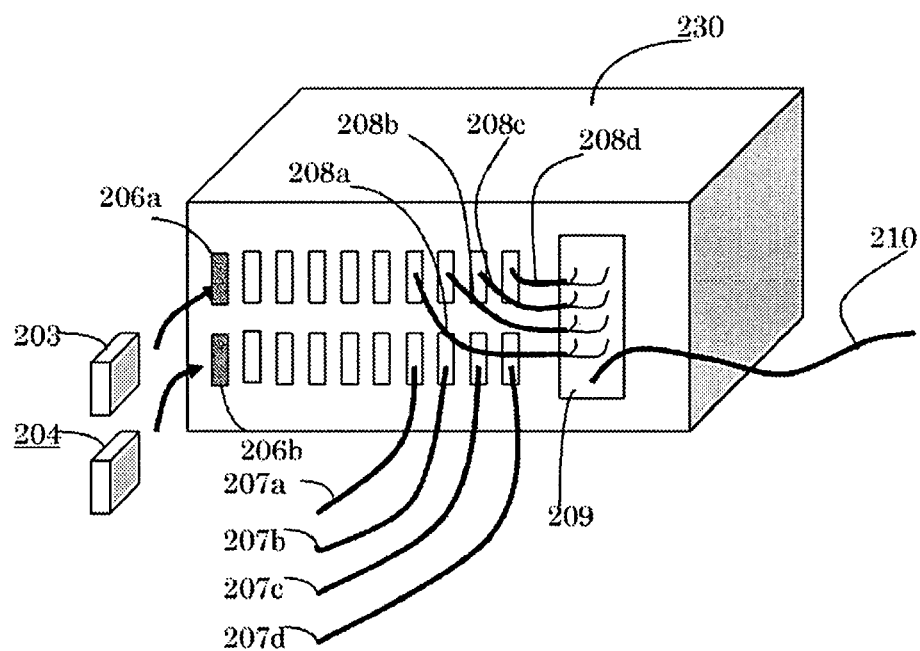
FIG. 34 is a perspective view of the 11th embodiment of an optical transport device.

FIG. 34 shows the eleventh embodiment of present invention. According to present embodiment, converter cards are fixed in an optical transport device 230. Slots 206a and 206b in which the local transceiver 204 and the remote transceiver 203 are mounted respectively are disposed on the chassis of the optical transport device 230. A wavelength division multiplexer 209 is disposed as a pluggable module. Furthermore, optical amplifier modules and dispersion compensation fiber modules may be mounted on slots on the chassis of the optical transport device 230 in same manner.

Pluggable mechanisms of converter cards bring additional cost and reliability problem in relation with electronic contacts. Present embodiment reduces cost and enhances reliability by eliminating the pluggable mechanisms of converter cards.

Figure 35:
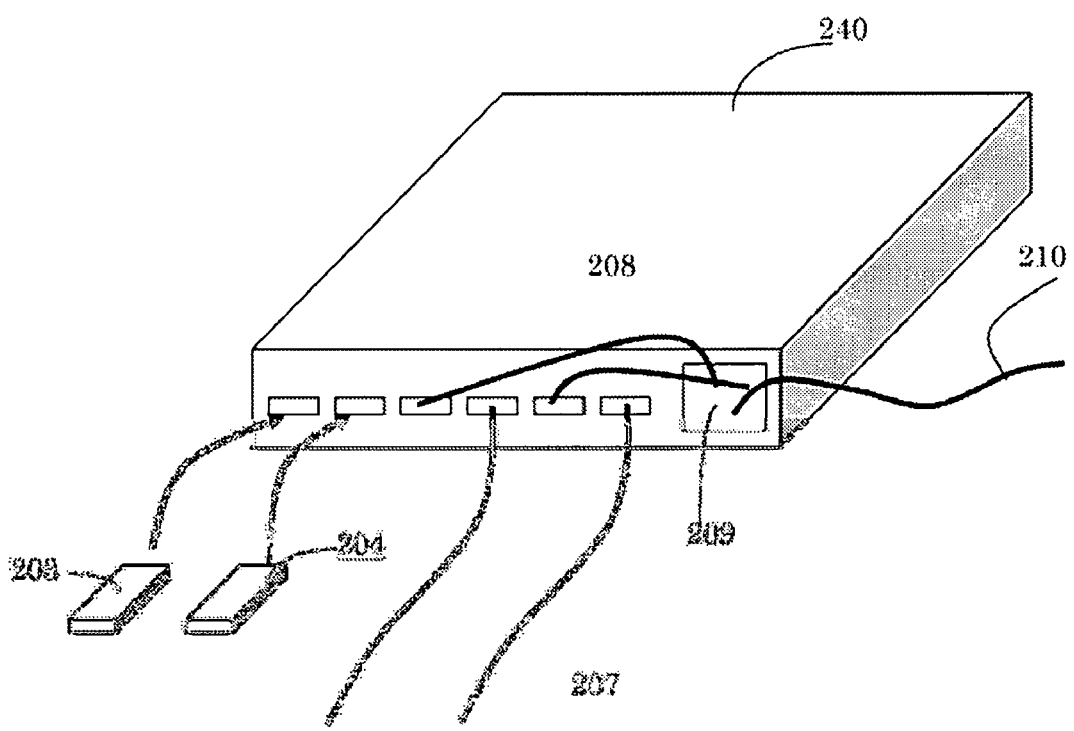
FIG. 35 is a perspective view of a modified optical transport device 240 of the 11th embodiment.

FIG. 35 shows a derivative embodiment. Optical transport device 240 has slots 206a and 206b on a line. According to this configuration, height of a chassis of the optical transport device is reduced. This configuration allows implementing plural converter cards on a PCB (Print Circuit Board). As a result, production process is simplified.

The Twelfth Embodiment

Figure 36:
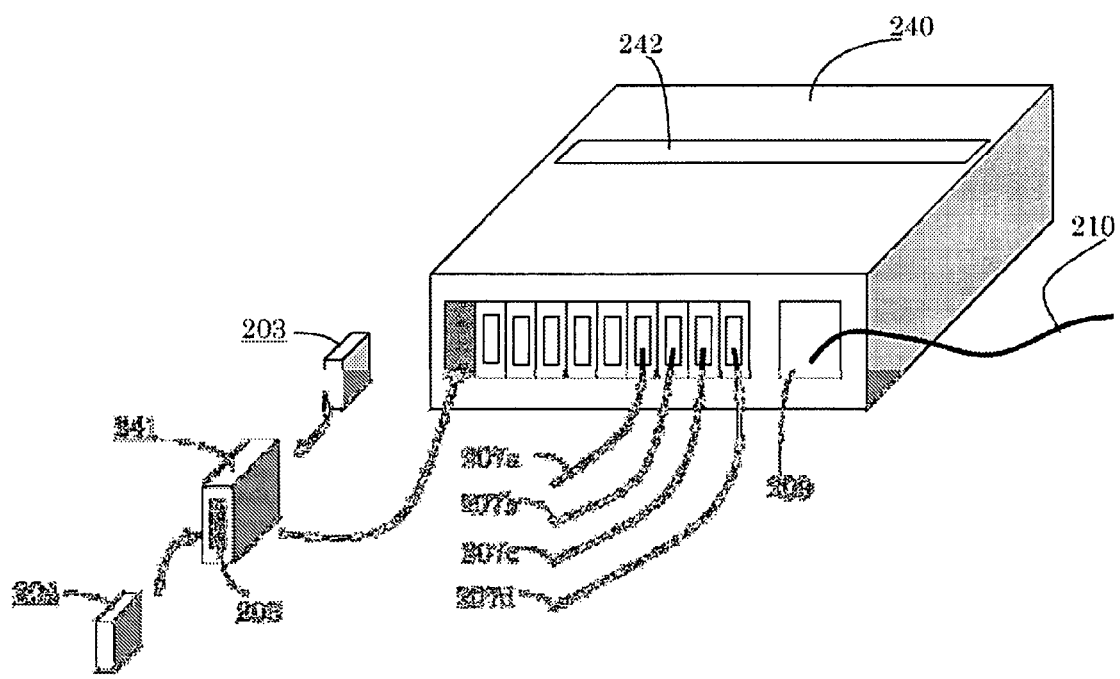
FIG. 36 is a perspective view of the 12th embodiment of the optical transport device.

FIG. 36 shows the twelfth embodiment of present invention. According to present embodiment, a slot 206b for a local transceiver is disposed on a front panel of a converter card 241. A slot 206a for a remote transceiver which is not shown in FIG. 36 is disposed on a rear panel of the converter card 241.

Optical circuits between a wavelength division multiplexer module 209 and the remote transceiver 203 are assembled as an optical back-plane which is not shown in FIG. 36. Furthermore, optical amplifiers and dispersion compensation fibers may be implemented into the wavelength division multiplexer module 209. The wavelength division multiplexer module 209 is a pluggable module.

The optical back-plane is installed from a slot 242 disposed on the upper panel of the chassis of the optical transport device 240. Therefore optical circuit is flexibly changed.

According to present embodiment, optical cabling in front of the front panel of the optical transport device is eliminated by optical back-plane. A height of the converter card 241 is shorter so that size of the chassis of the optical transport device 240 is reduced.

The Thirteenth Embodiment

FIG. 37A shows the thirteenth embodiment of present invention. An optical transport device of present embodiment comprises a booster optical amplifier 265, an optical preamplifier 269, and a dispersion compensation fiber 264. The optical transport device is operated using single fiber.

As shown in FIG. 37a, converter cards 251a, 251b, 251c, and 251d comprise local transceivers 254a, 254b, 254c, and 254d, respectively. The converter cards 251a, 251b, 251c, and 251d comprise remote transceivers 253a, 253b, 253c, and 253d respectively. The converter cards 251a, 251b, 251c, and 251d are 2R converter cards.

A wavelength division multiplexer 261 multiplexes optical signals transmitted from the remote transceivers 253a, 253b, 253c, and 253d into single fiber. The multiplexed optical signals are transmitted via the dispersion compensation fiber 264, the booster optical amplifier 265, and a wavelength division multiplexer 263 to a remote optical fiber 210. Optical signals transmitted from a remote site via the remote optical fiber 210 are conveyed via a wavelength division multiplexer 263 and the optical preamplifier 269 to a wavelength division multiplexer 262. The wavelength division multiplexer 262 de-multiplexes to independent wavelength optical signals. Each independent wavelength optical signal is transmitted to the remote transceivers 253a, 253b, 253c, and 253d respectively. The wavelength multiplexers 261, 261, and 263 are equipped in a single wavelength division multiplexer module 259.

The wavelength division multiplexer 263 multiplexes transmitting signals and receiving signals. A blue band selection filter or a red band selection filter equipped in the edge optical transport device 62, shown in FIG. 17, are applicable as the wavelength division multiplexer 263. So-called a "4 skip 1 filter" or an "8 skip 1 filter" are also applicable as the wavelength division multiplexer 263.

These filters are band-pass filters based on thin film dielectric filter technology. The "4 skip 1 filter", for example, is a band-pass filter which passes 4 wavelengths defined in C-band 100 GHz gird such as 1545.32 nm (194.00 GHz), 1546.12 nm (193.90 GHz), 1546.92 nm (193.80 GHz), and 1547.72 nm (193.70 GHz). Band-pass filters must reflect other wavelengths rather than passable wavelengths. However the "4 skip 1 filter" cannot use neighbor wavelengths of passable wavelengths, 1554.53 nm (194.10 GHz) and 1548.51 nm (193.60 GHz) due to gradual pass-reflection curve. Because of this performance in which 4 channel passes and one neighbor channel is skipped, this type of filter is called as "4 skip 1 filter". As same as the "4 skip 1 filter", the "8 skip 1 filter" passes 8 channel wavelengths and skips one neighbor channel.

XFP transceivers are used as the remote transceivers 253. The XFP transceivers emit wavelengths defined in C-band 100 GHz grid. The XFP transceivers comprise 3R function. Data rate is, for an example, 10 Gbit/s. EDFAs (Erbium Doped Fiber Amplifiers) are applied as optical amplifiers 265 and 269.

The optical amplifier 265 comprises an EDFA module 267a and a gain flattening filter 268a. The gain flattening filter 268a is disposed at input port of the EDFA module 267a. The EDFA module 267a amplifies single direction light as same direction as an arrow shown in FIG. 37A.

The optical amplifier 269 comprises an EDFA module 267b and a gain flattening filter 268b. The gain flattening filter 268b is disposed at output port of the EDFA module 267b. The EDFA module 267b amplifies single direction light as same direction as an arrow shown in FIG. 37A.

FIG. 37B shows gain versus wavelength curve of the EDFA modules 267 (267a or 277b). As shown in FIG. 37B, the EDFA modules 267 vary its gain against wavelength. The gain flattening filters 268 (268a or 268b) have reverse loss curve against the EDFA modules 267 therefore flat gain curve is obtained as total amplifier modules.

According to the above configuration, the dispersion compensation fiber 264 pre-compensates chromatic dispersion for transmitting optical signals. Then the optical amplifier 265 amplifies the transmitting optical signal up to saturation output power. Thus this configuration compensates an insertion loss of the dispersion compensation fiber 264. An insertion loss of the gain flattening filter 268a is compensated by amplification of the EDFA module 268a.

A dispersion compensation fiber and a gain flattening filter have typically 10 dB and 6 dB insertion loss, respectively. The transmitting optical signal need gain around 13 dB for amplify from 0 dBm to +13 dBm. Therefore the optical amplifier should have total 29 dB gain. Typically, an EDFA module has over 35 dB small signal gain. Thus the above configuration is workable.

The EDFA module 267b amplifies receiving optical signals. Then the gain flattening filter 268b flattens gain over wavelengths. In order to obtain good Noise Figure, the gain flattening filter 267b should disposed output port of the EDFA module 267b.

The receiving optical signals of −35 dBm should be amplified up to around −25 dBm so that required gain is 10 dB. The insertion loss of the gain flattening filer is around 6 dB. Therefore total 16 dB gain is required. As described previously, the EDFA module typically has over 35 dB small signal gain. Thus the above configuration is workable.

The above embodiment comprises C-band 100 GHz grid. However present invention is not limited by C-band wavelength or 100 GHz grid. L-band wavelengths are also applicable to present invention. Other gird definitions such as 50 GHz, 25 GHz, or 200 GHz are also applicable. Wavelengths, 1530 nm and 1550 nm belong to CWDM gird can be combined with C-band amplifier. Wavelengths, 1570 nm, 1590 nm, and 1610 nm belong to CWDM grid can be combined with L-band amplifier.

A minimized configuration of this embodiment comprises one converter card with a pair of wavelengths for transmitting and receiving optical signal over the remote optical fiber 210. Thus the minimized configuration may omit the wavelength division multiplexers 261 and 262. The minimized configuration also may omit the gain flattening filters 268a and 268b. Because the EDFA module just amplify single wavelength. Due to the gain flattening filter is relatively expensive component, this omission reduces cost.

As shown if FIG. 37B, if wavelength difference among utilize wavelengths is small enough, the gain flattening filters 268a and 268b may be omitted. If the gain deviation is smaller than 1 dB, the gain flattening filters 268a and 268b may be omitted.

The C-band has several small gain deviation wavelength regions such as 1530-1533 nm, 1538-1540 nm, 1545-1550 nm, and 1550-1560 nm. The grid interval of 100 GHz is approximately 0.8 nm in C-band wavelengths. Therefore 2.4 nm and 5.6 nm wavelength spaces are required for 4 channels and 8 channels configurations, respectively. The continuous wavelength region of 6 nm choosing from between 1545 nm and 1560 nm provides smaller than 1 dB gain deviation so that 8 channels configuration using C-band 100 GHz gird is realizable. If shorter gird interval is adopted more number of channels are simultaneously amplified without the gain flattening filters.

The same manner is applicable to other wavelength regions such as L-band. By choosing appropriate wavelength region in which an optical amplifier has smaller than 1 dB gain deviation, gain flattening filters may be omitted.

The "4 skip 1 filter" or the "8 skip 1 filter" is preferably employed as the wavelength division multiplexer 262. The wavelength space without gain flattening filter corresponds to wavelength space of the "4 skip 1 filter" or the "8 skip 1 filter". A wide variety of the "4 skip 1 filter" and the "8 skip 1 filter" are commercially available so that these filters make system design convenient.

Figure 37:
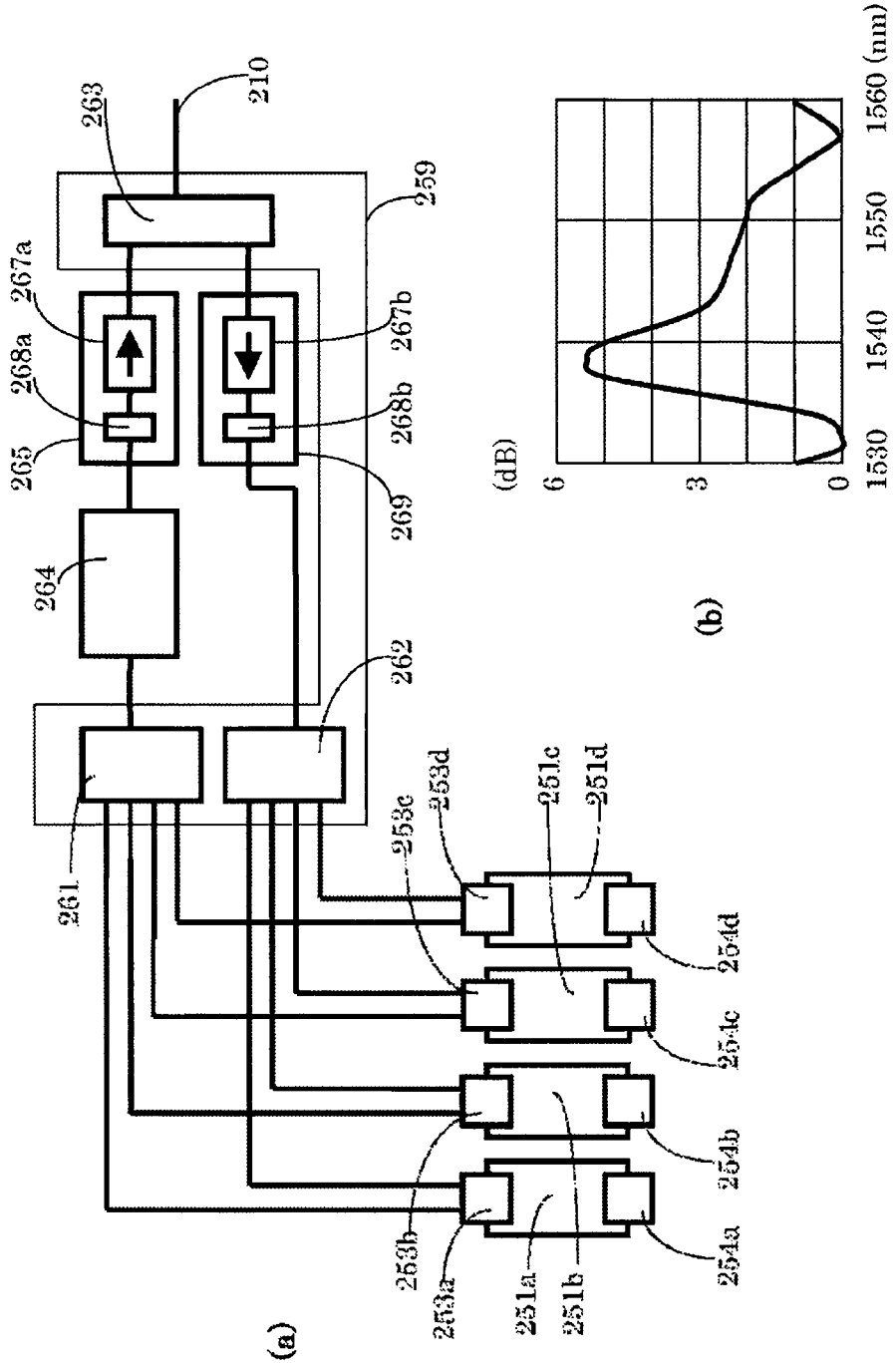
FIG. 37a is a block diagram of 13th embodiment of the optical transport device.
FIG. 37b is a graph showing gain property versus wavelength of C-band EDFA.

In FIG. 37, the optical transport device comprises the booster amplifier 265, the pre-amplifier 269, and the dispersion compensation fiber 264. However the optical transport device must not always comprise these three elements. Selected elements of these three elements should be combined depending on transmission distance.

The configuration without the gain flattening filter is applicable not only for single fiber operation but also for two fiber operation. The configuration that the dispersion compensation fiber is disposed at input port of the booster optical amplifier is applicable to the two fiber operation.

Figure 38:
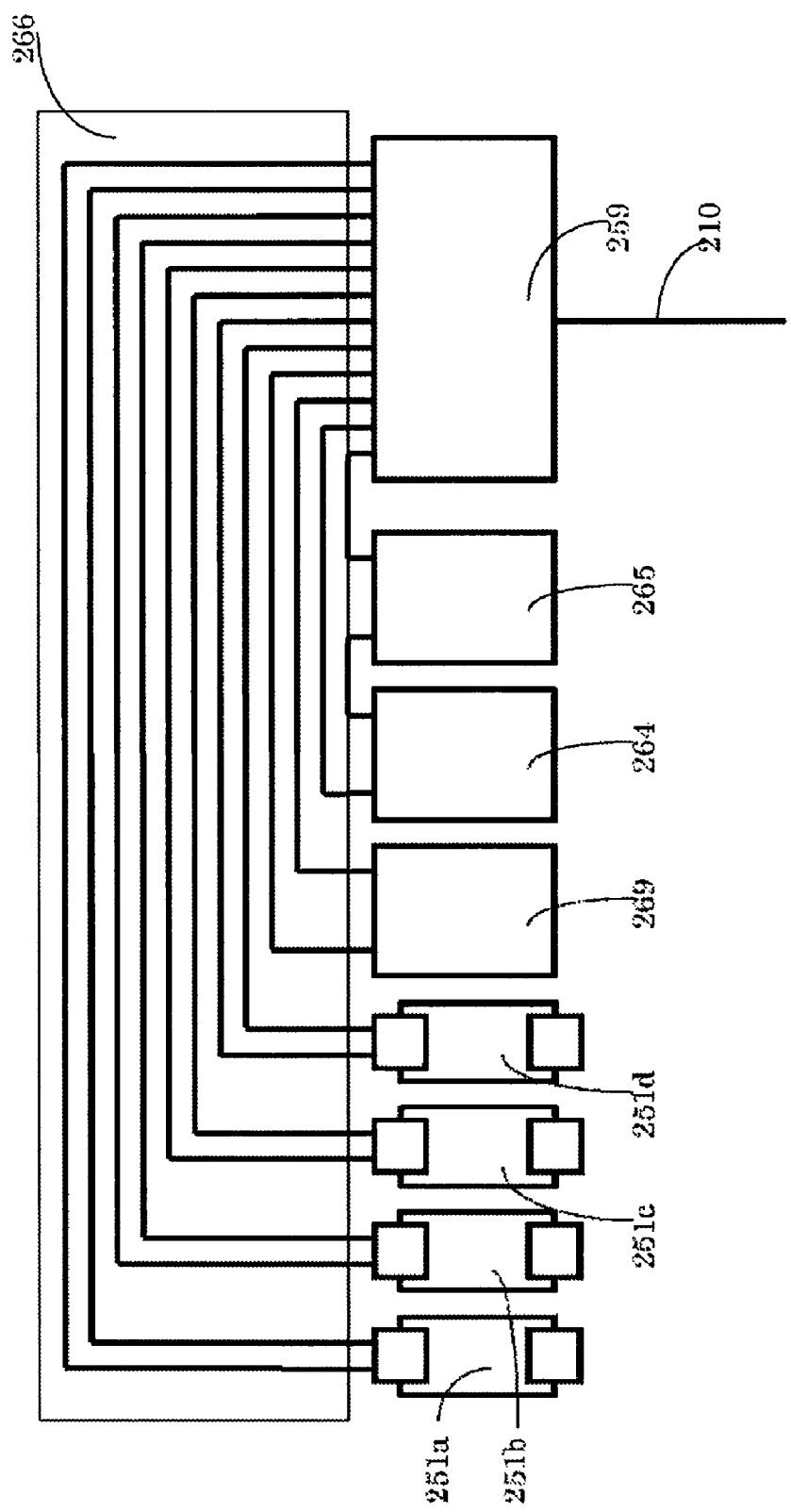

FIG. 38 shows the block diagram of the configuration shown in rearrangement of FIG. 37. The converter card 251a, 251b, 251c, 251d, the dispersion compensation fiber 264, the booster optical amplifier 265, optical pre-amplifier 269, and the wavelength division multiplexers 259 are connected by an optical back-plane 266.

Figure 39:
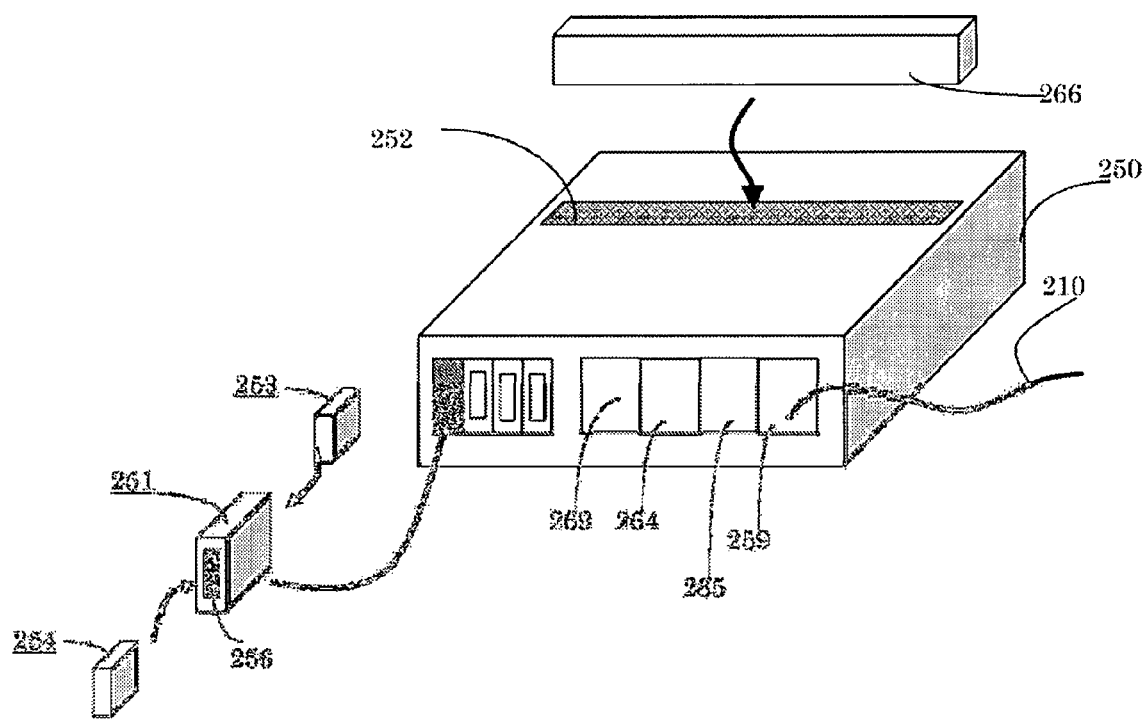
FIG. 39 is a perspective view of the 13th embodiment of the optical transport device.

FIG. 39 shows implemented form of present embodiment. This form is implemented in the manner shown in the twelfth embodiment. A slot for a local transceiver 256 is disposed at a front panel of the converter card 241. A slot for a remote transceiver 253 which is not shown in FIG. 39 is disposed at a rear panel of the converter card 241. A slot 252 for an optical back-plane 266 is disposed.

The dispersion compensation fiber module 264 comprises different length of the dispersion compensation fiber depending on transmission distance. If the transmission distance is short enough, due to there is no need of dispersion compensation, short optical patch cord is installed in the dispersion compensation fiber module 264. An optical amplifier with different saturation power is disposed on a chassis 250 depending on the transmission distance.

According to the above configuration, single fiber operable optical transport device with compact size chassis is provided.

In present embodiment, the configuration shown in FIG. 38 is adopted as an example of implementation. However, the configuration shown in FIG. 37 may be implemented in different form such as the implementation shown in FIG. 29, FIG. 34, and FIG. 35. The configuration shown in FIG. 37 is not limited by specific implementation manner.

The Fourteenth Embodiment

Figure 40:
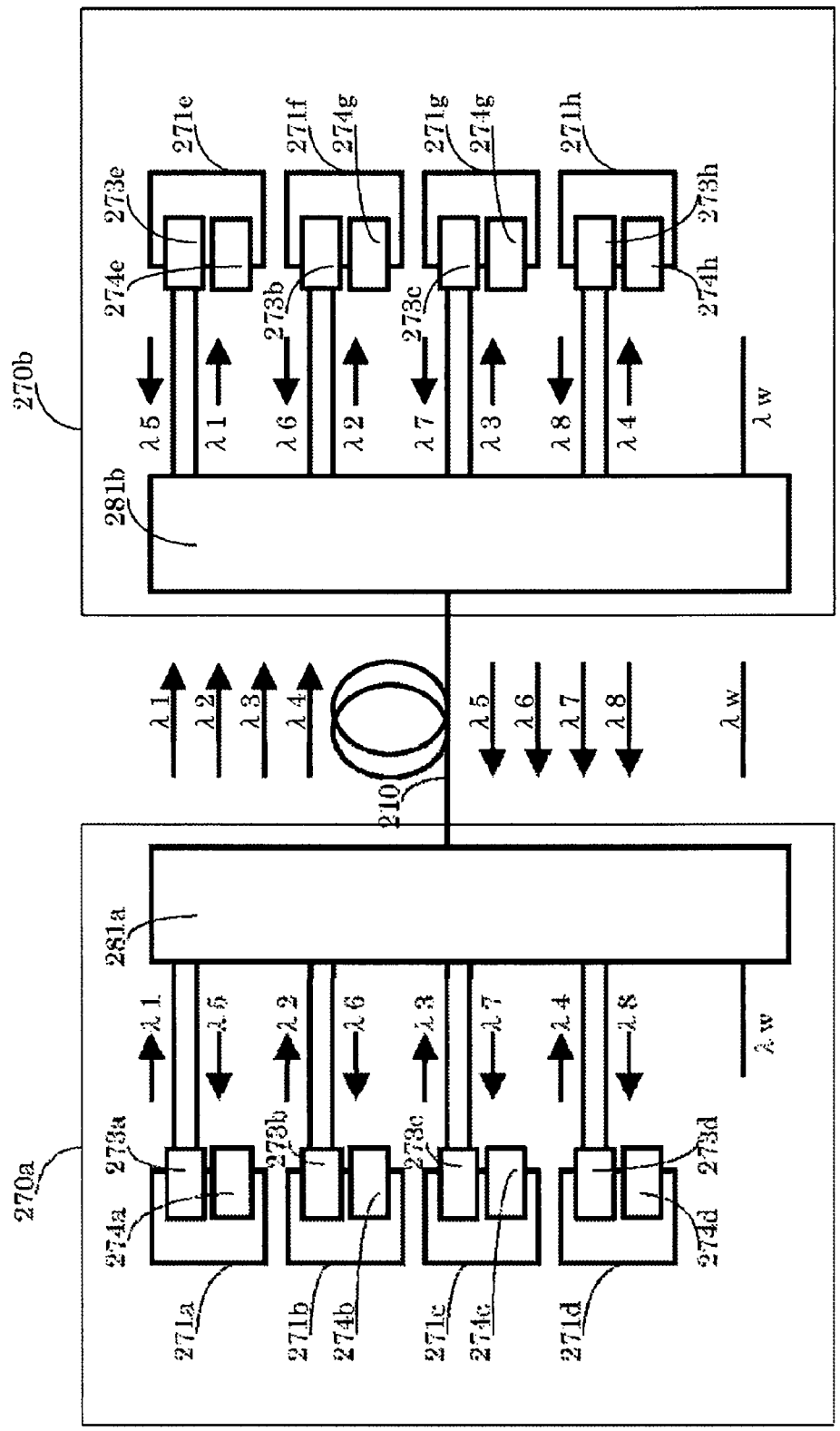
FIG. 40 is a schematic diagram showing the 14th embodiment of the optical transport device.

FIG. 40 shows the fourteenth embodiment of present invention. Two optical transport devices 270a and 270b are interconnected by a single remote fiber 210. The optical transport devices 270a and 270b are, for an example, the optical transport devices described as the $10^{th}$ embodiment or $11^{th}$ embodiment. The optical transport device 270a comprises four converter cards 271a, 271b, 271c, 271d, and a wavelength division multiplexer 281a. The optical transport device 270b comprises four converter cards 271e, 271f, 271g, 271h, and a wavelength division multiplexer 281b. The converter cards 271a, 271b, 271c, 271d, 271e, 271f, 271g, and 271h comprise remote transceivers 273a, 273b, 273c, 273d, 273e, 273f, 273g, and 273h, respectively. The converter cards 271a, 271b, 271c, 271d, 271e, 271f, 271g, and 271h comprise local transceivers 274a, 274b, 274c, 274d, 274e, 274f, 274g, and 274h, respectively.

Optical signals of wavelengths λ1, 80 2, λ3, and λ4 are transmitted from the optical transport device 270a to the optical transport device 270b. Optical signals of wavelengths λ5, λ6, λ7, and λ8 are transmitted from the optical transport device 270b to the optical transport device 270a. The wavelength division multiplexers 281a and 281b comprise λw in addition to the wavelengths λ1, ±2, ±3, λ4, λ5, ±6, λ7, and λ8. The wavelength λw is distinction of present embodiment. The wavelength λw is a "wild card" wavelength utilizing for recover of malfunction.

According to conventional design, transceivers with all wavelengths λ1, λ2, λ3, λ4, λ5, λ6, λ7, and λ8 must be stocked as back-up parts. On the other hand, in present embodiment, only a transceiver 275 with wild card wavelength λw must be stocked.

Figure 41:
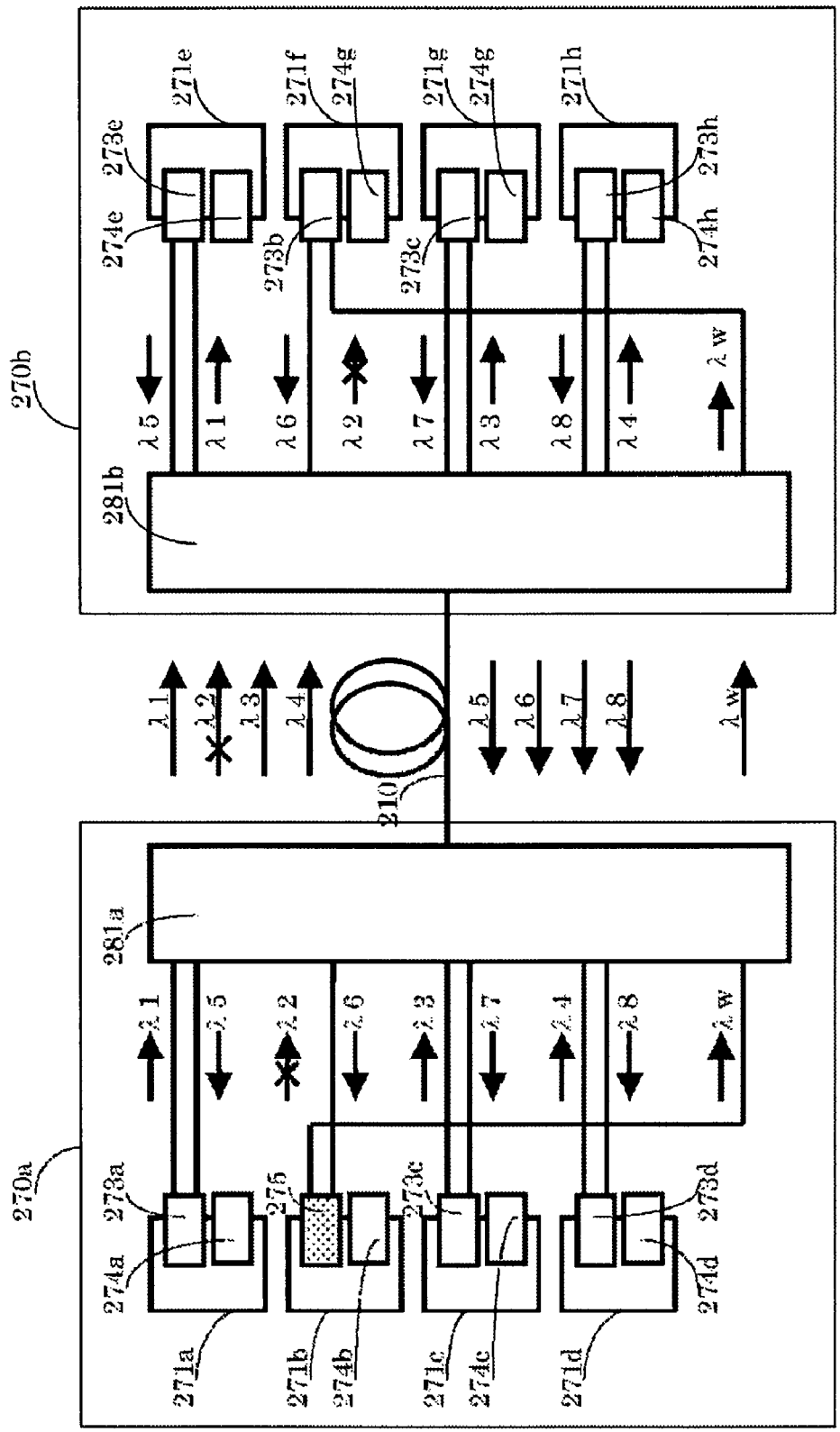
FIG. 41 is a schematic diagram in case of the remote transceiver mounted on the converter card 271b is failed.

As shown in FIG. 41, let us consider the remote transceiver equipped on the converter card 271b of optical transport device 270a is failed. In this circumstance, transmission line with wavelength λ2 is failed. According to present embodiment, instead of the transceiver with wavelength λ2, the transceiver 275 with wavelength λw is equipped to the converter card 271b. At the same moment, output port of the transceiver 275 is connected to a port of wavelength λw of the wavelength division multiplexer 281b. Also input port of the remote transceiver 273f on the converter card 271f of the optical transport device 270b is connected to a port of wavelength λw of the division multiplexer 281b. As a result, failure of transceiver with wavelength λ2 is repaired by the transceiver with wild card wavelength of λw.

Figure 42:
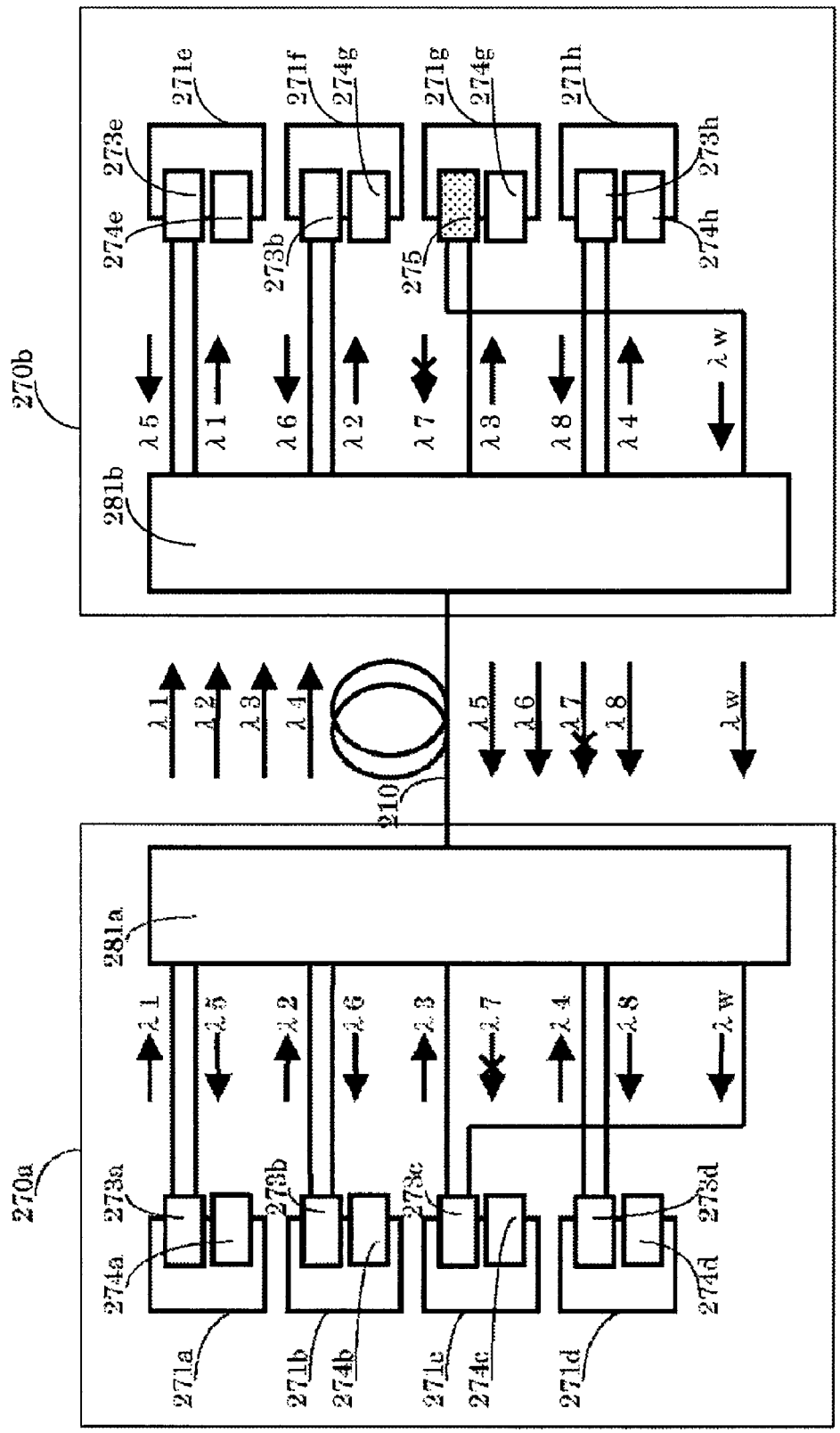
FIG. 42 is a schematic diagram in case of the remote transceiver mounted on the converter card 271g is failed.

Next, as shown in FIG. 42, let us consider the remote transceiver equipped on a converter card 271g of optical transport device 270b is failed. In this circumstance, transmission line with wavelength λ7 is failed. According to present embodiment, instead of the transceiver with wavelength λ7, the transceiver 275 with wavelength λw is equipped to the converter card 271g. At the same moment, output port of the transceiver 275 is connected to the port of wavelength λw of the wavelength division multiplexer 281b. Also input port of a remote transceiver 273c on a converter card 271c of optical transport device 270a is connected to the port of wavelength λw of the division multiplexer 281a. As a result, failure of transceiver with wavelength λ7 is repaired by the transceiver with wild card wavelength of λw.

The optical transport device shown in the tenth and eleventh embodiments comprise pluggable transceivers, thus a failed transceiver is easy to exchange. In these optical transport devices comprise optical cabling at front-panel so that connection port change of the wavelength division multiplexers is easy. The wild card wavelength is suited for these embodiments. According to present embodiment, kinds and number of maintenance parts are reduced. The present embodiment is described in the case of 8 kinds of wavelengths. However, present invention is not limited by specific wavelength number.

The present invention comprises single fiber operation in which upstream wavelengths are different from downstream wavelengths. However the present invention is not limited by the single fiber operation. The present invention is not only valuable for the single fiber operation but also valuable for two fiber operation.

Figure 43:
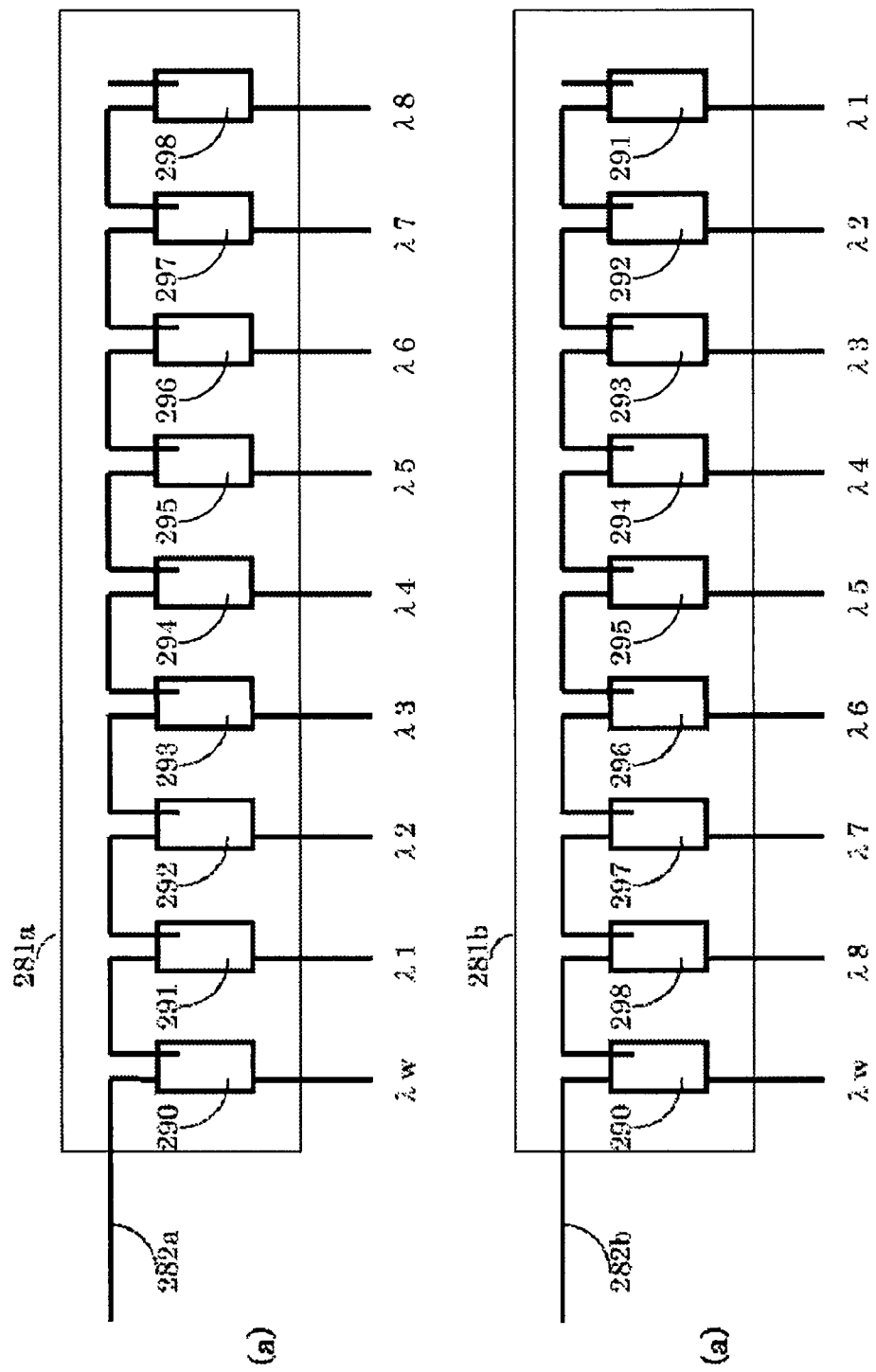
FIG. 43 is a schematic diagram showing wavelength division multiplexer 281a and 281b which comprise dielectric thin film filters.

FIG. 43A and FIG. 43B show the wavelength division multiplexers 281a and 281b configured by CWDM (Coarse Wavelength Division Multiplexing) based on thin film dielectric filters. As shown in FIG. 43A, a three-port device based on thin film dielectric filter 290 with wild card wavelength λw is located at the nearest place of a common port 282a. As shown in FIG. 43B, a three-port device based on thin film dielectric filter 290 with wild card wavelength λw is located at the nearest place of a common port 282b.

Three-port devices based on thin film dielectric filter 291, 292, 293, 294, 295, 296, 297 and 298 pass optical signals of wavelengths λ1, λ2, λ3, λ4, λ5, λ6, λ7, and λ8, respectively.

As shown in FIG. 43A and FIG. 45B, λ1=1470 nm, λ2=1490 nm, λ3=1510 nm, λ4=1530 nm, λ5=1550 nm, λ6=1570 nm, λ7=1590 nm, λ8=1610 nm, and λw=1430 nm, respectively. The wild card wavelength λw skips one grid of CWDM wavelength 1450 nm.

In the single fiber operation, strong transmitting optical signal could be reflected by near-end devices such as optical connectors. On the other hand receiving optical signal is attenuated by long distance optical fiber. Therefore reflection of the strong transmitting optical signal acts as noise against the receiving optical signal. High isolation is sometimes required for wavelength division de-multiplexer for single fiber operation. Skipping one CWDM grid provides high isolation. The thin film dielectric filters typically have 30 dB isolation against adjacent grid. On the other hand, the dielectric filters typically have 50-60 dB isolation against non-adjacent grid. Thus the wild card wavelength disposed skipped one grid wavelength provide enough isolation.

At the CWDM grid of 1430 nm, a loss of silica based single mode optical fiber is bigger than wavelength region between 1470 nm and 1610 nm. Thus the three-port device based on thin film dielectric filter 290 with wild card wavelength is disposed the nearest place of common port 282a or 282b to minimize an insertion loss for the wild card wavelength. The three-port device based on thin film dielectric filter passes specific wavelength and reflect other wavelengths. Reflection losses of the three-port devices are accumulated along multiple reflections. As shown in FIG. 43A, the insertion loss of the wavelength λ8 is biggest. As shown in FIG. 43B, the insertion loss of the wavelength λ1 is the biggest.

In order to flatten an insertion loss of each wavelength, as shown in FIG. 43A and FIG. 43B, a pair of wavelength division multiplexers 281a and 281b comprises reversal arrangement of the three-port devices each another. The wild card wavelength λw is disposed the place at minimum insertion loss.

As the wild card wavelength λw, wavelength 1450 nm can be adopted if high isolation three-port devices are disposed as the three-port devices 290 and 291. As high isolation three-port devices, double stage filters type three-port device or double pass filter type three-port device is applicable. If the high isolation three-port device is adopted, wavelength skip is not necessary.

The above embodiment comprises 8 wavelengths for standard signals and 1 wavelength for a wild card wavelength chosen from CWDM grids. However present invention is not limited by specific wavelength or wavelength number. Wavelengths chosen from DWDM grids are also applicable.

The method of skipping-a-grid is also useful for an embodiment comprising DWDM wavelength grids. Adopting high isolation three-port devices for the wild card wavelength and its neighbor wavelengths is a preferred implementation technique. A technique that the three-port device with the wild card wavelength is arranged minimum insertion loss position is also preferred.

It is possible to assign the wild card wavelength into ring shaped network system. For example, the wild card wavelength λw is assignable into the first embodiment comprising ring shaped physical layer.

Instead of the wavelength division multiplexers 21a and 21b shown in FIG. 3, the wavelength division multiplexers 281a and 281b may be disposed. Instead of the OADM 2 shown in FIG. 5, OADM 285 shown in FIG. 44 may be disposed.

Figure 44:
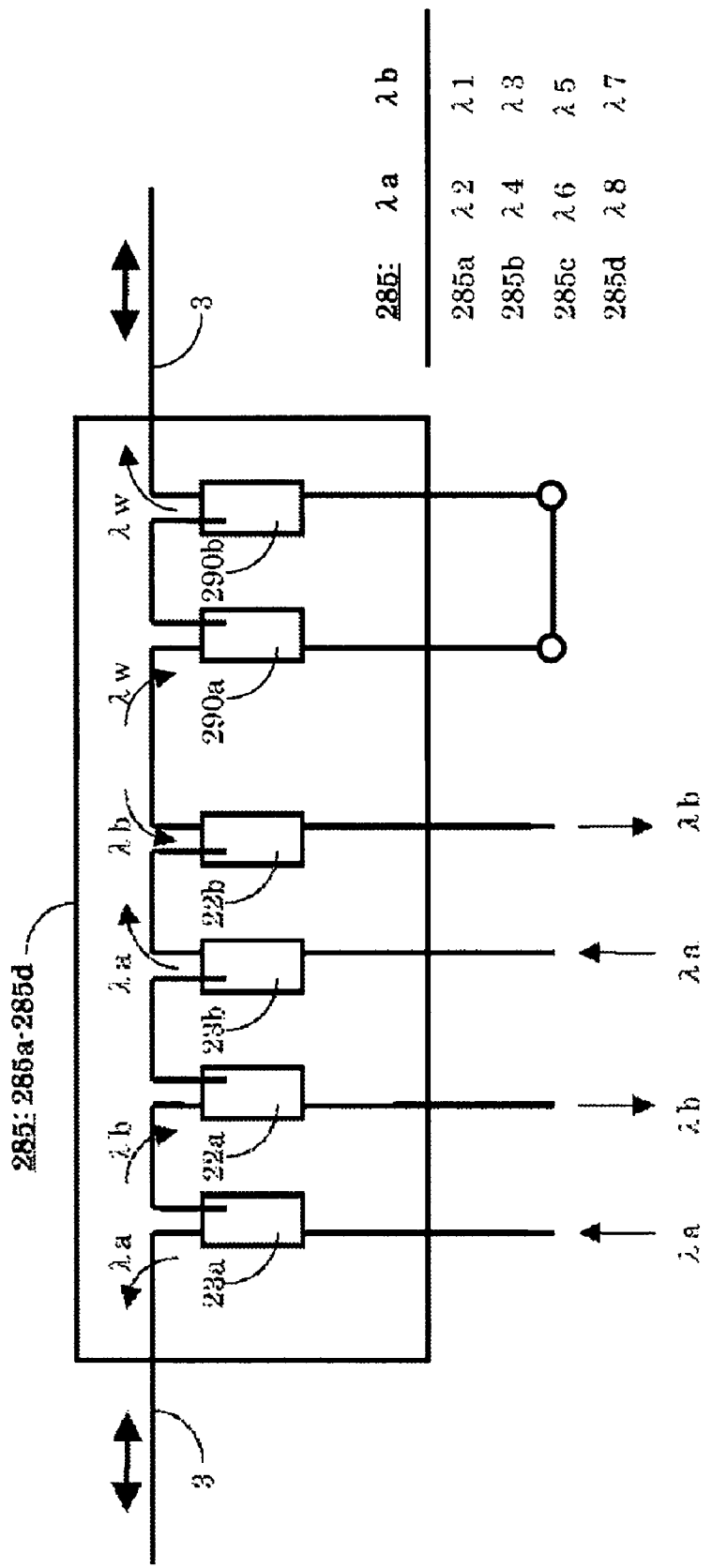
FIG. 44 is a schematic diagram showing the Add Drop Multiplexer 285 comprising wild card wavelength.

The OADM 285 shown in FIG. 44 comprises three-port devices 290a and 290b with the wild card wavelength. In normal time, a drop port is connected to an add port. If some failure has happened, this cabling is changed for recovery of malfunction.

The optical transport device 62 shown in FIG. 17, may equip the wild card wavelength. Two wild card wavelengths, λw1 for clockwise propagation and λw2 for anti-clockwise propagation, should be disposed for the optical transport device 62.

Multiple wild card wavelengths are assignable. If two wild card wavelengths are assigned simultaneous double failures can be recovered.

The optical communication network comprising OADM generally need many wavelengths so that the assignment of the wild card wavelengths are preferred for these systems.

The Fifteenth Embodiment

FIG. 45A, FIG. 45B and FIG. 45C show the fifteenth embodiment of present invention. As shown in FIG. 45A, dispersion compensation device 300 comprises dispersion compensation fibers 301a, 301b, 301c, optical switches 302a, 302b, 302c, 302d, 302e, 302f, bypass optical fibers 303a, 303b, and 303c. The dispersion compensation device 300 comprises input/output ports 304a and 304b.

The optical switch 302 is a 2×2 optical switch. The optical switch 302 has two connection statuses. One status is, as shown in FIG. 45B, a status of parallel connection. Another status is, as shown in FIG. 45C, cross connection status. The optical switches 302a and 302b work together. The optical switches 302c and 302d work together. The optical switches 302e and 302f work together. The optical switches 302a and 302b choose dispersion compensation fiber 301a or bypass optical fiber 303a. The optical switches 302c and 302d choose dispersion compensation fiber 301b or bypass optical fiber 303b. The optical switches 302e and 302f choose dispersion compensation fiber 301c or bypass optical fiber 303c.

The dispersion compensation fibers 301a, 301b, and 301c have dispersion coefficients of −340 ps/nm, −690 ps/nm, and −1320 ps/nm, respectively. Thus the dispersion compensation device 300 varies the dispersion coefficient between 0ps/nm and −2380 ps/nm with −340 ps/nm step by configuring switches 302a, 302b, and 302c.

The edge optical transport device 62 comprising the dispersion compensation devices 300 instead of the dispersion compensation fibers 84 and 85 can vary dispersion coefficient. The dispersion compensation devices 300 may be applied for the optical transport device shown if FIG. 37. The dispersion compensation devices 300 may be substituted for the dispersion compensation fiber 264 shown in FIG. 37. By this substitution, optical transport device with variable dispersion coefficient is realizable. The variable coefficient dispersion compensation device provides flexibility for fiber deployment.

Figure 46:
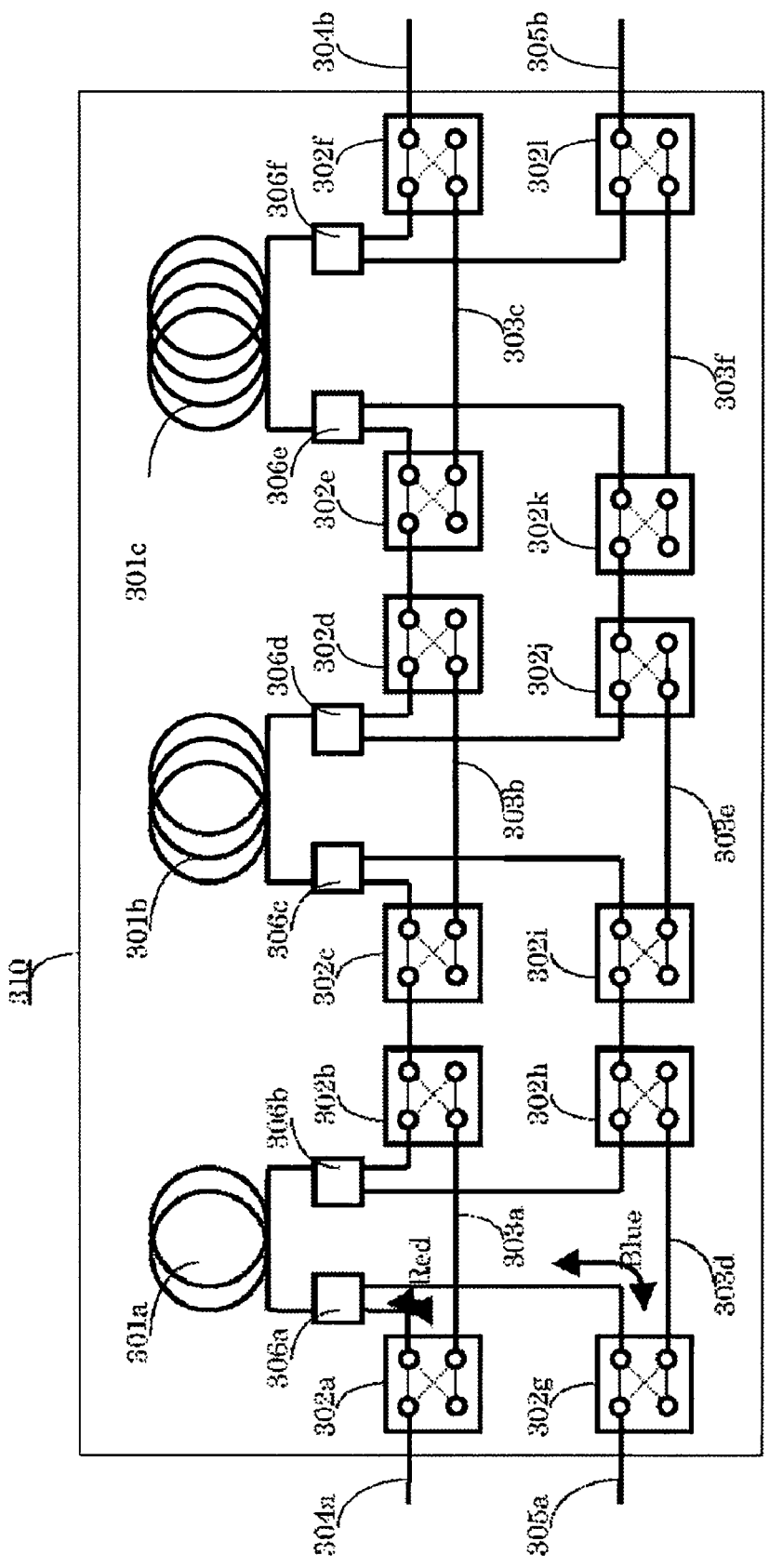
FIG. 46 is a schematic diagram showing the dispersion compensation device 310 suited for the edge optical transport device 62.

FIG. 46 shows dispersion compensation device 310 which is suited for the edge optical transport device 62 shown in FIG. 17. Filters 306a and 306b are disposed with the dispersion compensation fiber 301a. The filters 306a and 306b select the blue band and the red band of C-band. The filters 306a and 306b branch optical signals of the red band, approximately 1545-1560 nm, to optical switches 302a and 302b. The filters 306a and 306b branch optical signals of the blue band, approximately 1530-1545 nm, to optical switches 302g and 302h. In other words, optical signals of the red band, approximately 1545-1560 nm, transmitted from the optical switches 302a and 302b optical signals of the bleu band, approximately 1530-1545 nm, transmitted from the optical switches 302g and 302h are joined and transmitted to the dispersion compensation fiber 301a.

Filters 306c and 306d are disposed with the dispersion compensation fiber 301b. The filters 306c and 306d branch optical signals of the red band, approximately 1545-1560 nm, to optical switches 302c and 302d. The filters 306c and 306d branch optical signals of the blue band, approximately 1530-1545 nm, to optical switches 302i and 302j. Filters 306e and 306f are disposed with the dispersion compensation fiber 301c. The filters 306e and 306f branch optical signals of the red band, approximately 1545-1560 nm, to optical switches 302e and 302f. The filters 306e and 306f branch optical signals of the blue band, approximately 1530-1545 nm, to optical switches 302k and 302l.

Optical signals belong to the red band; propagate input/output port 304a, the dispersion compensation fibers 301a, 301b, 301c, optical switches 302a, 302b, 302c, 302d, 302e, and 302f, and an input/output port 304b. Optical signals belong to the blue band; propagate input/output port 305a, the dispersion compensation fibers 301a, 301b, 301c, optical switches 302g, 302h, 302i, 302j, 302k, and 302l, and an input/output port 305b.

Thus the optical signals belong to the red band and the optical signals belong to the blue band share the dispersion compensation fibers 301a, 301b, and 301c.

Figure 47:
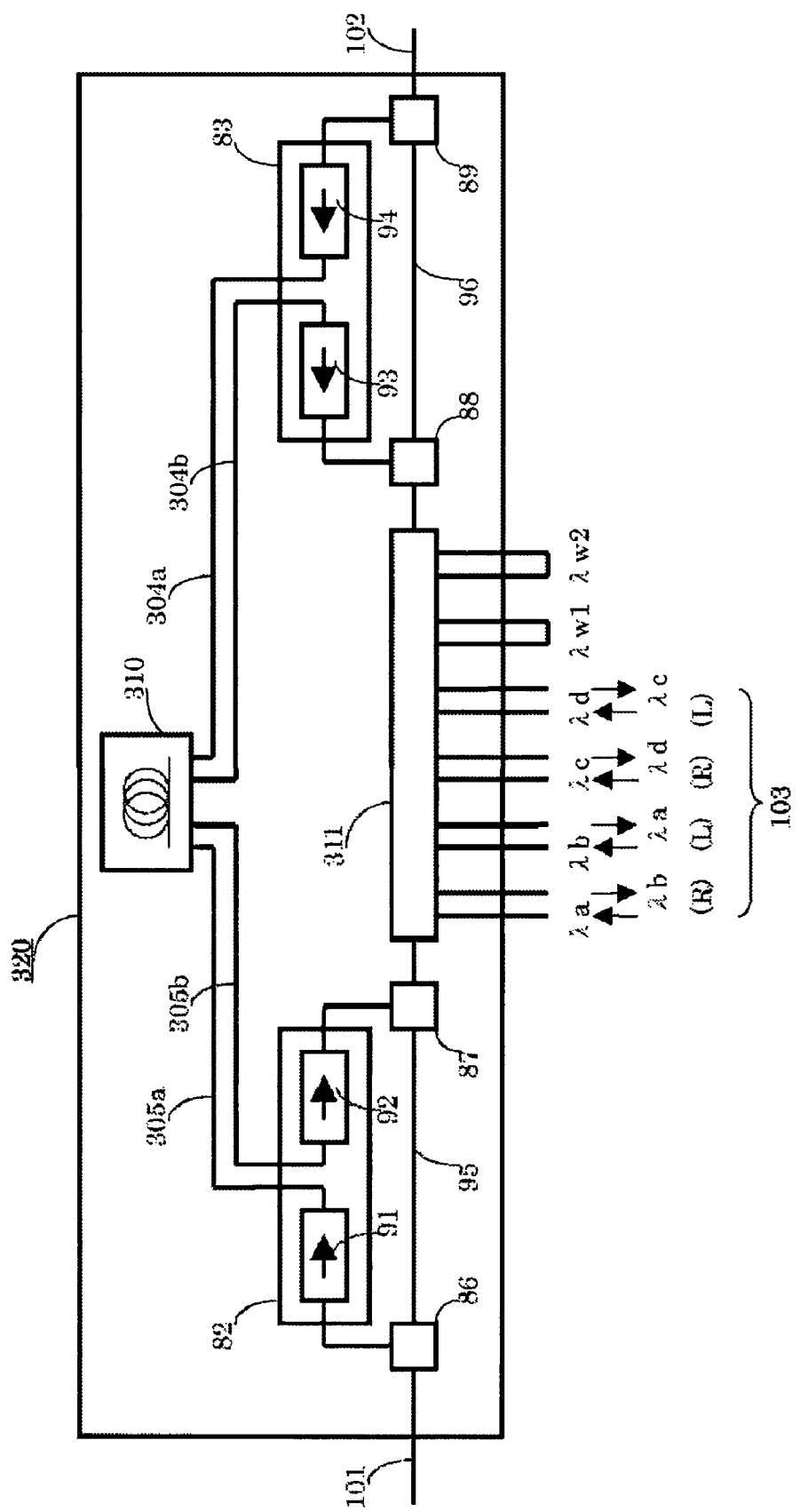
FIG. 47 is a schematic diagram showing the edge optical transport device comprising dispersion compensation device 310.

FIG. 47 shows optical transport device 320 comprising the optical dispersion compensation device 310. This configuration is equivalent to the edge optical transport device 62 comprising the optical dispersion compensation device 310 instead of the dispersion compensation fibers 84 and 85. Input/output ports 304a and 304b of the dispersion compensation device 310 are connected to the optical amplifier 83.

Lengths of the dispersion compensation fibers are over several kilo-meters so that the device volume is relatively big and costly. The dispersion compensation device 310 is shared by both of red band and blue band, therefore device volumes and costs are reduced.

As shown in FIG. 47, optical add drop multiplexer 311 comprises two wild card wavelengths λw1 and λw2. Thus the stock parts for maintenance are reduced as describe in the fourteenth embodiment.

The Sixteenth Embodiment

Figure 48:
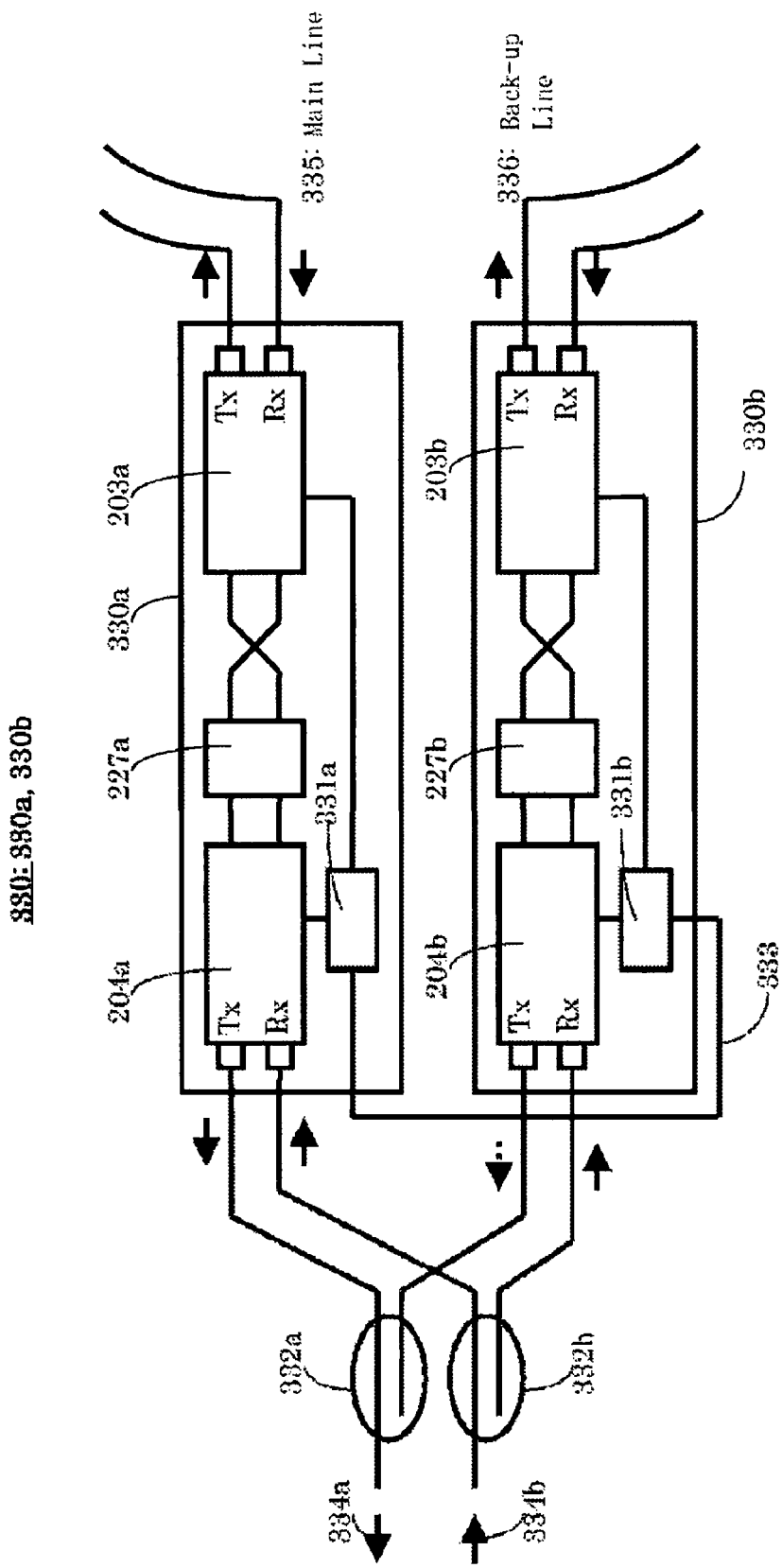
FIG. 48 is a schematic diagram showing the 16th embodiment of converter cards and the optical communication network.

FIG. 48 shows the sixteenth embodiment of present invention. This embodiment relates to a converter card 330 comprising protection mechanism and an optical communication network comprising the converter card 330.

As shown in FIG. 48, A converter card 330a comprises a local transceiver 204a, a clock data recovery circuit 227a, a remote transceiver 203a, and protection control circuit 331a. A converter card 330b comprises a local transceiver 204b, a clock data recovery circuit 227b, a remote transceiver 203b, and protection control circuit 331b. The protection control circuits 331a and 331b are connected by signal line 333.

An input optical signal 334b from local side is branched by an optical fiber coupler 332b. The branched two optical signals are transmitted to the local transceivers 204a and 204b. The converted electrical signals are transmitted to clock data recovery circuit 227a and 227b, respectively. Then the electrical signals are sent to the remote transceivers 203a and 203b, respectively. The re-converted optical signals are transmitted to main line 335 and back-up line 336, respectively.

Optical signals transmitted from remote site through the main line 335 and back-up line 336 are inputted to the remote transceivers 203a and 203b, respectively. Then converted electrical signals are transmitted to the clock data recovery circuit 227a and 227b, respectively. Then the electrical signals are sent to the local transceivers 204a and 204b, respectively.

The reconverted optical signals are combined by an optical fiber coupler 332a. In case of normal operation, the protection control circuits 331a and 331b enable only a transmitter of the local transceiver 204a and disable a transmitter of the local transceiver 204b. Thus the optical signal from the local transceiver 204a is transmitted to the local side as an optical signal 334a. In case of failure of the main line 335, the protection control circuits 331a and 331b enable the transmitter of the local transceiver 204b and disable the transmitter of the local transceiver 204a. Thus the optical signal from the local transceiver 204b is transmitted to local side as the optical signal 334a.

The status of the main line 335 and the back-up line 336 are detected by the remote transceivers 203a and 203b. Thus failure of the main line 336 is determined by the protection control circuit 331a by receiving signal form the remote transceiver 203a. The protection control circuit 331a sends status signal to the protection control circuit 331b via the signal line 333 and enables/disables the transmitters of the local transceivers 204a and 204b.

According to this embodiment, the converter cards 330a and 330b are connected in parallel by the optical fiber coupler 332a and 332b so that a failed converter card is easy to disconnect. The optical fiber couplers are passive component so that their reliabilities are high.

The converter card 330 may be applicable for the optical transport device 200 shown in FIG. 29, and/or the optical transport device 240 shown in FIG. 36. As the switching means 51, 52, 53, and 54 shown in FIG. 13A, two converter cards 330 and the optical fiber couplers are applicable. Any passive optical branch means are applicable instead of the optical fibers 332a and 332b.

The Seventeenth Embodiment

Figure 49:
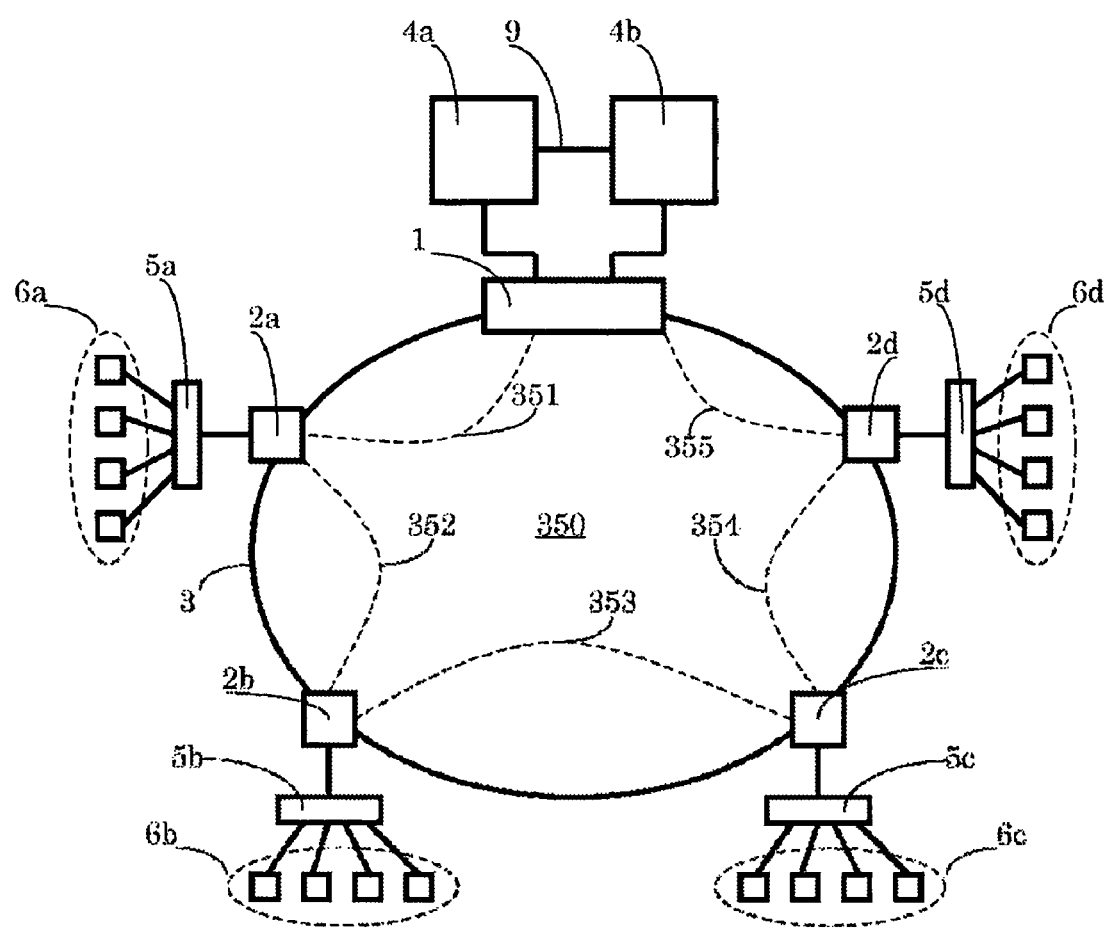
FIG. 49 is a schematic diagram showing the 17th embodiment of the optical communication network.

FIG. 49 shows the seventeenth embodiment of present invention. This embodiment is the optical communication network shown in FIG. 1 further comprises "In-line management". The "In-line management" is as described in the tenth embodiment, the mechanism to send management information to remote site using the wavelength division multiplexing technology.

As shown in FIG. 49, transmission circuit 350 is formed by the wavelength division multiplexing technology. The transmission circuit 350 comprises a transmission circuit 351, 352, 353, 354, and 355. The transmission circuit 350 has a relatively simple circuit in which neighbor stations are connected by point-to-point. Management information is transmitted through the transmission circuit 351, 352, 353, 354, and 355. Main signal transmission circuit 7 is formed which is shown in FIG. 1 is also formed among the stations.

Figure 50:
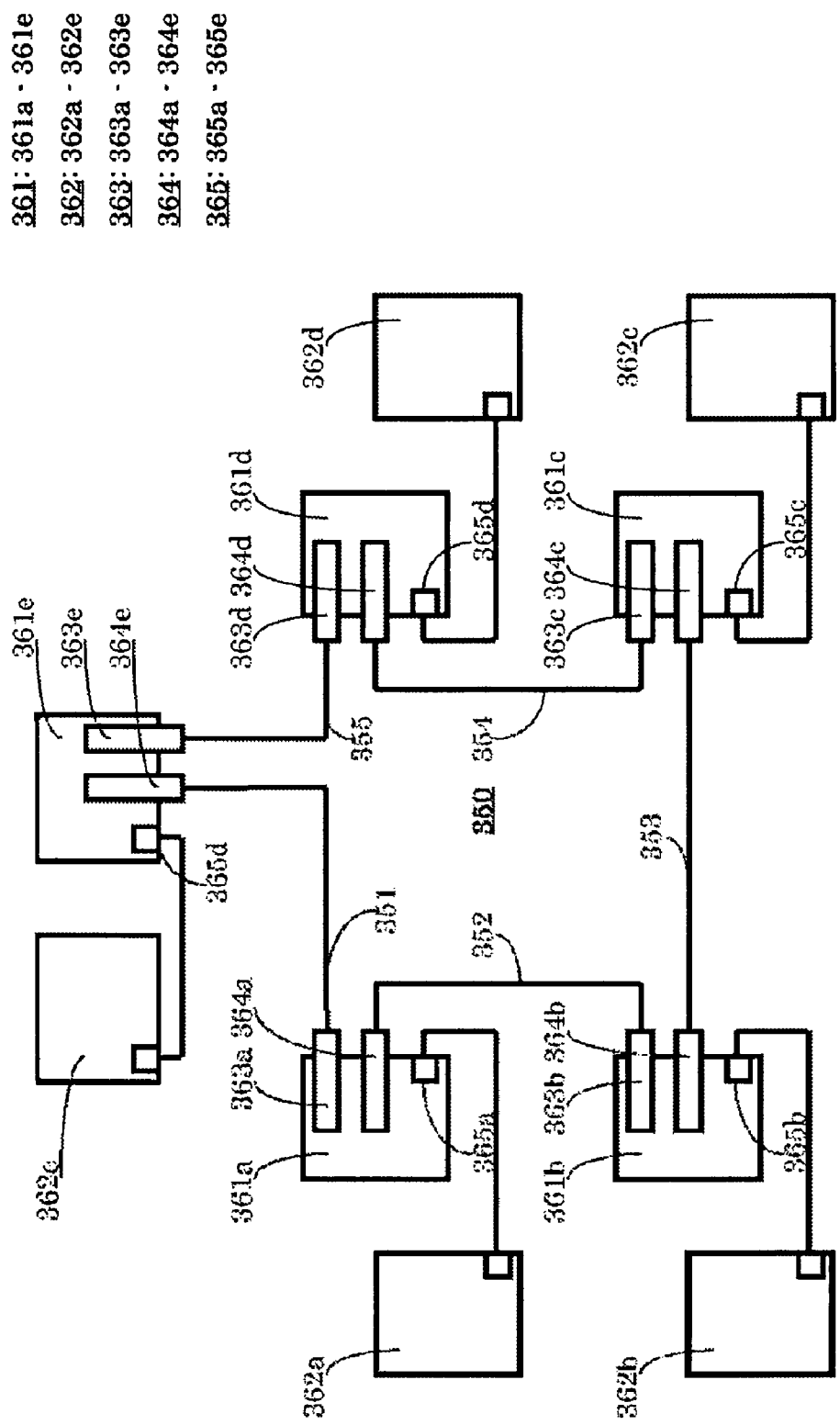
FIG. 50 is a schematic diagram showing the management signal transmission circuit extracted from FIG. 49.

FIG. 50 shows transmission mechanism of management signals. Three-port switch converter 361 comprising SFP optical transceivers 363 and 364 and SNMP management card 362 are disposed in each stations. A pair of the three-port switch card 361 and the SNMP management card 362 is disposed as same as a pair of the SNMP management card 212 and the three-port switch card 211 is disposed in the chassis 201 shown in FIG. 29. The three-port switch card 211 comprises a pluggable transceiver. On the other hand, the three-port switch card 361 comprises two SFP transceivers. The three-port switch card 361 comprises a RJ45 connector 365.

Between the three-port switch cards 361e and 361a, the transmission circuit 351 is formed. Between the three-port switch cards 361a and 361b, the transmission circuit 352 is formed. Between the three-port switch cards 361b and 361c, the transmission circuit 353 is formed. Between the three-port switch cards 361c and 361d, the transmission circuit 354 is formed. Between the three-port switch cards 361d and 361e, the transmission circuit 355 is formed. The three port switch cards 361a, 361b, 361c, 361d, and 361e are connected to the SNMP management cards 362a, 362b, 362c, 362d, and 362e, respectively.

The transmission circuit 350 is ring-shaped. Therefore routing has been made. Spanning tree protocol or VLAN (Virtual Local Area Network) is adopted for the routing mechanism. Two access routes from the core optical transport device are prioritized and if the main access route is failed another access route is chosen.

The transmission circuit 350 is based on "point-to-point" connection with neighbor stations. The transmission distance of each transmission circuit is shorter than OADM transmission. The management signal is transmitted in relatively low data rate such as 100 Mbit/s of First Ethernet, thus the transceiver sensitivity is relatively high. Transmission wavelengths for the management signals may be chosen from 1370 nn, 1390 nm, or 1410 nm. These wavelengths are belong to so-called a "water peak wavelength" in which silica based optical fiber has relatively high transmission loss. These wavelengths are difficult to apply main signal transmission, however, low data rate and short distance management signals may adopt these wavelengths.

Other wavelength rather than the "water peak wavelength" are preferably adopted for management signals if more wavelength girds are secured such as using DWDM grids.

The optical communication network shown in FIG. 8 may also adopt management signal transmission with the wavelengths, 1370 nn, 1390 nm, and 1410 nm.

The Eighteenth Embodiment

Figure 51:
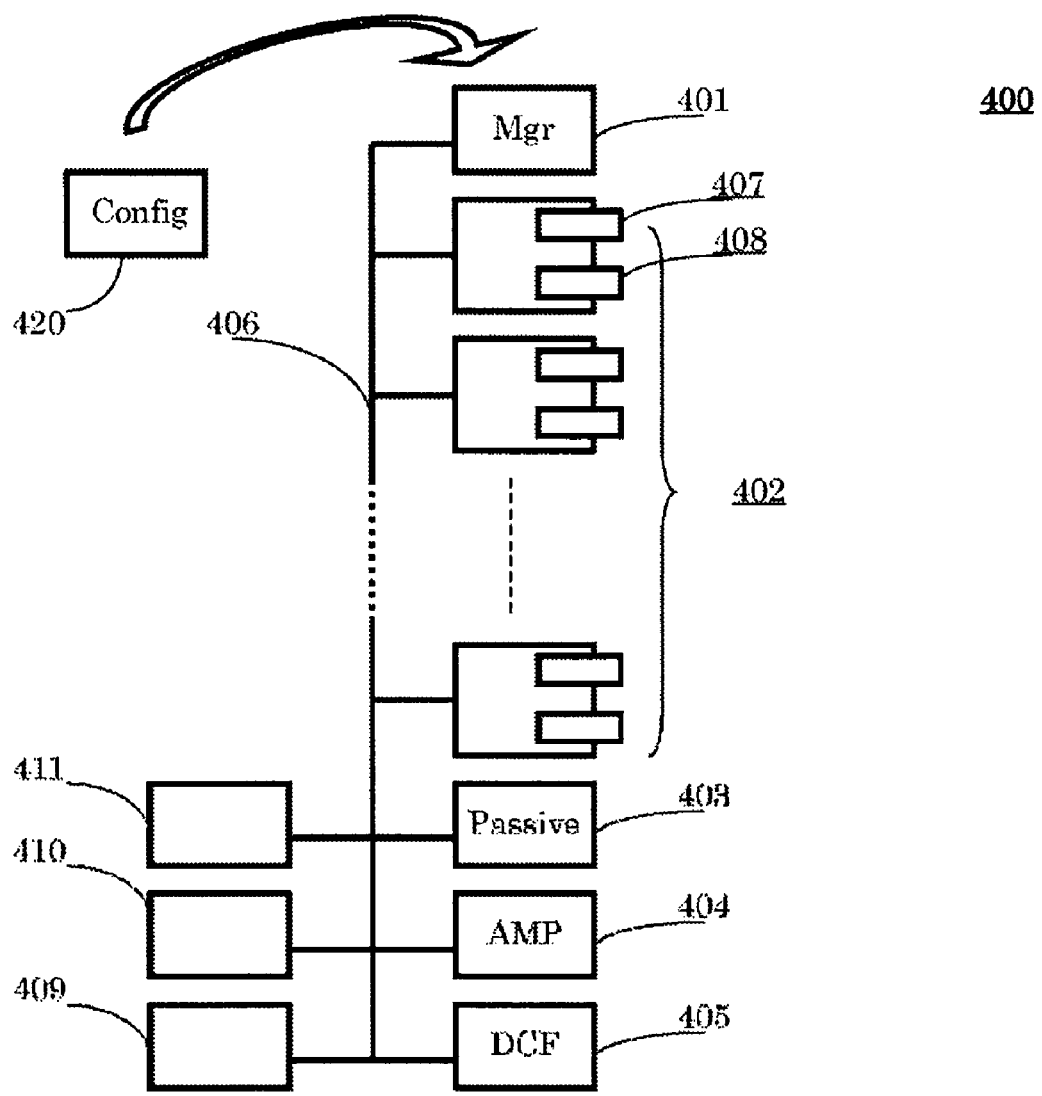
FIG. 51 is a schematic diagram of the 18th embodiment of the optical transport device 400.

FIG. 51 shows the eighteenth embodiment of present invention. Optical transport device 400 comprises a management card 401, converter cards 402, optical passive module 403, an optical amplifier module 404, a dispersion compensation fiber 405, a chassis identification module 408, a power supply module 410, a cooler fan module 411, and a bus 406. The converter card 402 comprises pluggable transceivers 407 and 408. The converter card 402 may further comprise ether switch function. The converter card comprises at least one pluggable transceiver.

A system configuration file 420 is installed in the management card 401. The management card 401 detect configuration of modules via the bus 406 and compare with the system configuration file 420. If the detected module configuration is different from the system configuration file 420, the management card 401 alarms and halts entire or part of the system.

The pluggable transceivers 407 and 408 comprise ROM (Read Only Memory) which stores vendor information, products' code of the transceiver, serial number of the transceiver, and encrypted authentication information. The management card 401 read this information through the bus 406 and compare with the system configuration file 420 to authenticate the pluggable transceivers.

If the information of the equipped pluggable transceivers are different from the system configuration file 420, the management card alarms to outside using SNMP Protocol. Accordingly, erroneous installations of the transceivers are avoided. In this situation, the management card 401 halts the pluggable transceivers. By using this function, other transceivers rather than approved transceivers are forbidden.

The management card 402 detects kinds and number of the converter cards 402 via the bus 406 and compare with the system configuration file 420. Accordingly, erroneous installations of the converter cards are avoided. The management card 401 alarms the erroneous converter cards. In a same manner, the passive module 403, the optical amplifier 404, the dispersion compensation fiber 405, power supply module 410, and the cooling fan module 411 are detected and compared with the system configuration file 420. Accordingly, erroneous usage of the modules is alarmed.

If the modules such as the converter cards are not authentic or the module configuration is different from the system configuration file, the correspondent modules are halted. Thus other modules rather than approved modules are forbidden to use.

The converter cards comprising the clock data recovery circuit need to be configured data rate. The data rate is also configured by the management card 401 according to the system configuration file 420.

By comparison with the system configuration file 420, the management card 401 can prevent a erroneous usage such as inappropriate data rate setting for the clock data recovery circuit, for example, 2.5 Gbit/s against the OC-3 (155 Mbit/s) transceiver.

The above method may be applied for the optical transport device shown in FIG. 37. In this case, by using the system configuration file 420, the management card 401 can identify if the equipped optical amplifier module adopts the gain flattening filter. Also the management card 401 can identify if the equipped transceivers wavelength difference is appropriate against the equipped optical amplifier module. These detailed configuration information is too complicated for system operators to understand everything. Thus predetermined system configuration file eliminate erroneous system setting.

Some transceivers comprise clock data recovery circuit inside. Some transceivers do not. By using the system configuration file erroneous installation of the transceivers are eliminated.

The system configuration file 420 is encrypted and activated by input of the specific password. Accordingly, circulation of the modules and pluggable transceivers are controlled. The management card 401 identifies the chassis identification module thus password can be provided for each chassis. Accordingly, copy of the system configuration file 420 is prevented.

The system configuration files are flexibly created. For example, one system configuration file allows only one configuration; on the other hand, another system configuration file allows multiple system configurations. Charge of the configuration file 420 is varied depending on type of configuration and number of kinds of configuration.

For another example, against the same hardware configuration such as converter cards and pluggable transceivers, one system configuration file allows only gigabit Ethernet data rate, on the other hand; another system configuration file allows multiple data rate such as OC-3/12/48 and gigabit Ethernet. Limited operation is charged lower price and multiple operation is charged higher price. The other method such as the allowed operations are changed by password is also available. According to this method license bound with passwords is sold to customers.

Optical transport device is operable after verification of combination of pluggable transceivers and modules. The optical transport device shown in the tenth embodiment has too many kinds of combinations to verify. Thus verified combinations are provided and other combinations are forbidden by the system configuration file 420. Onerous distribution of the system configuration files covers the cost of the system verification. Only approved pluggable transceivers are allowed to operate. Thus the free ride of the third vendor is eliminated.

A part or entire part of the system configuration file 420 may be provided by ROM (Read Only Memory). As shown in FIG. 52A, a memory card 421 contains a part or entire part of the system configuration file 420. The memory card is put on the management card 401. According to this architecture, the system configuration file 420 is provided bound with the memory card 421 so that illegal copy is easy to avoid.

As shown in FIG. 53B, a memory card 422 is put on the converter card 402. The memory card 422 contains a part of the system configuration file 420 relation with the converter card 402 such as pluggable transceivers. The memory card 422 is provided to a corresponding pluggable transceiver. Thus circulation of the pluggable transceivers is controlled by provision of the memory card.

The architecture shown in FIG. 52B is applicable not only for the pluggable transceivers, but also applicable for the optical passive module 403, the optical amplifier module 404, the dispersion compensation fiber module 405, and so on. This architecture controls the circulation of these modules.

Figure 53:
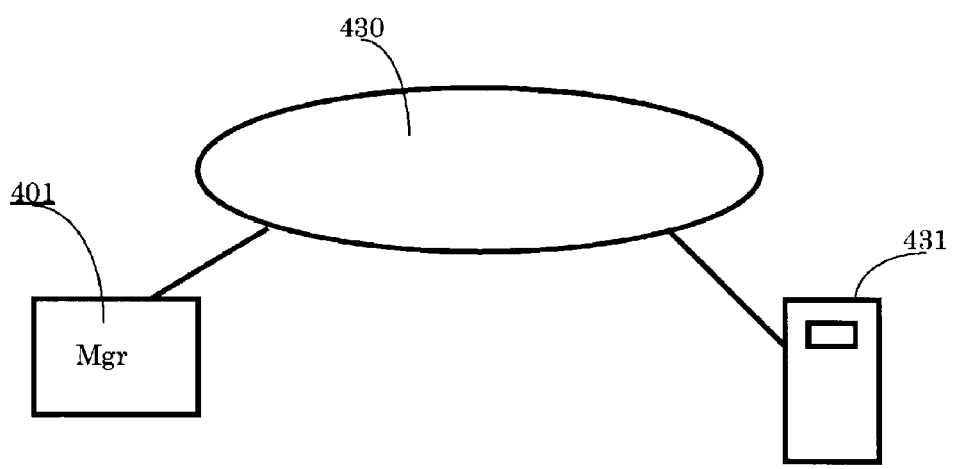
FIG. 53 is a schematic diagram showing an authentication mechanism using network.

FIG. 53 shows another method to control the circulation of pluggable transceivers and other modules by authentication through networks. The management card 401 is connected to an authentication server 431 through a network 430. A module identification code and a password are inputted to the management card 401. Then the management card 401 accesses to the authentication server 431 to verify the password. According to this method, illegal duplication of identification number is avoided. Thus the circulation of the modules such as pluggable transceivers and converter cards is controlled.

Figure 54:
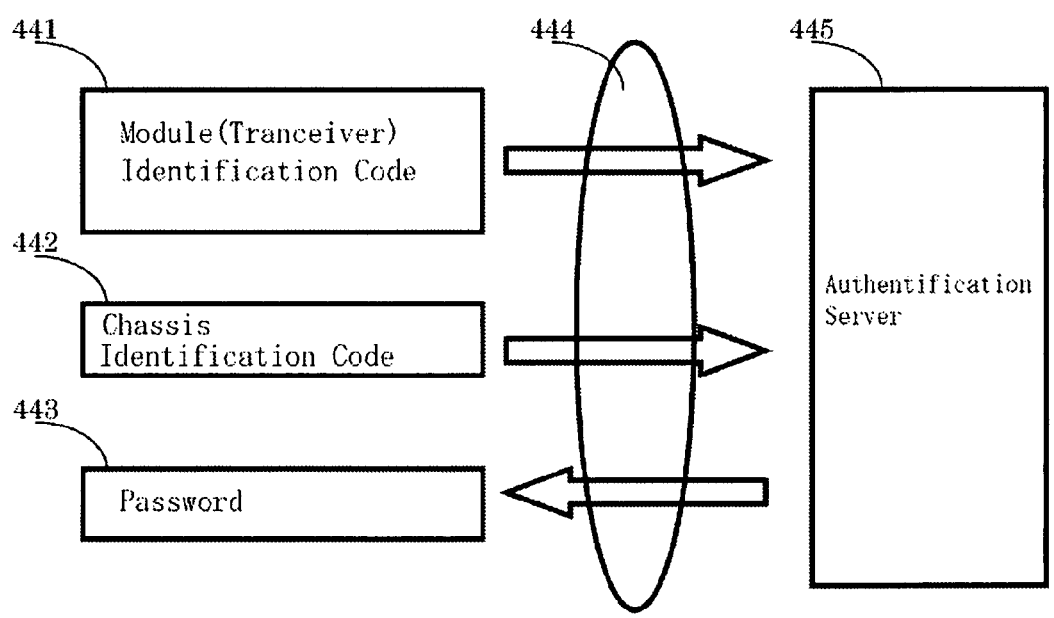
FIG. 54 is a schematic diagram showing another authentication mechanism using network.

FIG. 54 shows the other method to authenticate the modules such as transceivers and converter cards. According to this method, a password 443 is created from a module identification code 441 and a chassis identification code 442 by an authentication server 445. An access to the authentication server 445 is done through a network 444 such as internet. A user input the password provided by the authentication server to a management card to activate modules such as pluggable transceivers. At the same moment, the authentication server 445 registers modules and chassis, and charges fares. This method enables to track module circulation and detect illegal copies.

Figure 52:
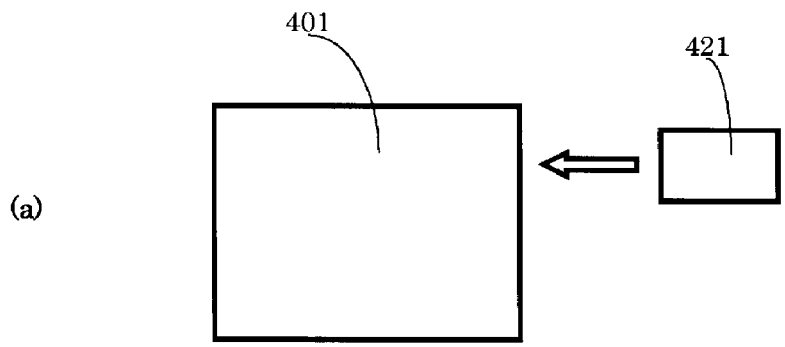
FIG. 52A is a schematic diagram showing the ROM (Read Only Memory) 421 to be mounted on management module 401.
FIG. 52B is a schematic diagram showing the ROM (Read Only Memory) 422 to be mounted on converter card 402.
Figure 52:
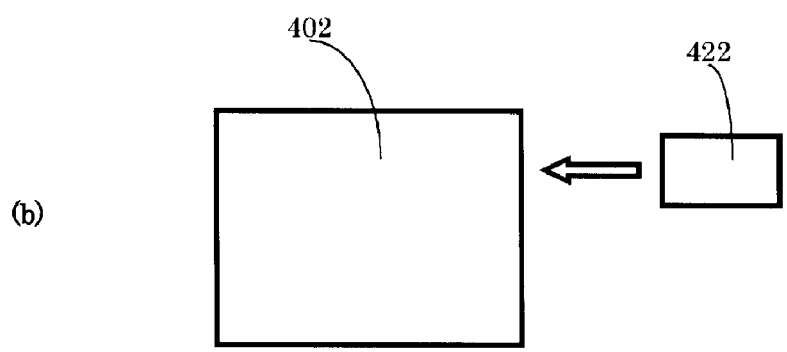

The methods shown in FIG. 52, 53, and 54 enables a business model to sell identification codes to module vendor and sell passwords user of optical transport device. This business model allows circulating verified modules and verified module combinations. This business model provides to supplier to collect the cost of verifications.

The Nineteenth Embodiment

Figure 55:
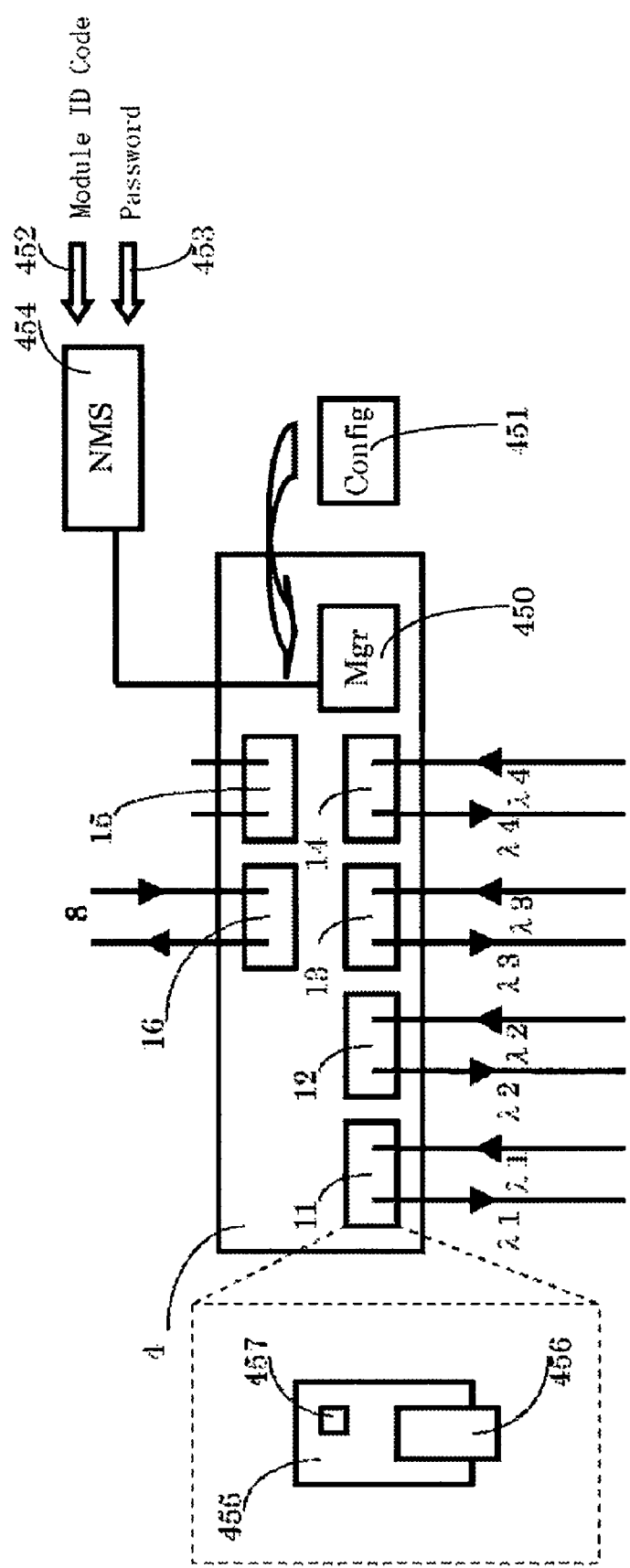
FIG. 55 is a schematic diagram showing the 19th embodiment of the authentication mechanism of pluggable transceivers.

FIG. 55 shows the nineteenth embodiment of present invention. As shown in FIG. 55, the authentication method described in the eighteenth embodiment is applied for switch or router. Description of present embodiment adopts same reference number for same configuration of the other embodiments. As shown in FIG. 3, the core-switch 4 comprises pluggable optical transceivers 11, 12, 13, and 14. Against these transceivers, the authentication method described in the eighteenth embodiment is applicable.

The core switch 4 comprises a management card 450 in which a system configuration file 451 is installed. The pluggable optical transceivers 11, 12, 13, and 14 comprise ROMs in which vendor information, parts number of the optical transceivers, identification information of each module, and encryption information are memorized. The core-switch 4 comprises bus which is not shown in FIG. 55. The management card 450 reads information from the pluggable optical transceivers via the bus and compares the system configuration file 451 to authenticate the pluggable optical transceivers.

The management card 450 is connected to a network control equipment 454 via a network. The network control equipment is a computer installed NMS (Network Management Software).

The signal transmission port 15 is interconnection port to a partner switch of the paired switches. The signal transmission port 16 is uplink port to the backbone network.

Figure 56:
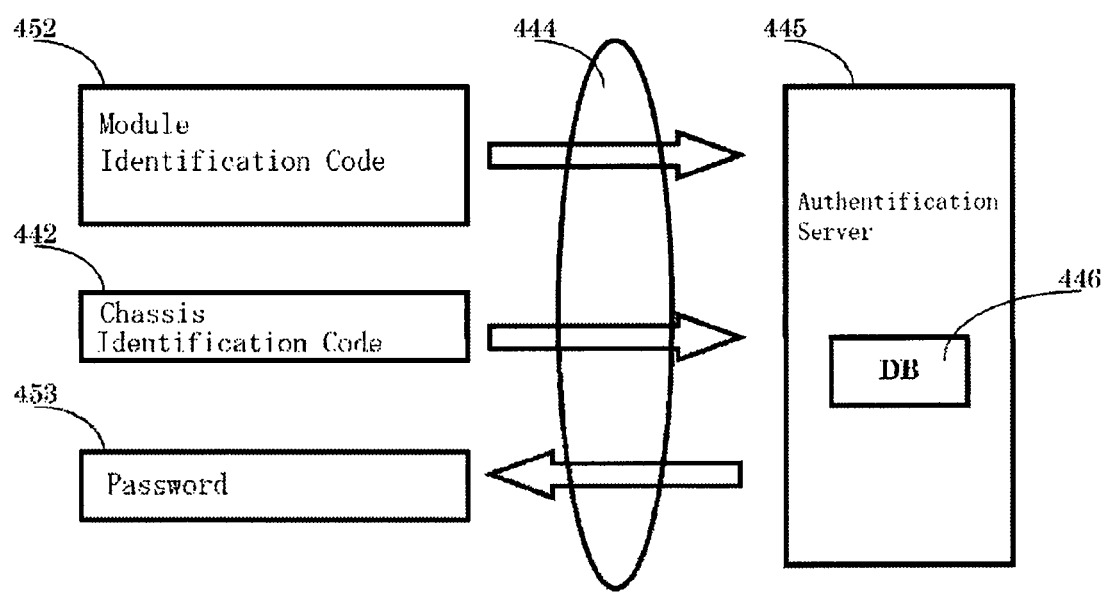
FIG. 56 is a schematic diagram showing the 19th embodiment of the authentication mechanism of a variety of modules.

FIG. 56 shows an authentication method of present embodiment. The authentication method is a modification of the authentication method shown in FIG. 54. The authentication server 445 creates password 453 from a module identification code 452 and the chassis identification code 442 and sends to user via the network 444. The module identification code 452 may be tagged any type of modules such as optical transceivers, converter cards, optical amplifiers, system configuration files and software components. The user who received the password 453 activates a target module by inputting the module identification code 452 and the password 453 to the network control equipment 454.

As shown in FIG. 55, the module identification code 452, the chassis identification code 442, and the password 453 are authenticated by the network control equipment 454. If authentication is successful, the network control equipment 454 sends activation command to each module through the management card 450.

An optical transceiver 456 is, for example, mounted on the card 455 at first time; authentication is requested to the network control equipment 454 via the management card 450. If the authentication is successful, the network control equipment 454 send command via the management card 450, an identification code of the optical transceiver is loaded onto non-volatile memory 457. After the authentication, during power-on sequence or reboot sequence, the identification code memorized in the non-volatile memory 457 is compared with the identification code of the optical transceiver 456. If the two identification codes correspond the optical transceiver 456 is enabled.

If the two identification codes are not matched, the converter card request to re-authenticate against the network control equipment 454 via the management card 450.

The above architecture in which the non-volatile memory 457 on the card 455 memorizes the module identification code provides fault tolerance. Even if the management card 450 or the network control equipment 454 failed, modules which are authenticated continue to work.

The authentication serer 445 comprises a database 446. The database 446 registers approved identification codes of chassis and modules. In another words, against unregistered chassis or modules, the password 453 shall not be issued.

Accordingly, a new business model to charge registration fee against module vendors is enabled. Thus free rider of third vendor is eliminated. Also circulation control of modules is enabled.

If some module vendor duplicates identification code, for example, plural requests containing the same identification code of optical transceiver with different chassis will be created. On the other hand, user may mount one optical transceiver onto different chassis. The authentication server may comprise authentication software which issues multiple passwords against one module. The number of multiple passwords should be limited such as 2 to 5 times.

The password may be inputted into the management card 401 shown in FIG. 51 or the management card 450 shown in FIG. 55. Otherwise password is inputted into a computer connected over a network to the management card 401 or 450.

A new business model that charges registration fee according to number of password is also available. If the number of passwords reaches to certain limit, additional password issue is denied until additional payment. The database 446 controls this transaction.

The authentication method shown in FIG. 56 is not limited by the configuration shown in FIG. 55. The authentication method shown in FIG. 56 is applicable other configurations such as the configuration shown in FIG. 51. The authentication method is applicable optical transport device, switches, routers, and so on.

The authentication methods shown in FIG. 54 or FIG. 56 have an advantage that the management card of optical transport device, switches, or routers is not necessary to connect networks such as internet. The communication equipments such as optical transport device, switches, or routers establish infrastructure of the communication networks. Therefore management network of the communication equipment is often isolated from public network such as internet. In this circumstance, the authentication method shown in FIG. 53 cannot be adopted. On the other hand, the authentication methods shown in FIG. 54 or 56 do not have such restriction.

The Twentieth Embodiment

Figure 57:
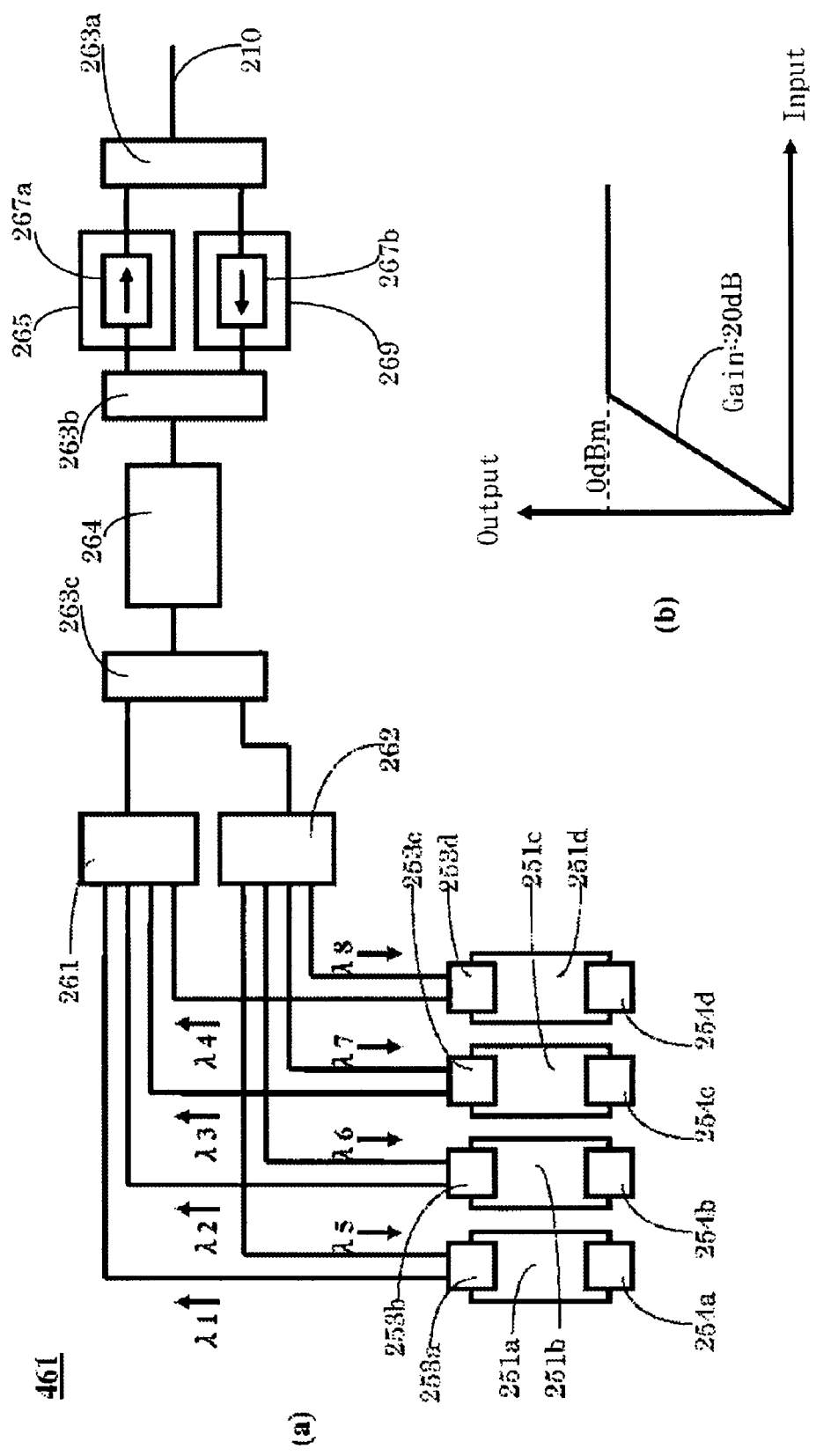
FIG. 57A is a schematic diagram showing the 20th embodiment of the optical transport device 461.
FIG. 57B is a graph showing input power versus output power of AGC with limiter mode in optical amplifier.

FIG. 57A shows the twentieth embodiment of present invention. An optical transport device 461 shown in FIG. 57A is a modification from the optical transport device shown in FIG. 37. For convenience, FIG. 57A adopts same reference numbers which are shown in FIG. 37 for same components.

Figure 45:
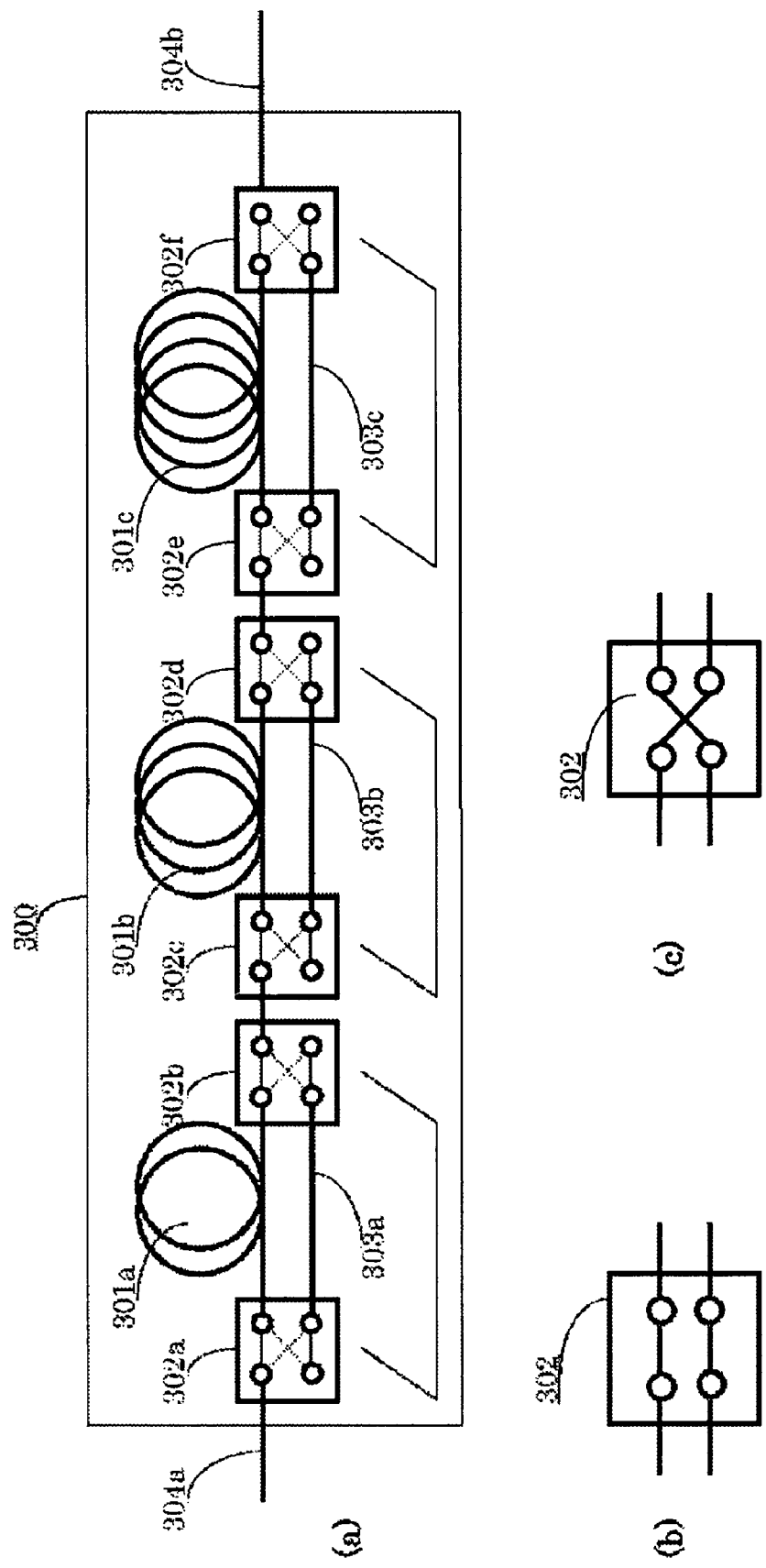
FIG. 45 is a schematic diagram showing dispersion compensation device 300.

Major difference from the configuration shown in FIG. 37 is that wavelength division multiplexers 263b and 263c are disposed and a dispersion compensation fiber 264 is disposed between the wavelength division multiplexers 263b and 263c. The wavelength division multiplexer 263 shown in FIG. 37 is re-numbered as a wavelength division multiplexer 263a. As the dispersion compensation fiber 264, variable dispersion compensation mean shown in FIG. 45 is applicable.

Optical signals transmitted from remote optical transceivers 253a, 253b, 253c, and 253d are aggregated by the wavelength division multiplexer 261, and outputted to the remote optical fiber 210 via the wavelength division multiplexer 263c, the dispersion compensation fiber 264, the wavelength division multiplexer 263b, the booster type optical amplifier 265, and the wavelength division multiplexer 263a. The optical signals transmitted from remote site are inputted from the remote optical fiber 210 and send to the optical transceivers 253a, 253b, 253c, and 253d via the wavelength division multiplexer 263a, the optical preamplifier 269, the wavelength division multiplexer 263b, the dispersion compensation fiber 264, the wavelength division multiplexer 263c, and the wavelength division multiplexer 262.

The remote optical transceivers 253a, 253b, 253c, and 253d are XFP transceivers comprising a PIN photodiode receiver. The PIN photodiode receiver has lower sensitivity and lower cost than an APD (Avalanche Photo Diode) receiver. A data rate of XFP transceivers is 10 Gbit/s. The converter cards 251a, 251b, 251c, and 251d are 2R type converter card.

Due to the present embodiment comprises the optical preamplifier 268, same or higher sensitivity than APD based optical transceivers is obtained despite PIN based optical transceivers are disposed. The sensitivity of the optical transport device comprising an optical preamplifier is determined by the noise characteristics of the optical preamplifier thus cost effective PIN receivers are preferred. According to the present embodiment, the optical preamplifier 269 pre-amplifies the optical signals so that the losses of the wavelength division multiplexers 263b, 263c, 262, and the dispersion compensation fiber 264 are compensated.

The booster optical amplifier 265 and the optical preamplifier 269 comprise single stage EDFA amplifier module 267a and 267b, respectively. The booster optical amplifier 265 and the optical preamplifier 269 may comprise two or more stages EDFA amplifier modules and/or may comprise gain flattening filters Optical signals transmitted from the optical transport device 461 are dispersion compensated in advance by the dispersion compensation fiber 264, then amplified by the booster optical amplifier 265, finally sent to the remote site optical transport device 462 via remote optical fiber 210. On the other hand, transmitted optical signals from the remote site optical transport device 462 are amplified by the optical preamplifier 269, then dispersion compensated by the dispersion compensation fiber 264.

The booster optical amplifier 265 is operated under AGC (Auto Gain Control) mode. According to the AGG mode, ratio of input power and output power of the optical amplifier is maintained so that even if inputted channel number varied output power of each channel does not change. This is advantageous feature.

First of all, let us consider only one converter card 251a is installed on the optical transport device 461. The output power of the optical transceiver 253a is 0 dB. The wavelength of the optical signal is λ1. The optical signal of the wavelength λ1 is attenuated to −10 dBm after passage through the wavelength the division multiplexers 261, 263c, dispersion compensation fiber 264, and the division multiplexer 263b. In this circumstance, the optical signal of wavelength λ1 is +10 dBm if the booster optical amplifier 265 is set at gain of 20 dB.

Second of all, let us consider another converter card 252a is installed onto the optical transport device 461 additionally. The output power of the optical transceiver 253b is also 0 dB. The wavelength of the optical signal is λ2. The optical signal of the wavelength λ2 is attenuated to −10 dBm after passage through the wavelength the division multiplexers 261, 263c, dispersion compensation fiber 264, and the division multiplexer 263b. In this circumstance, the optical signal of wavelength λ2 is +10 dBm if the booster optical amplifier 265 is set at gain of 20 dB.

Accordingly, by setting the booster optical amplifier 265 under AGC mode, the output power of each channel is maintained even if the number of channel varies.

The optical preamplifier 265 is operated under APC (Auto Power Control) mode. The APC mode maintains output power of the optical amplifier so that overloads of the receivers of optical transceivers are avoided. If the optical preamplifier 269 is set at 0 dBm output power, input power of the receiver never exceed 0 dBm at any condition. The setting power of the optical preamplifier 269 should be considered with losses of the wavelength division multiplexer 263b, the dispersion compensation fiber 264, the wavelength division multiplexers 263c and 261. If these passive components provide 10 dB insertion loss, the setting power of the optical preamplifier should be 10 dBm in order to avoid the receivers receive less than 0 dBm.

The optical preamplifier 265 is also operable under AGC (Auto Gain Control) with limiter mode. The AGC with limiter mode works as AGC until predetermined output power. FIG. 57B shows characteristics of the AGC with limiter mode. If input power is small enough, output power is proportional to input power. Ratio of the output power versus input power, that is gain, is such as 20 dB. If the output power reaches to certain value such as 0 dBm, then the output power no longer increases. The AGC with limiter mode is realized by operating low saturation power optical amplifier under AGC mode. Alternatively, an AGC mode optical amplifier comprising optical attenuating mean at output port is applied.

The booster optical amplifier 265 and the optical preamplifier 269 comprise a surge control mechanism. The surge control mechanism shut down pump right source of the optical amplifier if input power of the optical amplifier is below predetermined value. If there is no optical signal input, the EDFA (Erbium Doped Fiber Amplifier) accumulates pump power in the Erbium doped fiber. As a result, a giant optical pulse is generated against small input optical pulse and the giant optical pulse may damage a receiver of an optical transceiver. The surge control mechanism prevents this malfunction.

Figure 58:
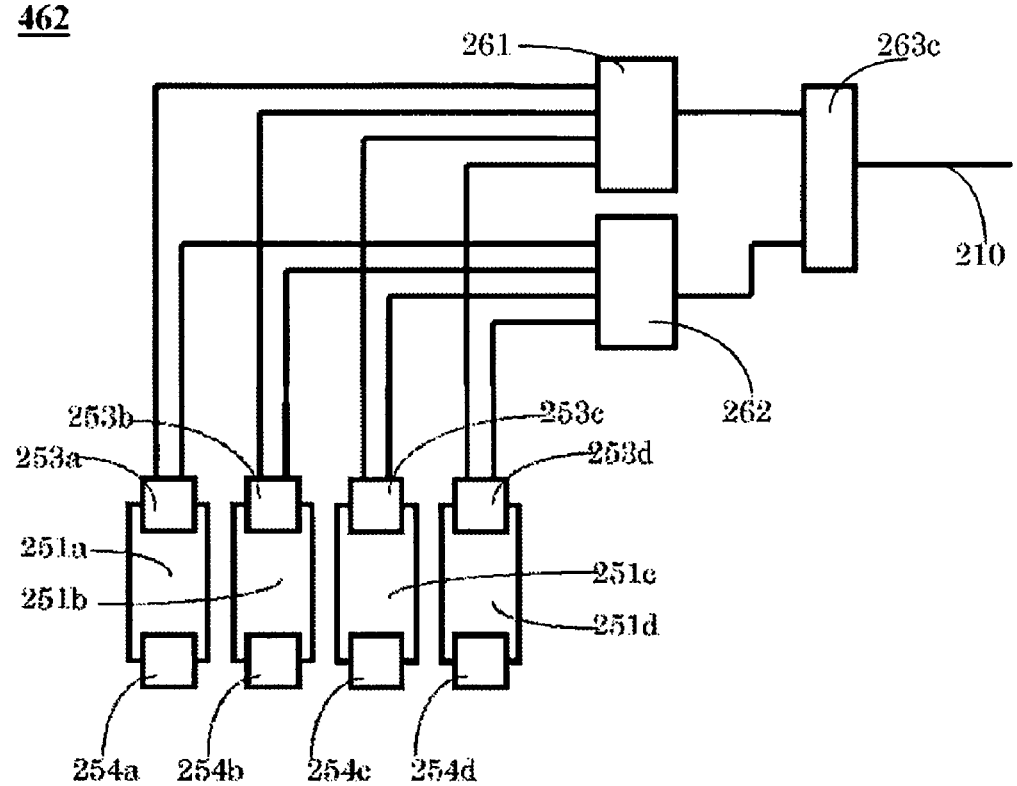
FIG. 58 is a schematic diagram showing the optical transport device 462 which is a counter partner of the optical transport device 461.
Figure 59:
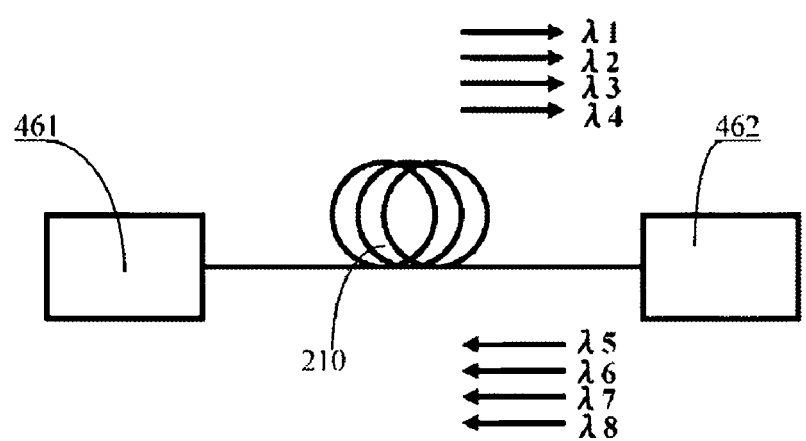
FIG. 59 is a schematic diagram showing connection between optical transport devices 461 and 462.

FIG. 58 shows optical transport device 462 which is a counter partner of the optical transport device 461. FIG. 59 shows optical transmission system in which the optical transport device 461 and 462 are connected by the remote optical fiber 210.

As shown in FIG. 58, the optical transport device 462 has a configuration in which the dispersion compensation fiber 264, the wavelength division multiplexer 265, the booster optical amplifier 265, the optical preamplifier 269, and the wavelength division multiplexer 263a are removed from the configuration of the optical transport device 461.

The remote optical fiber 210 produces the almost same dispersion for upstream and downstream of optical signals. Thus the dispersion compensation fiber 264 can compensate the dispersion both of the upstream and the downstream. By utilizing this nature, the dispersion compensation fiber is disposed in only the optical transport device 461. Optical signals from the optical transport device 461 to the optical transport device 462 are compensated in advance. On the other hand, optical signals from the optical transport device 462 to the optical transport device 461 are compensated after transmission of the remote optical fiber 210.

The optical transport device 461 comprises the booster optical amplifier 265 and the optical preamplifier 269. Oppositely, the optical transport device 462 does not comprise any optical amplifier. Despite this asymmetric configuration, upstream optical signals and downstream optical signals have almost same loss budget. The reason of this is described by FIG. 60A.

Figure 60:
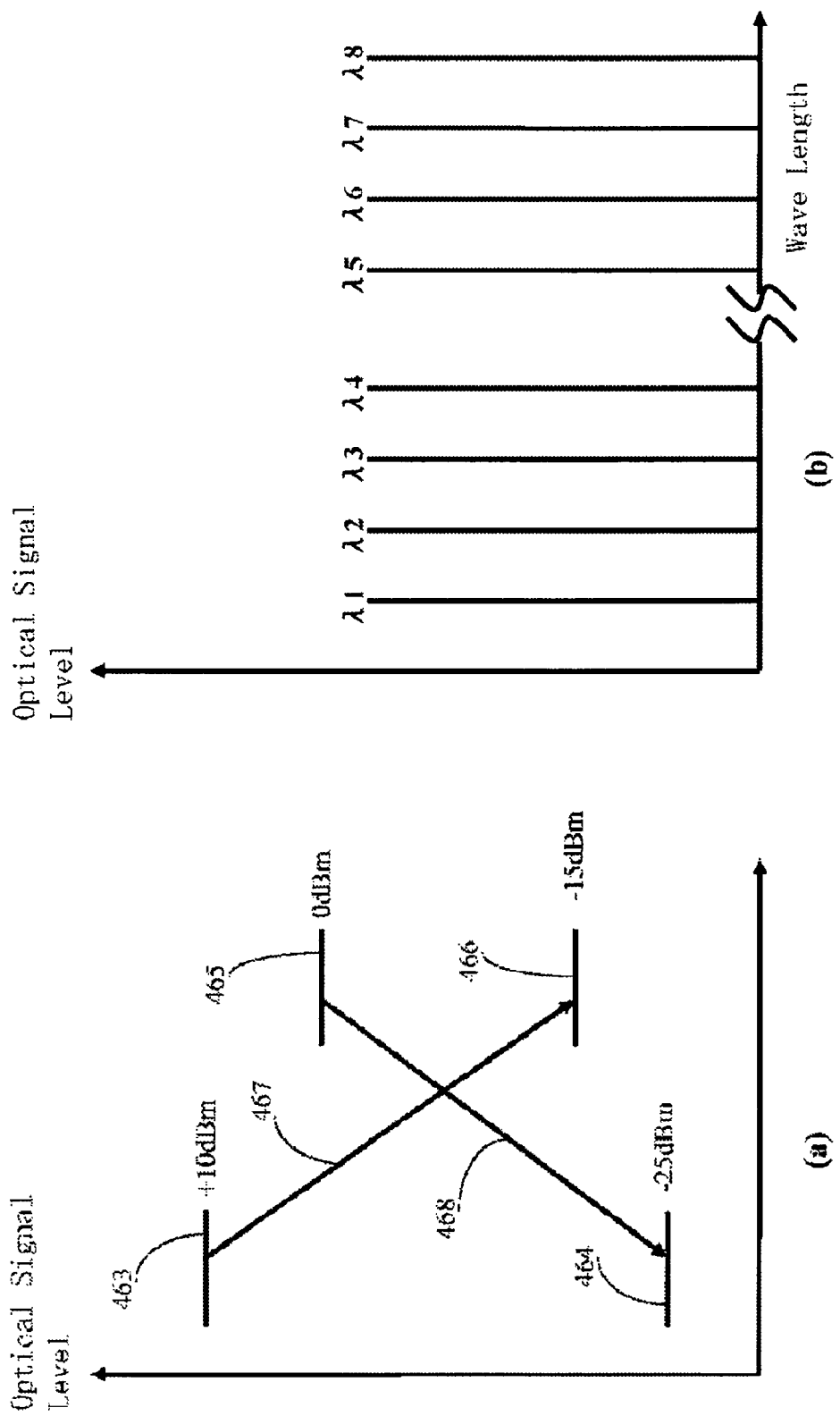
FIG. 60A is a level diagram at FIG. 59.
FIG. 60B is a schematic diagram showing wavelength alignment at FIG. 59.

In FIG. 60A, a reference number 463 represents an optical output signal level of each channel from the optical transport device 461. The output signal level 463 is 10 dBm (10 mW) due to amplification of the booster amplifier 265. A reference number 464 represents receiver sensitivity of the optical transport device 461. Due to amplification of the optical preamplifier, the receiver sensitivity 464 is −25 dBm (3 μW). A reference number 465 represents optical output signal level of each channel from the optical transport device 462. The value of the optical output signal level 465 is −15 dBm (30 μW).

As a result, a loss budget 467 from the optical transport device 461 to the optical transport device 462 is around 25 dB. A loss budget 468 from the optical transport device 462 to the optical transport device 461 is also around 25 dB. The optical transport device 461 has high transmission power and high receiving sensitivity. The optical transport device 472 has low transmission power and low receiving sensitivity. However, the combination of these two transport devices provide almost equal loss budgets for both of upstream signals and downstream signals.

FIG. 60B shows the relation between the wavelengths from λ1, λ2, λ3, λ4, λ5, λ6, λ7, and λ8. As shown in FIG. 59, the wavelengths λ1, λ2, λ3, and λ4 are used as optical signals transmitted from the optical transport device 461 to the optical transport device 462. The wavelengths λ5, λ6, λ7, and λ8 are used as optical signals transmitted from the optical transport device 462 to the optical transport device 461.

Figure 61:
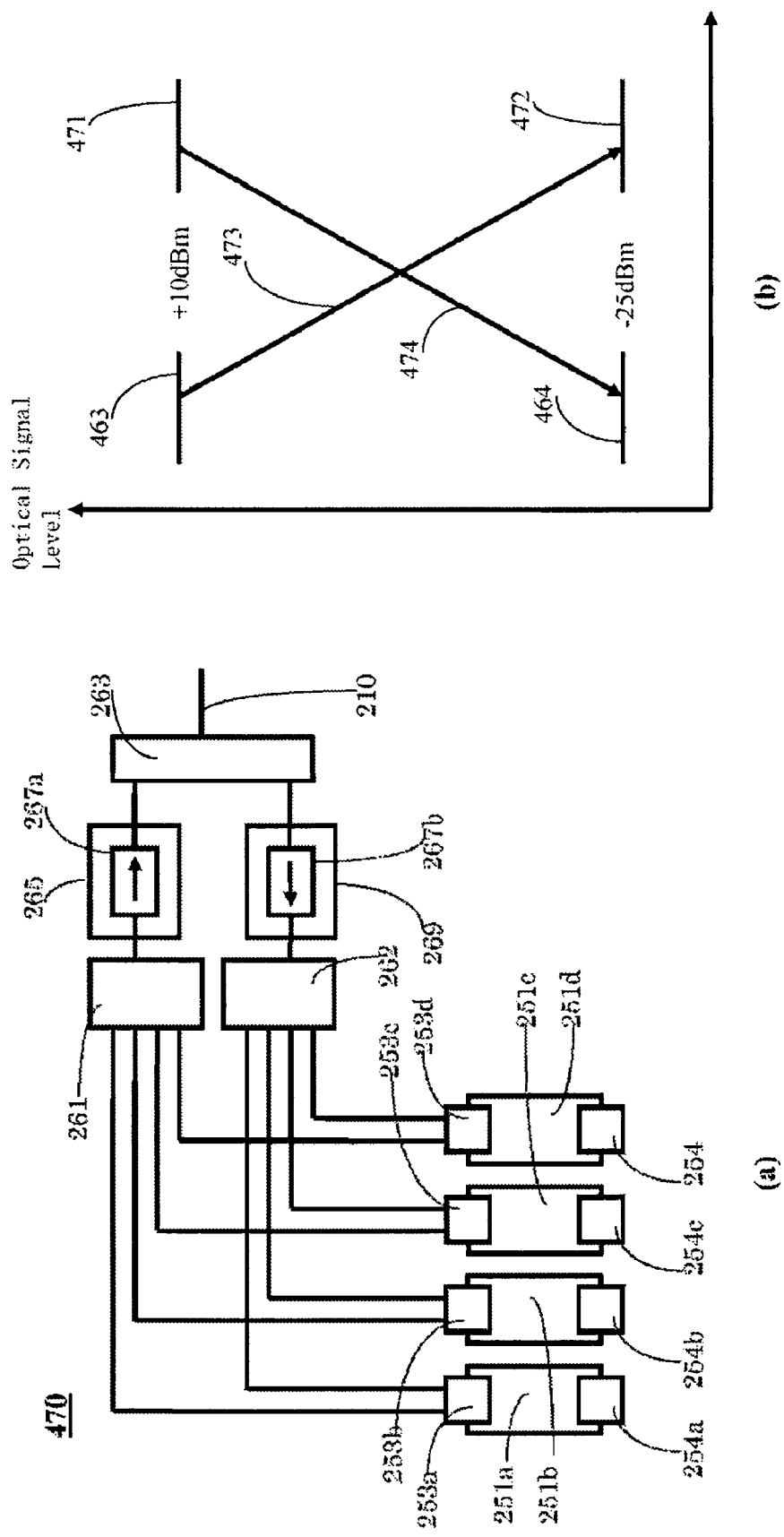
FIG. 61A is a block diagram of the optical transport device 470.
FIG. 61B is a level diagram at FIG. 61A.

FIG. 61A shows block diagram of optical transport device 470 which is applied instead of the optical transport device 462. The optical transport device 470 comprises the booster optical amplifier 375 and the optical preamplifier 269. FIG. 61B shows optical signal level diagram if the optical transport device 470 is used instead of the optical transport device 472 in the configuration shown in FIG. 59.

A reference number 471 represents an optical output signal level of each channel from the optical transport device 470. The value of the optical output signal level 471 is 10 dBm (10 mW). A reference number 472 represents a receiving sensitivity of the optical transport device 470. The value of the receiving sensitivity 472 is −25 dBm (3 μW).

As a result, a loss budget 473 from the optical transport device 461 from the optical transport device 462 is around 35 dB. A loss budget 474 from the optical transport device 462 from the optical transport device 461 is also around 35 dB.

Figure 72:
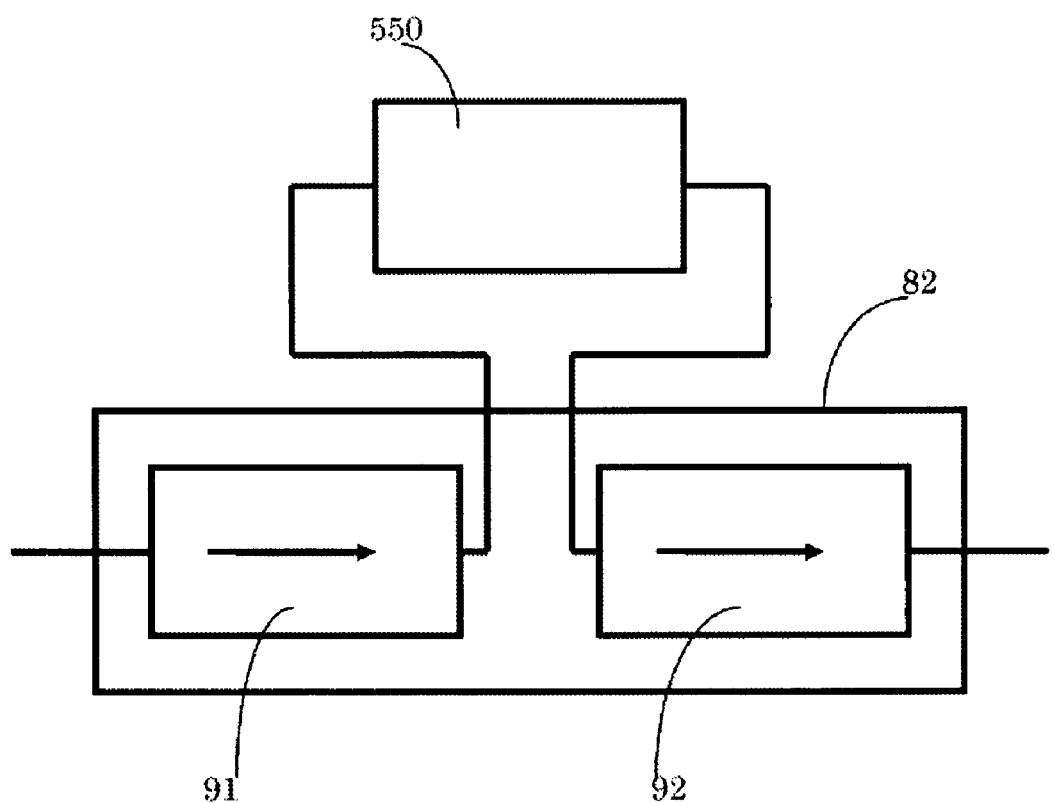
FIG. 72 is a schematic diagram showing the two-stage optical amplifier 82 which comprise the dispersion compensation device 550.

FIG. 72 shows block diagram of the optical transport device 480 which is used instead of the optical transport device 461. Between the dispersion compensation fiber 264 and the wavelength division multiplexer 273b, a gain flattening filter 268 is disposed. The gain flattening filter 268 may be disposed between the dispersion compensation fiber 264 and the wavelength division multiplexer 263c.

As described using FIG. 37, the booster optical amplifier is flattened gain versus wavelength by disposing the gain flattening filter at input port of EDFA module in order to prevent output power reduction. The optical preamplifier is flattened gain versus wavelength by disposing the gain flattening filter at output port of EDFA module in order to prevent receiving sensitivity reduction. According to FIG. 62, one gain flattening filter 268 flatten gain versus wavelength for both of the boost optical amplifier 265 comprising single EDFA module 267a and the optical preamplifier comprising single EDFA module 267b. In addition, both of output power reduction of the boost amplifier and receiving sensitivity reduction of the optical preamplifier are prevented.

Figure 62:
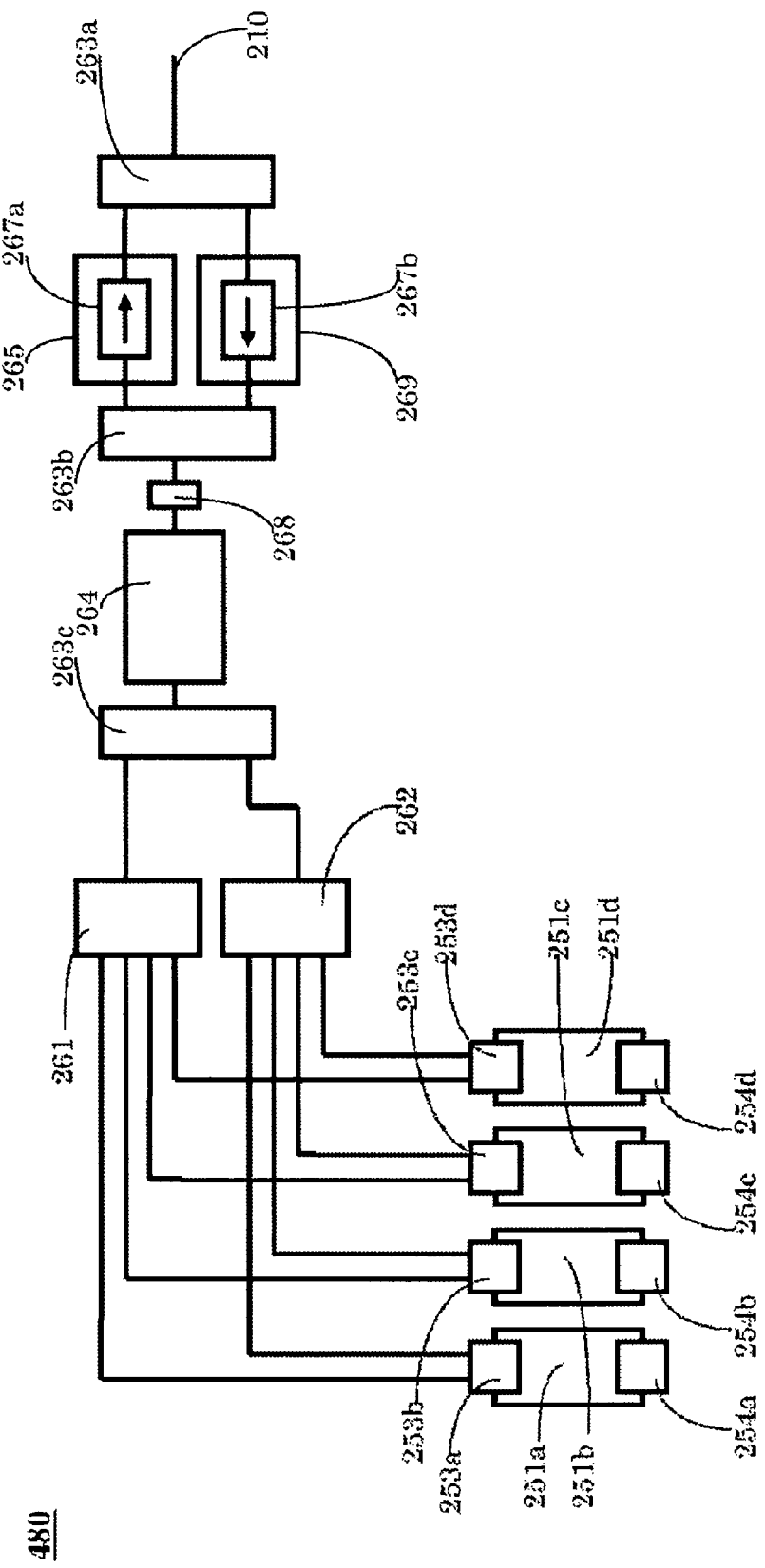
FIG. 62 is a block diagram of the optical transport device 480.

The configuration shown in FIG. 62 is suited for implementation in which many wavelengths are adopted or wavelength grid space is wider. The configuration in which the dispersion compensation fiber 264 is eliminated from the configuration shown in FIG. 62 is applicable as a substitute for the optical transport device 470 shown in FIG. 71.

Figure 63:
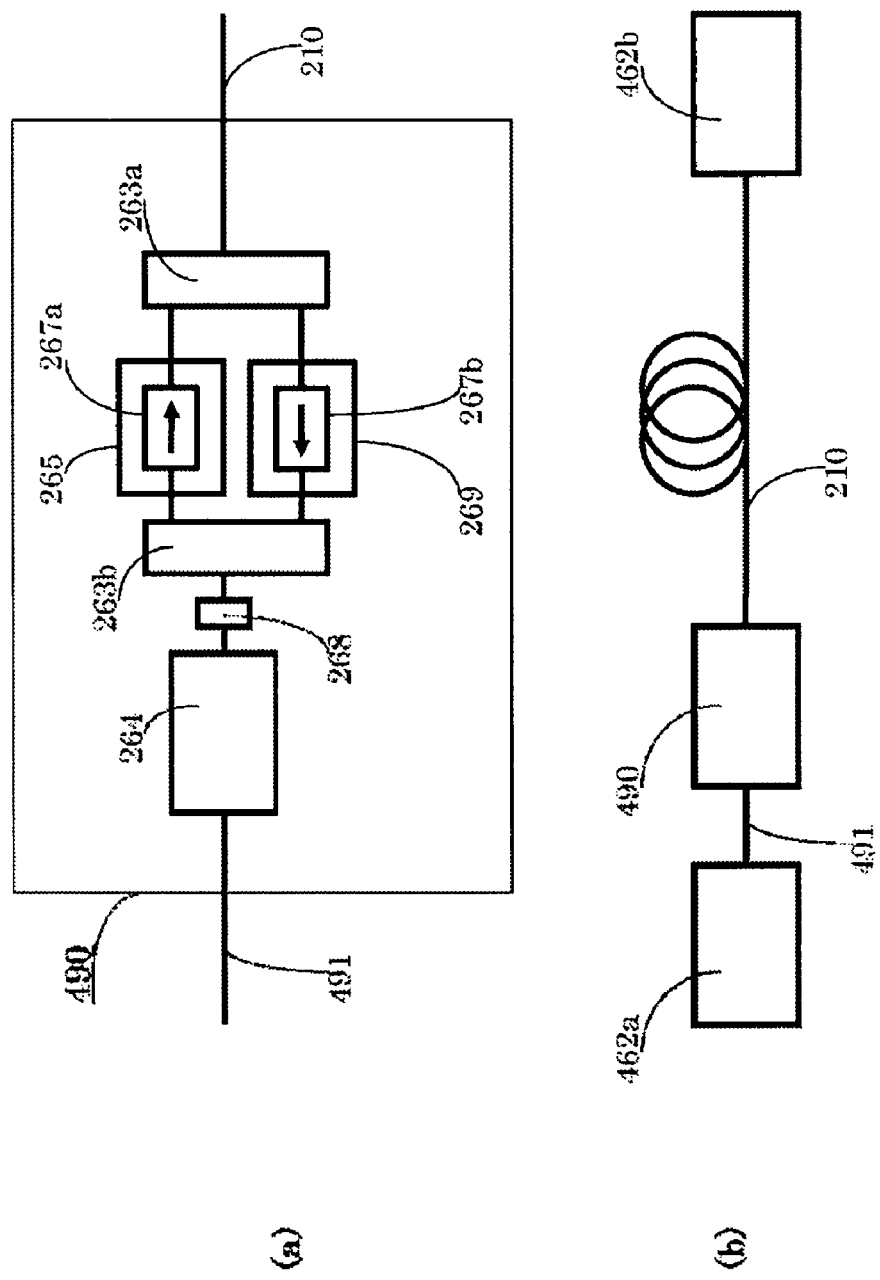
FIG. 63A is a block diagram of the extender unit 490.
FIG. 63B is a schematic diagram showing connection among the extender unit 490, the optical transport device 462a and 462b.

FIG. 63A shows block diagram of an extender unit 490. The extender unit 490 is used, as shown in FIG. 63B, as an adaptor module of the optical transport device 462a. A port 491 of the extender unit 490 is connected to the optical transport device 462a. The extender unit 490 and the optical transport device 462b are connected via the remote optical fiber 210.

The extender unit 490 has a configuration which extracts the wavelength division multiplexer 273a, the booster optical amplifier 275, the optical preamplifier 378, the wavelength division multiplexer 263b, the gain flattening filter 268, the dispersion compensation fiber 264, and the wavelength division multiplexer 263c from the configuration of the optical transport device 480. A configuration in which the extender unit 490 is added to the optical transport device 462 is equivalent to the configuration of the optical transport device 480.

If the distance of the remote optical fiber 210 is shorter, the optical transport device 462a and 462b are applicable. If the distance of the remote optical fiber 210 is longer, the extender unit 490 is added to the optical transport device 462a to enhance transmission distance. If the distance of the remote optical fiber 210 is much longer, another extender unit 490 is added to the optical transport device 462b to realize further enhancement of transmission distance. Accordingly, against a variety of transmission distances, minimum cost system is applied keeping minimum kinds of the transport devices.

It is possible to omit the gain flattening filter 268, if number of wavelengths is small enough or wavelength grid space is narrow enough. In this configuration, the dispersion compensation fiber 264 is shared by both of the upstream optical signals and downstream optical signals so that deployment cost is reduced. It is possible to omit the dispersion compensation fiber 264, if the total chromatic dispersion of the remote optical fiber 210 is small enough. In this configuration, the gain flattening filter 268 is shared by both of the upstream optical signals and downstream optical signals so that deployment cost is reduced. It is possible to omit the booster optical amplifier 265 and/or the optical preamplifier 269 if the loss of the remote optical fiber 210 is small enough. In this configuration, the dispersion compensation 264 is shared by both of the upstream optical signals and downstream optical signals so that deployment cost is reduced.

Figure 64:
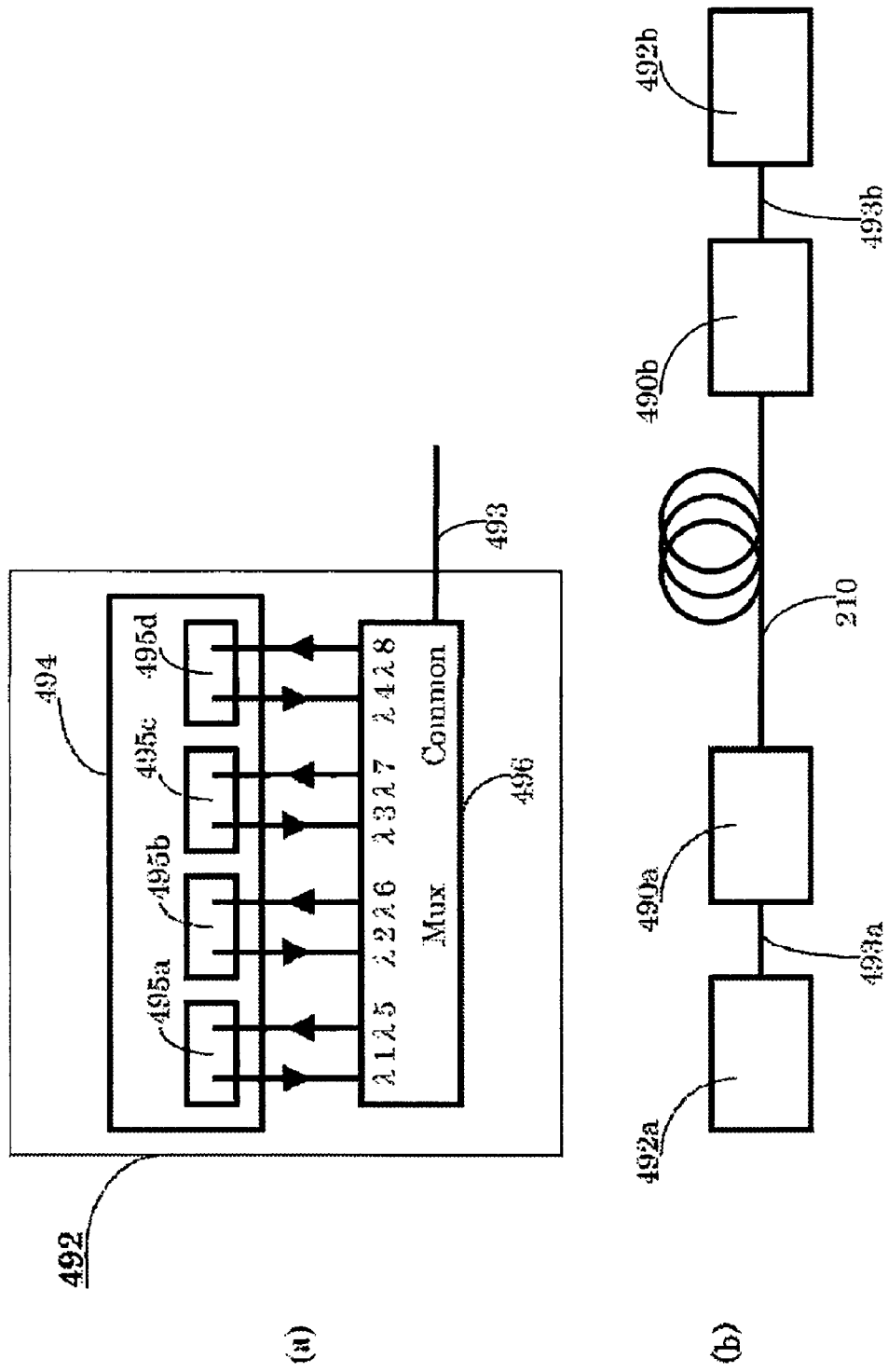
FIG. 64A is schematic diagram showing connection between the switch 494 and the wavelength division multiplexer 496.
FIG. 64B is a schematic diagram showing connection among the units 492a, 492b, the extenders 490a, and 490b.

As shown in FIG. 64A and FIG. 64B, the extender unit 490 is possible added to a unit 492 in which a switch 494 comprising pluggable optical transceivers 495a, 495b, 495c, 495d, and a wavelength division multiplexer 496. As shown in FIG. 64A, the pluggable optical transceivers 495a, 495b, 495c, and 495d transmit the wavelengths λ1, λ3, λ5, and λ7, respectively. A common port 493 of the wavelength division multiplexer 496 is connected to the extender 490. As shown in FIG. 64B, units 492a and 492b are connected to extenders 490a and 490b via the remote optical fiber 210, respectively. In FIG. 64B, two extender units 490 are disposed. It is also possible to dispose one extender unit is disposed as same manner shown in FIG. 63B.

Figure 65:
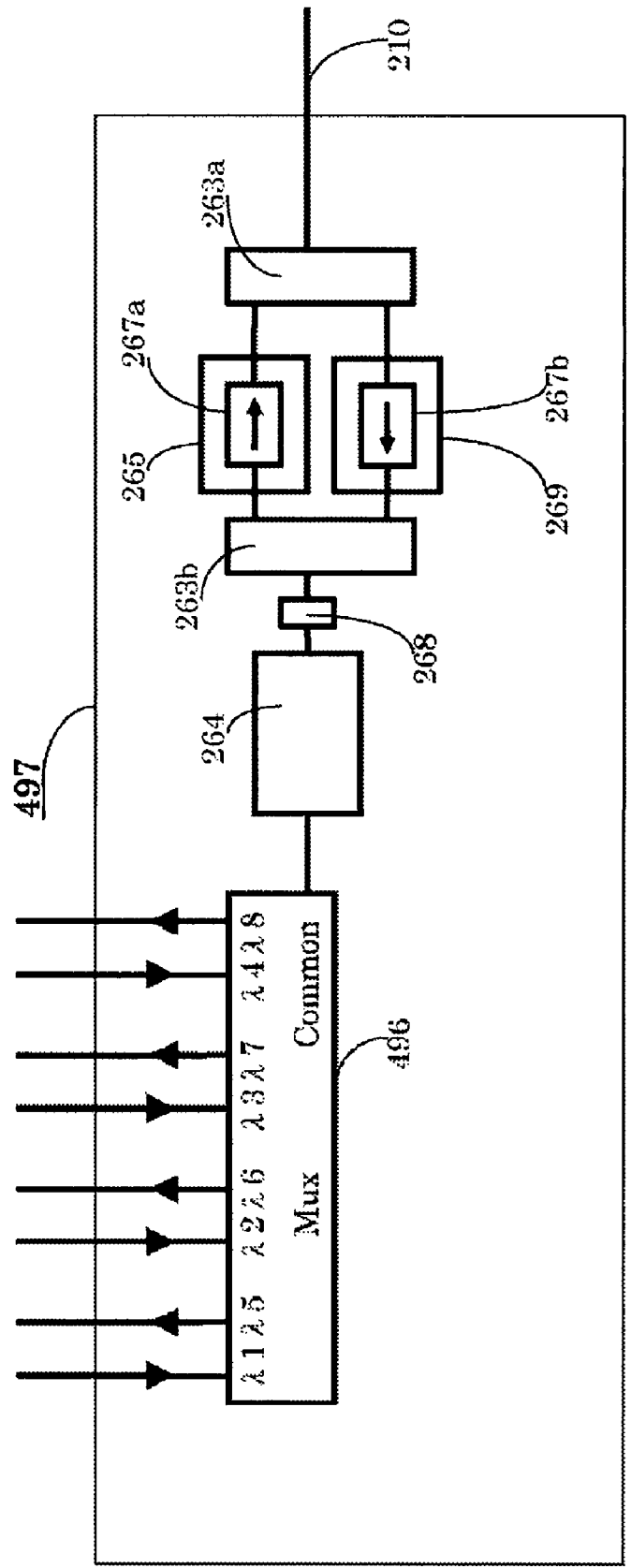
FIG. 65 is a block diagram of the extender unit 497.

Another configuration in which an extender unit 490 comprises the wavelength division multiplexer 496. FIG. 65 shows the extender unit 497 comprising the wavelength division multiplexer 496. The extender unit 490 and 497 may comprise three port switch converter card 361 and SNMP management card 362 as shown in FIG. 50 in order to add an "In-line management" function.

The Twenty First Embodiment

Figure 66:
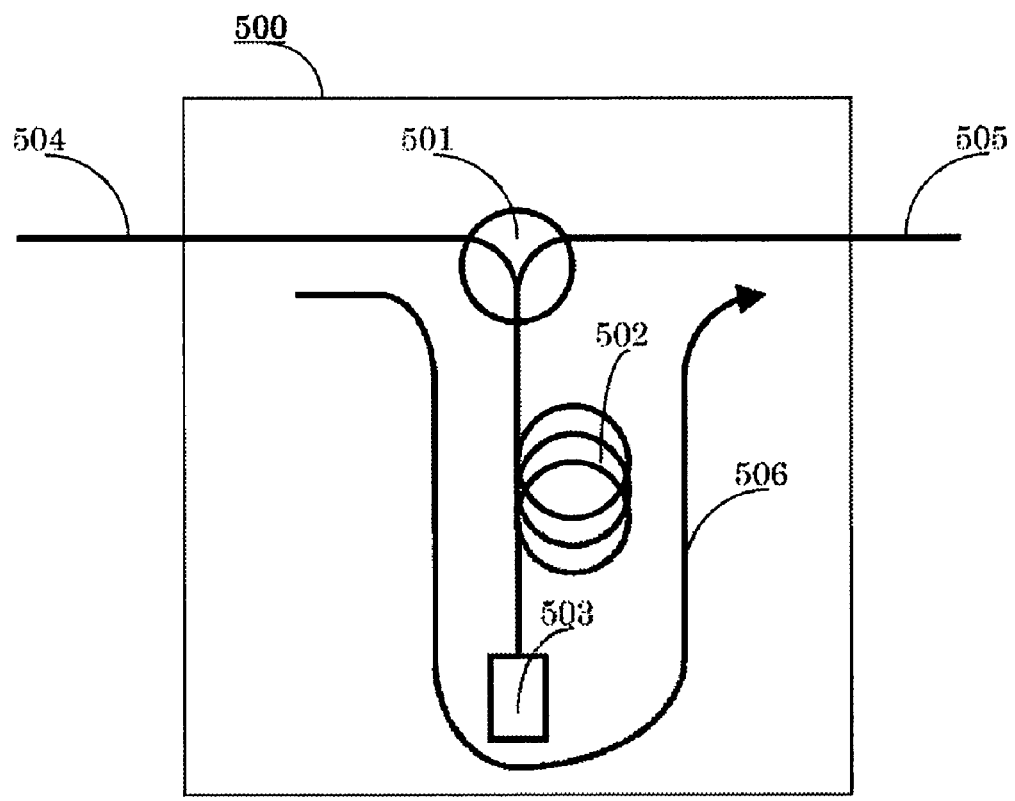
FIG. 66 is a schematic diagram showing twenty first embodiment of dispersion compensation device 500.

FIG. 66 shows the twenty first embodiment of present invention. A dispersion compensation device 500 comprises an optical circulator 501, a dispersion compensation fiber 502, and reflector mean 503. An optical signal 506 inputted from a port 504 of the dispersion compensation device 500 is transmitted through the optical circulator 501, the dispersion compensation fiber 502, then reflected by the reflector mean 503. The reflected optical signal 506 is transmitted again through the dispersion compensation fiber 502 and the optical circulator 501, and then outputted to another port 504. The optical signal 506 goes and return through the dispersion compensation fiber 502, as a result, value of the dispersion compensation is doubled. In other words, a length of dispersion fiber against required compensation is reduced to half.

The length of the dispersion compensation fiber is typically several kilo meters or sometimes over ten kilo meters. Therefore reduction of the dispersion compensation fiber length is valuable for cost reduction and miniaturization of the device. Cost of the dispersion fiber is proportional to the dispersion compensation fiber length. The size of the device is also proportional to the dispersion compensation fiber length.

Figure 67:
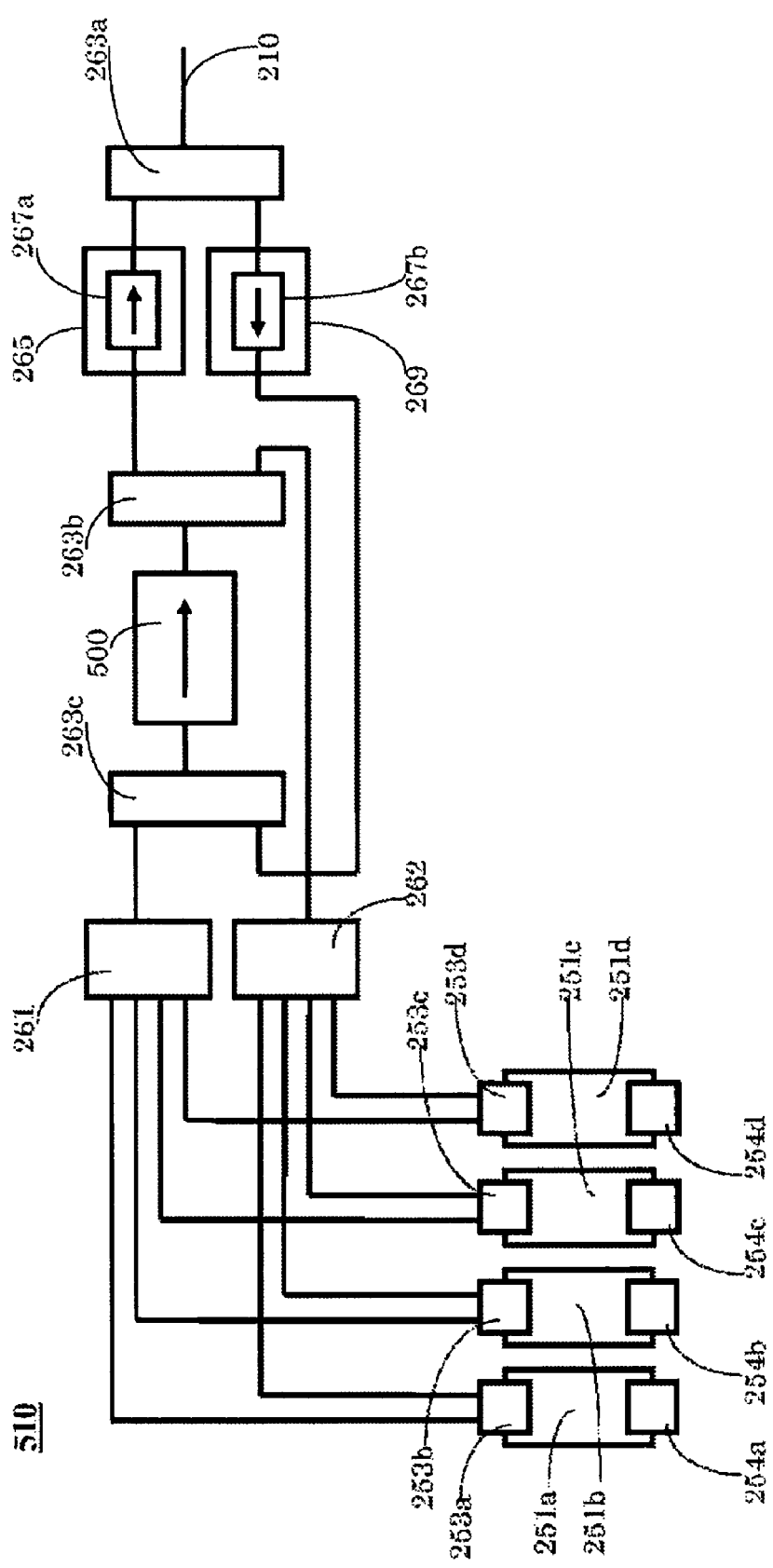
FIG. 67 is a schematic diagram showing the optical transport device which comprises the dispersion compensation device 500.

FIG. 67 shows an application of the dispersion compensation device 500 for the optical transport device 461 shown in FIG. 57A. As shown in FIG. 65, optical transport device 510 comprises the dispersion compensation device 500 instead of the dispersion compensation fiber 264. Due to the dispersion compensation device 500 transmits optical signals only one-way direction, connection among the wavelength division multiplexers 263b, 263c and the dispersion compensation device 500 is changed as shown in FIG. 67. An output of the optical preamplifier 269 is fed to the wavelength division multiplexer 263c, and an output of the wavelength 263b is fed to the wavelength division multiplexer 262.

Figure 68:
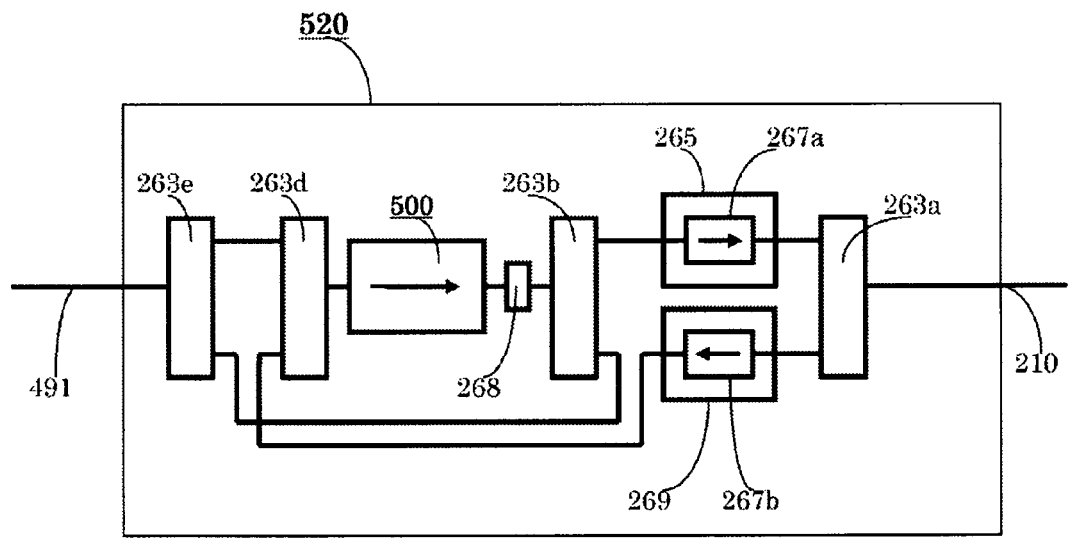
FIG. 68 is a schematic diagram showing the extender unit 461 which comprises the dispersion compensation device 500.

FIG. 68 shows an application of the dispersion compensation device 500 for the extender unit 490 shown in FIG. 63A. As shown in FIG. 68, the extender unit 520 comprises the dispersion compensation device 500 instead of the dispersion compensation fiber 264, and further comprises wavelength division multiplexers 263d and 263e. An output of the optical preamplifier 269 is fed to the wavelength division multiplexer 263, and the output of the wavelength division multiplexer 263b is fed to the wavelength division multiplexer 263e. The wavelength division multiplexer 263e is connected to a port 491. Inputted optical signals from the port 491 are fed to the dispersion compensation device 500 via the wavelength division multiplexers 263e and 263d.

The dispersion compensation device 300 may be disposed into the dispersion compensation device 500 instead of the dispersion compensation fiber 502. The dispersion compensation device 300 changes an amount of dispersion compensation so that compact size cost effective dispersion compensation mean is realized by substituting the dispersion compensation device 500 for the dispersion compensation fiber 502.

Figure 69:
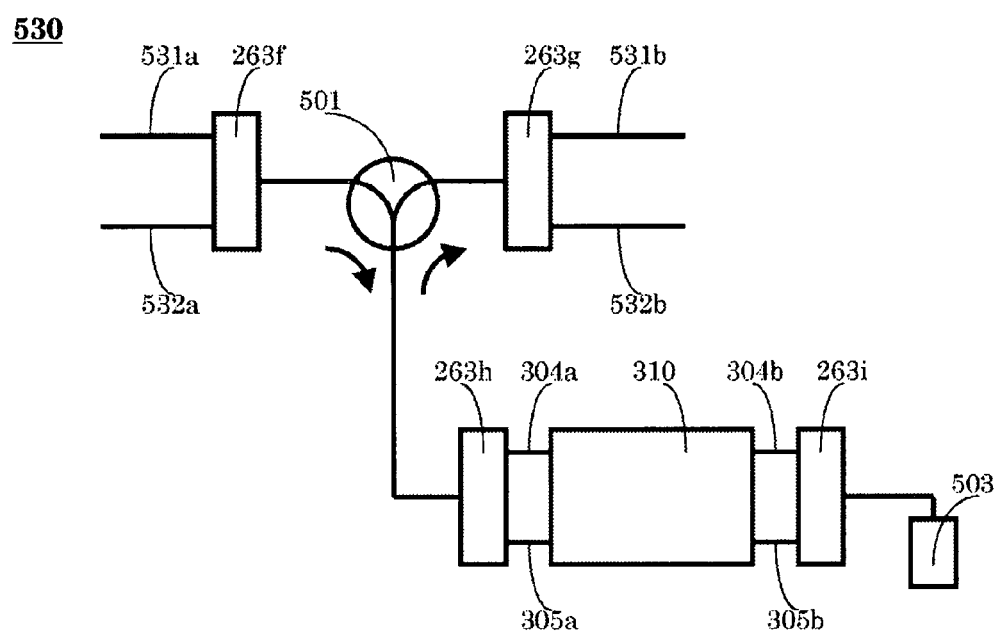
FIG. 69 is a schematic diagram showing the dispersion compensation device 530.

FIG. 69 shows a block diagram of an application of present invention for the dispersion compensation device 310. A dispersion compensation device 530 comprises wavelength division multiplexers 263f, 263g, 263h, 263i, an optical circulator 501, a dispersion compensation device 310, and the reflecting mean 503. The wavelength division multiplexers 263f, 263g, 263h, and 263i have almost same characteristics of the bleu/red band selection filters 306a, 306b, 306c, 306d, 306e and 306f. As a result, between a port 531a and a port 531b valuable dispersion compensation value is obtained against the red band, around 1545-1560 nm. Also, between a port 532a and a port 532b valuable dispersion compensation value is obtained against the blue band, around 1530-1545 nm. The dispersion compensation device 530 may be disposed into the optical transport device 320 shown in FIG. 47 instead of the dispersion compensation device 310.

The dispersion compensation fibers 301a, 301b, and 301c disposed in the dispersion compensation device 300 are reduced their fiber length to half according to the same principle shown in FIG. 66. Therefore, compact size cost effective dispersion compensation mean which independently varies chromatic dispersion against two wavelength regions, the red band and the blue band, is realized.

Figure 70:
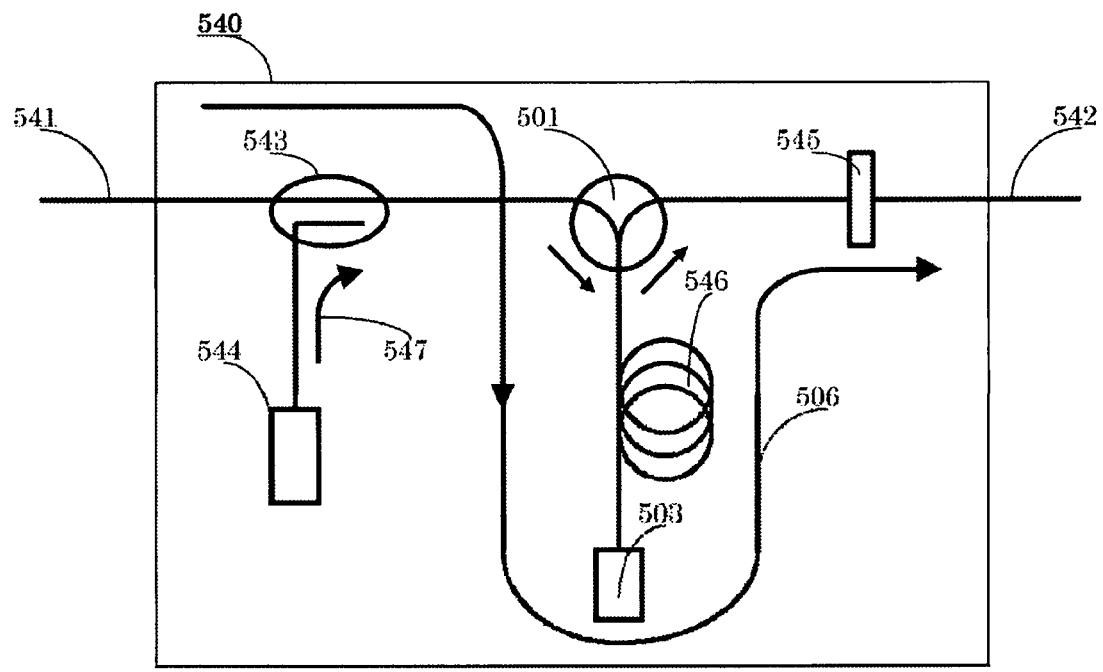
FIG. 70 is a schematic diagram showing a Raman amplifier which is applied for twenty first embodiment of present invention.

FIG. 70 shows application of present invention for a Raman optical amplifier. The Raman optical amplifier comprises similar characteristics optical fiber of the dispersion compensation fiber as an amplification medium. Sometimes the Raman optical amplifier comprises several kilo meters or more fiber length. Thus fiber length reduction provides cost reduction and compact equipment size.

As shown in FIG. 70, the Raman optical amplifier 540 comprises an optical circulator 501, amplification medium fiber 546, a reflecting mean 503, a pump right source 544, an optical fiber coupler 543, and pump light eliminating filter 545. An optical signal 506 inputted from a port 541 is combined with pump light 547 from the pump light source 544 by the optical fiber coupler 543, then propagates through the optical circulator 501, amplification medium fiber 546, the reflecting mean 503, again propagates through the amplification medium fiber 546 and the optical circulator 501. The pump light eliminating filter 545 eliminates the pump light from the light from the circulator 501 and the amplified optical signal is outputted to a port 542. According to present embodiment, optical signal propagates goes and returns on the amplification medium fiber 546, thus the same amplification with two times long fiber length is obtained.

This principle is also applicable to the rare earth doped fiber amplifiers such as EDFA (Erbium Doped Fiber Amplifier). However, EDFA needs around several tens meter amplification medium fiber, therefore cost or size reduction effect is no so prominent. In some case, additional optical components such as the optical circulator may exceed the cost reduction of the amplification medium fiber.

Figure 71:
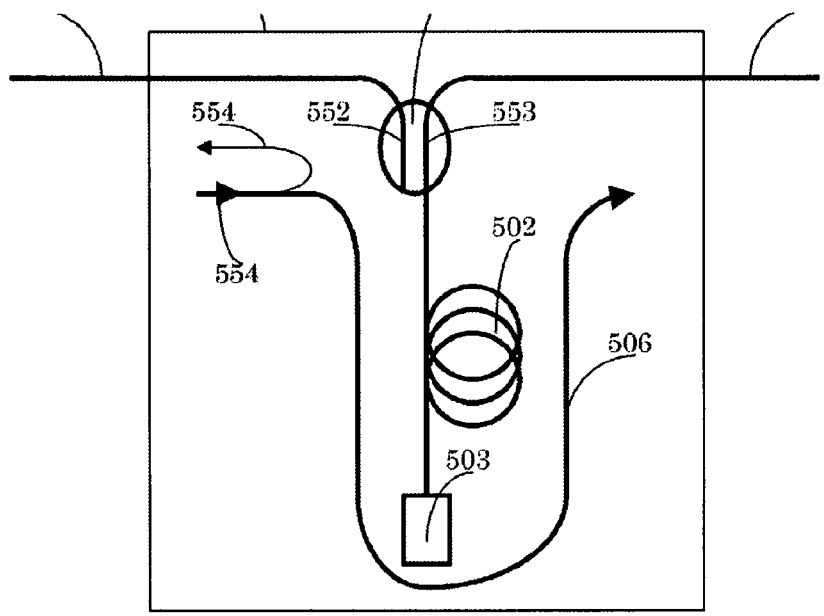
FIG. 71 is a schematic diagram showing the dispersion compensation device 550.

FIG. 71 shows a dispersion compensation device 550. The dispersion compensation device 550 comprises an optical fiber coupler 551 instead of the optical circulator 501 shown in FIG. 66. The optical fiber coupler 551 is far inexpensive than the optical circulator 501. However the optical fiber coupler 551 is reciprocal therefore produces return light 555. The optical fiber coupler also produces excessive insertion loss.

As the optical fiber coupler 551, an optical fiber coupler having branch ratio 50:50 is adopted, the optical signal 506 losses further 6 dB compared with the case of the FIG. 66. The return light 555 has almost same intensity of the optical signal 506. The output power of the optical signal is 13 dB smaller than input optical signal 554. The loss of 13 dB has a breakdown of 3 dB loss of the optical fiber coupler 551, 6 dB loss of the dispersion compensation fiber 502, 1 dB loss of the reflecting mean 503, and 3 dB loss of the optical fiber coupler 551.

As the optical fiber coupler 551, a different optical fiber coupler having branch ratio 90:10 is adopted, the return light 554 is reduced. A coupling ration between two fibers 552 and 553 formed the optical fiber coupler 551 is 10%, so that 10% of optical coupler of the optical fiber 552 is transferred to the optical fiber 553. Ten percent of an optical signal power of the optical fiber 552 is transferred to the optical fiber 553, then, the optical signal propagates through the dispersion compensation fiber 502, the reflecting mean 503, again the dispersion compensation fiber 502, and return to the optical fiber 553. The ten percent of the ten percent of the optical signal is transferred to the original optical fiber 552. Thus the return right has one percent intensity of the original light power. At the same moment, the optical signal 506 has nine percent of the original power intensity. Because of 9%=10%×90%. Accordingly, an asymmetric branch ratio optical fiber coupler provides smaller return light loss ratio.

The dispersion compensation device 550 is applied as substitution of the dispersion compensation device 500. If appropriate design is adopted larger residual return light 554 is suppressed. If the remote optical transceivers 253a, 253b, 253c, and 253d shown in FIG. 62 comprise optical isolators, the return light 554 will be suppressed. The optical preamplifier 269 typically adopts optical isolators therefore the residual return light 554 does not affect.

The two stage optical amplifier 82 shown in FIG. 47 possible comprises the dispersion compensation device 550. The two stage optical amplifier 82 comprises two EDFA modules 91 and 92. Thus loss caused by the dispersion compensation device 550 is sufficiently compensated. Also the EDFA modules 91 and 92 comprise optical isolators so that the return lights are suppressed.

The Twenty Second Embodiment

Figure 73:
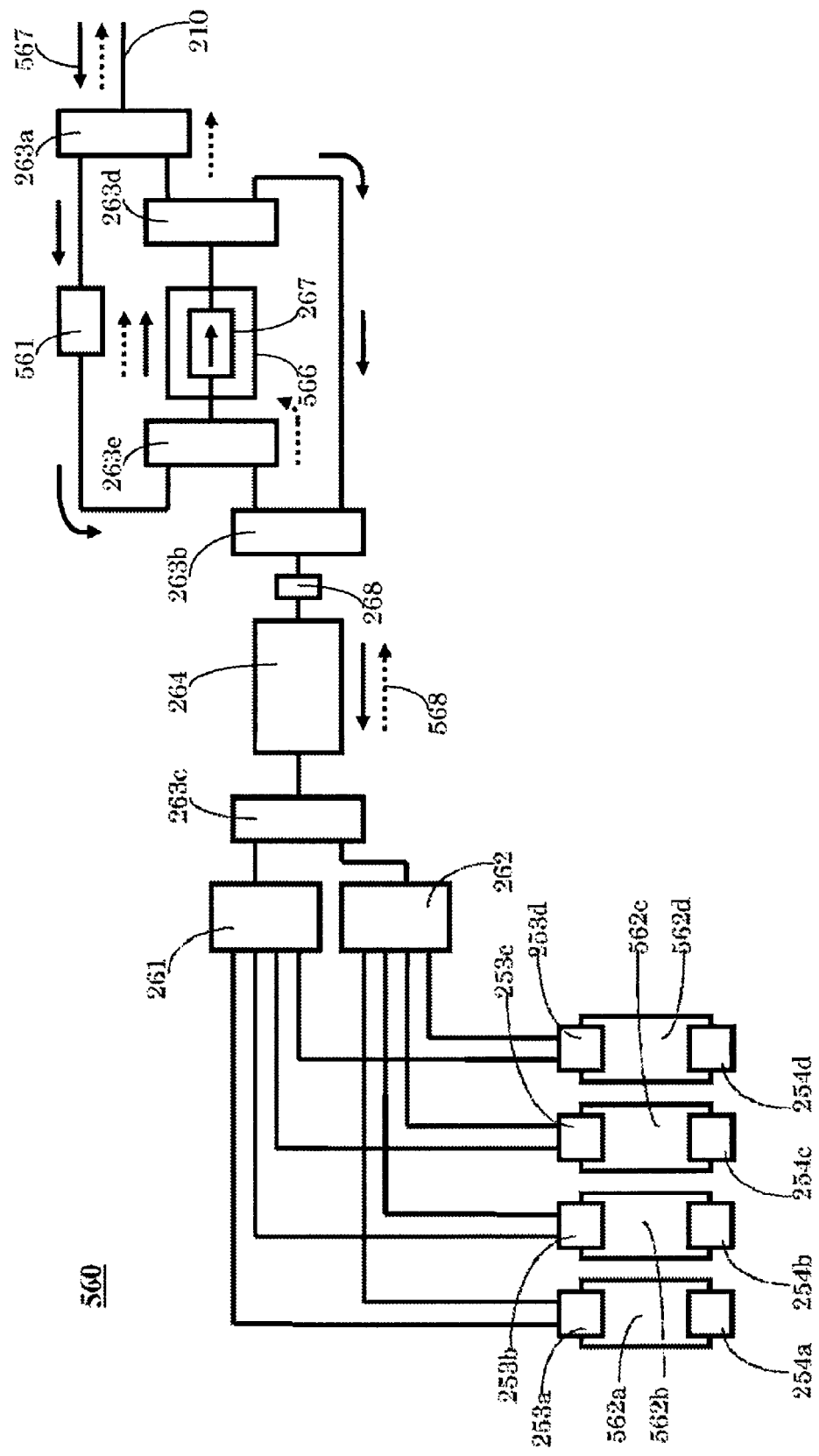
FIG. 73 is a schematic diagram showing the twenty second embodiment of the optical transport device.

FIG. 73 shows the twenty second embodiment of present invention. Optical transport device 560 shown in FIG. 73 is a modification of the optical transport device 480 shown in FIG. 62. Same reference numbers are employed in FIG. 73 for same element shown in FIG. 62.

Major difference from the configuration shown in FIG. 62 is that the optical transport device 560 comprises an optical amplifier 566 which acts as both of preamplifier and booster amplifier. The optical amplifier 566 comprises an EDFA module 266. Due to the optical amplifier is costly; reduction of a number of adopted optical amplifiers provides cost effectiveness. A variable optical signal attenuator 561 is disposed between the wavelength division multiplexers 263a and 263e. This configuration is suited for dual usage of optical amplifier 566 as preamplifier and booster amplifier.

An optical signal 567 transmitted from remote site via the remote fiber 210 is shown as solid line arrow in FIG. 73. The optical signal 567 is transmitted through the wavelength division multiplexer 263a and the variable optical signal attenuator 561, and then amplified by the optical amplifier 566. The output signals from the optical amplifier 566 are fed to the remote optical transceivers 253a, 253b, 253c, and 253d via wavelength division multiplexers 263d, 263b, the gain flattening filter 268, the dispersion compensation fiber 364, the wavelength division multiplexers 263c and 262.

On the other hand, output optical signals from the remote optical transceivers 253a, 253b, 253c, and 253d are aggregated by the wavelength division multiplexer 261. The aggregated optical signal 564 is shown as dotted line arrow in FIG. 73. The optical signal 564 is transmitted through the wavelength division multiplexer 263c, the dispersion compensation fiber 264, the gain flattening filter 268, the wavelength division multiplexers 263b and 263e, finally amplified by the optical amplifier 566. The amplified optical signal 564 by the optical amplifier 566 is transmitted to the remote optical fiber 210 via the wavelength division multiplexers 263d and 263a.

Figure 74:
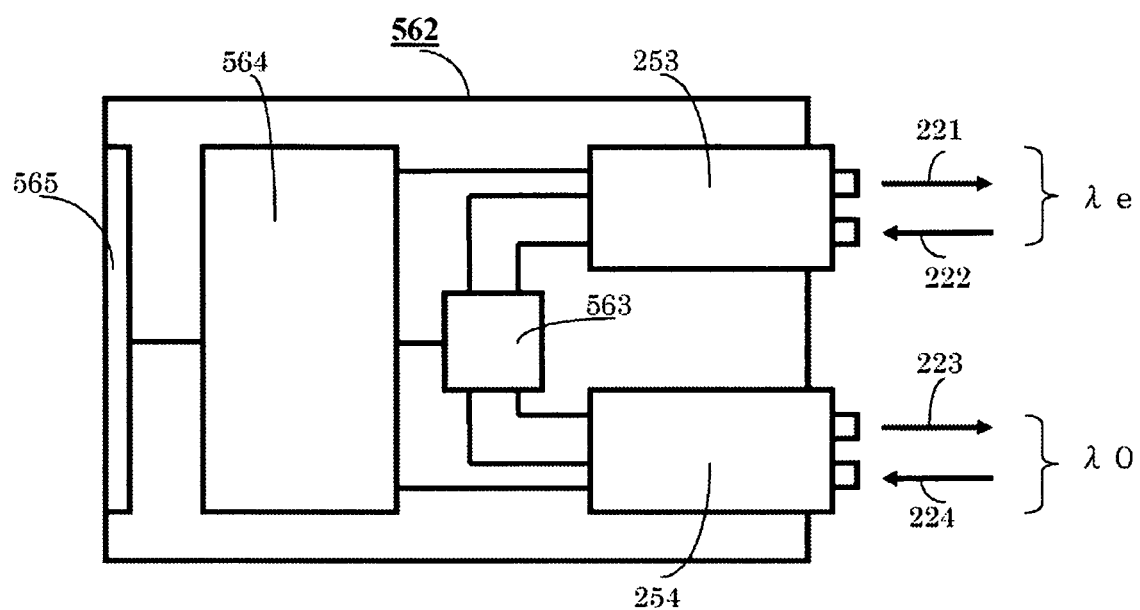
FIG. 74 is a schematic diagram showing inside architecture of converter card 562.

The remote optical transceivers 253a, 253b, 253c, and 253d are mounted on the converter cards 562a, 562b, 562c, and 562d, respectively. FIG. 74 shows the architecture of the converter card 562. The converter card 562 comprises a remote optical transceiver 253 and a local optical transceiver 254. The remote optical transceiver 253 and the local optical transceiver 254 are XFP transceivers with 10 Gbit/s data rate and having clock data recovery circuits.

Between the remote optical transceiver 253 and the local optical transceiver 254, a 2×2 cross-point switch 563 is disposed. The converter card 562 further comprises a control circuit 564 and a bus interface 566. The control circuit 564 collects information from the remote optical transceiver 253, the local optical transceiver 254, and the cross-point switch 563. The control circuit 564 sends command to the remote optical transceiver 253, the local optical transceiver 254, and the cross-point switch 563. The control circuit 564 is communicates with a management card, which is not shown in FIG. 74, via the bus interface 565.

Figure 75:
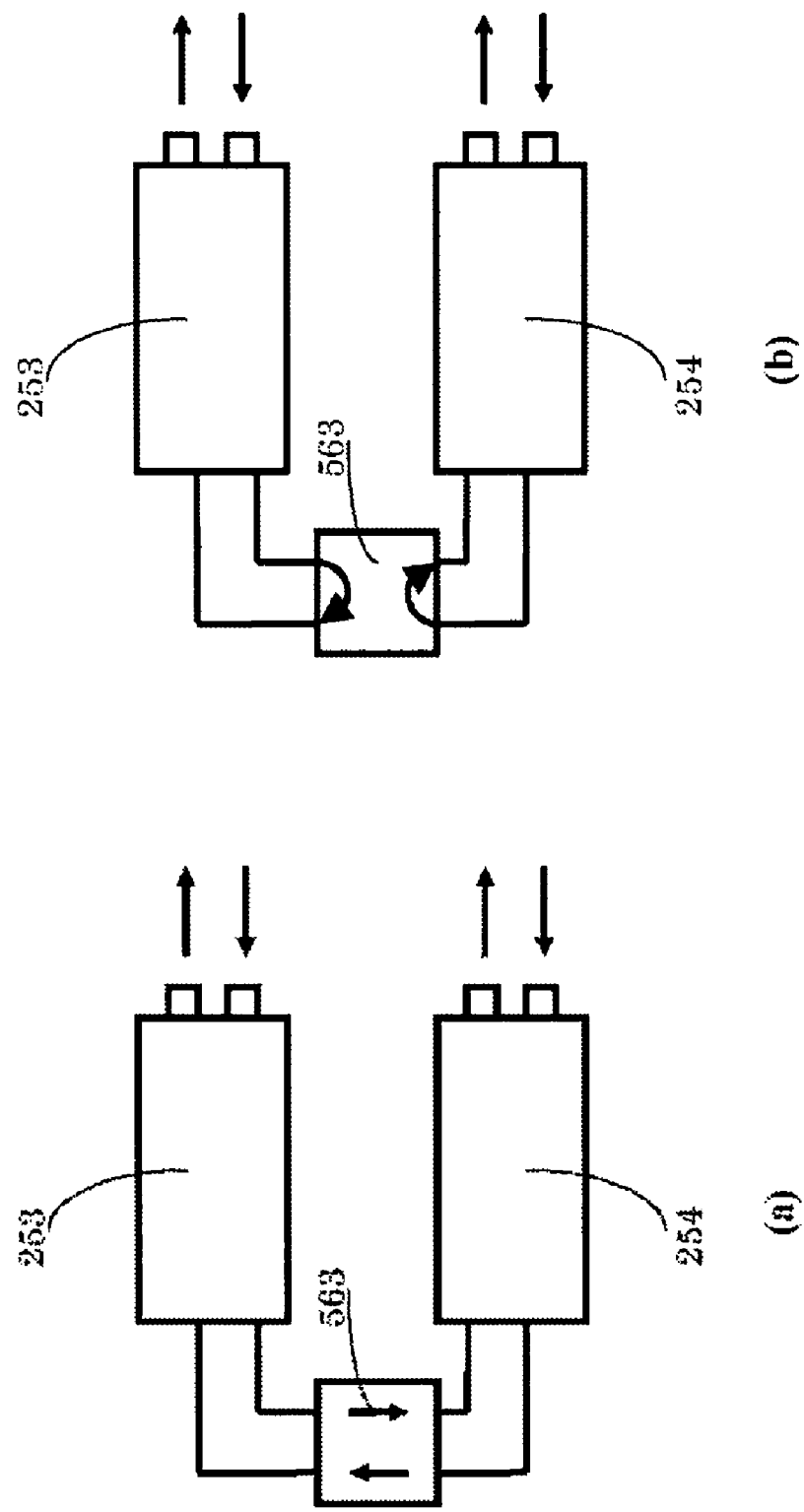
FIG. 75 is a schematic diagram showing behavior of cross-point switch 563.

FIG. 75A and FIG. 75B show behavior of the cross-point switch 563. FIG. 75A shows normal mode. In this mode, the remote optical transceiver 253 and the local optical transceiver 254 are connected via 2×2 cross-point switch 563. By contrast, FIG. 75B shows loop-back mode. In this mode, a receiving port and a transmitting port of the remote optical transceiver 253 are connected each another, thus the received signal by the remote optical transceiver 253 is send back to transmitter side of the remote optical transceiver 253. The local optical transceiver 254 is loop-backed in a same manner. This loop-back mode is employed for diagnostics of network failure. The control circuit 564 sends command to the cross-point switch 563 for mode change of the normal mode and loop-back mode.

The optical amplifier 566 is operated under AGC (Auto Gain Control) mode. The optical amplifier is, for example, set at gain of 20 dB. Saturation power the EDFA module 267 disposed in the optical amplifier 566 is +17 dBm (50 mW). The remote optical transceivers 253a, 253b, 253c, and 253d are XFP transceivers with data rate of 10 Gbit/s and their output power of 0 dBm (1 mW). Receivers of the remote optical transceivers 253a, 253b, 253c, and 253d comprise PIN photodiodes with sensitivity of −15 dBm.

Transmitting through the wavelength division multiplexers 261, 263c, the dispersion compensation fiber 268, the wavelength division multiplexers 263b and 263e, optical signals outputted from the remote optical transceivers 253a, 253b, 253c, and 253d are attenuated to −10 dBm per channel from 0 dBm per channel. Due to the gain of the optical amplifier 566 is 20 dB, power of the optical signals are boosted to +10 dBm per channel and sent to the remote optical fiber 210 via the wavelength division multiplexers 263d and 263a.

On the other hand, for example, optical signals 567 transmitted from the remote site via the remote optical fiber 210 have intensities of −25 dBm per channel. These optical signals are amplified to −5 dBm per channel by the optical amplifier 566. In this circumstance, the variable optical signal attenuator 561 is set at 0 dB attenuation. Insertion losses of the wavelength division multiplexers 263a, 263b, 263c, and 263e are neglected in this calculation.

The optical signals 567 with −5 dBm per channel intensities are attenuated to −15 dBm per channel due to the insertion losses of the wavelength division multiplexers 263d, 263b, the gain flattening filter 268, the dispersion compensation fiber 264, the wavelength division multiplexers 263c and 262. Finally, the optical signals 567 with −15 dBm per channel intensities are received by the PIN receivers of the remote optical transceivers 253a, 253b, 253c, and 253d.

The optical signals 567 transmitted via the remote optical fiber 210 are sometimes have more intensity such as −15 dBm per channel. In this circumstance, the optical signals 567 are boosted to +5 dBm per channel at output port of the optical amplifier 566. Then the optical signals 567 are attenuated to −5 dBm per channel at the receiving ports of the remote optical transceivers 253a, 253b, 253c, and 253d. This circumstance affect the system, however if the receiving optical signals increased some problems take place.

The EDFA module has highest output power called as saturation power. Total power of multiple wavelengths optical signals cannot exceed the saturation power. The EDFA module 267 shown in FIG. 73 has the saturation power of +17 dBm (50 mW). Four transmitting wavelengths with +10 dBm (10 mW) per channel and the four receiving wavelengths with +5 dBm (3 mW) per channel provide total 52 mw, that is around +17 dBm. If the optical signals 567 exceed −15 dBm per channel at input port of the optical amplifier 566, the EDFA module 267 is saturated. As a result, power of the transmitted optical signals are decreased under +10 dBm.

The PIN photodiode receivers of the remote optical transceivers 253a, 253b, 253c, and 253d have maximum receiver power of +0 dBm (1mW). If receiving optical power exceeds this value, the remote optical transceivers 253a, 253b, 253c, and 253d cannot receive optical signals appropriately. If the optical signals 567 exceed −10 dBm per channel at input port of the optical amplifier 566, the PIN photodiode receivers of the remote optical transceivers 253a, 253b, 253c, and 253d cannot work appropriately.

Accordingly, if the optical signals 567 exceed −15 dBm per channel intensities at input port of the optical amplifier 566, the variable optical signal attenuator 561 should apply appropriate attenuation.

As the variable optical signal attenuator 561, continuous variable optical attenuator is preferably adopted. Fixed optical attenuator may be adopted. Fixed optical attenuators with switching mean such as optical switch or manual switching using patch cords are also applicable.

FIG. 73 shows four converter cards 562. However, a number of converter cards are arbitrarily defined. Despite FIGS. 30, 37, 38, 40, 41, 42, 57, 58, 61, 62, and 67 show the configuration comprising four converter cards, these embodiments are not restricted by any number of the converter cards. Numbers of edge optical transport device and client stations shown in FIG. 1 is not restricted by any specific number.

The Twenty Third Embodiment

Figure 76:
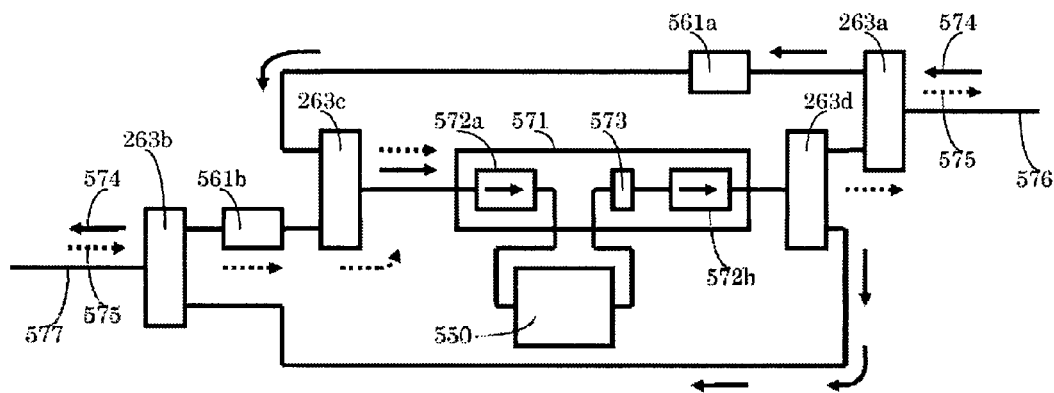
FIG. 76 is a schematic diagram of the twenty third embodiment of the optical line amplifier 570.

FIG. 76 shows the twenty third embodiment of present invention. FIG. 76 shows an optical line amplifier 570. The optical line amplifier 570 comprises ports 576 and 577. An inputted optical signal 574 from the port 576 is transmitted to the port the port 577 via a wavelength division multiplexer 263a, a variable optical signal attenuator 561a, a wavelength division multiplexer 263c, a two stage optical amplifier 571, dispersion compensation device 550, wavelength division multiplexers 263d, and 263b. On the other hand, an inputted optical signal 575 from the port 577 is transmitted to the port the port 576 via a wavelength division multiplexer 263b, a variable optical signal attenuator 561b, a wavelength division multiplexer 263c, a two stage optical amplifier 571, dispersion compensation device 550, wavelength division multiplexers 263d, and 263a. As shown in FIG. 76, the optical signal 574 is depicted as solid line arrows, and the optical signal 575 is depicted as dotted line arrows.

The wavelength division multiplexers 263a, 263b, 263c, and 263d are the red band filters or the blue band filters based on thin film dielectric filters. Similar red band and blue filters are disposed in the optical transport device 62 shown in FIG. 17. Also, the "4 skip 1" filters or the "8 skip 1" filters are applicable for the wavelength division multiplexers 263a, 263b, 263c, and 263d. An example of wavelength alignment, the optical signal 574 belongs to the blue band of C-band, and the optical signal 575 belongs to the red band of C-band.

The dispersion compensation device 550 has a same configuration shown in FIG. 71. The two stage optical amplifier 571 comprises the first EDFA module 572a, a gain flattening filter 573, and the second EDFA module 572b.

The optical line amplifier 570 is used for in-line amplification of optical signals. The optical line amplifier 570 is a bi-directional optical line amplifier in which an upstream wavelength is different from a downstream wavelength. Sometimes, intensity of the inputted optical signal 574 at the port 576 is different from intensity of the inputted optical signal 575 at the port 577. Because length of a remote fiber connected to the port 576 is sometimes different from length of a remote fiber connected to the port 577.

In order to compensate this signal intensity difference the optical line amplifier 570 comprises the variable optical signal attenuators 561a and 561b. The variable optical signal attenuators 561a and 561b may be substituted by pluggable fixed optical signal attenuators. When the optical line amplifier 570 is installed the fixed optical signal attenuator may be disposed at the port in which higher intensity signal is inputted. The fixed optical signal attenuator should have attenuation value almost corresponds to the intensity difference of the two ports of the optical line amplifier 570. At the same moment, an optical patch cord is disposed at another port in which lower intensity signal is inputted. This implementation is practical and cost effective.

The two stage optical amplifier 571 shown in FIG. 76 is operated under AGC (Auto Gain Control) mode. The AGC mode maintains a ratio of an input signal level of the first EDFA module 572a and an output signal level of the second EDFA module 572b. The ration corresponds to the gain of the optical line amplifier 570. If the input power level of the first EDFA module 572a falls below a certain value, pump light powers are shut off for both of the EDFA modules 572a and 572b. This mechanism provides the surge control mechanism as described before.

The optical line amplifier 570 has the configuration as described above thus the bidirectional optical amplification is realized by the single two stage optical amplifier 561 and the single dispersion compensation device 550. As a result the configuration of the optical line amplifier 570 reduces costs. Also the configuration of the optical line amplifier 570 provides optical signal level adjustment mechanism against the different input optical signals between the ports.

Figure 77:
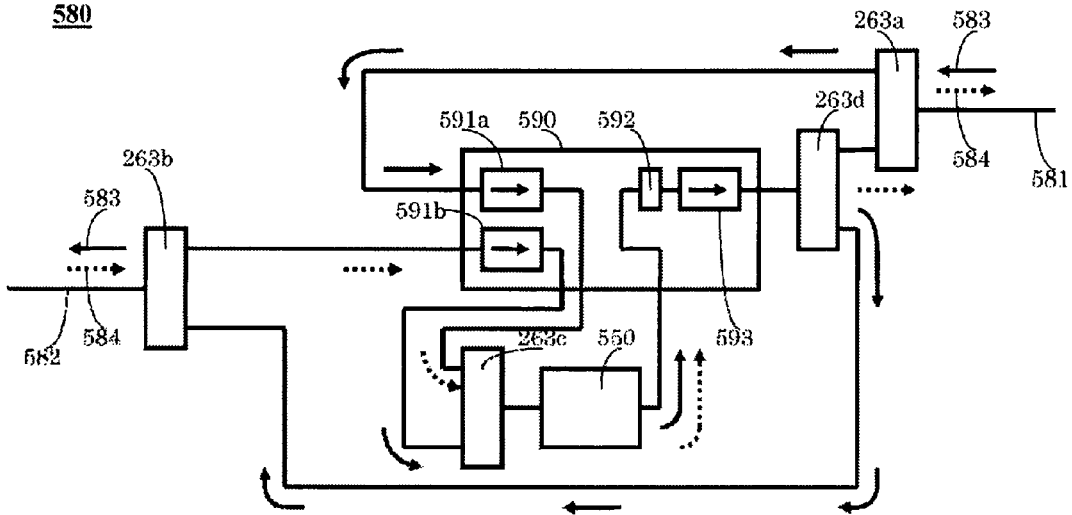
FIG. 77 is a schematic diagram showing the optical line amplifier 580, which is derivative of the optical line amplifier 570.
Figure 78:
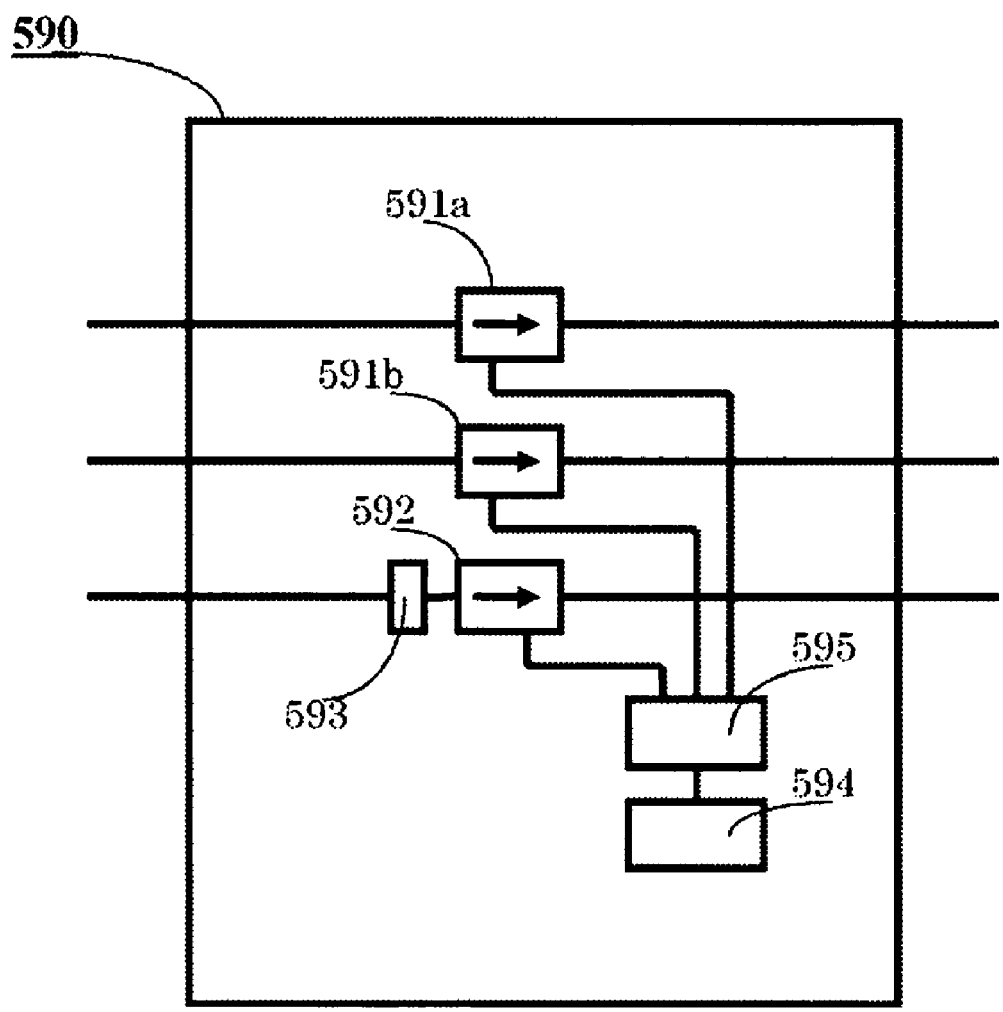
FIG. 78 is a schematic diagram showing the 2-input 2-stage optical amplifier 590.

FIG. 77 shows a modification of the configuration shown in FIG. 76. FIG. 77 shows an optical line amplifier 580. Major difference from the optical line amplifier 570 is that the optical line amplifier 580 comprises a two-input two stage optical amplifier 590. FIG. 78 shows architecture of the two-input two stage optical amplifier 590.

An optical signal 583 inputted from a port 581 is transmitted to a port 582 via a wavelength division multiplexer 263a, a first-stage EDFA module 591a, a wavelength division multiplexer 263c, a dispersion compensation device 550, a gain flattening filter 592, a second-stage EDFA module 593, and wavelength division multiplexers 263d, and 263b. On the other hand, an optical signal 584 inputted from a port 582 is transmitted to the port 581 via the wavelength division multiplexer 263b a first-stage EDFA module 591b, the wavelength division multiplexer 263c, the dispersion compensation device 550, the gain flattening filter 592, the second EDFA module 593, and wavelength division multiplexers 263d, and 263b. The optical signal 583 is depicted as solid line arrows and the optical signal 584 is depicted as dotted line arrows.

As shown in FIG. 78, the two-input two stage optical amplifier 590 comprises the two first-stage EDFA modules 591a, 591b, the gain flattening filter 593, and the second-stage EDFA module 593. Pump lights are provided to the two first-stage EDFA modules 591a, 591b, and the second-stage EDFA module 593 from a common light source 594 distributing by a pump light distributing mean 595. The pump light distributing mean 595 is, for example, optical fiber coupler.

If the two first-stage EDFA modules 591a and 591b are set at relatively high small signal gain and relatively small saturation power, the two first-stage EDFA modules 591a and 591b is operated under saturated operation. As a result, the optical signals 583 and 584 inputted to the wavelength division multiplexers 263c are maintained at almost same power level. The optical signal 583 and 584 are single wavelength optical signals or aggregated optical signals of multiple wavelengths.

Among components of the optical amplifiers, the most expensive component is the pump light source. The cost of the pump light source is roughly proportional to its output power. Thus an additional first-stage EDFA module does not affect the cost so much. In addition, the first-stage EDFA modules consumes a little bit of pump light so that cost impact against the pump light source is not so big. As a result, the configuration of the optical line amplifier shown in FIG. 77 provides automatic input power level adjustment mechanism between the ports with cost effectiveness.

Figure 79:
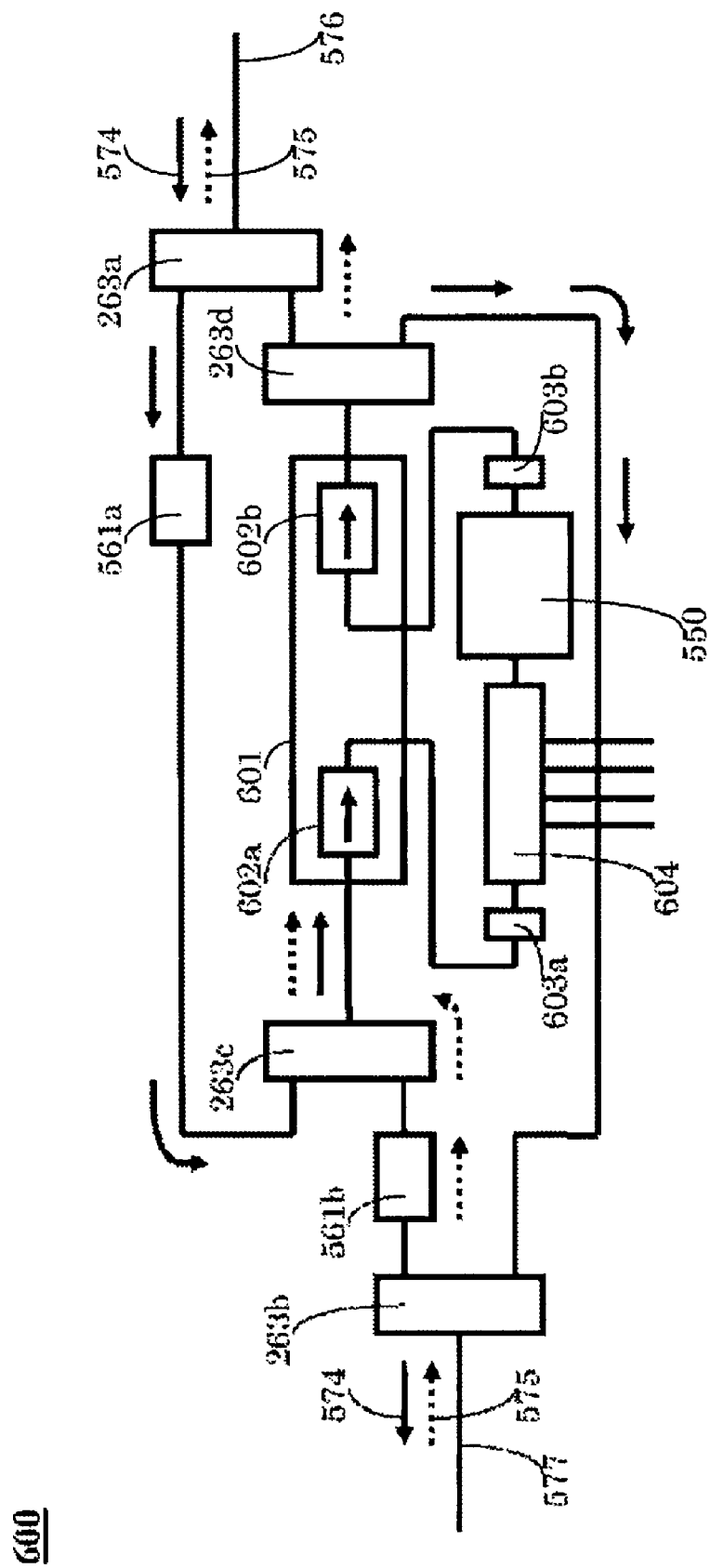
FIG. 79 is a schematic diagram showing the edge optical transport device 600.

FIG. 79 shows the edge optical transport device 600. FIG. 79 shows a modified configuration of the optical line amplifier shown in FIG. 76. The edge optical transport device 600 comprises a two stage optical amplifier 601 and OADM (Optical Add Drop Multiplexer) 604. The OADM 604 is disposed between a dispersion compensation device 550 and the first-stage EDFA module 602a.

The two-stage optical amplifier 601 comprises a first-stage EDFA module 602a and a second-stage EDFA module 602b. A gain flattening filter 603a is disposed before the OADM 604, and a gain flattening filter 603b is disposed after the dispersion compensation device 550. The characteristics of the gain flattening filters 603a and 603b are different form the gain flattening filter 573. This difference is for achieving gain flatness at the OADM 604.

According to the FIG. 79, the edge optical transport device 600 is realized cost effectively by using single two stage optical amplifier 601. The first-stage EDFA module 602a acts as an optical preamplifier so that cost effective PIN photodiode based optical transceivers may be connected to the OADM 604. The second-stage EDFA module 602b acts as a booster optical amplifier so that long distance transmission is enabled.

The Twenty Fourth Embodiment

Figure 80:
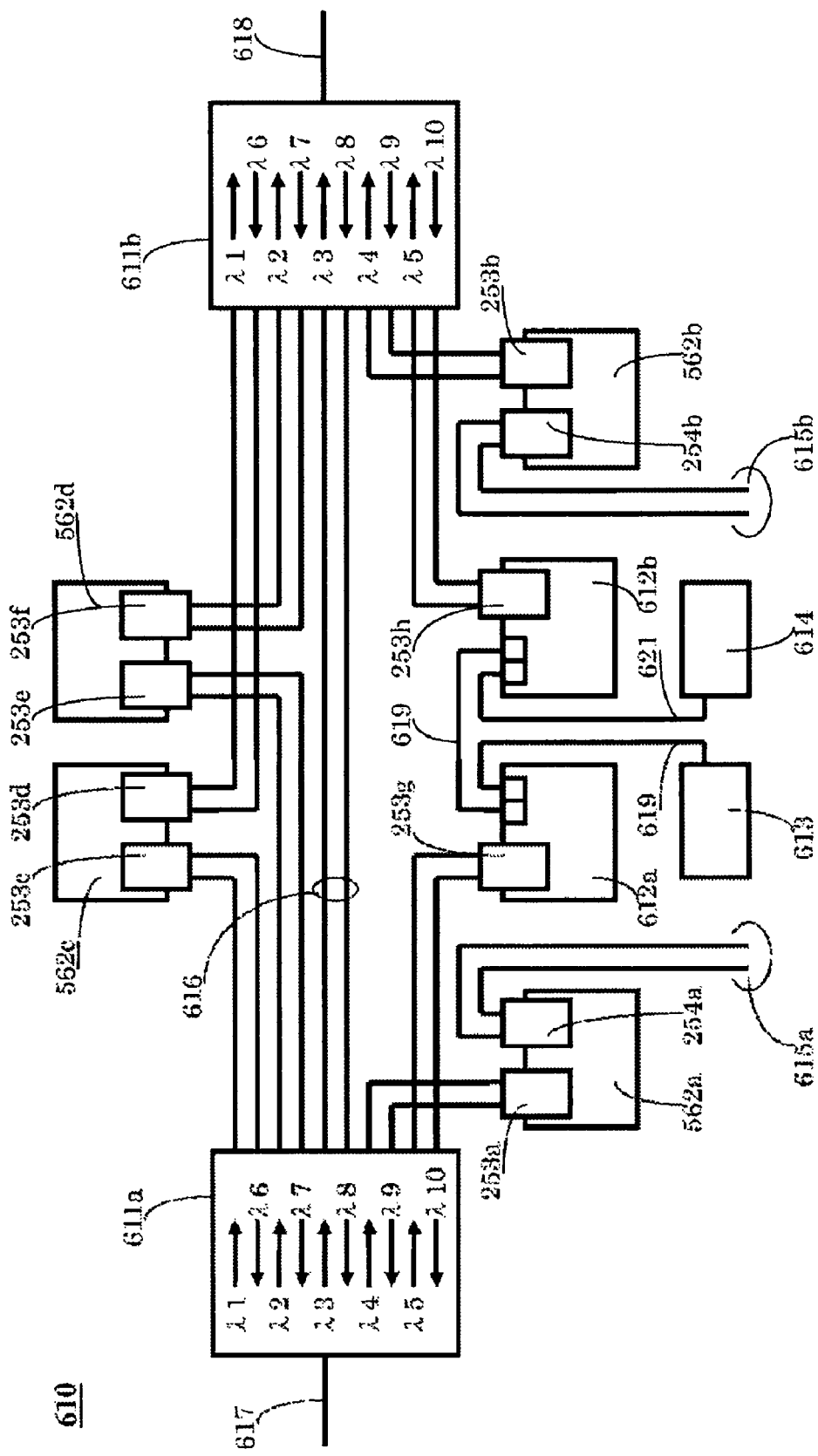
FIG. 80 is a schematic diagram showing the twenty fourth embodiment of the edge optical transport device.

FIG. 80 shows the twenty fourth embodiment of present invention. FIG. 80 shows edge optical transport device 610. The edge optical transport device 610 comprises wavelength division multiplexers 611a, 611b, converter cards 562a, 562b, 562c, 562d, three-port switch card 612a, 612b, management card 613, and network monitor equipment 614. The edge optical transport device 610 adopts bi-directional optical transmission system in which upstream wavelengths are different from downstream wavelengths on a single fiber. The edge optical transport device shown in FIG. 80 is implemented using the configuration shown in FIG. 29.

Converter cards 562a, 562b, 562c, and 562d have configurations shown in FIG. 74. The converter cards 562a and 562b are for add drop channels. The converter card 562a comprises a remote optical transceiver 253a and a local optical transceiver 254a. The local optical transceiver 254a is connected to a add drop port 615a. The converter card 562b comprises a remote optical transceiver 253b and a local optical transceiver 254b. The local optical transceiver 254ab is connected to a add drop port 615b.

The converter card 562c and 562d are for repeaters. The converter card 562c comprises two remote optical transceivers 253c and 253d. The converter card 562d comprises two remote optical transceivers 253e and 253f.

The three-port switch cards 612a and 612b comprise remote optical transceivers 253g and 253h, respectively. The three-port switch cards 612a and 612b are interconnected by a copper cable 619. The three-port switch card 612b and the network monitor equipment 614 are interconnected by a copper cable 621.

Ten wavelengths, λ1, λ2, λ3, λ4, λ5, λ6, λ7, ±8, λ9, and λ10, optical signals are inputted/outputted to/from two input/output ports 617 and 618. The wavelengths λ1, λ2, λ3, λ4, λ6, λ7, λ8, and λ9 are used for main signal transmission. The wavelengths λ5 and λ10 are used for monitor information transmission.

The optical signals of the wavelengths λ1 and λ6 are repeated by the converter card 562c. The optical signals of the wavelength λ2 and λ7 are repeated by the converter card 562d. The optical signals of wavelengths λ3 and λ8 are transmitted between the wavelength division multiplexers 611a and 611 directly transmitted via bypass circuit 616. The optical signals of the wavelengths λ4 and λ9 are add-dropped by the converter card 562a. The optical signals of the wavelengths λ4 and λ9 are add-dropped by the converter card 562b.

According to this embodiment, a converter card 562 comprises a remote optical transceiver 253 and a local transceiver 254 provides add drop function. A converter card 562 comprises two remote optical transceivers 253 provides repeater function. The wavelengths which are not attenuated so much are bypassed between the wavelength division multiplexers 611a and 611b.

Accordingly, a same kind of converter card is applicable both of add drop channel and repeater channel. Thus the kind of converter card is reduced. Two kinds of the wavelength division multiplexer are applicable for all nodes of the network so that the kind of the wavelength division multiplexer is reduced. The channels which are not attenuated so much are bypassed. Thus the total system cost is reduced.

The Twenty Fifth Embodiment

Figure 81:
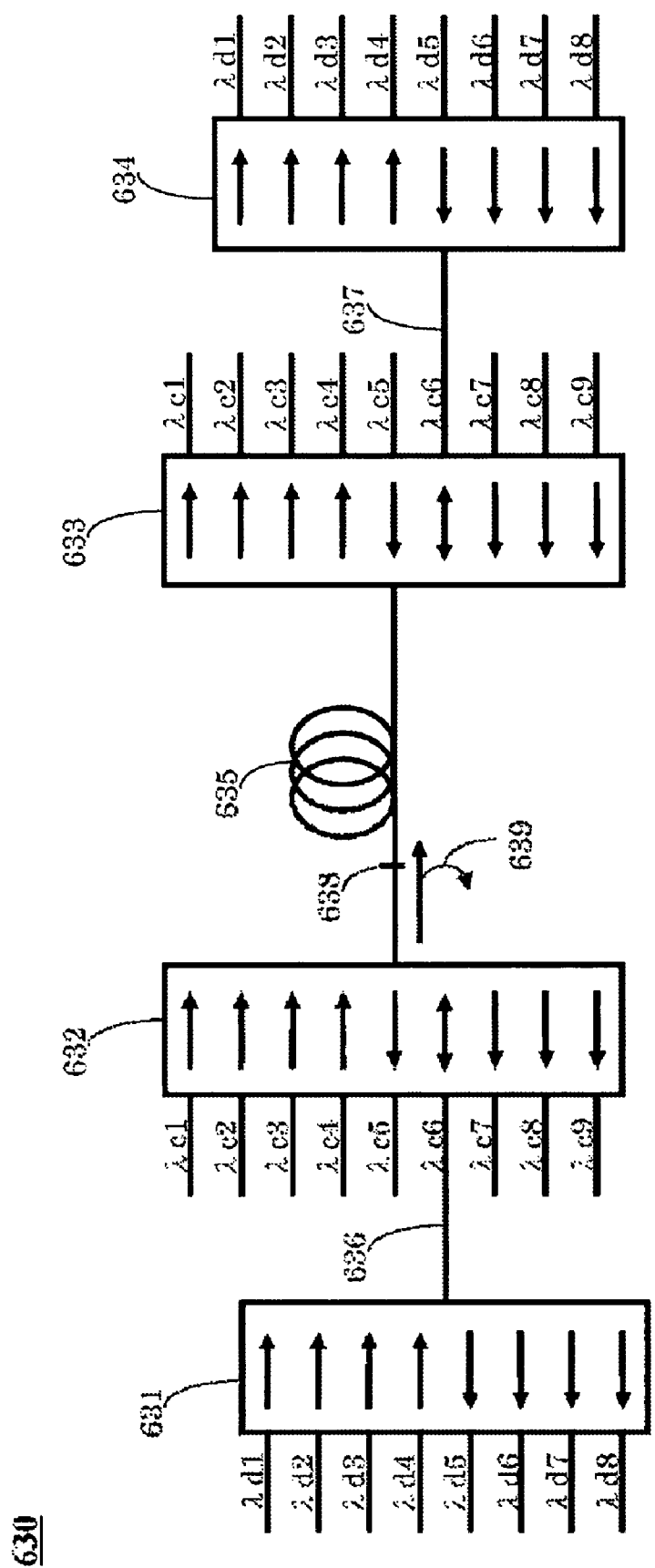
FIG. 81 is a schematic diagram showing the twenty fifth embodiment of the optical transport device.

FIG. 81 shows the twenty fifth embodiment of present invention. This embodiment belongs to bi-directional optical transmission system in which upstream wavelengths are different form downstream wavelengths on a single fiber. A common port 637 of a wavelength division multiplexer 631 is connected to a λc6 port of a wavelength division multiplexer 633. A remote optical fiber 635 is connected between common ports of wavelength division multiplexers 633 and 632.

The wavelength division multiplexers 632 and 633 are based on CWDM (Coarse Wavelength Division Multiplexing) technology. λc1=1451 nm, λc2=1471 nm, λc3=1491 nm, λc4=1511 nm, λc5=1531 nm, λc6=1551 nm, λc7=1571 nm, λc8=1591 nm, and λc9=1611 nm.

The wavelength division multiplexers 631 and 634 are based on DWDM (Dense Wavelength Division Multiplexing) technology. λd1=1547.715 nm (F370: 193.70 THx), λd2=1548.515 nm (F360: 193.60 THz), λd3=1549.315 nm (F350: 193.50 THz), λd4=1550.116 nm (F340: 193.40 THz), λd5=1551.721 nm (F320: 193.20 THz), λd6=1552.524 nm (F310: 193.10 THz), λd7=1553.329 nm (F300: 193.00 THZ), and λd8=1554.134 nm (F290: 192.90 THz). A wavelength grid F330 (1550.918 nm) is intentionally eliminated in this wavelength alignment. The reason is described later.

The wavelength division multiplexers 631 and 634 are based on DWDM (Dense Wavelength Division Multiplexing). Wavelengths belong to C-band 100 GHz grid are chosen. λd1=1547.715 nm (F370: 193.70 THz), λd2=1548.515 nm (F360: 193.60 THz), λd3=1549.315 nm (F350: 193.50 THz), λd4=1550.116 nm (F340: 193.40 THz), λd5=1551.721 nm (F320: 193.20 THz), λd6=1552.524 nm (F310: 193.10 THz), λd7=1553.329 nm (F300: 193.00 THz), and λd8=1554.134 nm (F290: 192.90 THz). A grid of F330 (1550.918 nm) which is nearest to 1551 nm is intentionally eliminated. The reason is described later.

Problem of crosstalk due to near end reflection arises in a bi-directional optical transmission system in which upstream wavelengths are different from downstream wavelengths. As shown in FIG. 81, if an optical connector 638 at a near end reflect optical signal around −13 dBm reflection optical signal 689 could be produced from strong transmission optical signal of 0 dBm. On the other hand, receiving signal is attenuated propagating through the remote fiber 635, as a result, intensity of the receiving signal sometimes around −35 dBm. Therefore undesired optical signal is stronger than the receiving optical signal as big as 22 dB. Typically, undesired signal must be smaller than the receiving signal as small as 25 dB. Thus total 47 dB isolation, undesired signal suppression ratio, is required.

Despite thin film dielectric filters used for wavelength division multiplexers have around 30 dB isolation against adjacent wavelengths, the thin film dielectric filters have greater than 60 dB isolation against non-adjacent wavelengths. Thus the transmission system in which wavelengths λd1, λd2, λd3, and λd4 are employed as upstream signals and wavelengths λd5, λd6, λd7, and λd8 are employed as downstream signals, the upstream signals and the downstream signal are non-adjacent each other, because the wavelength F330 (1550.918 nm) is skipped. As a result crosstalk due to the near end reflection is avoided.

Among CWDM wavelengths and DWDM wavelengths, similar problem may happen. Two methods avoid this problem. The first method is high isolation thin film dielectric filters are applied at a channel of DWDM wavelengths and adjacent channels of CWDM wavelengths of CWDM wavelength division multiplexers 632 and 633. As the high isolation thin film dielectric filters, double filter type filter, or double pass filter are applicable. These filters are applicable for wavelengths of λc5, λc6, and λc7.

Figure 82:
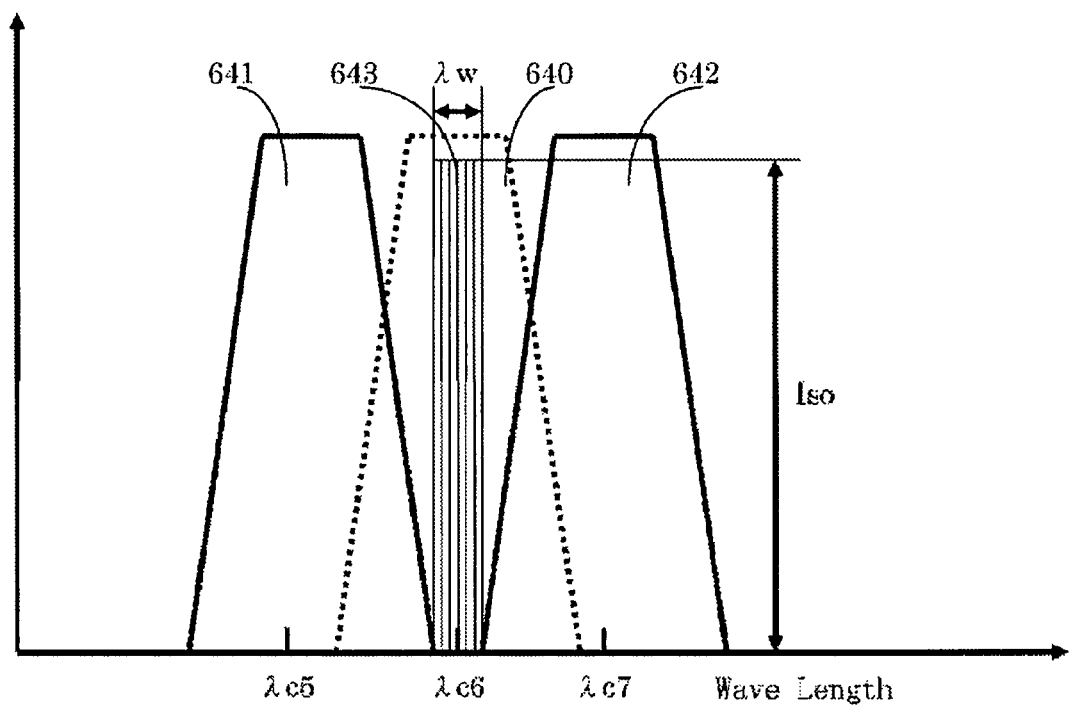
FIG. 82 is a schematic diagram showing the wavelength alignment among filers' characteristics and DWDM optical signals.

The second method is to limit DWDM wavelengths around center of the wavelength λc6. As shown in FIG. 82, a filtering characteristic 641 of the wavelength λc5 and a filtering characteristic 642 of the wavelength λc7 are as steep as 10 dB/nm or more. A reference number 640 depicts a filtering characteristic of the wavelength λc6. Typically, 30 dB isolation is provided against ±6.5 nm pass-band at the center wavelength of λc6. If DWDM wavelengths group 643 is limited around the wavelength λc6 the isolation, Iso, increases effectively due to effective narrow pass-band, λw. The DWDM wavelengths are chosen within λw isolation against the CWDM wavelength division multiplexers 632 or 633 does not have to have high isolation filters. As an actual example, the DWDM wavelengths are stuffed within ±4.5 nm pass-band around the center wavelength 1551 nm. The 2 nm difference of the pass-band provides 20 dB increase of the isolation.

According to present embodiment, the example of λc6=1551 nm with DWDM wavelengths are described, however other CWDM wavelengths are also available. Especially, λc7=1571 nm with L-band DWDM wavelengths and λc8=1591 nm with L-band DWDM wavelengths are practical combinations. The DWDM wavelength grid is not limited to 100 GHz grid, other grid such as 50 GHz grid or 200 GHz grid is also applicable.

According to present embodiment the crosstalk due to the near end reflection is avoided in the bi-directional transmission system.

The Twenty Sixth Embodiment

Figure 83:
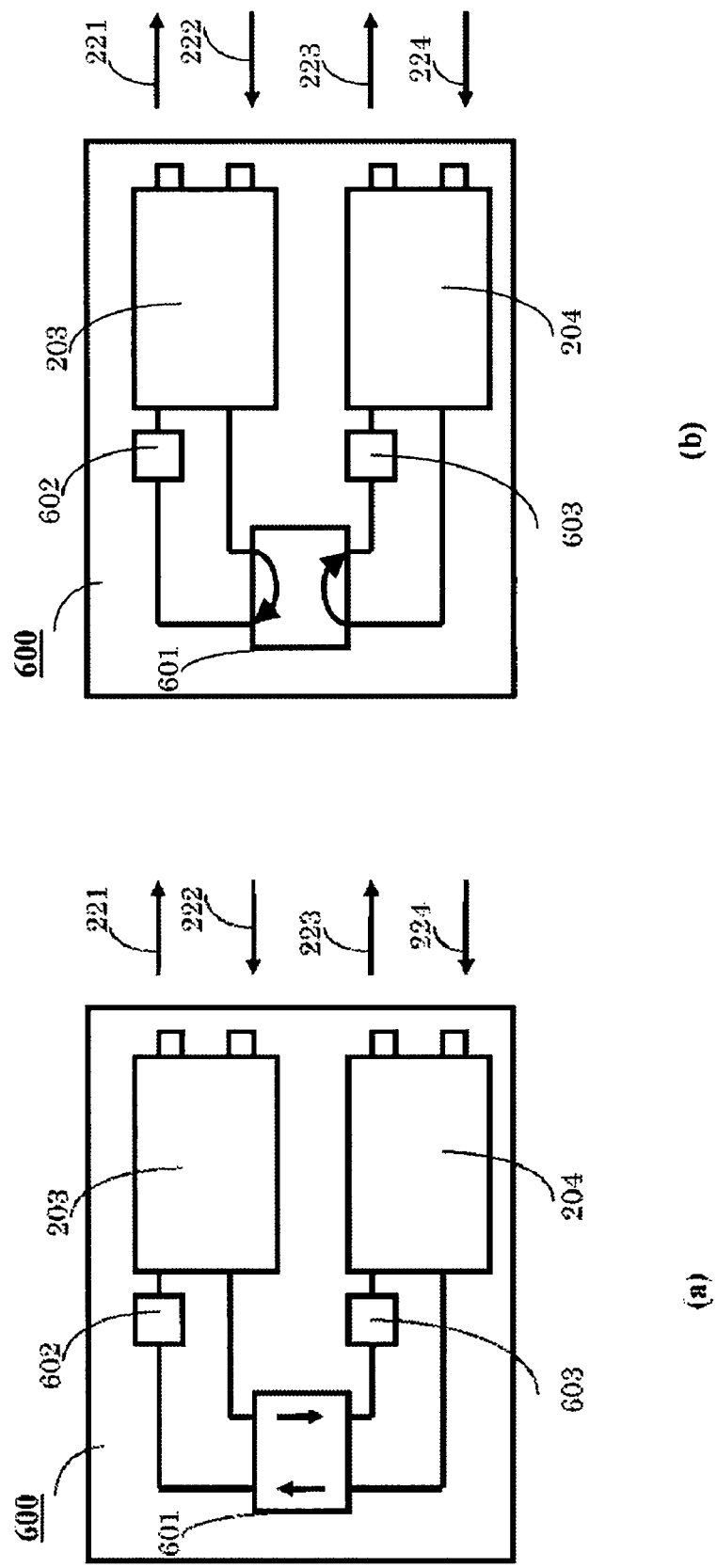
FIG. 83 is a schematic diagram showing the twenty sixth embodiment of the converter card.

FIG. 83A and FIG. 83 show the twenty sixth embodiment of present invention. FIG. 83A and FIG. 83B show a converter card 600. The converter card 600 is a modification of the converter card 202 shown in FIG. 31. The converter card 600 comprises a pluggable remote optical transceiver 203 and a pluggable local optical transceiver 204. The converter card 600 comprises a 2×2 switch 601 and equalizers 602 and 603. The pluggable optical transceivers 204 and 204 to be mounted on the converter card 600 are preferably XFP transceivers of data rate 10 Gbit/s with 3R function.

The converter card 600 realizes loop back function by using the single 2×2 switch 601. The loop back function is one of the diagnostics modes. As shown in FIG. 83A, a signal from the pluggable remote optical transceiver 203 is transmitted to the pluggable local optical transceiver 204 in normal mode. At the loop back mode, as shown in FIG. 83B, the signal from the pluggable optical transceiver 203 is transmitted to the pluggable optical transceiver 203 itself. At the same moment, the signal from the pluggable optical transceiver 204 is transmitted to the pluggable optical transceiver 204 itself. This mode is applied to detect a place of failure.

As a 2×2 switch 601, MAX3841 produced by Maxim Integrated Products of United States is preferably adopted. In FIGS. 83A and 83B, four ports of the 2×2 switch 601 are shown with single lines; however pairs of differential signal lines are typically adopted at high data rate such as 10 Gbit/s. Present invention does not depend on differential circuit or single-ended circuit.

The converter card 600 comprises the equalizer 602 and 603. These devices correct waveform of high data rate electric signals. As equalizers MAX3804 or MAX3805 produced by Maxim Integrated Products of United States are preferably adopted. These equalizers make circuit design easy.

The configurations shown in FIG. 83A and FIG. 83B are applicable to low data rate products. So-called PDH interfaces are different from in the United States and European countries. Thus PDH has many data rate interfaces among 1.5 Mbit/s and 140 Mbit/s. Data storage interfaces such as ESCON with 200 Mbit/s and low data rate FibreChannel with 265.25 Mbit/s exist. These interfaces have relatively low data rate so that 3R function is not necessary. In addition CDR (Clock Data Recovery) chip for these old interfaces are difficult to procure. Thus the configurations shown in FIG. 83A and FIG. 83B with low data rate have a practical value. For the low data rate converter card 600, as the 2×2 switch 601, MAX3840 produced by Maxim Integrated Products of United States is preferably adopted. The converter card 600 with low data rate may omit equalizers 602 and 603.

The Twenty Seventh Embodiment

Figure 84:
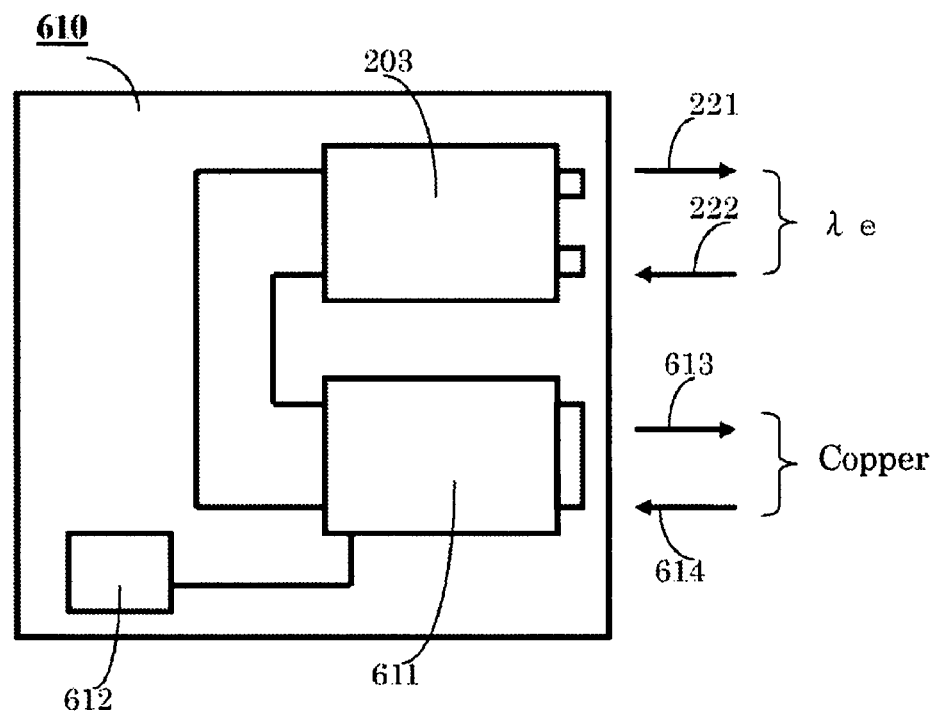
FIG. 84 is a schematic diagram showing the twenty seventh embodiment of the converter card.

FIG. 84 shows the twenty seventh embodiment of present invention. FIG. 84 shows a converter card 610. The converter card 610 is a modification of the converter card 202 shown in FIG. 31. The converter card 610 comprises pluggable copper transceiver 611 as a local transceiver. The converter card 610 comprises a copper transceiver control mechanism 612. The pluggable copper transceiver comprises 3R function so that even a 2R converter card can provide 3R function effectively.

In FIG. 84, as a matter of convenience, an input signal line 613 and an output signal line 614 of the copper transceiver 611 are shown as single lines. However, in reality, these single lines are made of differential lines of twisted pair cables. For data rates 10 Mbit/s and 100 Mbit/s, a pair of twisted pair cables are disposed as the input signal line 613 and the output signal line 614. In case of 1000 Mbit/s, 4 pairs of twisted cables are disposed with bidirectional electrical signal transmission.

The pluggable copper transceiver 611 comprises loop back function so that the loop back mode, one of the diagnostics modes, is realized by the control of the copper transceiver control mechanism 612. For a pluggable remote optical transceiver 203, an optical signal 222 of wavelength λe is loop-backed as an optical signal 221 of wavelength λe by the pluggable copper transceiver 611.

The pluggable copper transceiver 611 comprises a function which counts packet number and CRC errors. The copper transceiver control mechanism 612 collect these information and send to the management card 212 through a bus which is not shown.

As an example of the pluggable copper transceiver 611, FCMJ-8251-3 produced by Finisar Corporation of the United States is preferably adopted. Also Agilent Technologies, Inc. of the United States provides similar pluggable copper transceiver. These pluggable copper transceivers can transmit Ethernet signals with 10 Mbit/s, 100 Mbit/s and 1000 Mbit/s.

As described above, according to present embodiment, the converter card without CDR (Clock Data Recovery) or 2×2 switch can provide 3R function and loop back function. This provides cost reduction and high reliabilities. The copper transceiver control mechanism 612 can provides packet count and/or CRC error count information.

As a matter of convenience, in the case of the optical signals 221 and 222 are same wavelength of λe is described. However the optical signals 221 and 222 could be different wavelengths. In case of the bi-directional optical transmission system in which upstream wavelengths are different from downstream wavelengths, the optical signals 221 and 222 are obviously different from each another. The bi-directional optical transmission system has been already described in the 1$^{st}$ embodiment using FIG. 3.

The Twenty Eighth Embodiment

Figure 85:
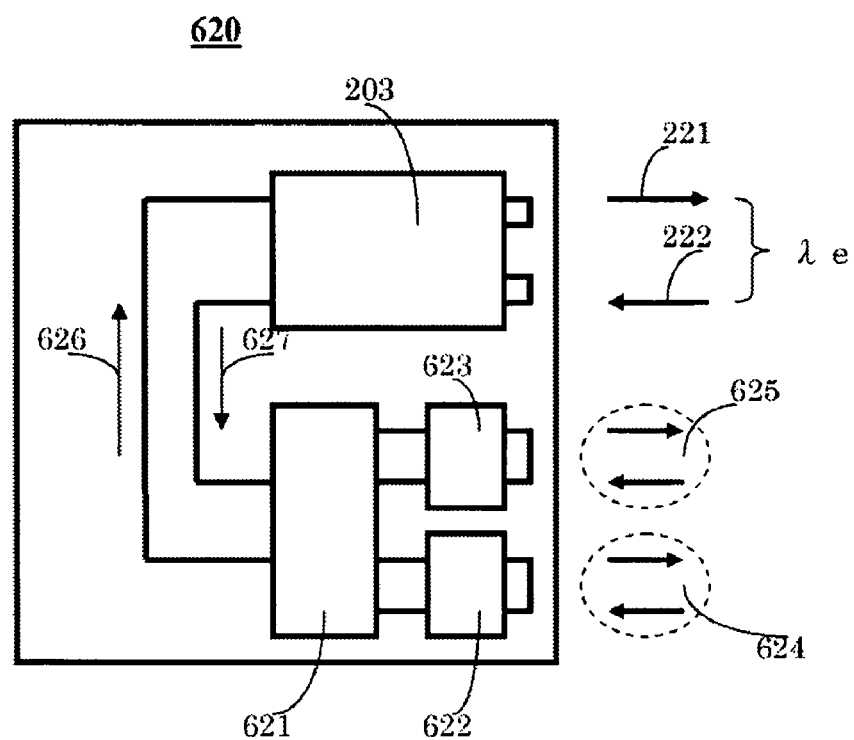
FIG. 85 is a schematic diagram showing the twenty eighth embodiment of the converter card.

FIG. 85 shows the twenty eighth embodiment of present invention. FIG. 85 shows a converter card 620. The converter card 620 is a modification of the converter card 202 shown in FIG. 31. The converter card 620 comprises an Ethernet PHY chip 621 operated under RSGMII (Reduced Serial Gigabit Media Independent Interface) mode. RJ45 jacks 622 and 623 are connected to the Ethernet PHY chip 621. The RJ45 jacks 622 and 623 are connected to copper cables which are not shown and transmitted Ether net signals 624 and 625, respectively.

The RSGMII mode aggregates two Gigabit Ethernet signals into single 2.5 Gbit/s serial signal. Between the Ethernet PHY chip 621 and a pluggable optical transceiver 203, RSGMII signals 626 and 627 are exchanged. At present embodiment, the pluggable optical transceiver 203 is a WDM transceiver which is operated at 2.5 Gbit/s.

The converter card 620 converts two Gigabit Ethernet signals 624 and 625 into a single RSGMII signal of 2.5 Gbit/s and transmits as an optical signal 221 of wavelength λe. The converter card 620 receives an optical signal 222 of wavelength λe which is modulated by RSGMII signal and convert to two Gigabit Ethernet signals 624 and 625.

The signals 624 and 625 were described as Gigabit Ethernet signals. However the signals 624 and 625 could be Ethernet signals of 10 Mbit/s or Fast Ethernet signals of 100 Mbit/s. The RSGMII mode converts the Ethernet signals of 10 Mbit/s or the Fast Ethernet signals of 100 Mbit/s are converted to the Gigabit Ethernet signal of 1000 Mbit/s, and aggregates into single 2.5 Gbit/s serial signal. In order to convert into the Gigabit Ethernet signal, the conversion mechanism repeats same symbol 100 times and 10 times in case of the Ethernet signals of 10 Mbit/s and the Fast Ethernet signals of 100 Mbit/s, respectively. The Gigabit Ethernet of 1000 Mbit/s adopts 8B10B code, one of the block codes, which make the signal at 1250 Mbit/s symbol rate. Then, two 1250 Mbit/s symbol rate signals are aggregated into the 2.5 Gbit/s RSGMII signal. Thus even if the signals 624 and 625 have different data rate, these two signals are aggregated into a RSGMII signal.

As the Ethernet PHY chips operated under RSGMII mode, RTL8211 and/or RTL8212 produced by Realtek Semiconductor Corp. of Taiwan are preferably adopted.

The Twenty Ninth Embodiment

Figure 86:
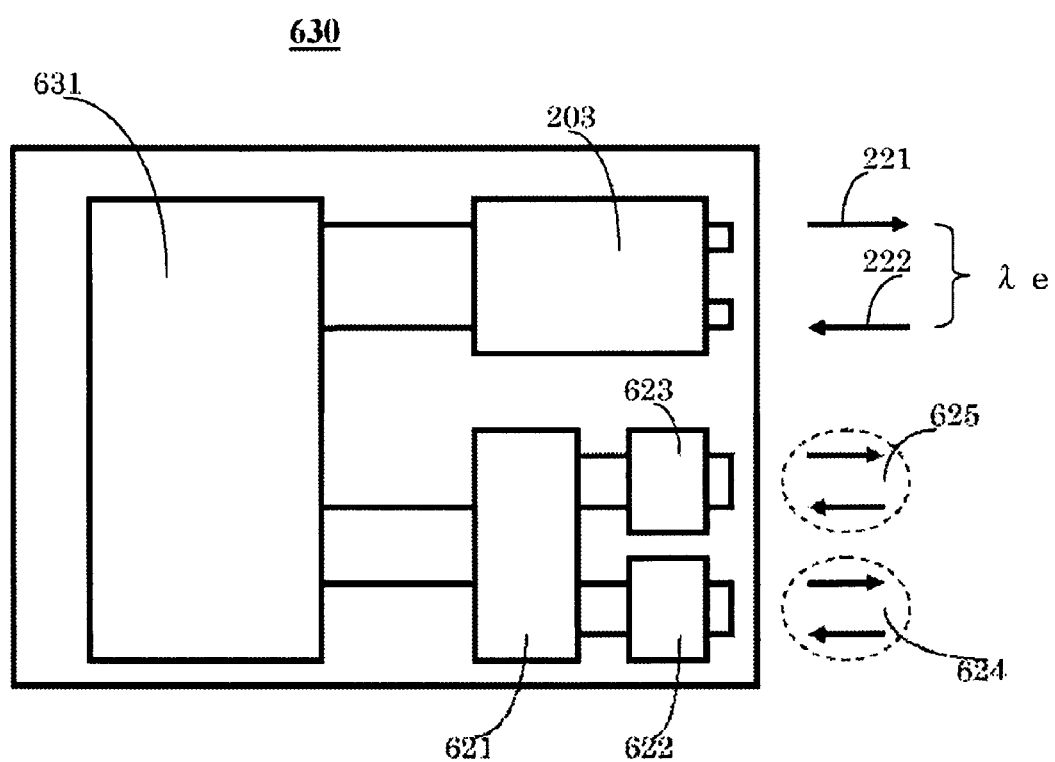
FIG. 86 is a schematic diagram showing the twenty ninth embodiment of the optical transport device.

FIG. 86 shows the twenty ninth embodiment of present invention. FIG. 86 shows the converter card 630. The converter card 630 comprises an Ethernet switch chip 631 having RSGMII interface. A pluggable remote optical transceiver 203 and the Ethernet switch chip 631 are connected by RSGMII interface each another. The converter card 630 comprises an Ethernet PHY chip 621. Two RJ 45 jacks 622 and 623 are connected to the Ethernet PHY chip 621.

As the Ethernet switch chip 631 having RSGMII interface, RTL8366 and/or RTL 8369 produced by Realtek Semiconductor Corp. of Taiwan, is preferably adopted. As the Ethernet PHY chip having RSGMII interface, RTL8211N and/or RTL8212N produced by Realtek Semiconductor Corp. of Taiwan, is preferably adopted.

The Ethernet chip 631 comprises functions of VLAN (Virtual Local Area Network) and port mirroring. The Ethernet chip 631 comprises measuring function of traffic status such as packet number, packet byte number, and CRC error number.

Figure 87:
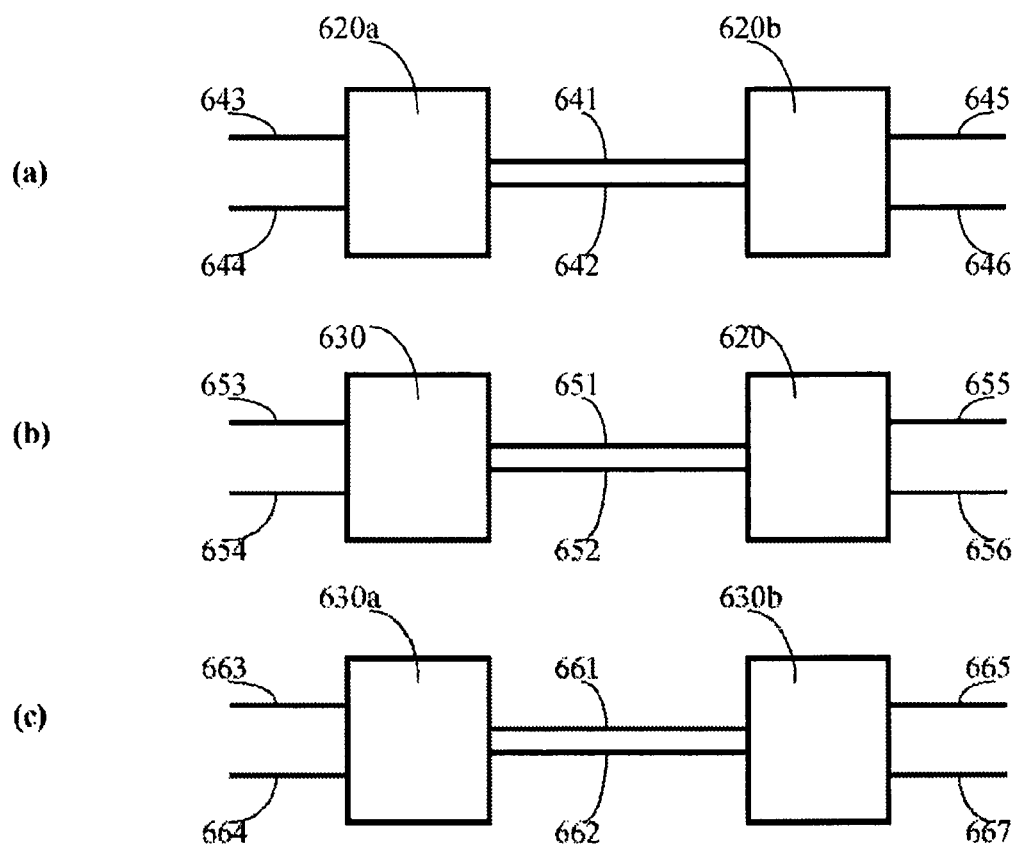
FIG. 87 is a schematic diagram showing the connection between the converter cards.

FIG. 87A shows a connection between two converter cards 620 shown in the twenty eighth embodiment. The converter cards 620*a* and 620*b* are connected by optical fibers 641 and 642, each another. The converter card 620*a* is connected to copper cables 643 and 644. The converter card 620*b* is connected to copper cables 645 and 646.

The copper cables 643 and 644 are applied independent Gigabit Ethernet signals. By the converter card 620*a*, these two Gigabit Ethernet signals are aggregated into RSGMII signals converted to optical signal, and transmitted to the converter card 620*b*. The converter card 620*b* converts the received optical signal into electric RSGMII signal and de-aggregates the two Gigabit Ethernet signal from the RSGMII signal, and transmits to the two copper cables 645 and 646. By the converter card 620*b*, the Gigabit Ethernet signal transmitted through the copper cables 645 and 646 are aggregated to RSGMII signal, converted to an optical signal, and transmitted to the converter card 620*a*. The converter card 620*a* converts the received optical signal into electric RSGMII signal and de-aggregates the two Gigabit Ethernet signal from the RSGMII signal, and transmits to the two copper cables 643 and 644.

FIG. 87B shows a connection between two converter cards 630 and 620. The converter card 620 and the converter card 630 are connected by optical fibers 651 and 652. The converter card 630 is connected to two copper cables 653 and 654. The converter card 620 is connected to two copper cables 655 and 656.

The connection of converter cards 630 and 620 provides same signal aggregation function shown in FIG. 87A. The configuration in connection with two converter cards 620 cannot provide auto negotiation function over copper cables. On the other hand, the configuration in connection with converter cards 630 and 620 can provide auto negotiation function over copper cables.

The RSGMII has a standard configuration in which MAC chip such as Ethernet switch chip and PHY chip are interconnected. The copper cable auto negotiation is done under a manner; a PHY chip negotiate with counter partner PHY chip and report a result to a MAC chip. In case of FIG. 87A, due to both of the converter cards 620*a* and 620*b* comprise PHY chip therefore the above communication protocol does not work. On the other hand, in case of FIG. 87B, a MAC chip and a PHY chip are connected each another so that the auto negotiation function does work.

FIG. 87C shows the configuration in connection with two converter cards 630*a* and 630*b*. The converter cards 630*a* and 630*b* are connected by the optical fibers 661 and 662. The converter card 630*a* is connected to copper cables 663 and 664. The converter card 630*b* is connected to copper cables 665 and 666.

The configuration shown in FIG. 87C, two MAC chips are interconnected so that the auto negotiation function does not work. Thus auto negotiation function against the remote transceiver 203 of the Ethernet switch 631 must be disabled in the configuration shown in FIG. 87C.

In the configuration shown in FIG. 87A, the signal of the copper cable 643 is transmitted to the signal of the copper cable 645, and the signal of the copper cable 644 is transmitted to the signal of the cooper cable 646. In the configuration shown in FIG. 87B, on the other hand, among copper cables 653, 654, 655, and 656, packet interchange is available. Because the Ethernet switch chip 631 mounted on the converter card 630 provides this packet interchange function. As a same manner, in the configuration shown in FIG. 87C provides packet interchange among the copper cables 653, 654, 655, and 656.

This behavior is not preferred for Metro Area Network. Because such a service in which communication between the copper cables 653 and 655 is assigned for the company A, and communication between the copper cables 654 and 656 is assigned for the company B, may exist. In the circumstance, communication interchange between the companies A and B is not preferred because of security issue.

As described previously, the Ethernet switch chip 631 comprises VLAN function. By utilizing the VLAN function, ports corresponds to the copper cables 653 and 655, respectively, may form a group. In the same manner, ports corresponds to the copper cables 654 and 656, respectively, may form a group. If two independent groups are defined by the VLAN, packet interchanges between these two groups are forbidden. Thus two independent communication lines are provided for customers. This group formation is flexible. Thus the configuration shown in FIG. 87B provides more flexibility in the network topology than the configuration shown in FIG. 87A. The configuration shown in FIG. 87C provides more flexibility due to both of the converter cards 630*a* and 630*b* comprise switches.

The configuration shown in FIG. 87A is hard to implement the loop back mode. On the other hand, the configuration shown in FIG. 87B may provide the loop back mode using port mirroring function in which Ether switch 631 comprises. The port mirroring function mirrors that input signal, Rx, or output signal, Tx, of a source port to the pre-defined port. If a receiving signal of certain input port is mirrored to the correspond output port of the same port pair, the behavior is as same as the loop back mode.

As another method, a port A and a port B are formed as a group by VLAN. Then an input signal, Rx, to the port A is transmitted as an output signal, Tx, from the port B. In this circumstance, if the output signal from the port B, Tx, is mirrored to the output signal of the port A, Tx, loop back is realized.

The configuration shown in FIG. 87B enables loop back function for the converter card 630. However, the configuration does not enable loop back function for the converter card 620. By contrast, the configuration shown in FIG. 83C enables loop back function for both of the converter cards, 630a and 630b.

The configuration shown in FIG. 86 comprises single Ethernet PHY chip 621. Despite this, the configuration may comprise two or more Ethernet PHY chips 621 and these Ethernet PHY chips 621 are connected to the Ethernet switch chip 631. For example, four local Gigabit Ethernet signals may be assigned to two remote Gigabit Ethernet signals. In this circumstance, flow control mechanism may be applied when traffic is heavy.

Another configuration, 20 local Fast Ethernet signals are assigned to two remote Gigabit Ethernet signals and the two remote Gigabit Ethernet signals are aggregated to a RSGMII signal, is also available.

The Thirtieth Embodiment

Figure 88:
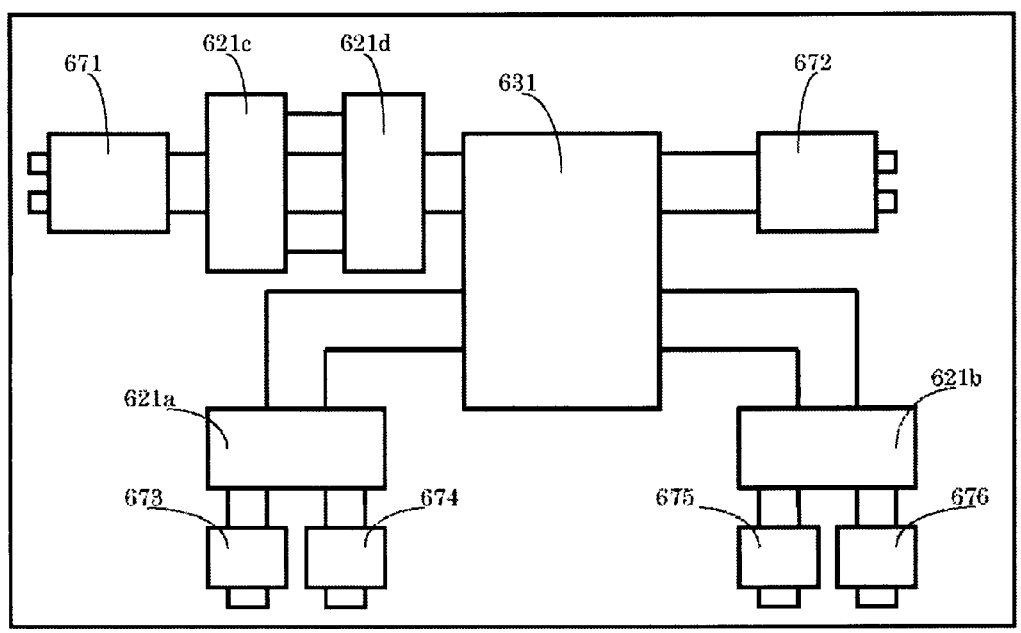
FIG. 88 is a schematic diagram showing the thirtieth embodiment of the converter card.

FIG. 88 shows the thirtieth embodiment of present invention. FIG. 88 shows a converter card 670. The converter card 670 comprises an Ethernet switch chip 631 which comprises RSGMII interfaces. A pluggable remote optical transceiver 671 and the Ethernet switch chip 631 are connected through two Ethernet PHY chips 621c and 621d which are connected in back-to-back from. The pluggable remote optical transceiver 671 and the Ethernet PHY chip 621c are directly connected over RSGMII interface. The converter card 630 comprises Ethernet PHY chips 621a and 621b. RJ45 jacks 673, 674, 675, and 676 are connected to the Ethernet PHY chips 621a and 621b, respectively. The RJ45 jacks, 673, 674, 675, and 676 are local signal ports. The pluggable optical transceivers 671 and 672 are remote signal ports.

This embodiment adopts 9 ports Ethernet switch chip, RTL8369 produced by Realtek Semiconductor Corp. as the Ethernet switch chip 631. This embodiment adopts RTL8212N as the Ethernet PHY chips 621a, 621b, 621c, and 621d. This embodiment adopts multi rate CWDM or DWDM transceivers whose data rate is up to 2.5 Gbit/s or 2.67 Gbit/s as the pluggable optical transceivers 671 and 672.

Figure 89:
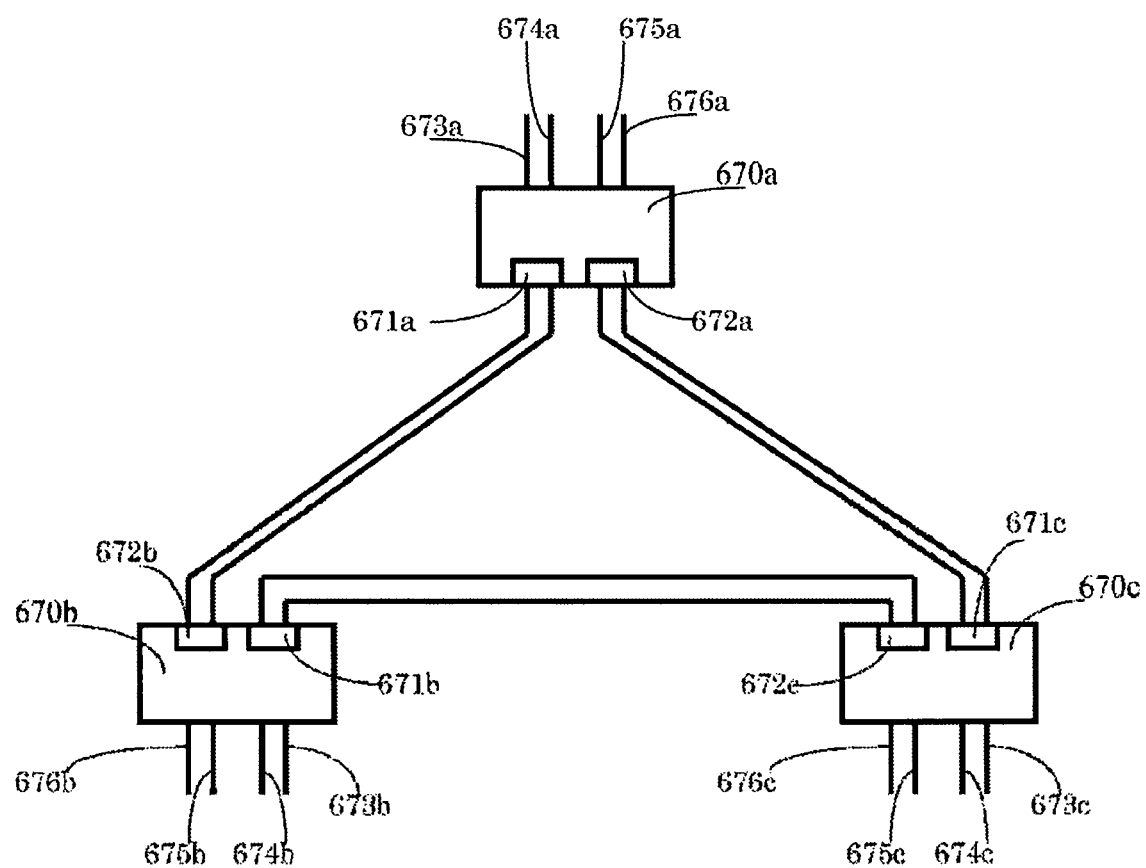
FIG. 89 is a schematic diagram showing the connection among the converter cards.
Figure 90:
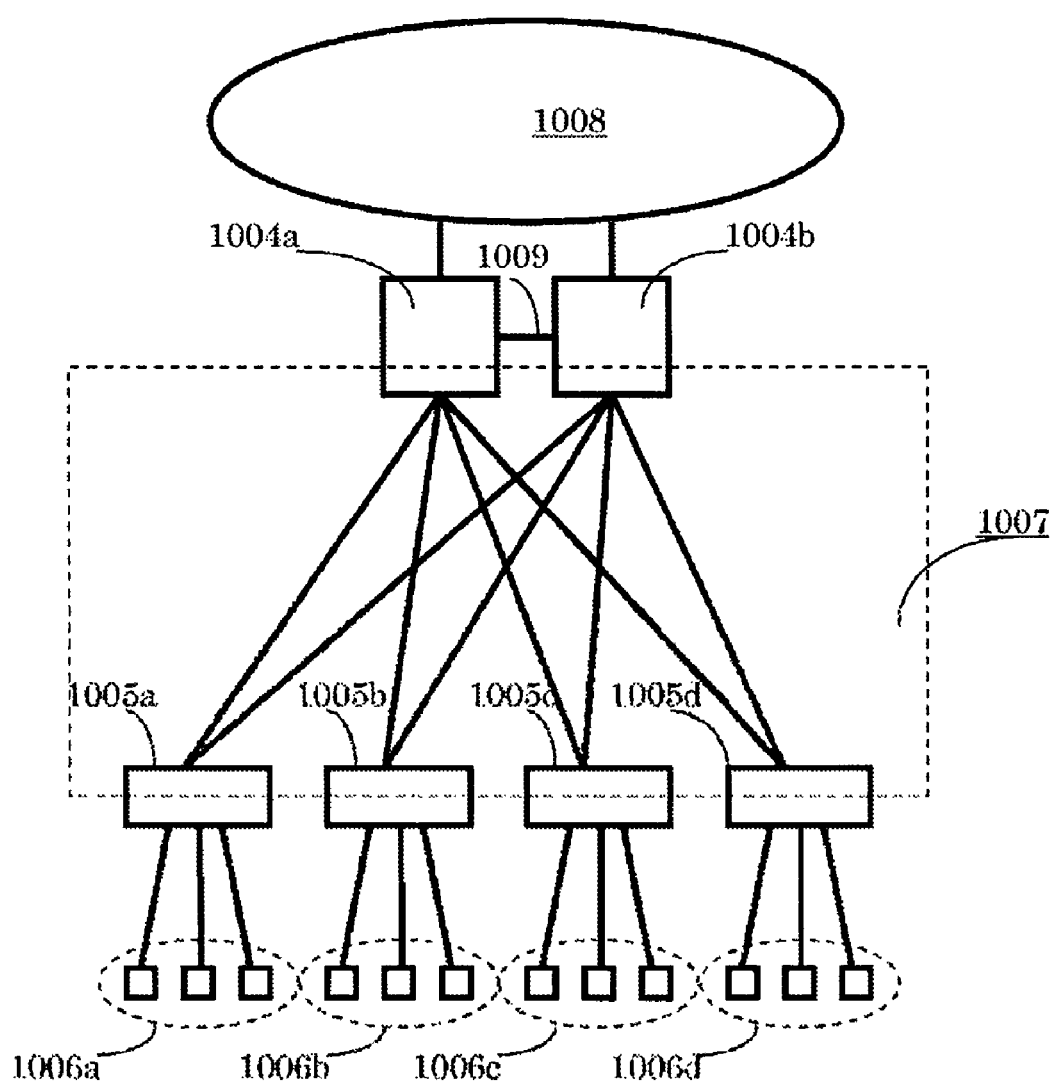
FIG. 90 is a schematic diagram showing conventional technology.

As shown in FIG. 89, when two converter cards 670 are connected each another a remote port 671 is connected to a remote port 672 of a counter partner. For example, as shown in FIG. 89, a remote port 671a of a converter card 670a is connected to a remote port 672b of a converter card 670b.

A manner of connection defined above makes all connections between Ethernet switch chip and Ethernet PHY chip authentic, thus all protocols are available. This fact is important for relatively complicated network such as shown in FIG. 89.

As shown in FIG. 89, three converter cards 670a, 670b, and 670c are connected as a ring-shape. A remote port 671a of the converter card 670a is connected to a remote port 672b of the converter card 670b. A remote port 672a of the converter card 670a is connected to a remote port 671c of the converter card 670c. A remote port 671b of the converter card 670b is connected to a remote port 672c of the converter card 670c.

In the configuration shown in FIG. 89, by using VLAN functions, among local ports 673a, 674a, 675a, 676a, 673a, 673b, 674b, 675b, 676b, 673c, 674c, 675c, and 676c, any connection pass is made. If a number of the edge-switch 5 is two, for example, transmission circuit 7 can be formed on the configuration shown in FIG. 89.

As shown in FIG. 89, the configuration comprises three converter cards connected as ring-shape. The configuration may comprise more converter cards connected as ring-shape. The configuration shown in FIG. 89 may be converted to single fiber operation by using the wavelength division multiplexing technologies. FIG. 89 shows four RJ45 jacks 673, 674, 675, and 676. However more or less local ports numbers are available.

What is claimed is:

1. An optical line amplifier for bi-directional optical transmission system comprising a first input/output port, a second input/output port, an optical amplifying means, a first wavelength division multiplexing means, a second wavelength multiplexing means, a third wavelength multiplexing means, a fourth wavelength multiplexing means, a first variable optical signal attenuating means, and a second variable optical signal attenuating means: wherein,
   (a) an optical signal of a first wavelength inputted from said first input/output port is transmitted to said second input/output port through said first wavelength division multiplexing means, said first variable optical signal attenuating means, said second wavelength division multiplexing means, said optical amplifying means, said third wavelength division multiplexing means, and said fourth wavelength division multiplexing means; and
   (b) an optical signal of a second wavelength inputted from said second input/output port is transmitted to said first input/output port through said fourth wavelength division multiplexing means, said second variable optical signal attenuating means, said second wavelength division multiplexing means, said optical amplifying means, said third wavelength division multiplexing means, and said first wavelength division multiplexing means.

2. An optical line amplifier of claim 1 wherein at least one of said first and second variable optical signal attenuating means is a pluggable fixed optical signal attenuating means.

3. An optical line amplifier of claim 1 wherein said optical amplifying means comprises a first-stage optical amplifier module and a second-stage optical amplifier module.

4. An optical line amplifier of claim 3 further comprising a gain flattening means wherein said gain flattening means is disposed between said first-stage optical amplifier module and said second-stage optical amplifier module.

5. An optical line amplifier of claim 3 further comprising a dispersion compensation means wherein said dispersion compensation means is disposed between said first-stage optical amplifier module and said second-stage optical amplifier module.

6. An optical line amplifier of claim 1 wherein said optical amplifying means is maintained at constant gain.

7. An optical transport device of claim 1 wherein said optical amplifying means is an erbium-doped optical amplifier.

8. An optical transport device for bi-directional optical transmission system comprising a first input/output port, a second input/output port, an optical amplifying means, a first wavelength division multiplexing means, a second wavelength multiplexing means, a third wavelength multiplexing means, a fourth wavelength multiplexing means, and an optical add drop means: wherein,
   (a) said optical amplifying means comprises a first-stage optical amplifier module and a second-stage optical amplifier module;
   (b) optical signals inputted from said first input/output port is transmitted to said second input/output port through said first wavelength division multiplexing means, said second wavelength division multiplexing means, said optical amplifying means, said third wavelength division multiplexing means, and said fourth wavelength division multiplexing means;
   (c) optical signals inputted from said second input/output port is transmitted to said first input/output port through said fourth wavelength division multiplexing means, said second wavelength division multiplexing means, said optical amplifying means, said third wavelength division multiplexing means, and said first wavelength division multiplexing means; and,
   (d) said optical add drop means is disposed between said first-stage optical amplifier module and said second-stage optical amplifier module.

9. An optical transport device of claim 8 further comprising a first variable optical signal attenuating means and a second variable optical signal attenuating means: wherein,
   (a) said first variable optical signal attenuating means is disposed between said first wavelength division multiplexing means and said wavelength division multiplexing means; and,
   (b) said second variable optical signal attenuating means is disposed between said fourth wavelength division multiplexing means and said second wavelength division multiplexing means.

10. An optical transport device of claim 9 wherein at least one of said first and second variable optical signal attenuating means is a pluggable fixed optical signal attenuating means.

11. An optical transport device of claim 8 further comprising a gain flattening means wherein said gain flattening means is disposed between said first-stage optical amplifier module and said second-stage optical amplifier module.

12. An optical transport device of claim 8 further comprising a dispersion compensation means wherein said dispersion compensation means is disposed between said first-stage optical amplifier module and said second-stage optical amplifier module.

13. An optical transport device of claim 8 wherein said optical amplifying means is maintained at constant gain.

14. An optical transport device of claim 8 wherein said optical amplifying means is an erbium-doped optical amplifier.

15. An optical transport device of claim 8 further comprising an optical signal receiving means wherein said optical signal receiving means comprises a PIN photodiode.

* * * * *